US011409409B1

(12) United States Patent
Sicora et al.

(10) Patent No.: US 11,409,409 B1
(45) Date of Patent: Aug. 9, 2022

(54) GRAPHICAL USER INTERFACES AND SYSTEMS FOR PRESENTING CONTENT SUMMARIES

(71) Applicant: Target Brands, Inc., Minneapolis, MN (US)

(72) Inventors: Caitlin Sicora, San Jose, CA (US); Priya Rajendran, Los Altos, CA (US); Westley M. Stringfellow, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/866,344

(22) Filed: May 4, 2020

Related U.S. Application Data

(63) Continuation of application No. 15/799,599, filed on Oct. 31, 2017, now Pat. No. 10,684,738.

(60) Provisional application No. 62/445,538, filed on Jan. 12, 2017, provisional application No. 62/445,531, filed on Jan. 12, 2017, provisional application No. 62/416,052, filed on Nov. 1, 2016, provisional application No. 62/416,046, filed on Nov. 1, 2016, provisional application No. 62/416,034, filed on Nov. 1, 2016, provisional application No. 62/416,073, filed on Nov. 1, 2016, provisional application No. 62/416,061, filed on Nov. 1, 2016, provisional (Continued)

(51) Int. Cl.

| | |
|---|---|
| ***G06F 3/0482*** | (2013.01) |
| ***G06F 3/04817*** | (2022.01) |
| ***G06F 3/0485*** | (2022.01) |
| ***G06F 16/435*** | (2019.01) |
| *H04L 51/52* | (2022.01) |
| *G06Q 50/00* | (2012.01) |

(52) U.S. Cl.
CPC ........ *G06F 3/04817* (2013.01); *G06F 3/0482* (2013.01); *G06F 3/0485* (2013.01); *G06F 16/435* (2019.01); *G06Q 50/01* (2013.01); *H04L 51/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,436,685 | B2 * | 9/2016 | Roth | G06F 3/0486 |
| 10,891,044 | B1 * | 1/2021 | Corsin | G06F 3/0485 |

(Continued)

*Primary Examiner* — Hien L Duong
(74) *Attorney, Agent, or Firm* — Fish & Richardson P.C.

(57) ABSTRACT

In one implementation, a computing device to provide a graphical user interface (GUI) for presenting content includes one or more processors; a network interface to establish a network connection with a remote server system; a display to output a plurality of graphical elements as part of the GUI; one or more input devices to receive user input related to the plurality of graphical elements; and memory storing instructions that, when executed, cause the one or more processors to perform operations including selecting a first content element; selecting second content elements; detecting a third content element comprising a content summary of the second content elements; and outputting, in the GUI on the display, a first graphical element for the first content element and a third graphical element for the third content element, wherein second graphical elements for the second content elements are hidden or collapsed in the GUI.

17 Claims, 79 Drawing Sheets

Related U.S. Application Data application No. 62/416,091, filed on Nov. 1, 2016, provisional application No. 62/416,065, filed on Nov. 1, 2016, provisional application No. 62/416,070, filed on Nov. 1, 2016.

(56) References Cited

U.S. PATENT DOCUMENTS

| | | | | |
|---|---|---|---|---|
| 2012/0166954 | A1* | 6/2012 | Roth | G06F 3/0482 715/730 |
| 2014/0100985 | A1 | 4/2014 | Lenahan et al. | |
| 2014/0279039 | A1 | 9/2014 | Systrom et al. | |
| 2015/0100458 | A1 | 4/2015 | Linden et al. | |
| 2016/0103805 | A1* | 4/2016 | Greenberg | G06F 3/0485 715/760 |
| 2016/0104130 | A1* | 4/2016 | Greenberg | G06Q 30/0255 705/16 |
| 2016/0104201 | A1* | 4/2016 | Greenberg | G06Q 30/0267 705/14.64 |
| 2016/0104202 | A1* | 4/2016 | Greenberg | G06F 3/0482 705/14.64 |
| 2016/0104205 | A1* | 4/2016 | Greenberg | G06Q 30/0272 705/14.68 |
| 2016/0124924 | A1* | 5/2016 | Greenberg | G06F 3/0483 715/738 |
| 2016/0171588 | A1* | 6/2016 | Linden | G06F 3/0488 705/26.7 |
| 2016/0321222 | A1* | 11/2016 | Greenberg | G06F 16/9577 |
| 2016/0343037 | A1 | 11/2016 | Nicholas et al. | |
| 2016/0350730 | A1* | 12/2016 | Greenberg | G06Q 50/01 |
| 2017/0262533 | A1* | 9/2017 | Chang | G06F 16/334 |
| 2017/0345075 | A1* | 11/2017 | Khandelwal | G06Q 30/0623 |
| 2018/0232121 | A1* | 8/2018 | Lewis | G06F 3/0485 |

* cited by examiner

GRAPHICAL USER INTERFACES AND SYSTEMS FOR PRESENTING CONTENT SUMMARIES

CROSS-REFERENCE TO RELATED APPLICATIONS

This application is a continuation of U.S. patent application Ser. No. 15/799,599, filed Oct. 31, 2017 (now U.S. Pat. No. 10,684,738), which claims the benefit of U.S. Provisional Application Ser. No. 62/445,538, filed Jan. 12, 2017; U.S. Provisional Application Ser. No. 62/445,531, filed Jan. 12, 2017; U.S. Provisional Application Ser. No. 62/416,034, filed Nov. 1, 2016; U.S. Provisional Application Ser. No. 62/416,052, filed Nov. 1, 2016; U.S. Provisional Application Ser. No. 62/416,046, filed Nov. 1, 2016; U.S. Provisional Application Ser. No. 62/416,065, filed Nov. 1, 2016; U.S. Provisional Application Ser. No. 62/416,061, filed Nov. 1, 2016; U.S. Provisional Application Ser. No. 62/416,073, filed Nov. 1, 2016; U.S. Provisional Application Ser. No. 62/416,070, filed Nov. 1, 2016; and U.S. Provisional Application Ser. No. 62/416,091, filed Nov. 1, 2016. The disclosures of the prior applications are considered part of (and are incorporated by reference) in the disclosure of this application.

TECHNICAL FIELD

This document generally describes technology related to providing improved graphical user interfaces (GUIs) on computing devices, such as mobile computing devices and other user computing devices.

BACKGROUND

GUIs are interfaces through which users are able to interact with computing devices and applications that are being executed thereon. For example, GUIs provide graphical presentations of information and graphical elements (e.g., icons, virtual buttons, visual indicators, textboxes, sliders, radio buttons, menus) that a user is able to interact with (e.g., select, activate) through one or more input devices (e.g., mouse, keys/buttons, scroll wheel, trackball, touch/presence-sensitive surface, camera). GUIs have been implemented across a variety of different computing devices, such as desktop computers, laptop computers, and mobile computing devices (e.g., smartphone, tablets, wearable computing devices).

GUIs have also been implemented to dynamically obtain and present information from remote computer systems (e.g., cloud computing systems). For example, social networking applications have been programmed to present GUIs that include a social feed of information relevant to a user who is logged into the application. Such social feeds can be "infinite"—meaning that when a user reaches the end of the content currently loaded into the client device, the social networking application can request additional content from the remote computer system and append the additional content to the social feed.

SUMMARY

This document generally describes technology for presenting multiple different types of content in a GUI on a client computing device. For example, a first type of content can be presented in a first content stream or feed, and a second type of content can be presented in a second content stream or feed that occurs within the first content stream. A variety of different types of content can be presented in such GUIs, like social media content, news content, messaging content, product content, productivity content, and/or other types of content.

In one implementation, a method for providing a graphical user interface (GUI) with a content stream includes receiving, at a computing device, social media posts to present in a vertical content stream that is vertically scrollable in the GUI; identifying, by the computing device, that a particular social media post includes tags one or more products that correspond to one or more product elements; outputting, by the computing device, the social media posts in the vertical content stream, wherein the particular social media post is designated in the GUI as being part of a horizontal content stream that is horizontally scrollable in the GUI; receiving, through an input subsystem of the computing device, horizontal scrolling input related to the particular social media post; and outputting, in response to receiving the horizontal scrolling input, a first of the one or more product elements in place of the particular social media post in the vertical content stream.

Such a method can optionally include one or more of the following features. The method can further include receiving, through the input subsystem, user input selecting a graphical element to purchase a product associated with the first product element; and adding, by the computing device, the product to a virtual shopping cart in response to receiving the user input. The vertical content stream can be an infinite social feed. The product can be added to the virtual shopping cart without leaving the infinite social feed or launching another application. The method can further include receiving, through the input subsystem of the computing device, vertical scrolling input while displaying the first product element; and outputting, in response to receiving the vertical scrolling input, a next social media post in the vertical content stream. The GUI can be output on the computing device by a social-retail application that being executed or interpreted on the computing device. The computing device can include a mobile computing device and the social-retail application comprises a mobile application. The social-retail application can be a web application that is being output by a web browser installed and running on the computing device.

In another implementation, a computing device to provide a graphical user interface (GUI) for presenting multiple types of content within a content stream includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including selecting first content elements to present in the GUI from the information received through the network interface, the first content elements being of a first type and each including a single content element; selecting second content elements to present in the GUI from the information received through the network interface, the second content elements being of a second type and each including a primary element and one or more secondary elements; and outputting, in a scrollable content stream in the GUI on the display, first graphical elements for the first content elements and second graphical elements for the second content elements, the scrollable content stream being scrollable along a first dimension of the display, the second graphical elements being scrollable along a second dimension of the display and within the scrollable content stream to transition between displaying the primary element and the one or more secondary elements, the second dimension being different from the first dimension.

Such a computing device can optionally include one or more of the following features. The second graphical elements can be presented initially in the scrollable content stream with their primary elements being displayed and the one or more secondary elements being hidden. The operations can further include receiving, through the one or more input devices, scrolling input along the second dimension related to a particular second graphical element that corresponds to a particular second content element; and outputting, in the scrollable content stream in the GUI on the display, a secondary element for the particular second content element in the particular second graphical element in response to receiving the scrolling input. Outputting the secondary element cab include replacing a primary element in the particular second graphical element with the secondary element. The replacing can include an animated transition from the primary element to the secondary element. The animated transition can include a scrolling animation that corresponds to the scrolling input along the second dimension. The operations can further include receiving, through the one or more input devices and while displaying the secondary element for the particular second content element in the particular second graphical element, additional scrolling input along the first dimension; and scrolling, while displaying the secondary element for the particular second content element in the particular second graphical element, the scrollable content stream in the GUI according to the additional scrolling input.

The first dimension can be a vertical dimension, and the second dimension can be a horizontal dimension. The first content elements can be first user-generated social media posts, the primary elements of the second content elements can be second user-generated social media posts that each tag one or more additional content elements described or depicted in the second user-generated social media posts, and the secondary elements of the second content elements can be the additional content elements. The second user-generated social media posts can include (i) user-generated images and (ii) tags that identify products depicted in the user-generated images, and the secondary elements can include product posts for the products identified by the tags, the product posts including retailer-provided images for the products and retailer-provided textual descriptions of the products. The primary elements can further include user-generated comments for the second user-generated social media posts, and the secondary elements can further include (i) user-generated reviews of the products in the product posts and (ii) selectable graphical elements to add corresponding ones of the products to a virtual shopping cart. The user-generated comments for the second user-generated social media posts can be from first groups of users, and the user-generated reviews for the products posts can be from second groups of users that are different from the first groups of users. The first groups of users can include users who have direct or indirect social media connections with an original poster of the second user-generated social media posts, and the second groups of users can include users who own or have otherwise used the products identified in the product posts.

The operations further can further include receiving, through the one or more input devices, scrolling input along the second dimension related to a particular second graphical element that corresponds to a particular second user-generated social media post; outputting, in the scrollable content stream in the GUI on the display, a particular product post for a particular product tagged in the particular second user-generated social media post in the particular second graphical element in response to receiving the scrolling input, the particular product post including (i) one or more user-generated reviews for the particular product and (ii) a particular selectable graphical element to add the particular product to the virtual shopping cart; receiving, through the one or more input device, user input selecting the particular selectable graphical element; adding, in response to receiving the selecting user input, the particular product to virtual shopping cart; outputting, in response to the particular product being successfully added to the virtual shopping cart, one or more visual elements confirming that the particular product has been added to the virtual shopping cart; receiving, through the one or more input devices and while displaying the particular product post in the particular second graphical element, additional scrolling input along the first dimension; and scrolling, while displaying the particular product post in the particular second graphical element, the scrollable content stream in the GUI according to the additional scrolling input. The operations can further include receiving, through the one or more input devices and after the scrolling of the scrollable content stream, further scrolling input along the second dimension related to another second graphical element that corresponds to another second user-generated social media post that is different from the particular second user-generate social media post; outputting, in the scrollable content stream in the GUI on the display, another product post for another product tagged in the other second user-generated social media post in the other second graphical element in response to receiving the further scrolling input, the other product post including (i) one or more user-generated reviews for the other product and (ii) another selectable graphical element to add the other product to the virtual shopping cart; receiving, through the one or more input device, additional user input selecting the other selectable graphical element; adding, in response to receiving the other selecting user input, the other product to virtual shopping cart; and outputting, in response to the other product being successfully added to the virtual shopping cart, one or more additional visual elements confirming that the other product has been added to the virtual shopping cart. The operations can further include receiving, through the one or more input devices, selection of a shopping cart element in the GUI; outputting, in the GUI, (i) a textual summary of the virtual shopping cart, including information identifying the particular product and the other product, and (ii) one or more graphical shopping cart elements to manage and electronically purchase items in the virtual shopping cart. The particular product and the other product can be from different retailers. Outputting the one or more visual elements can include replacing the particular selectable graphical element with the one or more visual elements. The information from the remote server system can be particular to a user who is logged-in on the computing device, and the first content elements and the second content elements can include user-generated content that has been generated by other users with whom the user has direct or indirect social media connections. The computing device can be a mobile computing device and the instructions can be a mobile application.

Certain implementations may provide one or more advantages. In a first example, a single GUI can be used to present different types of content that would otherwise be presented across separate GUIs or applications. Such features can improve the GUI on client computing devices, such as client computing devices with smaller form factor displays, like screens on mobile and wearable computing devices. For instance, by presenting multiple different types of content within a single GUI, users can more efficiently access information and features on their devices. In a second example, computing devices can operate more efficiently by not needing to run multiple applications concurrently, which can reduce memory usage and processing requirements.

In a third example, arrangements and sequences by which graphical elements are presented in the GUIs can provide more intuitive and efficient graphical presentations on client computing devices.

In a fourth example, some implementations of the system can be configured to provide an improved platform and user interface for users to access/contribute social media content (e.g., user posts, comments, shared content) with other types of content (e.g., product content, messaging content, productivity application content, news content). Such an improved platform and user interface can allow users to interact with each of the content items, to perform social media and other interactions (e.g., purchasing, messaging, productivity, news distribution) without exiting the graphical user interface and its content stream. In some implementations described below, the users can readily and seamlessly access and interact with user-generated content (e.g., social media content) and other content (e.g., product content) within a common user interface.

In a fifth example, a single GUI can be provided through which a user can readily navigate between different types of content and content streams without having to lose their context (e.g., where the user is within a content stream and what she is doing in the content stream). For instance, a single GUI can present a content stream of social media content that have perpendicular content streams of other types of content (e.g., product content, messaging content, productivity content) that are tagged in (or otherwise associated with) the social media content. Such a GUI can permit a user to navigate through the social media content stream (e.g., scroll through the social media content stream) and, when appropriate, to navigate in a perpendicular direction along one or more of the other content streams (e.g., product content stream) while maintaining her context within the social media content stream. For instance, within a single GUI a user can scroll to a first social media post (located adjacent to a second social media post), scroll along a product content stream that is relevant to the first social media post, and then from within the product content stream continue to scroll to the second social media post. The user's context within a primary content stream can be maintained while accessing a secondary content stream, and likewise, the context within secondary content streams can be maintained while accessing the primary content stream. Such context can additionally be maintained regardless of the actions performed within either content stream.

This document generally describes technology for presenting content in a GUI on a client computing device, such as content obtained from a computer system that can incorporate multiple different types of content. For example, a GUI can be configured to obtain and present first types of content in association with related second types of content. A variety of techniques can be used to identify related content, such as unidirectional tags between different types of content. For example, forward tags from first content types to second content types can be used to identify relevant second content types. In another example, reverse tags from second content types to first content types can be used to identify relevant second content types. A variety of different types of content can be presented in such GUIs, like social media content, news content, messaging content, product content, productivity content, and/or other types of content.

In one implementation, a method for presenting a graphical user interface (GUI) for product content that is associated with social media content includes receiving, at a computing device, (i) product content for a particular product and (ii) social media content that is associated with the particular product, wherein the social media content each include a product tag that identifies the particular product as being present in the social media content; outputting, by the computing device, the product content in a GUI; outputting, by the computing device, control features in the GUI for ordering the particular product from an online merchant; and outputting, by the computing device, the social media content as selectable elements in the GUI, wherein the selectable elements are configured to cause social media posts corresponding to the social media content to be displayed.

Such a method can optionally include one or more of the following features. The method can further include receiving, through an input subsystem of the computing device, first input selecting a particular selectable element that corresponds to particular social media content; and outputting, by the computing device, a particular social media post that corresponds to particular media content, wherein the particular social media post includes the product tag for the particular product and another product tag for another product. The particular social media content can include a user-generated image that depicts the particular product and the other product. The product tag and the other product tag can identify the particular product and the other product in the user-generated image. The method can further include receiving, through the input subsystem, second input selecting the other product; and outputting, by the computing device, other product content for the other product in the GUI, wherein the first input and the second input cause the GUI to navigate from the particular product to the other product via the particular social media content. The method can further include outputting, before outputting the product content, a social feed in the GUI, wherein the social feed includes social media posts, at least one of which includes the product tag for the particular product; receiving input selecting the particular product from the at least one social medial post in the GUI; and requesting, by the computing device, the product content for the particular product in response to receiving the input. The product content can be output in the GUI in response to receiving the input. The method can further include detecting, through a touchscreen of the input subsystem, a particular gesture after outputting the product content in the GUI; and outputting, in response to detecting the particular gesture, the social feed in the GUI, the social feed replacing the product content in the GUI.

The method can further include outputting, before outputting the product content, a search interface in the GUI with search results that include social media posts and products; receiving input selecting the particular product from the search results; and requesting, by the computing device, the product content for the particular product in response to receiving the input. The product content can be output in the GUI in response to receiving the input. The method can further include detecting, through a touchscreen of the input subsystem, a particular gesture after outputting the product content in the GUI; and outputting, in response to detecting the particular gesture, the search interface in the GUI, the search interface replacing the product content in the GUI. The method can further include outputting, before outputting the product content, an activity feed in the GUI with a chronological list of social actions performed by other users with regard to social media posts and products; receiving input selecting the particular product from the activity feed; and requesting, by the computing device, the product content for the particular product in response to receiving the input. The product content can be output in the GUI in response to receiving the input. The method can further include detecting, through a touchscreen of the input subsystem, a particular gesture after outputting the product content in the GUI; and outputting, in response to detecting the particular gesture, the activity feed in the GUI, the activity feed replacing the product content in the GUI. The method can further include outputting, before outputting the product content, a user profile interface in the GUI with saved social media posts and saved products, the saved social media posts and the saved products having been saved by a user of the computing device across one or more social interfaces provided by the GUI; receiving input selecting the particular product from the saved products in the user profile interface; and requesting, by the computing device, the product content for the particular product in response to receiving the input. The product content can be output in the GUI in response to receiving the input. The method can further include detecting, through a touchscreen of the input subsystem, a particular gesture after outputting the product content in the GUI; and outputting, in response to detecting the particular gesture, the user profile interface in the GUI, the user profile interface replacing the product content in the GUI.

The GUI can be output on the computing device by a social-retail application that being executed or interpreted on the computing device. The computing device can be a mobile computing device and the social-retail application can be a mobile application. The social-retail application can be a web application that is being output by a web browser installed and running on the computing device.

In another implementation, a computing device to provide a graphical user interface (GUI) for presenting content includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including selecting a first content element to present in the GUI from the information received through the network interface, the first content element comprising product content regarding a particular product; selecting second content elements to present in the GUI from the information received through the network interface, the second content elements comprising social media content that includes a product tag identifying the particular product; and outputting, in the GUI on the display, the first graphical element for the first content element and second graphical elements for the second content elements, the second graphical elements being selectable that, when selected, cause the GUI to present corresponding social media posts that include the social media content.

Such a computing device can optionally include one or more of the following features. The social media content can include user-generated images that depict, at least, the particular product. The operations can further include outputting, in the GUI on the display, control graphical elements that are configured to receive user input related to the first graphical element. The control graphical elements can include a selectable graphical element to add the particular product to a data record that correlates user-selected product information with a user account. The control graphical elements can include a selectable graphical element to transmit a request to a remote server system related to the particular product. The operations further include receiving, through the one or more input devices, first input selecting a particular second graphical element that corresponds to particular social media content; and outputting, in the GUI on the display, a third graphical element for a particular social media post that corresponds to particular media content, wherein the particular social media post includes the product tag for the particular product and another product tag for another product, wherein the third graphical element replaces the first graphical element and the second graphical elements in the GUI. The particular product can be different from the other product. The operations can further include receiving, through the one or more input devices, second input selecting the other product in the third graphical element; and outputting, in the GUI on the display, a fourth graphical element for the other product content corresponding to the other product, wherein the fourth graphical element replaces the third graphical element in the GUI, wherein the first input and the second input cause the GUI to navigate from the particular product to the other product via the particular social media content. The computing can be a mobile computing device and the instructions can be a mobile application.

Certain implementations may provide one or more advantages. In a first example, a single GUI can be used to present and combine different types of content that would otherwise be presented across separate GUIs or applications. Such features can improve the GUI on client computing devices, such as client computing devices with smaller form factor displays, like screens on mobile and wearable computing devices. For instance, by presenting multiple different types of content within a single GUI, users can more efficiently access information and features on their devices. In a second example, computing devices can operate more efficiently by not needing to run multiple applications concurrently, which can reduce memory usage and processing requirements.

In a third example, arrangements and sequences by which graphical elements are presented in the GUIs can provide more intuitive and efficient graphical presentations on client computing devices.

In a fourth example, some implementations of the system can be configured to provide an improved platform and user interface for users to access/contribute social media content (e.g., user posts, comments, shared content) with other types of content (e.g., product content, messaging content, productivity application content, news content). Such an improved platform and user interface can allow users to interact with each of the content items, to perform social media and other interactions (e.g., purchasing, messaging, productivity, news distribution) without exiting the graphical user interface and its content stream. In some implementations described below, the users can readily and seamlessly access and interact with user-generated content (e.g., social media content) and other content (e.g., product content) within a common user interface.

This document generally describes technology for presenting content summaries in a GUI on a client computing device, such as summaries of content obtained from a computer system. For example, a client computing device can be configured to obtain content, determine summaries for the content, and present the summaries in a GUI in connection with at least a portion of the content. Content summaries can be stored and used to provide improved and enhanced content searching and retrieval features, such as searching across content summaries that are associated with various types of content. For example, content summaries can be generated and stored in association with content. When search requests are received, the content summaries can be searched to determine results, which can allow for fewer computing resources (e.g., CPU cycles, RAM) to be used to generate results.

In one implementation, a method for presenting a graphical user interface (GUI) for social media content with content summaries, includes receiving, at a computing device, social media content to present in a social feed in a GUI on the computing device; identifying, by the computing device, a plurality of social media posts from the social media content, each of the plurality of social media posts including (i) content generated by a creator of the post and (ii) comments for the post that were generated by other users; detecting, by the computing device, that a portion of the plurality of social media posts further include content summaries that summarizes the comments for corresponding posts; and outputting, by the computing device, the plurality of social media posts in the social feed in the GUI, wherein the portion of the plurality of social media posts are output with graphical elements for the corresponding content summaries and with graphical elements for the corresponding comments being hidden or collapsed in the GUI.

Such a method can optionally include one or more of the following features. The content summaries can include particular emojis that appear in the comments generated by the other users. The particular emojis can be selected as content summaries from among a larger set of emojis used in the comments based on the particular emojis satisfying one or more criteria. The one or more selection criteria can include, at least, the particular emojis occurring in the comments with a greatest frequency among the larger set of emojis. Frequencies with which the larger set of emojis occur can be weighted based on how recently each instance occurs in the comments. The one or more selection criteria can include, at least, the particular emojis occurring at least a threshold number of times in the comments. The one or more selection criteria can include, at least, the particular emojis occurring in a greatest number of comments among the larger set of emojis.

The method can further include receiving, at a computing device, product content describing a product that is tagged in the social media posts; identifying, by the computing device, a particular social media post that tags the product; outputting, by the computing device, one or more graphical elements for the particular social media post that indicates that the particular social media post includes a product tag and that horizontal scrolling is permitted within the GUI to access a product element for the tagged product. The method can further include receiving, through the GUI, horizontal scrolling input received in relation to the particular social media post; identifying, by the computing device, the product element from the product content, the product element including (i) content describing the product and (ii) reviews of the product that were generated by a group of users; detecting, by the computing device, that the product element further includes a content summary that summarizes the reviews for corresponding product; and outputting, by the computing device, the product element in place of the particular social media post in the social feed in the GUI in response to receiving the horizontal scrolling input, wherein the product element is output with graphical elements for the corresponding content summary and with graphical elements for the corresponding reviews being hidden or collapsed in the GUI. The content summaries can include particular hashtags that appear in the comments generated by the other users. The content summaries can include particular keywords that appear in the comments generated by the other users.

In another implementation, a method for presenting a graphical user interface (GUI) for searching social media content includes outputting, in a GUI on a computing device, a search field; receiving, at the computing device, a search query entered through the search field; transmitting, by the computing device, the search query to a computer system hosting social media content that includes, at least, social media posts and user comments related to the social media posts, wherein the computer system maintains content summaries of the user comments; receiving, at the computing device, search results for the search query from the computer system, wherein the search results are determined by the computer system based on a comparison of the search query with one or more of: the social media posts and the content summaries; and outputting, in the GUI on the computing device, the search query and the search results.

Such a method can optionally include one or more of the following features. The search query can include one or more emojis. The content summaries can include particular emojis that appear in the comments generated by the other users. The search results can include one or more of: one or more social media posts with corresponding content summaries that include the one or more emojis, one or more identifiers for users who created social media posts with corresponding content summaries that include the one or more emojis, and one or more hashtags that are included in social media posts with corresponding content summaries that include the one or more emojis. The computer system can further host product content that is tagged in social media content, the product content including, at least, product elements and user reviews related to the product elements. The computer system can maintain content review summaries of the user reviews. The search results can be determined by the computer system based on a comparison of the search query additionally with one or more of: the product elements and the content review summaries for the user reviews. The search results can include one or more of: one or more social media posts with corresponding content summaries that match the search query, one or more identifiers for users who created social media posts with corresponding content summaries that match the search query, one or more hashtags that are included in social media posts with corresponding content summaries that match the search query, and one or more product elements with corresponding content review summaries that match the search query.

In another implementation, a method for presenting a graphical user interface (GUI) for emoji-based analysis of social media content includes receiving, at a computing device, user input in a GUI to present emoji-based analytics related to social media posts created through a particular social media account, transmitting, by a computing device, a request to a computer system for the emoji-based analytics to a computer system hosting social media content that includes, at least, social media posts and user comments related to the social media posts, wherein the computer system maintains emoji summaries of the user comments; receiving, at the computing device, the emoji-based analytics for the particular social media account from the computer system; and outputting, in the GUI on the computing device, the emoji-based analytics, wherein the emoji-based analytics include information indicating user reactions to the social media posts through emojis the search query and the search results.

Such a method can optionally include one or more of the following features. The emoji-based analytics can include, at least, a frequency with which each of a plurality of emojis occur in the user comments for each of the social media posts. The plurality of emojis can be arranged along a emotive spectrum according to one or more emotions that are represented by the plurality of emojis.

In another implementation, a computing device to provide a graphical user interface (GUI) for presenting content includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including selecting a first content element to present in the GUI from the information received through the network interface, the first content element comprising a social media post created by a first user; selecting second content elements to present in the GUI from the information received through the network interface, the second content elements comprising user comments related to the social media post created by one or more other users; detecting a third content element from the information received through the network interface, the third content element comprising a content summary of the user comments; and outputting, in the GUI on the display, a first graphical element for the first content element and a third graphical element for the third content element, wherein second graphical elements for the second content elements are hidden or collapsed in the GUI based on the third graphical element being displayed in the GUI.

Such a computing device can optionally include one or more of the following features. The social media post can include (i) a user-generated image that depicts, at least, a particular product, and (ii) a product tag that identifies the particular product as being depicted in the user-generated image. The operations can further include selecting a fourth content element from the information received through the network interface, the fourth content element comprising a product element that corresponds to the particular product identified by the product tag in the social media post; receiving, through the one or more input device, user input related to transition from presenting the first graphical element to presenting a fourth graphical element for the fourth content element; and outputting, in the GUI on the display, the fourth graphical element in place of the first graphical element in response to the user input. The user input can include horizontal scrolling input related to the first graphical element received through the one or more input devices. The operations can further include selecting fifth content elements to present in the GUI from the information received through the network interface, the fifth content elements comprising user reviews related to the particular product; detecting a sixth content element from the information received through the network interface, the sixth content element comprising a review summary of the user reviews; and outputting, in the GUI and in combination with outputting the fourth graphical element, a sixth graphical element for the sixth content element that replaces the third graphical element in the GUI, wherein fifth graphical elements for the fifth content elements are hidden or collapsed in the GUI based on the sixth graphical element being displayed in the GUI. The review summary can include one or more emojis that are included in the user reviews. The content summary can include one or more emojis that are included in the user comments. The computing device can be a mobile computing device and the instructions can be a mobile application.

Certain implementations may provide one or more advantages. In a first example, presenting content summaries can allow a GUI to present substantially the same amount of information through graphical elements that occupy a smaller proportion of the area on a display. For example, the GUI can present content summaries in graphical elements that use less area on a computing device's display than graphical elements that would be used to present all of the content that is being summarized. While display area is a consideration with all computing devices providing GUIs, conservation of and efficient usage of display area can be of particular concern on devices with smaller form factor displays, like mobile computing devices (e.g., smartphones, tablets, smartwatches, other wearable computing devices). Such content summaries can provide for a more efficient and improved GUI that is able to more concisely and effectively convey information to computing device users.

In a second example, content summaries can be dynamically generated from a wide range of user inputs that are not constrained, for example, to a small set of possible reactions. For instance, instead of providing a limited set of options for reacting to a social media post, such as selectable buttons to "like" or "love" a post, content summaries can be generated from a wider range of characters and character encodings (e.g., emoji encodings) to provide for a wider range of reactions to be surfaced with social media posts. For instance, a content summary for a social media post can be determined based on the emojis that are used in comments for the social media post, which can allow the content summary to vary dynamically over time and from post to post based on the specific reactions that users provide in the comments.

In a third example, content summaries can allow content to be more efficiently retrieved, served, and searched. For example, a computer server system can regularly update and store content summaries. When content is requested by a client computing device, such a server system can retrieve and serve the predetermined and stored content summary instead of having to retrieve and process the individual content elements that it summarizes. Such pre-determination of content summaries can allow for fewer computing resources to be used by the server system (e.g., fewer processor cycles, fewer disc read operations, less RAM used), which can additionally allow for a response to be more quickly served to client computing devices. Similarly, in a fourth example, content summaries can allow for relevant content to be identified more efficiently through searching/analyzing content summaries instead of the actual content. For instance, content summaries can be searched with greater efficiency by a computer server system than the underlying content they summarize, which can allow for results to be generated and served more quickly using fewer computational resources. In a fifth example, content summaries can provide an additional search dimension for identifying relevant content. For instance, content summaries can include one or more emojis that summarize the emojis used in comments for a social media post. Searching emoji summaries for social media posts can allow for posts to be identified that have particular user reactions (represented through emojis), which can be different from searching based on the content (e.g., keywords, tags, hashtags, links, images) included in social media posts.

In a fifth example, content summaries can be generated for and presented within a single GUI for different types of content that would otherwise be presented across separate GUIs or applications. Such features can improve the GUI on client computing devices, such as client computing devices with smaller form factor displays, like screens on mobile and wearable computing devices. For instance, by presenting content summaries for multiple different types of content within a single GUI, users can more efficiently access information and features on their devices, and can have normalized/common features across different types of content. In a sixth example, computing devices can operate more efficiently by not needing to run multiple applications concurrently, which can reduce memory usage and processing requirements.

In a seventh example, arrangements and sequences by which graphical elements are presented in the GUIs can provide more intuitive and efficient graphical presentations on client computing devices.

In a eight example, some implementations of the system can be configured to provide an improved platform and user interface for users to access/contribute social media content (e.g., user posts, comments, shared content) with other types of content (e.g., product content, messaging content, productivity application content, news content). Such an improved platform and user interface can allow users to interact with each of the content items, to perform social media and other interactions (e.g., purchasing, messaging, productivity, news distribution) without exiting the graphical user interface and its content stream. In some implementations described below, the users can readily and seamlessly access and interact with user-generated content (e.g., social media content) and other content (e.g., product content) within a common user interface, such as through providing reactions that are reflected in a dynamically determined and updated content summary.

This document generally describes technology for associating multiple different types of content with each other so that they can presented together within a single GUI on a client computing device. For example, a GUI can be provided on a first computing device for associating a first type of content with a second type of content, and uploading the content and their associations to a computer server system. A GUI can also be provided on a second computing device for presenting the first and second types of content in a common interface, such as one in which the first type of content is presented in a first content stream or feed, and the second type of content is presented in a second content stream or feed that occurs within the first content stream. A variety of different types of content can be presented in such GUIs, like social media content, news content, messaging content, product content, productivity content, and/or other types of content.

In one implementation, a method for providing a graphical user interface (GUI) to create a social media post with tagged products includes receiving, at a computing device, user input to create a social media post; outputting, in a GUI on the computing device, one or more selectable features through which a user is able to provide information for the social media post; receiving, via the one or more selectable features, a user-generated photo for the social media post, wherein the user-generated photo depicts one or more products; receiving, via the one or more selectable features, user designation of a product tag that identifies at least one of the products depicted in the photo; receiving, via the one or more selectable features, a request to upload the post with, at least, the photo and the product tag; and transmitting, by the computing device, the post with the photo and the product tag to a server system, wherein the server system stores the post and serves the post with a product element corresponding to the tagged product to other computing devices.

Such a method can optionally include one or more of the following features. Receiving the user designation of the product tag can include receiving, via the one or more selectable features, a search query for the product; transmitting, by the computing device, the search query to the server system; receiving, at the computing device, search results for the search query from the server system, wherein the search results include information for candidate products; outputting, in the GUI, the information for the candidate products; receiving, in the GUI, selection of a particular candidate product; and designating, by the computing device, an identifier for the particular candidate product as the product tag. The search results can include (a) in-network search results and (b) out of network search results. The in-network search results can include products that are provided by the server system or an affiliate server system. The out of network search results can include products that are provided by other server systems that are different from the server system and the affiliate server system. The search results can be grouped in the GUI according to whether they are in-network search results or out of network search results. The in-network search results can be presented by default and the out of network search results are initially hidden from view in the GUI.

As part of storing the post, the server system can be programmed (i) to determine whether the product element corresponding to the tagged product is already stored in a database accessible to the server system, and (ii) in response to determining that the product element is not present in the database, to generate the product element for the tagged product. As part of generating the product element, the server system can be programmed (i) to retrieve information describing the tagged product from one or more other server systems and (ii) to store the information in the database in association with the post. The post and the product element can be different types of content that are configured to be presented on the other computing devices in a common GUI. Presentation of the post and the product element in the common GUI can include (i) the post being presented in a vertical content stream that is vertically scrollable in the common GUI and (ii) the product element being presented within the vertical content stream in response to horizontal scrolling input related to the post.

The method can further include receiving, via the one or more selectable features, user designation of the post for publication by the server system at a user-designated future time. The post can be transmitted to the server system with the user-designated future time. The server system can be programmed to delay publication of the post until the user-designated future time. The method can further include receiving, from the server system, one or more proposed future publication times, wherein the future publication times are determined by the server system based on past post performance by the user; and outputting, in the GUI, the one or more proposed future publication times as selectable features. Receiving the user designation can include receiving selection of one of the proposed future publication times.

The method can further include receiving, from the server system, one or more proposed hashtags for the post, wherein the proposed hashtags are determined by the server system based on currently trending hashtags; outputting, in the GUI, the one or more proposed hashtags as selectable features; receiving, via the GUI, selection of a particular hashtag from the one or more proposed hashtags. The post can further be transmitted to the server system with the particular hashtag. The method can further include receiving, from the server system, one or more proposed location tags for the post, wherein the proposed locations are determined by the server system based on current or previous locations of the client computing device; outputting, in the GUI, the one or more proposed location tags as selectable features; receiving, via the GUI, selection of a particular location tag from the one or more proposed location tags. The post can further be transmitted to the server system with the particular location tag.

In another implementation, a method for providing a graphical user interface (GUI) to create a social media post with tagged products can include receiving, at a computing device, user input to create a social media post; outputting, in a GUI on the computing device, one or more selectable features through which a user is able to provide information for the social media post; receiving, via the one or more selectable features, a user-generated photo for the social media post, wherein the user-generated photo depicts one or more products; receiving, via the one or more selectable features, a user request to crowd source tagging the one or more products depicted in the photo; receiving, via the one or more selectable features, a request to upload the post with, at least, the photo and the user request; and transmitting, by the computing device, the post with the photo and the user request to a server system, wherein the server system stores the post and serves the post with a product tag request element that is programmed to permit other users to propose product tags for the post.

Such a method can optionally include one or more of the following features. The method can further include receiving, at the computing device, a proposed product tag for the post, the proposed product tag having been designated by another user via the product tag request element; outputting, in the GUI, the proposed product tag for the post along with selectable options to accept and decline the proposed product tag; receiving, via the GUI, selection of the option to accept the proposed product tag; transmitting, by the computing device, information identifying an accepted product tag to the server system. The server system can store the post in association with the accepted product tag and serves the post with a product element corresponding to the product identified in the accepted product tag to other computing devices.

In another implementation, a computing device to provide a graphical user interface (GUI) for presenting multiple types of content within a content stream includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including outputting first graphical control elements to present in the GUI that are configured to permit a user to provide information for a social media post; receiving user input through the first graphical control elements and the input devices designating the information for the social media post, outputting second graphical control elements to present in the GUI that are configured to permit the user to tag a product that is identified in the social media post; receiving user input through the second graphical control elements and the input devices tagging a product in the social media post, transmitting over the network interface and to the remote server system the information for the social media post and the designated tags, wherein the remote server system is programmed to store and serve the social media post with a product element corresponding to the tagged product to other computing devices.

Such a computing device can optionally include one or more of the following features. The post and the product element can be different types of content that are configured to be presented on the other computing devices in a common GUI. Presentation of the post and the product element in the common GUI can include (i) the post being presented in a vertical content stream that is vertically scrollable in the common GUI and (ii) the product element being presented within the vertical content stream in response to horizontal scrolling input related to the post. The operations can further include outputting third graphical control elements to present in the GUI that are configured to permit the user to select a future time to publish the social media post; receiving user input through the third graphical control elements and the input devices designating a particular future time for publication of the social media post. The social media post can be transmitted to the remote server system with the particular future time. The remote server system can be programmed to delay publication of the post until the particular future time. The operations can further include receiving, from the remote server system over the network interface, one or more proposed future publication times, wherein the future publication times are determined by the remote server system based on past post performance by the user. At least a portion of the third graphical control elements can correspond to the one or more proposed future publication times. The computing device can be a mobile computing device and the instructions can be a mobile application.

Certain implementations may provide one or more advantages. In a first example, a single GUI can be used associate and present different types of content that would otherwise be presented across separate GUIs or applications. Such features can improve the GUI on client computing devices, such as client computing devices with smaller form factor displays, like screens on mobile and wearable computing devices. For instance, by associating and presenting multiple different types of content within a single GUI, users can more efficiently access information and features on their devices. In a second example, computing devices can operate more efficiently by not needing to run multiple applications concurrently, which can reduce memory usage and processing requirements.

In a third example, arrangements and sequences by which graphical elements are presented in the GUIs can provide more intuitive and efficient graphical presentations on client computing devices.

In a fourth example, some implementations of the system can be configured to provide an improved platform and user interface for users to access/associate/contribute social media content (e.g., user posts, comments, shared content)

with other types of content (e.g., product content, messaging content, productivity application content, news content). Such an improved platform and user interface can allow users to associate and interact with each of the content items, to perform social media and other interactions (e.g., purchasing, messaging, productivity, news distribution) without exiting the graphical user interface and its content stream. In some implementations described below, the users can readily and seamlessly access, associate, and interact with user-generated content (e.g., social media content) and other content (e.g., product content) within a common user interface.

In a fifth example, user interfaces and systems can allow social content to be annotated with tags identifying other types of content, such as product content, included in the social content, which can provide a variety of advantages. For instance, product tags can permit a single GUI to present both social content and product content so that a user can readily navigate between and to perform actions (e.g., social actions, product action) with regard to different types of content from within a common interface In a sixth example, tags for social content can be automatically determined and suggested, and presented with graphical elements that a user can simply select instead of having to search for and locate. For example, entering text and searching through interfaces on some computing devices, such as touchscreen devices, can be cumbersome and more time consuming than on other computing devices, such as desktop and laptop computers with full keyboards. By automatically identifying relevant tags and suggesting them to users through one or more readily selectable buttons, the GUI can be improved by allowing a procedure (e.g., designating a tag) to be completed in less time and through fewer interactions with the GUI. Tags can be automatically identified in any of a variety of ways, such as based on tags that are currently trending, optical analysis of user-generated photos/videos (e.g., optical object recognition, optical face recognition), textual analysis of user-generated text (e.g., automatic sentiment analysis), analysis of information from device sensors/components (e.g., location analysis, environment analysis), and/or other analysis techniques. Such automatic analysis techniques can improve the likelihood of the automatic tag suggestion/determination accurately capturing information contained in social content, which can increase the likelihood that the user will select the automatically suggested tags and will not have to manually search or enter tags.

This document generally describes technology for interacting with graphical elements presented in a GUI on a client computing device. For example, graphical elements can be presented in a GUI to permit various content elements to be saved, stored, or otherwise associated with a user account, including different types of content elements. For instance, a first type of content element can be associated with a user account and a different, second type of content element can be associated with the user account. Content elements can be saved/stored/otherwise associated with a user account with various attributes, such as being publicly or privately associated with a user account. For instance, public association of a content element with a user account can permit that association to be viewed by other users, whereas private association of a content element can restrict that association from being viewed by anyone other than the owner of the user account to which the content element was associated.

In one implementation, a method for providing a graphical user interface (GUI) includes receiving, at a computing device associated with a first user, a social media post to present in a content stream in the GUI, the received social media post including (i) one or more content elements generated by a second user, (ii) user information identifying the second user, and (iii) save count information that indicates a number of times the social media post has been persistently saved by other users, the social media post being received from a computer system; outputting, by the computing device, the social media posts in the content stream, the social media posts being output with (i) the one or more content elements, (ii) the user information for the second user, (iii) a selectable save feature that is selectable by the first user to persistently save the social media post, and (iv) the save count information in association with the selectable save feature; receiving, through an input subsystem of the computing device, input selecting the selectable save feature; transmitting, by the computing device and in response to receiving the input, a request to the computer system to persistently save the social media post in association with an account for the first user; receiving, at the computing device, confirmation that the social media post has been saved in association the account for the first user; and outputting, in response to receiving the confirmation, a graphical update for the social media post, the graphical update including incrementing the save count information and replacing the selectable save feature with, at least, a graphical icon indicating that the social media post has already been saved by the first user.

Such a method can optionally include one or more of the following features. The method can further include receiving, through the input subsystem, input to present a profile for the first user; and outputting, by the computing device, profile information for the first user in the GUI, including outputting an area that persistently presents saved content in association with the first user, the area including information identifying the social media post as having been saved by the first user. The one or more content elements can include (i) a digital photo taken by the first user and (ii) a textual description of the digital photo authored by the first user. The digital photo can depict one or more products. The social media post can include one or more product tags that identify the one or more products. The computing device can further receive one or more product elements that correspond to the one or more products that are identified by the one or more product tags. The social media post can be presented in a vertical content stream that is vertically scrollable in the GUI. The social media post can be designated in the GUI as being part of a horizontal content stream that is horizontally scrollable in the GUI. The method can further include receiving, through an input subsystem of the computing device, horizontal scrolling input related to the social media post; and outputting, in response to receiving the horizontal scrolling input, a first of the one or more product elements in place of the particular social media post in the vertical content stream. The first product element can be output with (i) product information, (ii) a selectable order feature that is selectable by the first user to order a corresponding first product from within the content stream, (iii) another selectable save feature that is selectable by the first user to persistently save the first product element, and (iv) other save count information that indicates a number of times that the first product element has been saved by the other users. The method can further include receiving, through an input subsystem of the computing device, input selecting the other selectable save feature for the first product element; transmitting, by the computing device, a second request to the computer system to persistently save the first product element in association with the account for the first user; receiving, at the computing device, confirmation that the first product element has been saved in association the account for the first user; and outputting, in response to receiving the confirmation, a graphical update for the first product element, the graphical update for the first product element including incrementing the other save count information and replacing the other selectable save feature with, at least, the graphical icon indicating that the first product element has already been saved by the first user. The method can further include receiving, through the input subsystem, input to present a profile for the first user; and outputting, by the computing device, profile information for the first user in the GUI, including outputting an area that persistently presents saved content in association with the first user, the area including information identifying (i) the social media post as having been saved by the first user and (ii) the first product element as having been saved by the first user. The method can further include receiving, through the input subsystem, user input selecting the selectable order feature to order the product associated with the first product element; and adding, by the computing device, the product to a virtual shopping cart in response to receiving the user input. The vertical content stream can be an infinite social feed. The product can be added to the virtual shopping cart without leaving the infinite social feed or launching another application.

Persistently saving the social media post in association with the account for the first user can cause the computer system to: distribute, to a group of computing devices associated with a group of users who are socially-connected to the first user, the social media post for presentation in content streams on the group of computing devices, the social media post being distributed with (i) information identifying that the first user saved the social media post and (ii) information identifying the second user who generated the social media post, and distribute, to a second computing device associated with the second user, information summarizing user interactions with the social media post for presentation in an activity feed on the second computing device. The social connections between the first user and the group of users can include one or more of following relationships and/or friendship relationships. The information summarizing the user interactions can include (i) information summarizing users saving the social media post, (ii) information summarizing users sharing the social media post, (iii) information summarizing comments on the social media post, and (iv) information summarizing users purchasing products tagged in the social media post.

The GUI can be output on the computing device by a social-retail application that being executed or interpreted on the computing device. The computing device can be a mobile computing device and the social-retail application can be a mobile application. The social-retail application can be a web application that is being output by a web browser installed and running on the computing device.

In another implementation, a computing device to provide a graphical user interface (GUI) for presenting multiple types of content within a content stream includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including selecting first content elements to present in the GUI from the information received through the network interface, the first content elements being of a first type and each including first information indicating a number of times that they have been saved across a population of users; selecting second content elements to present in the GUI from the information received through the network interface, the second content elements being of a second type and each including second information indicating a number of times that they have been saved across the population of users; and outputting, in a scrollable content stream in the GUI on the display, (i) first graphical elements for the first content elements and (ii) second graphical elements for the second content elements. The first graphical elements can include the first information and first selectable elements that cause corresponding ones of the first content elements to be persistently saved in association with an account for a user of the computing device. The second graphical elements can include the second information and second selectable elements that cause corresponding ones of the second content elements to be persistently saved in association with the account for the user of the computing device.

Such a computing device can optionally include one or more of the following features. The operations can further include receiving, through the one or more input devices, first selection input of a particular one of the first selectable elements that corresponds to a particular first content element; receiving, through the one or more input devices, second selection input of a particular one of the second selectable elements that corresponds to a particular second content element; and outputting, in a profile page for the user in the GUI on the display, a graphical area that presents content elements persistently saved by the user via the content stream, the graphical area including graphical elements identifying, at least, the particular first content element and the particular second content element. The operations can further include transmitting, to the remote server system via the network interface, a first request for the particular first content element to be saved in association with the account for the user; receiving, from the remote server system via the network interface, first confirmation that the particular first content element has been persistently saved to the account for the user; updating, in response to receiving the first confirmation, a particular first graphical element representing the particular first content element, the updating including (i) replacing the particular one of the first selectable elements with a graphical icon indicating that the particular first content element has been persistently saved to the account for the user and (ii) incrementing particular first information for the particular first content element; transmitting, to the remote server system via the network interface, a second request for the particular second content element to be saved in association with the account for the user; receiving, from the remote server system via the network interface, second confirmation that the particular second content element has been persistently saved to the account for the user; and updating, in response to receiving the first confirmation, a particular second graphical element representing the particular second content element, the updating including (i) replacing the particular one of the second selectable elements with a graphical icon indicating that the particular second content element has been persistently saved to the account for the user and (ii) incrementing particular second information for the particular second content element. The computing device can be a mobile computing device and the instructions can be a mobile application.

Certain implementations may provide one or more advantages. In a first example, a single GUI can be used to present different types of content and to present graphical elements for interacting with the different types of content, which may otherwise be presented across separate GUIs or applications. Such features can improve the GUI on client computing devices, such as client computing devices with smaller form factor displays, like screens on mobile and wearable computing devices. For instance, by presenting multiple different types of content and graphical elements to interact with the different types of content within a single GUI, users can more efficiently access information and features on their devices. Furthermore, computing devices can operate more efficiently by not needing to run multiple applications concurrently, which can reduce memory usage and processing requirements.

In a second example, multiple different types of content and services can additionally be saved, stored, or otherwise associated with a common user account through a GUI. This can allow for a single user account to store and combine different types of content elements and services, including associations between different types of content and services (e.g., a first type of content tagging another type of content), which may otherwise be associated with different and separate user accounts across multiple different services. For example, instead of having a first account with a first service to view and interact with a first type of content (e.g., social media content) and a second account with a second service to view and interact with a second type of content (e.g., product content), such services and accounts can be combined into a single service and a single account. Additionally, such combined services can provide additional features around cross-content associations (e.g., social media content tagging products in the social media content) that would not be possible across different services. This can allow for a more robust and improved GUI to be provided to users, which can alleviate need to switch between GUIs and to present multiple different GUIs to accomplish similar tasks, as described in the preceding paragraph.

In a third example, arrangements and sequences by which graphical elements are presented in the GUIs can provide more intuitive and efficient graphical presentations on client computing devices.

In a fourth example, some implementations of the system can be configured to provide an improved platform and user interface for users to access/contribute social media content (e.g., user posts, comments, shared content) with other types of content (e.g., product content, messaging content, productivity application content, news content). Such an improved platform and user interface can allow users to interact with each of the content items, to perform social media and other interactions (e.g., purchasing, messaging, productivity, news distribution) without exiting the graphical user interface and its content stream. In some implementations described below, the users can readily and seamlessly access and interact with user-generated content (e.g., social media content) and other content (e.g., product content) within a common user interface.

In a fifth example, social media content and other types of content that are tagged in (or otherwise associated with) the social media content can be saved in association with a user's account, which can persistently associate the saved content elements with the user's account. For example, saved content elements can be presented on a user's profile page so that the user can readily find and view previously saved content elements. Saved content elements can be automatically organized on the user's profile page to further assist a user in locating saved content elements that they are interested in. For example, product elements that are saved to a user's profile can be automatically organized according to a product taxonomy, which can slot products into different product categories and subcategories. Other techniques for automatically organizing content elements are also possible, such as through optical analysis of images (e.g., object identification, facial recognition), semantic analysis of text (e.g., automatically determining content through textual descriptions and/or user comments), sentiment analysis based on user reactions (e.g., automatically analyzing user reactions, such as emojis), location-based organization (e.g., organization based on tagged location), and/or other factors. GUIs can be programmed to present the automatic organization of saved content elements using one or more interface features to permit users to readily navigate through the organizational structure to located content elements of interest. Such features can improve the GUI by promoting and enhancing the identification of relevant content elements.

In a sixth example, tagged content that can be saved with information that identifies the user-generated content (e.g., social media content) tagging the content, which can be presented to users to permit them to navigate back to the user-generated content that caused the tagged content to be originally presented to the user. For example, a user saving a social media post (example user-generated content) that tags a product (example other type of content) can cause the tagged product to automatically be saved to a user's profile as well as the social media post. The tagged product can be presented in the user's profile with a link to navigate to the social media post, which the user can select to view the social media post that introduced the product to the user. Similarly, when a user saves a tagged content element directly (as opposed to doing so indirectly by saving the user-generated content that tags the content element), the content element can be saved with information identifying the user-generated content that caused the content element to be presented to the user via a tag. For example, if the user saves a product that is tagged in a social media post (as opposed to saving the social media post), the product can be saved with information identifying the social media post. By saving such identifying information, the context of particular saving actions can be preserved, which can help users remember and place particular content elements (e.g., product elements) within their social landscape.

In a seventh example, saving content elements can cause information identifying the save action and saved content elements to be distributed to a saving user's followers (or other users who are socially connected to the saving user), along with graphical elements attributing the saved content element to its original creator. For example, if a first user creates a social media post that is saved by a second user, the social media post can be distributed to the second user's followers with information indicating that the second user saved the post and with a reserved area (e.g., "via" element) identifying the first user as the creator of the post. This reserved area identifying the first user as the creator can persist regardless of the number of degrees removed from the first user the saving user is. For example, if a third user (who is socially connected to the second user but not the first user) were to save the post after seeing that the second user had saved the post, then the post can similarly be distributed to the third user's followers with the reserved area identifying the first user as the creator of the post. Such reserved areas can be, for example, selectable links to the original creator's profile and/or user-generated content. By providing such a reserved area, users can readily identify and determine appropriate attribution for user-generated content, and can readily navigate to additional information on the original creator of the content element.

This document generally describes technology for presenting GUIs on client computing devices with graphical elements for exploring and discovering content, such as content hosted by and obtained from a computer system. For example, a client computing device can be configured to present a GUI with a variety of different graphical features through which a user can explore and discover a different types of content (e.g., user-generated content, social media content, product elements, users, content categories), including navigating through suggested content and searching for content related to one or more search parameters. A variety of different types of parameters can be provided by users through graphical elements to locate content, such as keywords, location identifiers, hashtags, graphical icons (e.g., emojis), and combinations thereof.

In one implementation, a method for presenting a graphical user interface (GUI) for searching across multiple different content types includes receiving, at a computing device, a search query provided through a search interface on the computing device; transmitting, by the computing device, the search query to a remote computer system that hosts a social-retail platform; receiving, at the computing device, search results that identify a plurality of content elements across a plurality of different content types on the social-retail platform, wherein the search results include unique identifiers for the plurality of content elements; outputting, by the computing device, the search results in the GUI, wherein the search results are output as selectable graphical elements representing the plurality of content elements, wherein selection of the selectable graphical elements causes the computing device to request the plurality of content elements using the unique identifiers; and outputting, by the computing device, one or more selectable buttons in association with at least a portion of the selectable graphical elements, the selectable buttons permitting one or more actions to be performed with regard to at least a portion of the plurality of content elements from within the search results.

Such a method can optionally include one or more of the following features. The plurality of different content types can include two or more of the following: social media posts, product content elements, user profiles on the social-retail platform, and hashtags. The selectable buttons can be (i) presented with the social media posts and (ii) programmed to transmit, to the remote computer system, requests to save the social media posts to a profile for a user who is currently logged-in to the computing device in response to being selected. The selectable buttons can be (i) presented with the product content elements and (ii) programmed to transmit, to the remote computer system, requests to add the product content elements to a virtual shopping cart that is persistent across pages of the social-retail platform for a user who is currently logged-in to the computing device in response to being selected. The selectable buttons can be (i) presented with the product content elements and (ii) programmed to transmit, to the remote computer system, requests to save the product content elements to a profile for a user who is currently logged-in to the computing device in response to being selected. The selectable buttons can be (i) presented with the user profiles and (ii) programmed to transmit, to the remote computer system, requests for a logged-in user on the computing device to follow the user profiles in response to being selected. The selectable buttons can be (i) presented with the hashtags and (ii) programmed to transmit, to the remote computer system, requests for a logged-in user on the computing device to follow the hashtags in response to being selected.

The method can further include receiving, via the GUI, selection of a particular graphical element that represents a particular social media post included in the search results; transmitting, by the computing device, a request for the particular social media post to the remote computer system, the request including a particular unique identifier for the particular social media post; receiving, at the computing device, that particular social media post; identifying, by the computing device, that the particular social media post tags one or more products; outputting, in the GUI, the particular social media post with one or more graphical elements that indicate that the particular social media post includes a product tag and that horizontal scrolling is permitted within the GUI to access a product element for the tagged product. The method can further include receiving, through the GUI, horizontal scrolling input received in relation to the particular social media post; and outputting, by the computing device, the product element in place of the particular social media post in the GUI in response to receiving the horizontal scrolling input.

The method can further include receiving, via the GUI, selection of a particular graphical element that represents a particular hashtag included in the search results; accessing, by the computing device, particular social media posts and particular product elements that include or are otherwise associated with the particular hashtag; outputting, in an expanded area of the GUI that that is inline with the search results, the particular social media posts and the particular product elements. The particular social media posts and the particular product elements can be received by the computing device with the search results and cached by the computing device. The accessing can include retrieving the particular social media posts and the particular product elements from the cache on the computing device.

The method can further include receiving, via the GUI, selection of a particular graphical element that represents a particular product element for a particular product included in the search results; transmitting, by the computing device, a request for the particular product element to the remote computer system, the request including a particular unique identifier for the particular product element; receiving, at the computing device, that particular product element; identifying, by the computing device, that the particular product element includes user-generated images from one or more social media posts that tag the particular product; outputting, in the GUI, the particular product element with the user-generated images, the user-generated images being selectable and including unique identifiers for the one or more social media posts. The method can further include receiving, via the GUI, selection of a particular graphical element that represents a particular user profile included in the search results; transmitting, by the computing device, a request for the particular user profile to the remote computer system, the request including a particular unique identifier for the particular user profile; receiving, at the computing device, that particular user profile; identifying, by the computing device, that the particular user profile includes saved social media posts and saved product elements that have been publicly associated with the particular user profile by an owner of the particular user profile; outputting, in the GUI, the particular user profile with the saved social media posts and the saved product elements, the saved social media posts being selectable and including unique identifiers for the saved social media posts, the saved product elements being selectable and including unique identifiers for the saved product elements.

The search query can include one or more keywords. The search query can include one or more hashtags. The search query can include one or more location identifiers. The search query can include one or more emojis. The search query can include at least two or more of the following: a keyword, a hashtag, a location identifier, and an emoji.

In another implementation, a computing device to provide a graphical user interface (GUI) for presenting content includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including selecting search results that identify a plurality of content elements across a plurality of different content types, wherein the search results include unique identifiers for the plurality of content elements; outputting, in the GUI, the search results as selectable graphical elements representing the plurality of content elements, wherein selection of a selectable graphical element causes a request for the selected content element to be transmitted using a unique identifier for the selected content element; and outputting, in the GUI, one or more selectable buttons in association with at least a portion of the selectable graphical elements, the selectable buttons permitting one or more actions to be performed with regard to at least a portion of the plurality of content elements from within the search results.

Such a computing device can optionally include one or more of the following features. The plurality of different content types can include two or more of the following: social media posts, secondary content elements tagged in the social media posts, user profiles, and hashtags. The selectable buttons can be (i) presented with the social media posts and (ii) programmed to transmit, to the remote computer system, requests to save the social media post to a profile for a user who is currently logged-in to the computing device in response to being selected. The selectable buttons can be (i) presented with the secondary content elements and (ii) programmed to transmit, to the remote computer system, requests to save the secondary content elements to a profile for a user who is currently logged-in to the computing device in response to being selected. The selectable buttons can be (i) presented with the user profiles and (ii) programmed to transmit, to the remote computer system, requests for a logged-in user on the computing device to follow the user profiles in response to being selected. The selectable buttons can be (i) presented with the hashtags and (ii) programmed to transmit, to the remote computer system, requests for a logged-in user on the computing device to follow the hashtags in response to being selected.

The operations can further include receiving, via the GUI, selection of a particular graphical element that represents a particular social media post included in the search results; transmitting, using the network interface, a request for the particular social media post to the remote server system, the request including a particular unique identifier for the particular social media post; receiving, through the network interface, that particular social media post; identifying that the particular social media post tags a secondary content element; outputting, in the GUI, the particular social media post with one or more graphical elements that indicate that the particular social media post includes a secondary content tags and that horizontal scrolling is permitted within the GUI to access the tagged secondary content element. The operations can further include receiving, through the GUI, horizontal scrolling input received in relation to the particular social media post; and outputting, by the computing device, the secondary content element in place of the particular social media post in the GUI in response to receiving the horizontal scrolling input. The operations can further include receiving, via the GUI, selection of a particular graphical element that represents a particular hashtag included in the search results; accessing particular social media posts and particular secondary content elements that include or are otherwise associated with the particular hashtag; outputting, in an expanded area of the GUI that that is inline with the search results, the particular social media posts and the particular product elements. The particular social media posts and the particular product elements can be received over the network interface with the search results and cached in the memory. The accessing can include retrieving the particular social media posts and the particular product elements from the memory.

The operations can further include receiving, via the GUI, selection of a particular graphical element that represents a particular secondary content element included in the search results; transmitting, using the network interface, a request for the particular secondary content element to the remote server system, the request including a particular unique identifier for the particular secondary content element; receiving, over the network interface, that particular secondary content element; identifying that the particular secondary content element includes user-generated images from one or more social media posts that tag the particular secondary content element; outputting, in the GUI, the particular secondary content element with the user-generated images, the user-generated images being selectable and including unique identifiers for the one or more social media posts.

The operations can further include receiving, via the GUI, selection of a particular graphical element that represents a particular user profile included in the search results; transmitting, over the network interface, a request for the particular user profile to the remote server system, the request including a particular unique identifier for the particular user profile; receiving, over the network interface, that particular user profile; identifying that the particular user profile includes saved social media posts and saved secondary content elements that have been publicly associated with the particular user profile by an owner of the particular user profile; outputting, in the GUI, the particular user profile with the saved social media posts and the saved secondary content elements, the saved social media posts being selectable and including unique identifiers for the saved social media posts, the saved secondary content elements being selectable and including unique identifiers for the saved secondary content elements. The operations can further include receiving, through the one or more input device, user input designating a search query; and transmitting, over the network interface, the search query to the remote server system. The search results can be received in response to the search query.

The search query can include one or more keywords. The search query can include one or more hashtags. The search query can include one or more location identifiers. The search query can include one or more emojis. The search query can include at least two or more of the following: a keyword, a hashtag, a location identifier, and an emoji.

Certain implementations may provide one or more advantages. In a first example, GUIs with particular graphical elements can be presented to permit content to be discovered and explored across multiple different types within a single GUI instead of across separate GUIs or applications. Such features can improve the GUI on client computing devices, such as client computing devices with smaller form factor displays, like screens on mobile and wearable computing devices. For instance, by presenting graphical elements to discover and explore multiple different types of content within a single GUI, users can more efficiently access information and features on their devices, and can have normalized/common features across different types of content. As a result, computing devices can operate more efficiently by not needing to run multiple applications concurrently, which can reduce memory usage and processing requirements.

In a second example, GUIs can be improved by reducing the space on a display that is used to present and explore content, including different types of content. For example, graphical elements can be presented to organize and interleave content in a manner that permits users to readily navigate to and identify content that is of interest. While display area is a consideration with all computing devices providing GUIs, conservation of and efficient usage of display area can be of particular concern on devices with smaller form factor displays, like mobile computing devices (e.g., smartphones, tablets, smartwatches, other wearable computing devices). Such graphical elements can provide for a more efficient and improved GUI that is able to more concisely and effectively convey content, including different types of content, to computing device users.

In a third example, GUIs can be presented on client computing devices that allow users to search for and discover content using multiple different types of input. For instance, instead of limiting the identification and presentation of content to only keywords, graphical elements can be presented to permit a variety of different inputs and combinations of inputs to be used to search content, such as graphical icons (e.g., emojis), location identifiers, hashtags, keywords, and combinations thereof. Accordingly, data search and retrieval techniques can be improved by permitting content to be identified across multiple different dimensions, instead of being limited to just textual keywords. This can allow content to be discovered and explored based on a wide range of user inputs that are not constrained, for example, to a single type of search parameter.

In the fourth example, content suggestions can be preloaded onto a client computing device before a user visits an explore/search interface of a GUI and then presented in the GUI when the explore/search interface is presented without delay (without having to retrieve content suggestions from a remote computer system in response to the explore/search interface being presented). For example, a client computing device can receive content suggestions from a remote computer system in the background and in advance of a user navigating to an explore/search interface. When the user visits the explore/search interface, the content suggestions can be presented with the explore/search interface being loaded. By preloading such content suggestions, the latency with which content is presented to a user of a computing device for exploration and discovery can be significantly reduced.

In a fifth example, GUIs can be provided that allow content to be more efficiently retrieved, served, and searched. For example, a computer server system can maintain and search across content summaries. When content is requested by a client computing device, such a server system can retrieve and serve the predetermined and stored content summary instead of having to retrieve and process the individual content elements that it summarizes. Such predetermination of content summaries can allow for fewer computing resources to be used by the server system (e.g., fewer processor cycles, fewer disc read operations, less RAM used), which can additionally allow for a response to be more quickly served to client computing devices.

In a sixth example, arrangements and sequences by which graphical elements are presented in the GUIs can provide more intuitive and efficient graphical presentations on client computing devices.

In a seventh example, some implementations of the system can be configured to provide an improved platform and user interface for users to access/contribute social media content (e.g., user posts, comments, shared content) with other types of content (e.g., product content, messaging content, productivity application content, news content). Such an improved platform and user interface can allow users to interact with each of the content items, to perform social media and other interactions (e.g., purchasing, messaging, productivity, news distribution) without exiting the graphical user interface and its content stream. In some implementations described below, the users can readily and seamlessly access and interact with user-generated content (e.g., social media content) and other content (e.g., product content) within a common user interface, such as through providing reactions that are reflected in a dynamically determined and updated content summary.

This document generally describes technology for presenting GUIs for managing and monitoring activity related to multiple different types of content. For example, a computing device can provide a GUI through which a user can generate and distribute content to other computing devices, and through which the user can monitor and manage activity related to the user-generated content being distributed to and presented on the other computing devices. In another example, a computing device can additionally present a GUI through which content generated on other computing devices can be distributed to and presented on the computing device, as well as activity related to the content generated on the other computing devices by other users. Such activity information can be presented in a GUI through the use of one or more streams or feeds, such as a first stream or feed of activity information related to content generated on other computing devices and a second stream or feed of activity information related to content generated on the computing device presenting the GUI. A variety of different types of content can be presented in such GUIs, like social media content, news content, messaging content, product content, productivity content, and/or other types of content.

In one implementation, a method for providing a graphical user interface (GUI) with an activity feed for a social network includes receiving, at a computing device, activity information for a user of a social network, wherein the activity information identifies social network activity related to (i) social media posts and (ii) products tagged in social media posts; identifying, by the computing device, news activity information from the activity information, the news activity information identifying social network activity of other users on the social network who are socially connected to the user of the computing device; identifying, by the computing device, user activity information from the activity information, the user activity information identifying social network activity related to (i) social media posts created by the user of the computing device and (ii) products saved to the user's profile on the social network; and outputting, by the computing device, the news activity information in a first tab in the GUI and the user activity information in a second tab in the GUI, wherein the news activity information and the user activity information are presented with selectable graphical elements that, selection of which, cause the computing device to retrieve and present additional information in the GUI.

Such a method can optionally include one or more of the following features. The news activity information can identify particular social media posts and particular product elements saved by the other users to their profiles on the social network. The news activity information can identify particular social media posts and particular product elements shared by the other users on the social network or on other social networks. The news activity information can identify particular social media posts and particular product elements commented on by the other users. The news activity information can identify particular social media posts and particular product elements to which the other users have submitted reactions on the social network. Reactions on the social network can include emojis included in comments entered by the other users with regard to the particular social media posts and particular product elements.

The user activity information can prompt the user of the computing device for input regarding actions performed by one or more other users. The actions performed by the one or more other users can include tagging the user of the computing device in a particular social media post. The prompt for input can include input to approve or decline the particular social media post being associated with the user of the computing device in activity feeds of other users who are socially connected with the user of the computing device. The actions performed by the one or more other users can include tagging the user of the computing device in a particular social media post. The prompt for input can include input to apply or remove the user of the computing device being tagged in the particular social media post. The actions performed by the one or more other users can include proposing a tag for a particular social media post created by the user of the computing device. The prompt for input can include input to approve or decline the tag for the particular social media post. The tag can include a product tag that identifies one or more products in a user-generated image included in the particular social media post. The method can further include receiving, through the GUI, first user input designating the particular social media post and electing to permit other users to propose product tags for the particular social media post; transmitting the first user input to a server system that is programmed to distribute the particular social media post to other users who are socially connected to the user of the computing device; receiving, through the GUI, second user input approving the product tag for the particular social media post; and transmitting the second user input to the server system, causing the server system to distribute the particular social media post to the other users with the product tag and a corresponding product element that is viewable within a social media feed via horizontal scrolling related to the particular social media post.

The user activity information can identify a user engagement milestone that have been reached for a particular social media post created by the user of the computing device. The user engagement milestone can include one or more of: a threshold number of views having been attained for the particular social media post, a threshold number of comments having been attained for the particular social media post, a threshold number of reactions having been attained for the particular social media post, a threshold number of saves having been attained for the particular social media post, a threshold number of shares having been attained for the particular social media post, and a threshold number of purchases of one or more products tagged in the particular social media post having been made.

The user activity information can identify that one or more other users have commented on (i) a particular social media post created by the user of the computing device or (ii) a particular product element tagged in the particular social media post. The user activity information can identify that one or more other users have saved (i) a particular social media post created by the user of the computing device or (ii) a particular product element tagged in the particular social media post. The user activity information can identify that one or more other users have reacted to (i) a particular social media post created by the user of the computing device or (ii) a particular product element tagged in the particular social media post. The reactions can include emojis included in comments entered by the other users with regard to the particular social media post or the particular product element. The user activity information can identify updated information related to a product previously saved by the user of the computing device to the user's profile on the social network. The updated information can include a price reduction for the previously saved product. The user activity information can identify shipping and delivery updates for a product tagged in a particular social media post and purchased by the user of the computing device via an interface for the particular social media post.

In another implementation, a computing device to provide a graphical user interface (GUI) for presenting multiple types of content within a content stream includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI, the operations including selecting first content elements to present in the GUI from the information received through the network interface, the first content elements being of a first type and each identifying activity related to (i) content elements created by a user of the computing device or (ii) content elements saved to the user's profile; selecting second content element to present in the GUI from the information received through the network interface, the second content elements being of a second type and each identifying activity of other users who are socially connected to the user of the computing device; and outputting, in a scrollable content stream in the GUI on the display, first graphical elements for the first content elements in a first selectable grouping and second graphical elements for the second content elements in a second selectable grouping.

Such a computing device can optionally include one or more of the following features. The first selectable grouping can include a first selectable tab under which the first graphical elements are displayed in the GUI. The second selectable grouping can include a second selectable tab under which the first graphical elements are displayed in the GUI. The network interface can be programmed to obtain and cache the information from the remote server system in advance of the first selectable tab and the second selectable tab being output on the display. The computing device can be a mobile computing device and the instructions can be a mobile application.

Certain implementations may provide one or more advantages. In a first example, a single GUI can be used to present different types of content that would otherwise be presented across separate GUIs or applications. Such features can improve the GUI on client computing devices, such as client computing devices with smaller form factor displays, like screens on mobile and wearable computing devices. For instance, by associating and presenting multiple different types of content within a single GUI, users can more efficiently access information and features on their devices. Such features can allow computing devices to operate more efficiently by not needing to run multiple applications concurrently, which can reduce memory usage and processing requirements.

In a second example, a single GUI can additionally be used to organize and present different types of activity information. For example, multiple tabs can be used to organize activity information into different groups that are selectively presented in a single GUI based on user selection of graphical elements for the tabs. Such tabs presented on a computing device can include, for instance, a first tab that presents information related to user activity regarding content generated by other users and a second tab that presents information related to user activity regarding content generated by a user of the computing device. Like the advantages described in the preceding paragraph, such features can also improve the GUI on client computing devices, such as client computing devices with smaller form factor displays, like screens on mobile and wearable computing devices. For instance, by presenting and organizing different types of activity information within a single GUI, users can more efficiently access and location particular types of information and features on their devices. Such features can be particularly beneficial on devices with smaller form factor displays that are not able to concurrently display as much information within a single screen as devices with larger displays.

In a third example, arrangements and sequences by which graphical elements are presented in the GUIs can provide more intuitive and efficient graphical presentations on client computing devices.

In a fourth example, some implementations of the system can be configured to provide an improved platform and user interface for users to access/associate/contribute social media content (e.g., user posts, comments, shared content) with other types of content (e.g., product content, messaging content, productivity application content, news content). Such an improved platform and user interface can allow users to associate and interact with each of the content items, to perform social media and other interactions (e.g., purchasing, messaging, productivity, news distribution), and to monitor interactions with content items without exiting the graphical user interface and its content stream. In some implementations described below, the users can readily and seamlessly access, associate, interact with, and monitor user-generated content (e.g., social media content) and other content (e.g., product content) within a common user interface.

In a fifth example, an activity feed on an improved platform can provide a single place where a user can view all social and other activity stemming from social activity, such as activity related to other content (e.g., product content) tagged in social content. For example, an improved social platform can permit social content, such as social posts, to include tags for other types of content (different from social content), such as product content for products offered for sale on merchant sites, productivity content for productivity projects hosted on productivity sites/services, and/or other types of tagged content. Activity information related to both social content and other content that is tagged in the social content can be provided in a common activity feed, which can provide a simplified, more robust, and improved user interface. For example, if a user creates social posts tagging products and saves other social posts that also tag products, the user can be presented with an activity feed that provides information on social activity (e.g., saves, shares, comments, reactions) related to both the created and the save posts, as well as product activity (e.g., purchases, sales, limited supply) related to the products that have been tagged on those posts. By serving combined activity information in a common feed, client computing device resources (e.g., processor cycles, memory, battery) can additionally be conserved by permitting the device to access and display information from a single source (e.g., improved platform server system) and in a single application (e.g., mobile app, web application), as opposed to polling and retrieving information from multiple different sources and displaying that information across multiple different applications.

This document generally describes technology for tracking, monitoring, and determining user engagement with content elements presented in GUIs. For example, a variety of different types of content elements can be presented in GUIs, such as social media content, messaging content, product content, productivity content, and/or other types of content. Users can engage with content elements in various ways, such as through explicit actions related to content elements (e.g., entering a comment in a comment field, saving the content element to the user's profile, entering a reaction to the content element, sharing the content element) and/or through implicit actions (e.g., viewing the content element for a duration of time, hovering a pointer over the content element for a duration of time). GUIs can be programmed to monitor, record, and report user activity related to content elements, which a computer system can use to track, monitor, and determine user engagement with content elements.

In one implementation, a method tracking and allocating engagement-related benefits for social media posts tagging products includes receiving, at a computer system and from a first computing device associated with a first user, user-generated content created by the first user for distribution on a social platform, wherein the user-generated content includes tag for a product, wherein the first user is designated on the social platform to receive engagement-related benefits for social media content the first user creates; distributing, by the computer system, the user-generated content for distribution to other users who are socially connected to the first user, wherein the user-generated content and a product element for the tagged product are presented together in social feeds on computing devices for the other users; receiving, by the computer system, first purchase information indicating that a first purchasing user purchased the product from the product element presented in the first purchasing user's social feed in association with the user-generated content; allocating, by the computer system, that the first purchase information to the first user for engagement-related benefits based on the first purchase information stemming directly from the user-generated content; and transmitting, to the first computing device, information identifying the first purchase information being allocated to the first user for engagement-related benefits.

Such a method can optionally include one or more of the following features. The method can further include receiving, by the computer system, second purchase information indicating that a second purchasing user purchased the product element presented in the second purchasing user's social feed in association with another user having performed an action with regard to the user-generated content; and determining, by the computer system, that the second purchase information is not allocated to the first user for engagement-related benefits based on the first purchase information stemming indirectly from the user-generated content. The action performed with regard to the user-generated content can include the other user having saved the user-generated content, causing the user-generated content to appear in the second purchasing user's social feed in association with the other user's save action. The action performed with regard to the user-generated content can include the other user having shared the user-generated content, causing the user-generated content to appear in the second purchasing user's social feed in association with the other user's share action. The action performed with regard to the user-generated content can include the other user having commented on or reacted to the user-generated content, causing the user-generated content to appear in the second purchasing user's social feed in association with the other user's comment or reaction action.

The method can further include receiving, at the computer system, an indication that the first user is generating content for distribution on the social platform; obtaining, by the computer system, historical data identifying historical user engagement with content generated by the first user and distributed on the social platform; selecting, by the computer system, from a plurality of candidate times, one or more future times of publication that have a likelihood of generating at least a threshold level of user engagement for the user-generated content based on the historical data; transmitting, by the computer system, the one or more future times to the first computing device; receiving, with the user-generated content, designation of a particular future time of publication for the user-generated content; setting, by the computer system, a timer for the particular future time; and publishing, by the computer system, the user-generated content upon expiration of the timer. The historical data can be specific to the other users who are currently socially connected to the first user. The historical data can include one or more of: previous content views, previous content saves, previous content comments, previous content shares, and previous purchases of tagged products.

The user-generated content can include a social post. The first purchasing user can have purchased the product from within the first purchasing user's social feed. The information identifying the first purchase information being allocated to the first user for engagement-related benefits can be designated for presentation in a social activity feed on the first computing device. The engagement-related benefits can include a portion of revenue from the product being purchased by the first purchasing user.

In another implementation, a computing device to provide a graphical user interface (GUI) for scheduling content for distribution on a social platform at a future time includes one or more processors; a network interface that is programmed to establish a network connection with a remote server system and to receive information from the remote server system over the network connection; a display that is programmed to output a plurality of graphical elements as part of the GUI; one or more input devices that are configured to receive user input related to the plurality of graphical elements; and memory storing instructions that, when executed, cause the one or more processors to perform operations to provide the GUI including receiving user input through the one or more input devices to present an interface in the GUI to create a social post; outputting, in response to the user input, the interface to create the social post in the GUI, the interface including a plurality of graphical control elements for designating fields of the social post; transmitting, also in response to the user input, a request for suggested future post times for the social post to the remote server system; receiving information from the remote server system identifying one or more suggested future post time based on analysis of historical engagement data; outputting post scheduling graphical control elements that provide (i) options to select the one or more suggested future post times, (ii) an option to designate a future post time, and (iii) an option to post the social post at a current time; receiving user input via the one or more input devices designating the social post through the plurality of graphical control elements and scheduling information for the social post through the post scheduling graphical control elements; and transmitting the user input to the remote server system for distribution of the social post to other users on the social platform who are socially connected to user of the computing device, publication of the social post being scheduled according to the user input through the post scheduling graphical control elements.

Such a computing device can optionally include one or more of the following features. The plurality of graphical control elements can include one or more graphical control elements for tagging a product in the social post. The user input can tag a particular product in the social post. The operations can further include receiving user engagement information from the remote server system for the social post; and outputting in an activity feed for the social platform the user engagement information. The user engagement information can include, at least, information that identifies actions taken by users with regard to the product tagged in the social post. The actions taken by users can include purchases of the product in association with the social post from within a social feed. The user engagement information can include, at least, analytics related to engagement with (i) the social post and (ii) the product tagged in the social post across a plurality of dimensions. The plurality of dimensions can include, at least, a social dimension related to social engagement on the social platform and a merchant dimension related to product sales on the social platform.

Certain implementations may provide one or more advantages. In a first example, a single GUI can be used associate and present different types of content that would otherwise be presented across separate GUIs or applications. Such features can improve the GUI on client computing devices, such as client computing devices with smaller form factor displays, like screens on mobile and wearable computing devices. For instance, by associating and presenting multiple different types of content within a single GUI, users can more efficiently access information and features on their devices. In a second example, computing devices can operate more efficiently by not needing to run multiple applications concurrently, which can reduce memory usage and processing requirements.

In a third example, arrangements and sequences by which graphical elements are presented in the GUIs can provide more intuitive and efficient graphical presentations on client computing devices.

In a fourth example, some implementations of the system can be configured to provide an improved platform and user interface for users to access/associate/contribute social media content (e.g., user posts, comments, shared content) with other types of content (e.g., product content, messaging content, productivity application content, news content). Such an improved platform and user interface can allow users to associate and interact with each of the content items, to perform social media and other interactions (e.g., purchasing, messaging, productivity, news distribution) without exiting the graphical user interface and its content stream. In some implementations described below, the users can readily and seamlessly access, associate, and interact with user-generated content (e.g., social media content) and other content (e.g., product content) within a common user interface.

In a fifth example, user interfaces and systems can allow social content to be annotated with tags identifying other types of content, such as product content, included in the social content, which can provide a variety of advantages. For instance, product tags can permit a single GUI to present both social content and product content so that a user can readily navigate between and to perform actions (e.g., social actions, product action) with regard to different types of content from within a common interface.

In a sixth example, particular users who have large social followings can be designated to receive a portion of revenue associated with product sales that are directly attributable to social content that they generate that tags various products. This framework can be provided through a platform permitting product tagging in social content, and can provide incentives to content creators to generate content that is impactful and that authentically connects with other users so that the other users are motivated, based on the user-generated content, to purchase tagged products. Users who are successful in connecting with their followers can receive more compensation than other users who generate less impactful and authentic content that does not gain as much traction with their followers, thus incentivizing high quality social content to be generated on the platform. This can provide a variety of benefits. For instance, high quality content can help a social platform to maintain a steady and active user base (frequent, high quality content can cause users to engage with a social platform more consistently and more frequently), which can often dictate the viability of a social platform. In another example, high quality content featuring various products can help merchants more authentically connect with users outside of the confines of traditional advertising and marketing channels, which can help merchants and their products gain traction with users, especially users who are more difficult to reach via traditional marketing channels.

In a seventh example, analytics around the performance of social content and products tagged in social content can be provided to user, such as users designated to receive compensation for sales of tagged products. Such analytics can provide users with insights into what works well and gains traction with their user base, and what does not, which can help users improve user engagement with future social content that they generate. Additionally, suggestions on how to improve engagement with social content can be automatically determined via various data analytics techniques and can be provided to users, such as suggestions based on the day and time at which a post should go live on a social platform to best engage the user's audience (e.g., followers, other socially connected users). Content scheduling can be provided via a social platform, which can allow a user to designate social content for distribution at a particular future time, which can increase the ease and use to time-specific distribution to improve user engagement.

In an eighth example, analytics and/or other information generated on a social platform can be used to provide additional features to enhance user-generated content and/or user engagement with content on such a social platform. For example, training modules can be provided as part of and/or outside of a social platform to provide guidance to content creators on how to better create content that will engage other users on the platform. Such training modules can include automatic analysis of a variety of social platform information, such as automatic analysis of user-generated content (e.g., posts, images, textual descriptions, tags, hashtags), user engagement to the user-generated content (e.g., comments, reactions, shares, purchases of tagged products), social connections between users (e.g., followers, friends, fans), timing information for posts and engagement (e.g., day of the week, time of day, delay from initial post to engagement), and/or combinations thereof. Training modules can use the automatic analysis to determine what users are doing well and what users could do to improve their engagement with other users on the social platform, and to guide the user on specific, actionable steps the user could take. For example, the user could be informed that he/she could better engage other users in his/her social circle by generating posts that include trending topics/hashtags, that include high-resolution photographs, and that are posted between 3 pm-7 pm on Thursdays and Fridays. Other posts by other users that have achieved improved engagement may be provided as examples to a user as part of the training, for example. Such other posts can be automatically identified by the training modules, as well.

In a ninth example, analytics around the performance of products that are tagged in social content can be provided to merchants whose products are tagged in social content. Such analytics can assist merchants in better assessing what sort of messaging resonates well with users, what sort of sentiments user express with regard to products, and which demographic groups are most pertinent to particular products. Such analytics can aid merchants in better connecting with users, such as through influencers on a social platform.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
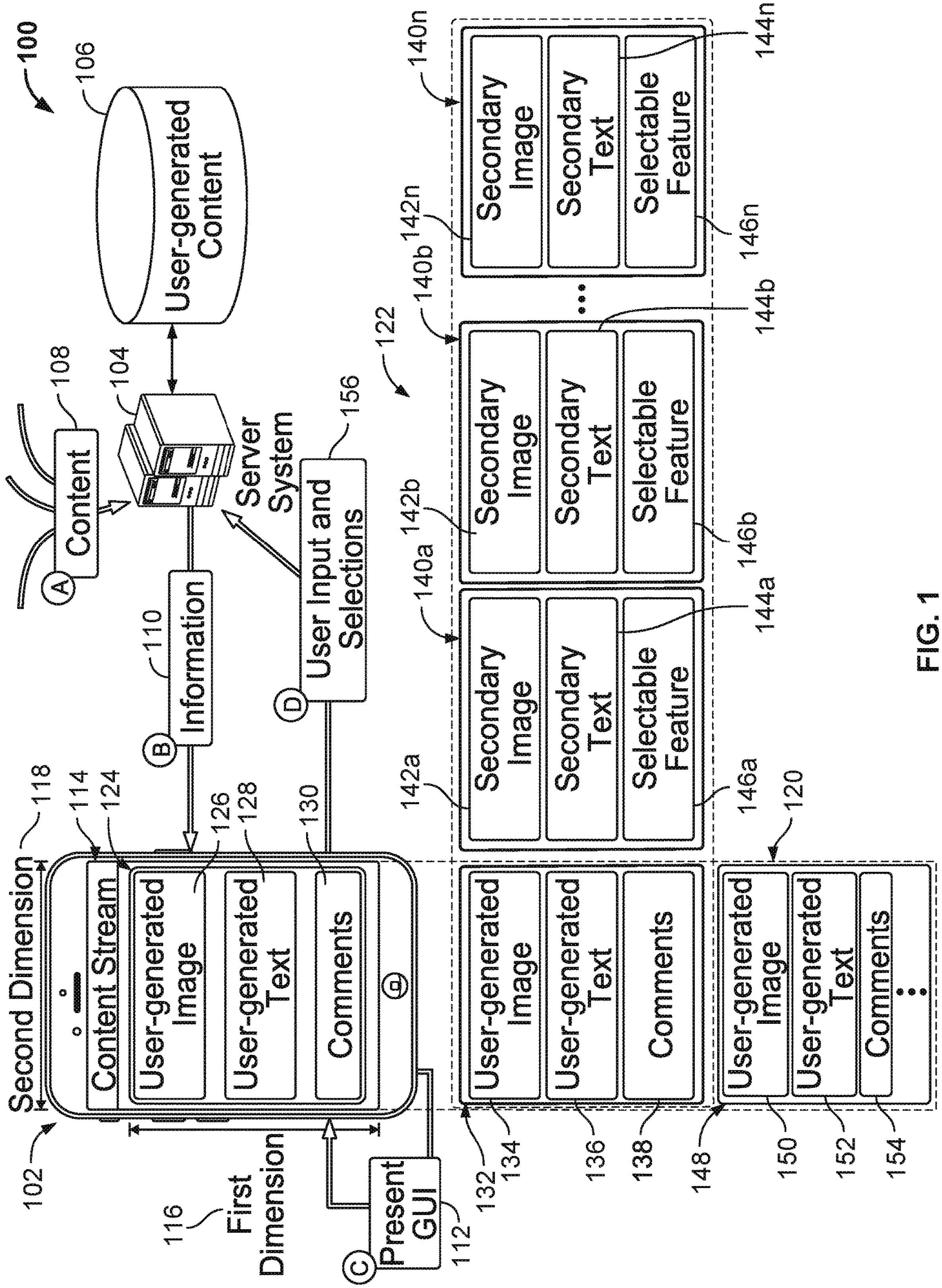
FIG. 1 is a conceptual diagram of an example system to provide an example GUI on an example client computing device.

Referring to FIG. 1, some embodiments of a system 100 can be configured to provide an example GUI 114 on an example client computing device 102 for presenting multiple different types of content within a common content stream. For example, the GUI 114 can present and seamlessly integrate social media content (e.g., user posts, comments, shared content) with other types of content (e.g., product content, messaging content, productivity application content, news content) using interfaces and controls that allow users to interact with each of the content items within the GUI 114 and its common content stream. The GUI 114 can allow users to interact with content in a variety of ways, such as through social interactions (e.g., share, save, comment) and other types of interactions (e.g., purchasing, messaging, productivity, news distribution) without exiting the GUI 114 and its content stream to use other, specifically designed applications or interfaces. For example, instead of providing a GUI that presents a single type content (e.g., social media content, product content) and that links to other applications/GUIs that are launched to present other types of content, the GUI 114 is programmed present multiple types of content without launching or otherwise relying on another application/GUI.

The computing device 102 can be any of a variety of client computing devices, such as a mobile computing device (e.g., smartphone, tablet, wearable device, smartwatch), laptop computer, desktop computer, and/or other types of user computing devices. The computing device 102 can communicate with a server system 104 over one or more networks (e.g., internet, local area network (LAN), wide area network (WAN), virtual private network (VPN), wireless network, mobile data network, or any combination thereof) to obtain multiple different types of content that are presented in the GUI 114. The server system 104 can be a computer system (e.g., cloud computer system) that either by itself or through affiliate networks is able to serve and provide features for multiple different types of content, such as social media, messaging, e-commerce, and/or other types of content. For example, the server system 104 may directly provide social networking features and can communicate with other affiliate computer systems to provide product-related features (e.g., reviews, purchasing, order tracking). In other examples, the server system 104 may directly provide both social networking features and product-related features. Other configurations of the server system 104 among one or more other computer systems are also possible.

As indicated by step A (108), the server system 104 can receive content, such as user-generated content and other types of content (e.g., merchant-provided product content, news content, messaging content). For example, the server system 104 can receive social media content (e.g., posts, comments, shared content) from other client computing devices and can receive product-related content (e.g., product information, product images, product reviews) from merchant computer systems. The server system 104 can store the received user-generated content in a data repository 106 (e.g., cloud storage system), from which it can be served by the server system 104A to the client computing device 102. The server system 104 can store other types of content as well.

As indicated by step B (110), the server system 104 can provide information to the client computing device 102, which can be presented in the GUI 114, as indicated by step C (112). The information can include multiple different types of content to be presented in the GUI 114. In the depicted example, the GUI 114 is programmed to present bi-directional content streams 120 and 122 that are oriented along a first dimension 116 of the device 102 and a substantially perpendicular second dimension 118 of the device 102, respectively. For example, a first type of content can be presented in the content stream 120 and a second type of content can be presented in the second, perpendicular content stream 122, which can improve the GUI 114 so that users are able to navigate effectively between content types without having to navigate to or launch other applications/GUIs.

The depicted content stream 120 is a vertical content stream that can be "infinite"—meaning that client computing device 102 is programmed to obtain additional content from the server system 104 when scrolling along the stream 120 approaches a current end of the content that has been downloaded onto the client computing device 102. The content stream 120, in this example, presents user-generated content items, such as social media content items, and the perpendicular content stream 122 presents secondary content items that are associated with the user-generated content items. For example, the content stream 120 includes user-generated content elements 124, 132, and 148, which each include an example user-generated image (126, 134, and 150), example user-generated text (128, 136, and 152), and example comments (130, 138, and 154). For instance, the content stream 120 can be a social media content stream for a user who is logged into the computing device 102, and the user-generated content elements 124, 132, and 148 (e.g., social media posts, shares, saves, comments) can be user-generated social media content items for other users in the user's social network (e.g., friends, following).

In the depicted example, the first user-generated content element 124 is depicted as being displayed by the computing device 102. If the user were to scroll down in the GUI 114, then the second user-generated content element 132 would be displayed by the computing device 102. This second user-generated content element 132 is distinct from the other user-generated content elements 124 and 148 in that it is associated with the perpendicular stream 122 of secondary content elements 140*a-n*. For example, the user-generated content element 132 can be a social media post that tags products depicted in the image 134, and the secondary content elements 140*a-n* can be product elements for each of the products tagged in the image 134. The secondary content elements 140*a-n* can be, for example, different from the user-generated content elements 124, 132, and 148 in terms of what the elements include and/or in terms of the features associated with the elements. For instance, in instances where the elements 124, 132, and 148 are social media content elements, a user may be presented with features in the GUI 114 to interact with the elements, like commenting, liking, sharing, saving, or otherwise reacting to the elements 124, 132, and 148. In contrast, in instances where the secondary content elements 140*a-n* are product elements, a user may be presented with different information (e.g., product information as opposed to user-generated content, product ratings/reviews instead of user comments) and may be presented with different features (e.g., product purchase features instead of social interaction features).

The example secondary content elements 140*a-n* each include an image 142*a-n* (e.g., image depicting a product), text 144*a-n* (e.g., text describing a product), and selectable features 146*a-n* (e.g., selectable button to purchase or add the product to a virtual shopping cart, selectable button to save the product to the user's profile, compose and transmit message). The secondary content elements 140*a-n* can include additional and/or alternate elements, such as multiple images, associated other products, associated other user-generated content (other user-generated content items), and/or other features.

The secondary content elements 140*a-n* in the second content stream 122 can be displayed in the GUI 114 in response to scrolling input along the second dimension 118 while the user-generated content element 132 is being displayed. For example, if the user scrolls down the content stream 120 so that at least a portion of the user-generated content element 132 is displayed in the GUI 114, then subsequent horizontal scrolling input (related to the user-generated content element 132) in the GUI 114 can cause the secondary content element 140*a* to be displayed in the GUI 114. The horizontal scrolling along the second dimension 118 can cause the secondary content element 140*a* to replace, at least partially, the user-generated content element 132 (e.g., replace through horizontal scrolling animation of the content elements 132 and 140*a* that coincides with the scrolling input). The other secondary content elements 140*b-n* can also be displayed in the GUI 114 based on further horizontal scrolling along the second dimension 118. Horizontal scrolling can be either way (left or right) along the second dimension 118, to allow the user to navigate forward and backward along the content stream 122, which may be limited in length (contain a finite number of element) or which may be infinite (as described above with regard to the stream 120.

The user of the device 102 can interact with the secondary content elements 140*a-n* when they are displayed in the GUI 114, such as selecting the selectable features 146*a-n*. Such interactions can take place without transitioning outside of the GUI 114 or causing the GUI 114 (or the content stream 120) to lose focus. For instance, instead of providing links that would cause another application to be launched, the selectable features 146*a-n* for the secondary content elements 140*a-n* are provided within the content stream 120 by horizontally scrolling through the perpendicular content stream 122. For example, the user-generated content elements 124, 132, and 148 can be social media content and the secondary content elements 140*a-n* can be product content, which can be added to a virtual shopping and/or purchased from within the GUI 114 by selecting the selectable features 146*a-n*. As indicated by step D (156), selecting the selectable features 146*a-n* (and other user inputs) can cause the computing device 102 to transmit information about user selection to the server system 104, which can either directly or through communication with other computer systems process the input.

A user of the device 102 can continue to scroll vertically through the content stream 120 while secondary content elements 140*a-n* are displayed (no need to scroll horizontally back to the user-generated content element 132 before vertically scrolling through the content stream 120). For example, a user can vertically scroll down in the stream 120 until the user-generated element 132, horizontally scroll along the stream 122 so that the secondary content element 140*b* is displayed, and then vertically scroll down to the user-generated content element 148 (without first scrolling back along the stream 122 to the user-generated content element 132). Furthermore, the computing device 102 can be programmed to maintain the context of the content stream 120 and the perpendicular content stream 122 when scrolling is occurring along the other of the two content streams. For instance, continuing from the previous example, if the user were to then scroll from the user-generated content element 148 up the content stream 120, the next element displayed would be the secondary content element 140*b* based on the context (position) of the content stream 122 being maintained.

Although not depicted, the user-generated content element 132 with associated secondary content elements 140*a-n* can include one or more graphical elements to indicate to a user that secondary content elements 140*a-n* are present. Additionally, the user generated content element 132 can include graphical status elements for the content stream 122 to provide a user with an indication of the current context (position) within the content stream 122 of the element displayed in the GUI 114.

Figure 2:
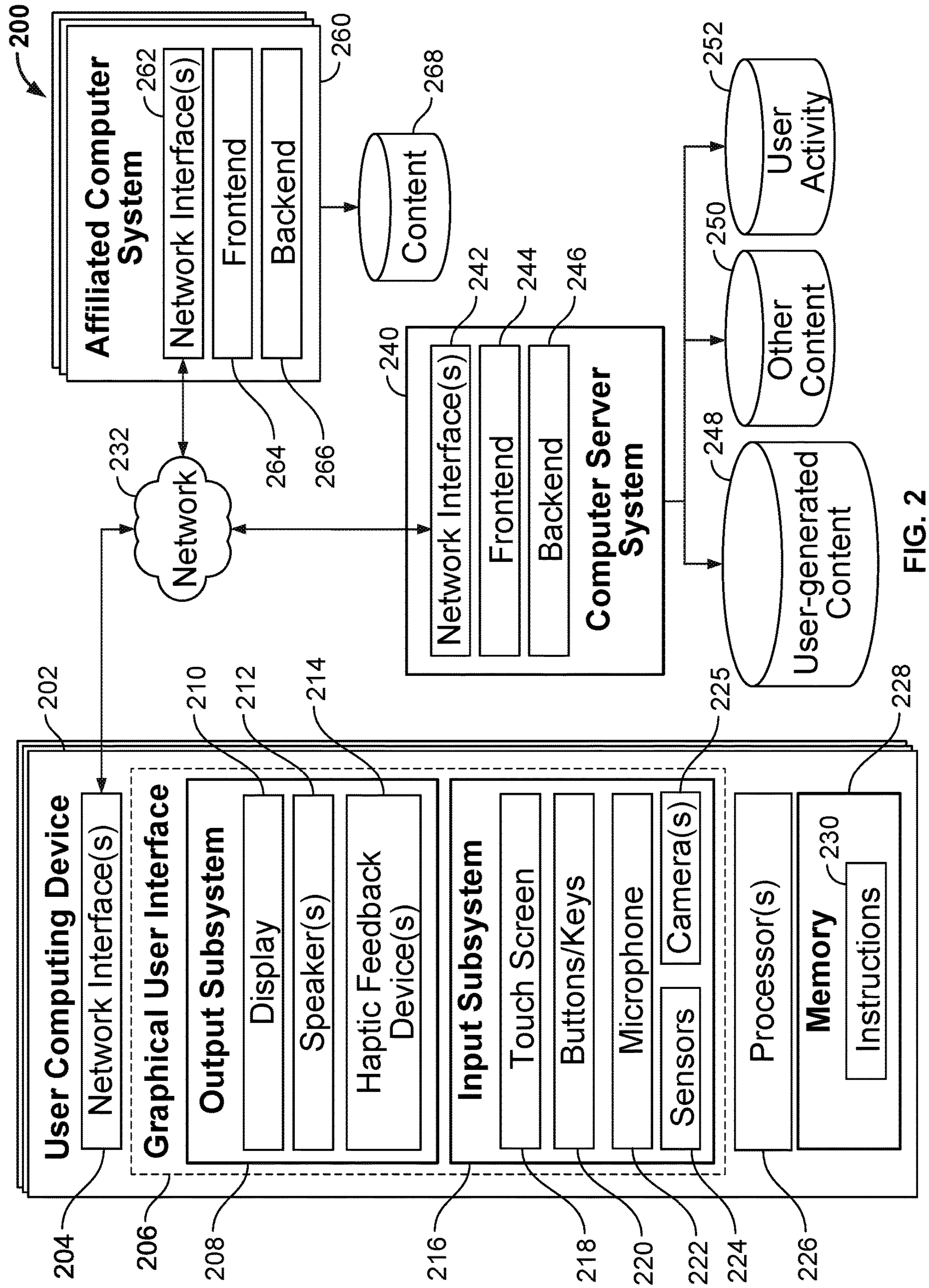
FIG. 2 is an example system for presenting one or more GUIs on an example user computing device.

Referring now to FIG. 2, in some embodiments, an example system 200 is configured to present one or more GUIs on an example user computing device 202. The system 200 is similar to the system 100 described above with regard to FIG. 1 and to the systems 1200, 1800, 2200, 2600, 3200, 3600, and 4200 described below with regard to FIGS. 12, 18, 22, 26, 32, 36, and 42, respectively, and includes the user computing device 202 (similar to the computing device 102) and a computer server system 240 (similar to the server system 104).

The computing device 202 is programmed to present one or more GUIs on the computing device 202 based, at least in part, on information received over the network 232 from the computer server system 240 using a one or more network interfaces 204 of the device 202. The one or more network interfaces 204 can include wireless and/or wired network interfaces, such as network interface cards (NIC), wireless radio chipsets (e.g., 4G LTE chipset, BLUETOOTH chipset, near field communication (NFC) chipset, Wi-Fi chipsets), optical network interfaces (e.g., fiber optic network interface), and other network interfaces.

The computing device 202 includes one or more processors 226 that are programmed to control operation of an output subsystem 208 and an input subsystem 216 to present one or more GUIs 206 according to one or more instruction sets 230 that are stored in memory 228. The one or more processors 226 can be any of a variety of processors, such as single or multi-core central processing units (CPU), graphics processing units (GPU), microcontrollers, application-specific integrated circuits (ASIC), or combinations thereof. The memory 228 can be any of a variety of volatile and/or non-volatile memory from which the processors 226 can, directly or indirectly, load and execute the instructions 230, such as random access memory (RAM), registers, caches, flash memory, storage devices, or combinations thereof. The instructions 230 can be any of a variety of instruction sets, such as being part of an application (e.g., mobile application), executable file, binary, script, code, operating system (OS) library, or combinations thereof. The instructions 230, at least in part, can be downloaded and run/interpreted/installed on the computing device 202. For example, the instructions 230 can be downloaded and installed as a mobile application from an online mobile application store accessible over the network 232. In another example, the instructions 230 can be downloaded from a web server as part of a web page that is interpreted/executed by a web browser application on the computing device 202.

The output subsystem 208 can include a number of components to output the one or more GUIs 206 on the user computing device 202, such as one or more displays 210, one or more speakers 212, and one or more haptic feedback devices 214. For example, the one or more displays 210 can be any of a variety of displays, such as organic light emitting diode (OLED) displays, RETINA displays, liquid crystal displays (LCD), and/or other displays. The one or more displays 210 can output graphical elements (e.g., text, graphics, buttons, images, videos, links, menus) as part of the GUI 206 as directed by the instructions 230 being executed by the one or more processors 226. The other components 212 and/or 214 of the output subsystem 208 can supplement/augment the graphical elements output on the display 210 for the GUI 206, such as providing audio and/or haptic feedback in association with graphical elements and/or in response to user input provided through the input subsystem 216.

The input subsystem 216 includes components through which a user can provide input to the computing device 202 and the GUIs 206. For example, the input subsystem 216 can include one or more touchscreens (e.g., capacitive touchscreens), physical buttons and/or keys 220, one or more microphones 222, one or more sensors 224 (e.g., motion sensors, orientation sensors), one or more cameras 225 (e.g., front-facing digital camera, rear facing digital camera), and/or other input components. The input subsystem 216 is accessed and used as part of the one or more GUIs 206. For example, graphical elements of the GUI 206 can be output through the display 210 and input related to these elements can be received through the touchscreen 218 (e.g., touch-based input), buttons/keys 220, the microphone 222 (e.g., speech-based input), sensors 224 (e.g., motion/gesture-based input), the cameras 225 (e.g., visual input), and/or other components.

Input received (e.g., user inputs, commands, comments, shares, saves, posts, purchases, requests) and other information related to the GUI 206 (e.g., user actions/inactions regarding particular graphical elements, status information) can be transmitted to the computer system 240 over the network 232. The network can include, for example, the internet, LANs, WANs, VPNs, wireless networks (e.g., Wi-Fi networks, BLUETOOTH networks), wired networks, mobile data networks, and/or combinations thereof.

The computer server system 240 (e.g., computer server, cloud-based computer system, social networking server system) includes one or more network interfaces 242 to communicate over the network 232, a frontend 244 to serve requests from the computing device 202 (e.g., requests for content, requests to perform particular operations), and a backend 246 to process requests and perform other operations. The computer server system 240 includes one or more data sources that the frontend 244 and/or the backend 246 can access, such as a user-generated content repository 248 (e.g., social media content), a repository of other content 250 (e.g., product content, messaging content), and a repository of user activity 252 (e.g., user actions related to the GUI 206 and content presented thereby).

The computer server system 240 can process some requests directly, such as requests to add a post (example user-generated content) to a social network hosted by the computer server system 240, and can communicate with one or more affiliated computer systems 260 to process requests, such as requests to purchase a product. For example, the computer server system 240 can receive a request from the computing device 202 to add a social media post to a social network hosted by the computer system 260, which the backend 246 can perform by storing the post to the user-generated content repository 248. In another example, the computer server system 240 can receive a request from the computing device 202 to purchase a product, which the backend 246 can retransmit through the network interface 240 to the affiliated computer system 260, which may provide an online merchant store.

The affiliated computer system 260 can be similar to the computer server system 240 in that it can communicate over the network 232 via a network interface 262, serve requests using a frontend 264, and process requests and perform other operations using a backend 266. The affiliated computer system 260 can store content in a repository 268, such as product information, which can be served to the computing device 202, to the computer server system 240, and/or to other systems/devices. For example, the affiliated computer system 260 can serve product catalog information (e.g., product taxonomy) to the computer server system 240 and the content 268 can store product catalogs. The affiliated computer system 260 can one of many affiliated computer systems that are part of the system 200 and that perform one or more tasks to provide a service hosted by the computer server system 240, such as online merchant stores and ordering, messaging services, productivity services, news distribution services, and/or other services.

Referring now to FIGS. 3A-B, 4A-B, 5A-B, 6A-B, and 7A-B, some embodiments of the computer system 240 (in combination with the affiliated computer systems 260) can be implemented with the GUI 206 in a manner that provides a social-retail platform that combines social media features, such as social media posts and social interactions, with online retail content. Such an example social-retail platform can allow users to generate and share social content (e.g., social media posts, images, text) that incorporates online retail content (e.g., product information, online product purchasing interface). For example, instead of merely posting a link or indicating interest in a product on a social networking platform, users can generate social content that describes that users' own personal experience with the product and the platform can present this social content with online retail content for the product. For instance, a user can post a picture of an outfit that incorporates multiple different clothing items (example products). Such a post can include a description of the outfit (e.g., textual description, hashtags, tag other users, tag brands, tag location) and product tags for each of the clothing items depicted in the image, which can cause the post to be presented with online retail content for each of the tagged products. The online retail content can, for example, provide a way for other users viewing the post to directly view product information (e.g., merchant-provided product information, product reviews/ratings) and, if interested, to order/purchase the product from within an interface for the social-retail platform (no need to launch another application or otherwise exit the social-retail platform interface). So the social-retail platform can allow users to create and share their own customized product experiences, which can better engage other socially-connected users (e.g., friends, followers) with particular products through personalized and authentic social content, and can allow other users viewing product experiences with a way to directly interact with a merchant-interface for the identified products (e.g., no need to launch a different application or to navigate to another website).

Additionally, such an example social-retail platform can allow users to curate product offerings across multiple different online merchants through their posts and other actions on the platform, such as saving products and/or posts. For example, users can generate posts that tag products offered by multiple different online merchants and/or brands, which can allow users freedom and independence from particular merchants and/or brands when creating personalized product experiences (i.e., posts not limited to products offered by particular merchants and/or brands). Through user-based product curation across different merchants/brands, the universe of online merchant product can be culled to a more manageable and personalized subset that can better engage and interest users. For example, a user can identify and follow other users who have shared interests on the social-retail platform, and can receive updates/posts, such as social posts tagging products, from those other users in a customized feed on the social-retail platform. This example user can then discover new products through personalized social content that curates product offerings in a more genuine and authentic manner, which can better engage and maintain user interest.

While the example social-retail platform that is described with regard to FIGS. 3A-B, 4A-B, 5A-B, 6A-B, and 7A-B illustrates uses related to clothes and fashion, additional and/or alternate uses of such a social-retail platform are also possible, such as uses related to other types of products (e.g., other product verticals) and/or services (e.g., online services). For example, multiple different social-retail platforms can be provided by the computer system 240, each of which has a particular product/service focus. In another example, the computer system 240 may provide a single social-retail platform that encompasses a broader universe of online product/service offerings and may rely on users to self-organize/group themselves into subsets based on their own interests.

Additionally, the social-retail platform implementation of the computer system 240 described with regard to FIGS. 3A-B, 4A-B, 5A-B, 6A-B, and 7A-B is one example implementation and other implementations are also possible. For example, the computer system 240 can provide a social-productivity platform through which users can readily and more easily collaborate with other users on projects (e.g., users can generate social posts that tag projects for which they are seeking collaboration from other users). Other examples are also possible. The GUI features described below with regard FIGS. 3A-B, 4A-B, 5A-B, 6A-B, and 7A-B can be extended/applied to these other implementations.

Figures 3A, 3B:
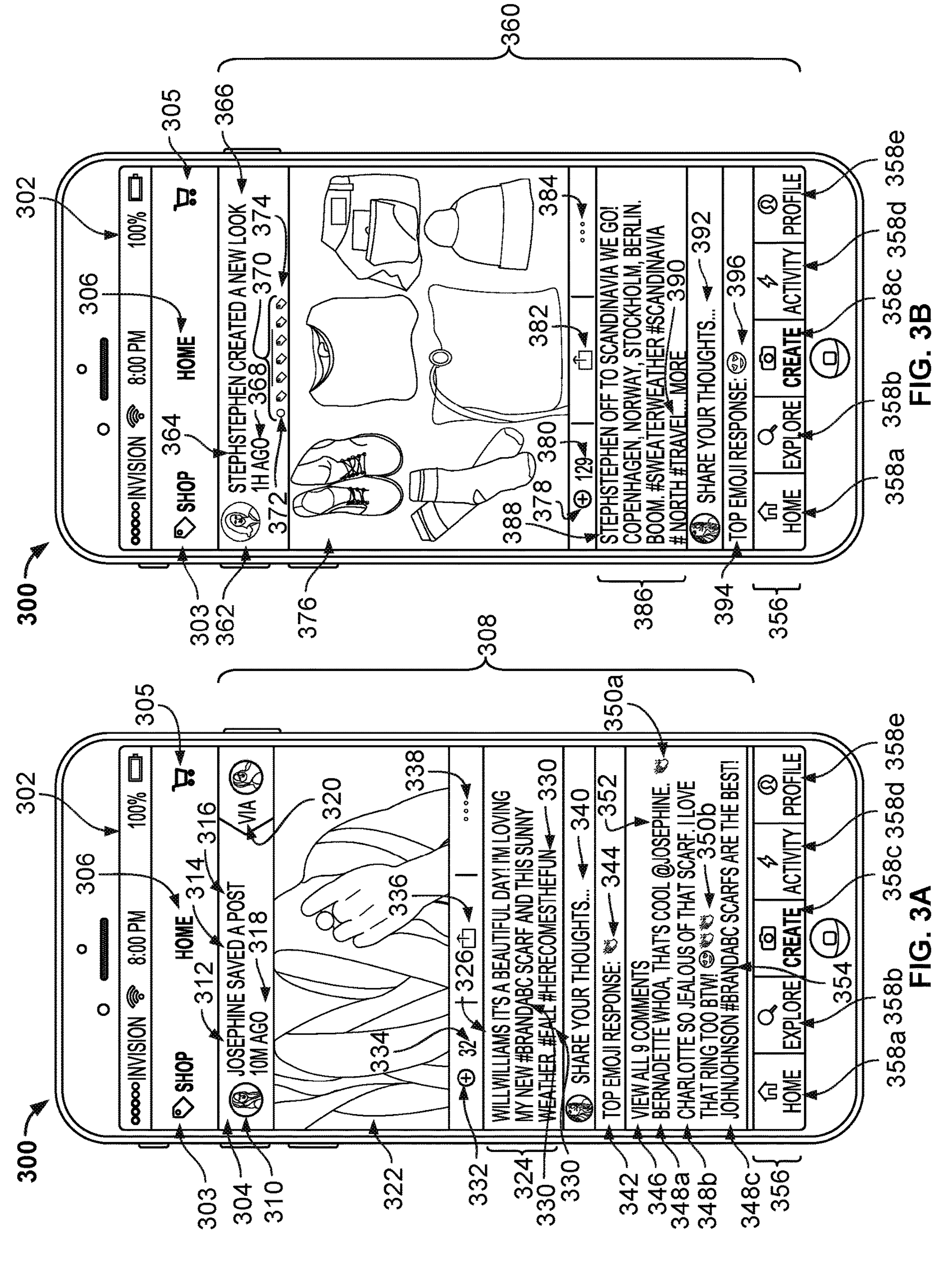
FIGS. 3A-B are screenshots of an example GUI for a home feed on an example platform.

Referring to FIGS. 3A-B, screenshots of an example GUI 304 for a home feed on an example social-retail platform provided by the computer system 240 is depicted. The GUI 304 is presented on a display 302 (example of the display 210) of a mobile computing device 300 (example of the computing device 202). The home feed in the GUI 304 is an example content stream that is provided to the computing device 300 by the computer system 240 and that is customized for the user of the computing device 300. For example, a user logged into the computing device 300 can be socially connected (e.g., follow, friend) with other users on the social-retail platform, and the computer system 240 can identify user-generated content (and other actions) from these other users to serve to the computing device 300 to present in the GUI 304. The home feed can be an "infinite" content stream, meaning that as the user scrolls to the bottom of the stream depicted in the GUI 304, the computing device 300 can request and be served with additional content from the system 240, which can be appended to the end of the stream.

Referring to FIG. 3A, a first example social post 308 is depicted in the home feed. This post 308 is a graphical element presented in the GUI 304 that includes a number of graphical elements, including a profile picture 310 and username 312 of the user who performed an action 314 (e.g., create post, save, comment, share), which in this example was "saving" a post 316 created by another user identified by the "via" element 320. The post 308 also identifies a time 318 when the user 312 performed the action 314, which may be different from a time when the other user 320 created the post 316. The post 308 includes a user-generated image 322, which can be, for example, a photo taken by the user through a camera on a mobile computing device. The user-generated image 322 can be any of a variety of media that are generated on the device 300 (and/or other computing and peripheral devices), such as photos, videos, live photos (photo with a few seconds of video), live streaming video, 3D photos and videos, and/or other types of images. The user-generated image 322 can depict one or more products, such as the example scarf that a person is wearing in the image 322. The post 308 also has a textual description area 324, which in this example includes the username 326 of the user who authored the description (same as the user identified in the "via" element 320 as having created the post 308). The description in this example includes multiple hashtags 330, which can be used, for example, by the computer system 240 to identify and serve the post 308 as a result to search queries (e.g., search queries with keywords and/or hashtags) submitted by client devices.

The graphical element for the post 308 includes a set of controls 332-338 for a user to interact with the post 308. The controls include a selectable element 332 ("+" button) through which a user can "save" the post to her profile (see FIGS. 7A-B). The selectable button 332 is paired with a counter 334 that identifies a number of other users who have already saved the post 332. The controls further include another selectable element 336 (share icon) that can be selected to share the post 308 either inside or outside of the social-retail platform provided by the computer system 240. For example, the user can select the element 336 to share the post 308 with other users within the social-retail platform provided by the computer system 240, and/or to share the post 308 on other social media platforms (e.g., FACEBOOK, TWITTER, PINTEREST). The controls also include another selectable element 338 (ellipses icon) that includes additional features that can be performed with regard to the post 308 (e.g., message user 312 and/or user 326, flag as inappropriate).

The graphical element for the post 308 also includes a comment section through which users can comment on and react to the post 308. The comment section includes a comment field 340 through which the user of the computing device 300 can enter a comment (which can be transmitted to, stored by, and served in association with the post 308 by the computer system 240). The comment section can initially be collapsed to show only a portion of the total number of comments (e.g., initially show three comments 348*a-c*) also includes a selectable feature 346 to expand/view all comments within the GUI 304. The comments 348*a-c* can include a variety of annotations and features other than just text, such as tagging other users 352, hashtags 354, and emojis 350*a-b*. The comment section can include a summary 342 that identifies one or more top responses, which in this example is a top emoji response 344 to the post 308. The top emoji response 344 can be determined (by the computer system 240 and/or by the computing device 300) in any of a number of ways, such as based on number of instances each emoji appearing in the comments 348*a-c*, a number of users using each emoji in the comments 348*a-c* (counting users using a particular emoji instead of a number of times the particular emoji is used by each user), time decay features through which emojis in more recent comments are weighted more heavily than those in older comments, user-specific weighting through which emojis in comments from other users who are socially-connected to the user of the computing device 300 are weighted more heavily than emojis in comments from other, non-connected user, and/or other techniques.

The GUI 304 also includes a header with a selectable icon 303 to navigate the GUI 304 to an online retail store (which can be customized based on social-retail posts and other actions), a title 306 for the GUI 304 to identify which interface (home feed) is currently being presented on the display 302, and a virtual shopping cart icon 305 that can identify a number of items added to the shopping cart from within the social-retail platform and that is selectable to navigate the GUI 304 to a shopping cart interface to purchase/order the items. The header (icon 303, title 306, and shopping cart 305) can be persistently presented at the top of the GUI 304.

The GUI 304 also includes a footer 356 that includes selectable icons 358*a-e* to navigate to different interfaces that are provided on the computing device 300 (as part of a mobile application being executed on the device 300) to interface with the social-retail platform provided by the computer system 240. The home icon 358*a* can correspond to the GUI 304 for the home feed presented in FIGS. 3A-B. The explore icon 358*b* can correspond to a GUI in a search and exploration interface presented in FIGS. 4A-B. The create icon 358*c* can correspond to a GUI to create posts for the social-retail platform as presented in FIGS. 5A-B. The activity icon 358*d* can corresponds to a GUI to view an activity feed on the social-retail platform relevant to the logged-in user as presented in FIGS. 6A-B. The profile icon 358*e* can correspond to a GUI to view a profile on the social-retail platform for the logged-in user, as presented in FIGS. 7A-B. The footer 356 can be persistently presented at the bottom of the GUI 304.

Referring to FIG. 3B, a second example post 360 is presented. The user scrolling (down or up) in the home feed can present the post 360 in the GUI 304, for example. The example post 360 is similar to the post 308 in that it includes a profile picture 362 for the user 364 who created the post 360, information 366 describing the action performed by the user 364, and a time 368 when the post 360 was created. Different from the post 308, though, the post 360 includes products that are tagged in a user-generated image 376 (or tagged in the post 360 more generally), as indicated by the collection of icons 370. For example, the icons 370 include a first type of icon 372 for the user-generated social content (e.g., user-generated image 376) and a second type of icon 374 identifying product content for products that are tagged in the image 376 (or tagged in the post 360 more generally). In this example, the post 360 includes one user-generated content element (indicated by icon 372) and six product content elements (indicated by icons 374), which a user can navigate between through in the GUI 304. For example, the GUI 304 can allow a user to navigate between the user-generated content element and the product content elements by scrolling/swiping in a direction substantially perpendicular (e.g., horizontal) to the home feed (e.g., vertical home feed) when the post 360 is presented. The product content elements can provide an interface to view product information and to order/purchase the depicted products from within the GUI 304 and the home feed.

Like the post 308, the post 360 also includes controls 378-384 (similar to the controls 332-338), a textual description section 386 that identifies the author 388 and includes hashtags 390 (similar to the description section 324), and a comment section with a comment field 392 and top response 394-396 (similar to the comment section 342-354).

Figure 4B:
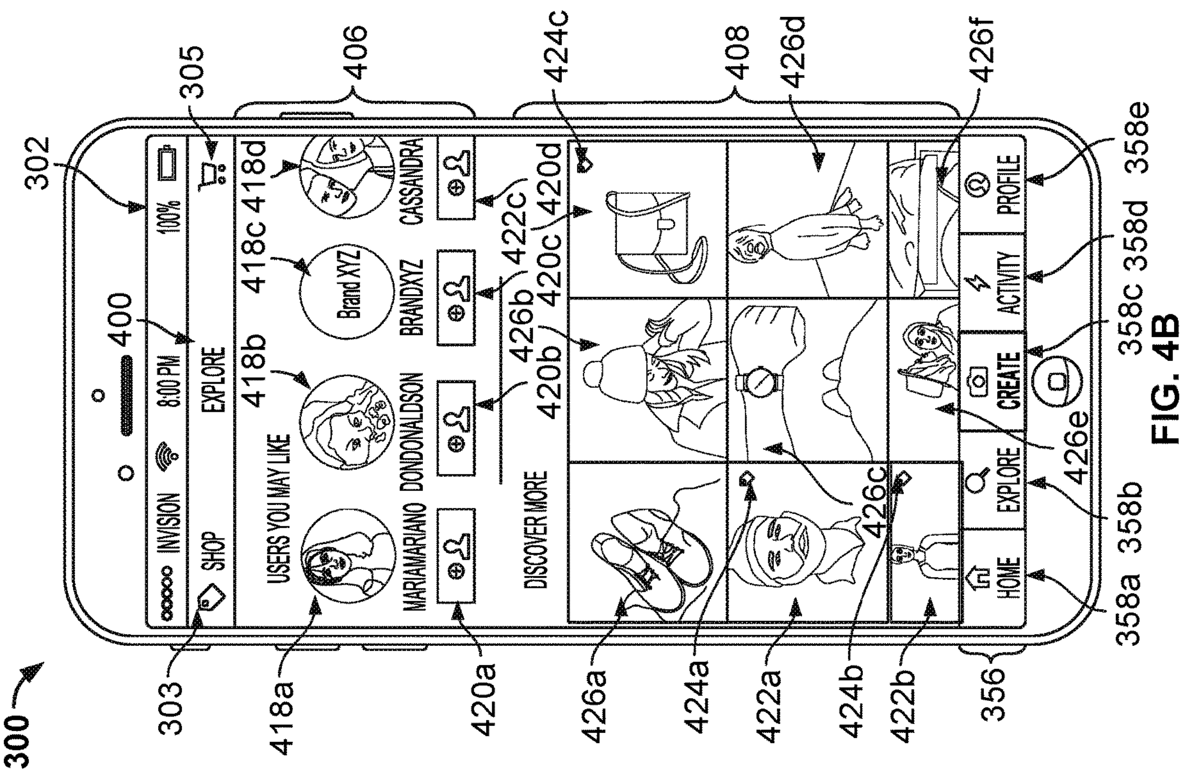
FIGS. 4A-B are screenshots of an example GUI for an explore/search interface on an example social-retail platform.
Figure 4A:
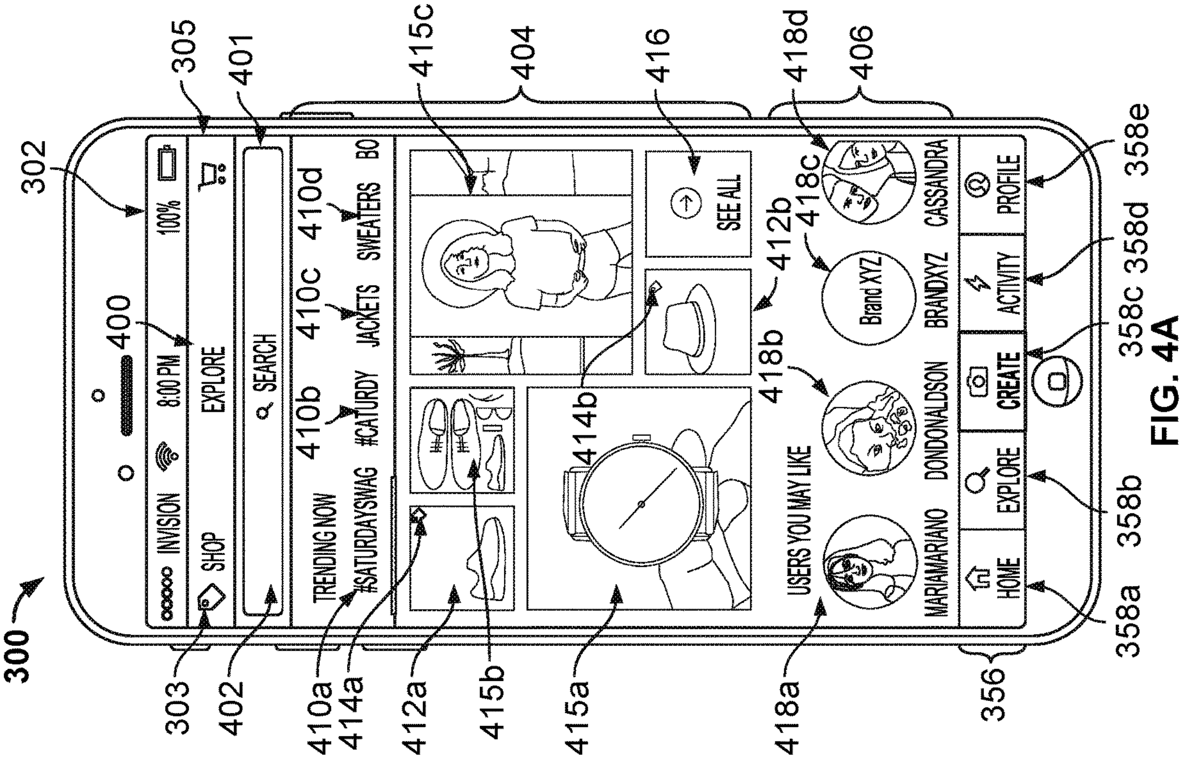

Referring to FIGS. 4A-B, screenshots of an example GUI 401 for an explore/search interface on an example social-retail platform provided by the computer system 240 is depicted. The GUI 401 is presented on the display 302 of the mobile computing device 300, and includes the header (303, 305, with the addition of the "explore" title 400) and the footer 356 described above with regard to GUI 304. The GUI 401 provides an interface for a user to discover new things (e.g., user-generated content, users, product content) on the social-retail platform, such as through suggestions created by the computer system 240 and/or results to search queries submitted through a search field 402. In the examples depicted in FIGS. 4A-B, the GUI 401 is presenting suggestions to the user based, for example, on other things that the user has directly expressed interest in (e.g., self-identified as liking particular styles) or indirectly expressed interest in (e.g., performing actions (e.g., save, comment, share, view, dwell) with regard to items presented through the social-retail platform). Results in response to search queries (submitted through the field 402) can be presented in a similar or different manner as the suggestions depicted in FIGS. 4A-B.

Referring to FIG. 4A, a "trending" section 404 of content on the social-retail platform is presented and a suggested user section 406 is presented. The trending section 404 can include content elements (e.g., user-generated content, product content) that are currently "trending"—meaning that they are currently popular among users of the social-retail platform. Popularity can be determined in any of a variety of ways, such as through evaluating actions (e.g., views, comments, shares, saves, likes) performed with regard to the content elements over a recent period of time (e.g., past hour, past four hours, past day) and/or using time-decay functions to weight more recent actions more heavily than older actions. The trending section 404 includes, for example, hashtags 410*a-d* that are currently trending on the social-retail platform, which can be determined, for instance, from posts (e.g., hashtags 330) and comments (e.g., hashtag 354). The hashtags 410*a-d* can be associated with trending posts and products, which are presented when the hashtags 410*a-d* are selected. For example, the hashtag 410*a* (#saturdayswag) is selected in the GUI 401, which causes trending products 412*a-b* and trending posts 415*a-c* associated with the hashtag 410*a* to be presented. The products 412*a-b* can be identified as products (and not posts) based on the presence of the product icons 414*a-b*. The trending section 404 further includes a button 416 to view all trending products and posts associated with the selected hashtag 410*a*.

The suggested user section 406 includes a collection of users 418*a-d* on the social-retail platform who the computer system 240 has determined that the logged-in user on the computing device 300 may want to follow. For example, the computer system 240 may determine that the users 418*a-d* should be suggested based on the users 418*a-d* and the logged-in user sharing similar interests (e.g., saving the same or similar posts and products, purchasing the same or similar products). Referring to FIG. 4B (which depicts the GUI 401 scrolled down a ways from what is depicted in FIG. 4A), selectable icons 420*a-d* are presented, which the logged-in user can select to begin following the corresponding users 418*a-d*.

The GUI 401 also includes a discovery section 408 that includes a collection of products 422*a-d* and posts 426*a-f* that the computer system 204 has determined that may be of interest to the logged-in user. The products 422*a-d* are depicted with product tags 424*a-d*. The products 422*a-d* and the posts 426*a-f* can be selected by the computer system 204 (regardless of whether they are currently trending) based on the products 422*a-d* and the posts 426*a-f* being new to the logged-in user (e.g., the products 422*a-d* and the posts 426*a-f* have not been presented in the home feed) and likely to be of interest to the logged-in user (e.g., include hashtags that the user follows/uses, saved by other users with similar interests).

The identified products 412*a-b*, 422*a-d* and the posts 415*a-c*, 426*a-f* in the GUI 401 can be selectable, selection of which can cause the GUI 401 to display the selected content. For example, selecting a product or a post can cause the selected product or post to be presented in the home feed, similar to the posts 308 and 360.

Figures 5A, 5B:
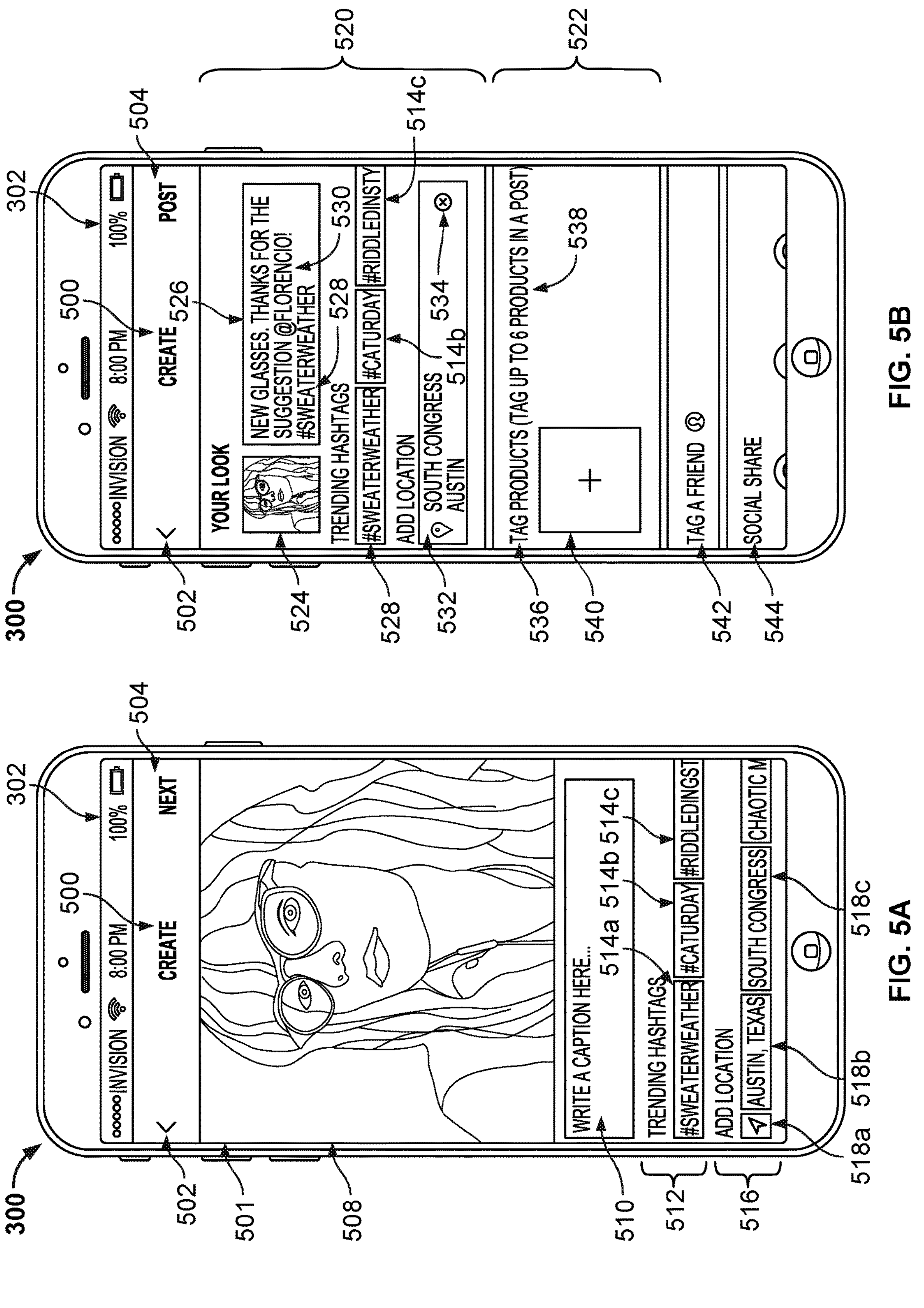
FIGS. 5A-B are screenshots of an example GUI for an interface to create a post on an example platform.

Referring to FIGS. 5A-B, screenshots of an example GUI 501 for an interface to create a post on the example social-retail platform provided by the computer system 240 is depicted. The GUI 501 is presented on the display 302 of the mobile computing device 300. The GUI 501 can be presented, for example, in response to user selection of the create icon 358*c*. The GUI 501 includes a header with a back button 502 (to navigate back to a previous page/interface that was presented when the create icon 358*c* was selected), a title 500 ("create"), and subsequent action buttons 504/506, which change depending on the status of the post creation through the GUI 501.

Referring to FIG. 5A, the GUI 501 is presented with the user already having selected the image 508 (e.g., selected from a local storage device on the computing device 300, selected from a network/cloud repository of images that are accessible to the logged-in user, selected from another social platform). The GUI 501 includes a field 510 through which the user can enter a textual description for the post, including adding hashtags, emojis, tagging other users, and other features. The GUI 501 also includes a section 512 with suggested hashtags 514*a-c* that are currently trending and that can be selected by the user to be added to the field 510. The GUI 501 further includes a section 516 through which the user can designate one or more locations 518*a-c* that are relevant to the post. The user can select the next button 504 once these fields in the GUI 501 have been completed.

Referring to FIG. 5B, a summary 520 of the post is presented with a thumbnail 524 for the image 508, a description 526 (with a user tag 530 and a selected hashtag 528) entered through the field 510, the selected hashtag 528 among the suggested hashtags 514*a-c*, and a location 532 designated for the post (which can be removed by the "x" icon 534). The GUI 501 also includes a product tagging section 522 through which the user can tag products for the post. The section 522 includes a title 536, information describing limits to a number of products that can be tagged 538, and a button 540 that can be selected to enter a product tagging interface, which can include features (e.g., search features) for users to manually identify/select a product (glasses, shirt) in the image 508. The product tagging interface can additionally and/or alternatively include features to automatically suggest products based, for example, on analysis of the image 508, such as object identification. The GUI 501 also includes a feature 542 for tagging friends and a feature 544 for sharing the post on other social platforms. Once the post is complete, the user can select the post button 506, which causes the computing device 300 to transmit the post to the computer system 204 (which stores and serves the post).

Figure 6B:
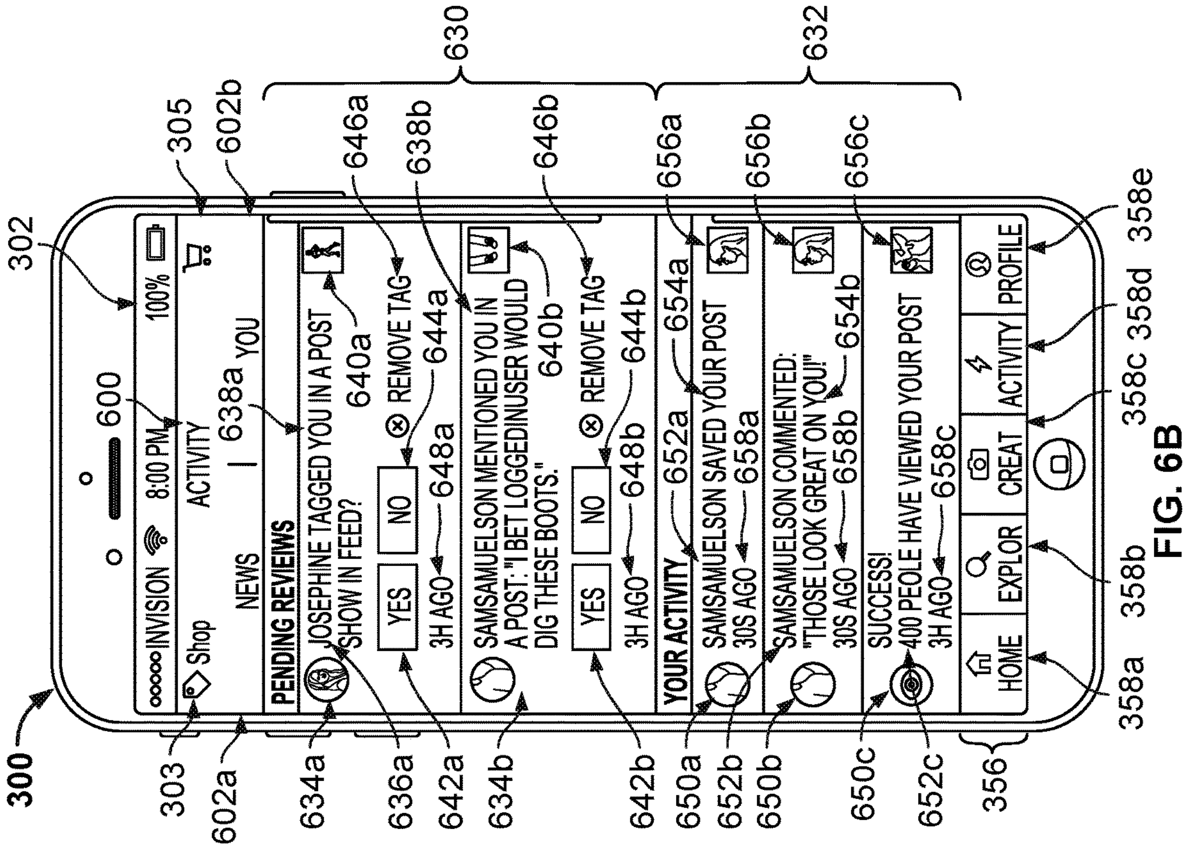
FIGS. 6A-B are screenshots of an example GUI for an activity feed on an example social-retail platform.
Figure 6A:
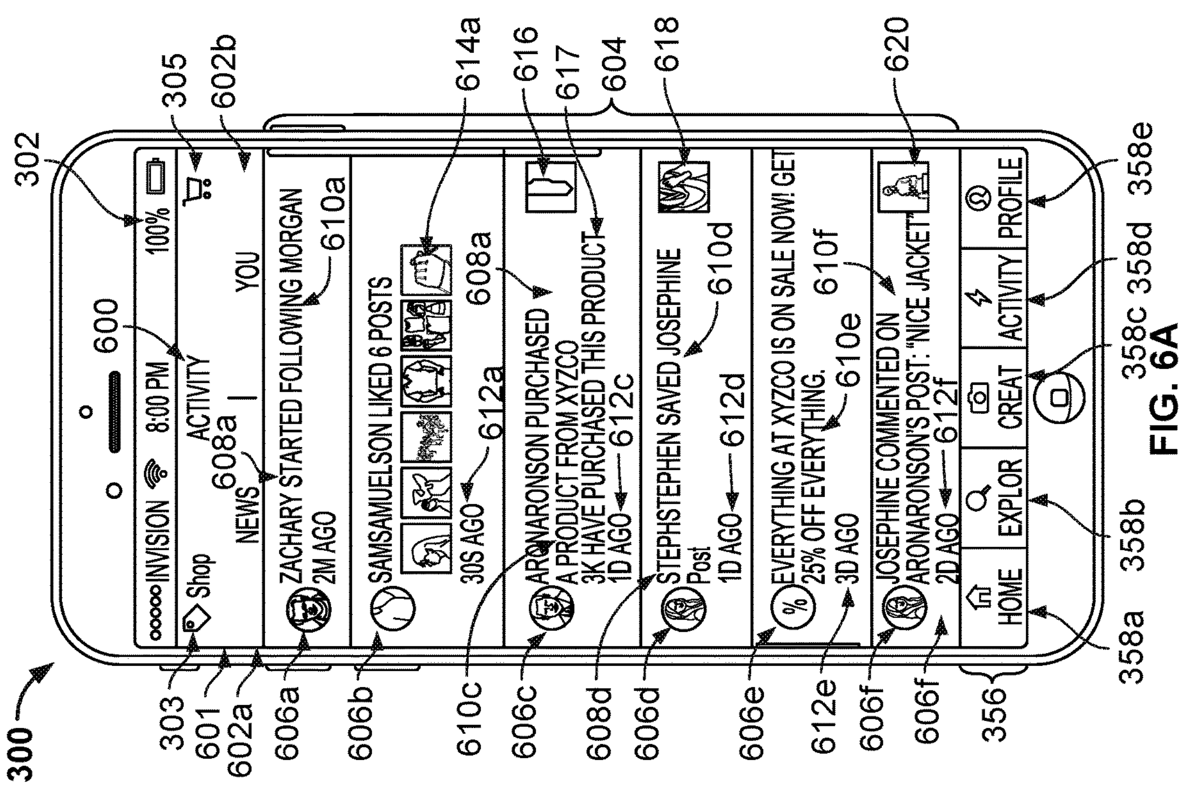

Referring to FIGS. 6A-B, screenshots of an example GUI 601 for an activity feed on the example social-retail platform provided by the computer system 240 is depicted. The GUI 601 is presented on the display 302 of the mobile computing device 300, and includes the header (303, 305, with the addition of the "activity" title 600) and the footer 356 described above with regard to GUI 304. The GUI 601 provides an interface for a logged-in user to view recent activity on the social-retail platform related to the user's social network (other users to whom the logged-in user is socially connected) and related to the user's presence on the platform. For example, the GUI 601 splits the two types of activities (activity in the user's network and activity related to the user's presence on the platform) into separate tabs 602*a-b*, with tab 602*a* ("news") presenting activity for the logged-in user's social network and tab 602*b* ("you") presenting activity relevant to the user's presence on the social-retail platform.

Referring to FIG. 6A, which depicts the tab 602*a* ("news"—activity feed for the user's social network on the platform), a stream 604 of activities 606*a-f* related to other users/entities 608*a-f* on the platform that are connected to or otherwise within the logged-in user's social network on the platform are presented. The graphical elements for the activities 606*a-f* include textual descriptions 610*a-f* of the action performed by the users/entities 608*a-f* and include times 612*a-f* at which the actions occurred. A variety of actions can be presented in the stream 604, including following other users (610*a*), liking posts (610*b*), purchasing products (610*c*), saving posts (610*d*), sales/price reductions on products (610*e*), comments (610*f*), and other actions. The graphical elements for the activities 606*a-f* can include additional features in particular instances, such as thumbnail icons 614, 618, 620 for posts, thumbnail icons for products 618, and information identifying a frequency/number of times 617 that action has been performed by other users.

The users 608*a-f* may need to provide consent to some or all of these activities 606*a-f* appearing in other users' activity feeds (i.e., feed 602*a*). For example, the user 608*c* may need to consent to information his purchase of the product 616 appearing in other users' activity feeds before it can appear in the feed 602*a*. Consent requirements may be limited to more actions that have potential privacy implications, like product purchases, users being tagged in posts by other users, users being geotagged at particular locations, and/or other potential sensitive information.

Referring to FIG. 6B, which depicts the tab 602*b* ("you"—activity feed for the user's presence on the platform), a section 630 of items 634*a-b* needing the logged-in user's approval and a stream 632 of activities 650*a-c* relevant to the user's presence on the platform are depicted. The section 630 includes items 634*a-b* that have potential privacy implications, such as the logged-in user being tagged in particular posts. The example items 634*a-b* identify that other users 636*a-b* tagged the logged-in in posts (638*a-b*), provide thumbnails 640*a-b* of the posts, user controls 642*a-b* (e.g., selectable button) to approve the tag (allow the post with the tag to be shown in other users' home feeds), user controls 644*a-b* (e.g., selectable button) to decline the tag (not allow the post with the tag to be shown in other users' home feeds), and user controls 646*a-b* to remove the tags (remove the tag from the posts). The example items 634*a-b* also include time information 648*a-b* on when the posts were created.

The stream 632 includes, for example, a list 650*a-c* of activities 654*a-c* (e.g., comments, saves, shares, purchases) performed by other users 652*a-c* that are relevant to posts (and other content) created/shared by the logged-in user. The graphical elements 650*a-c* in the list include thumbnail icons 656*a-c* that represent the posts to which the activities 654*a-c* relate, as well as times 658*a-c* at which the activities occurred.

Figure 7B:
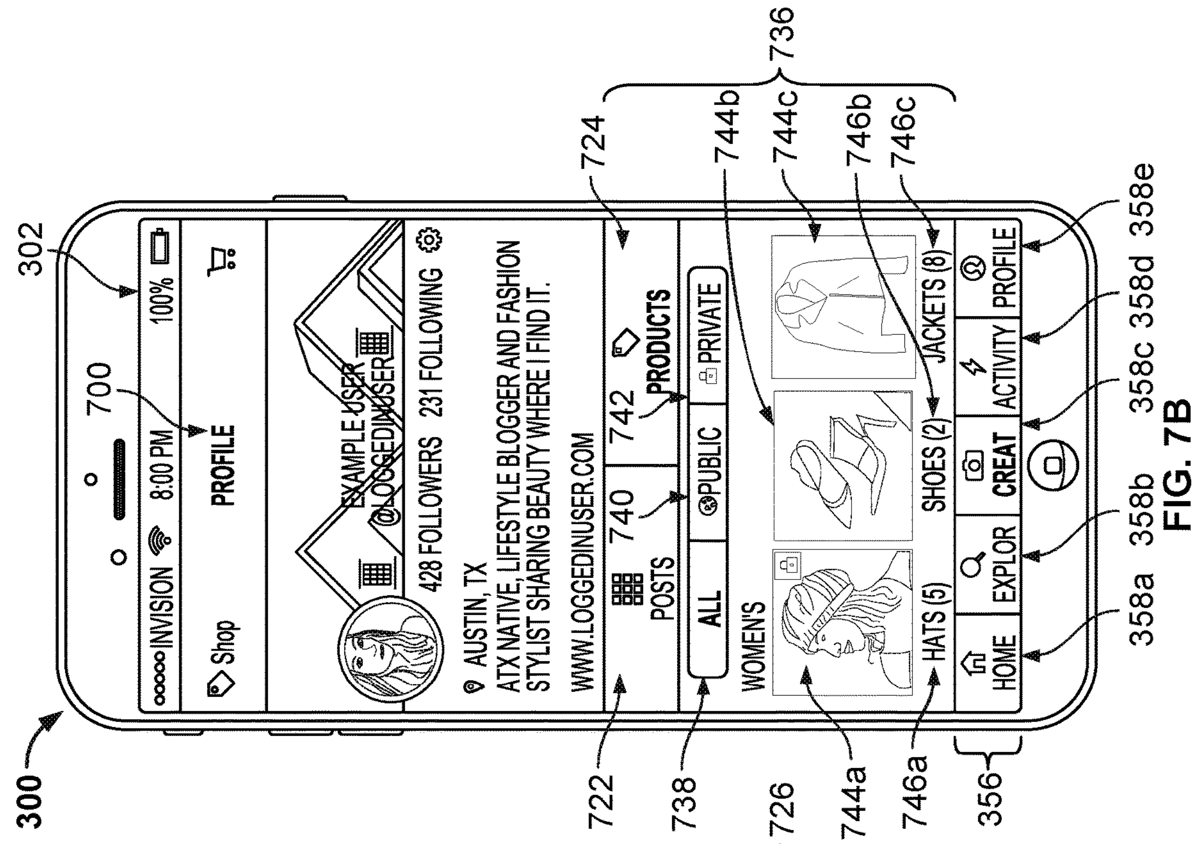
FIGS. 7A-B are screenshots of an example GUI for a user profile on an example platform.
Figure 7A:
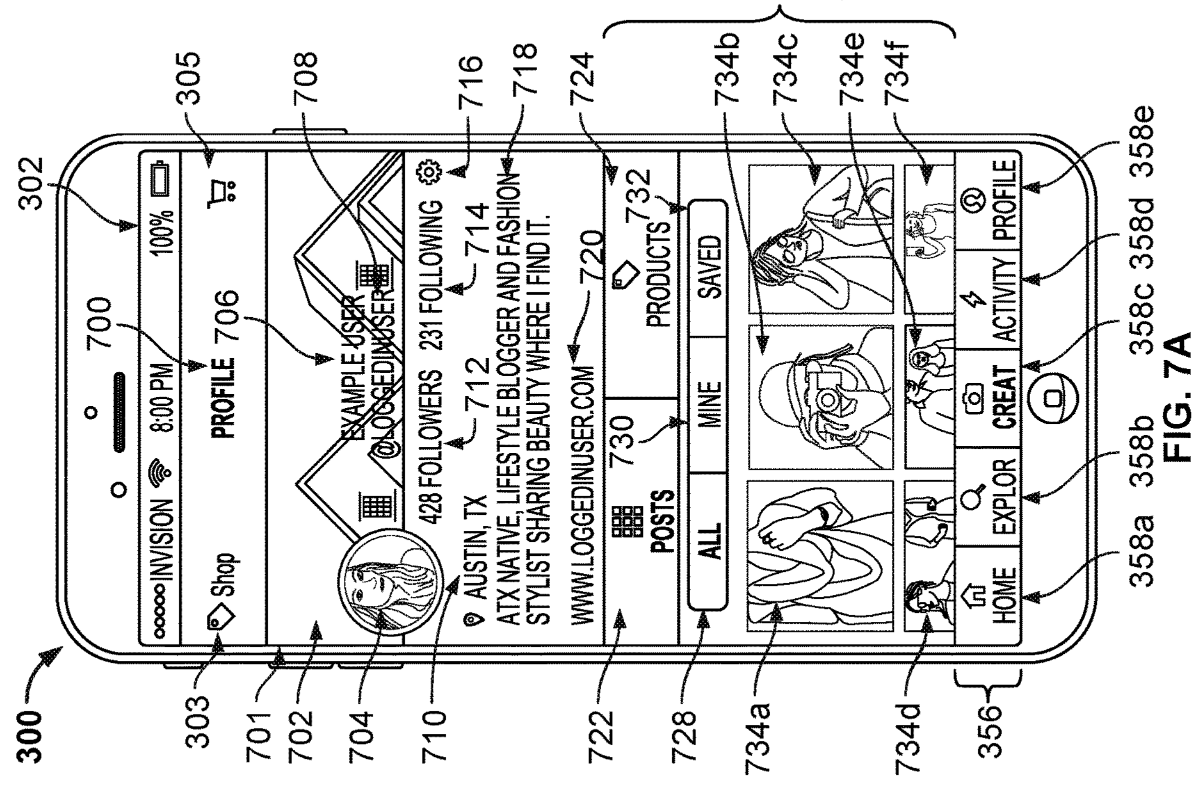

Referring to FIGS. 7A-B, screenshots of an example GUI 701 for a user profile on the example social-retail platform provided by the computer system 240 are depicted. The GUI 701 is presented on the display 302 of the mobile computing device 300, and includes the header (303, 305, with the addition of the "profile" title 700) and the footer 356 described above with regard to GUI 304. The GUI 701 provides an interface for a logged-in user to view her profile, as well as posts that the user has created, posts that the user has saved, and products that the user has saved. For example, the GUI 701 includes a posts tab 722 that can be selected to view and manage posts associated with the user, and a products tab 724 that can be selected to view and manage products associated with the user.

Referring to FIG. 7A, the GUI 701 includes user information, including profile pictures 702, 704, name 706, username 708, location 710, a number of followers 712, a number of users who the logged-in user is following 714, features to edit/change the user's information or settings 716, a brief description of the user 718, and a website/blog for the user 720. The posts tab 722 is selected, which presents buttons 728-732 to toggle the posts view 726 between all posts (728), posts that were created by the user (730), and posts that were saved by the user (732). Example posts 734*a-f* that are presented in the interface 726 are depicted. The graphical elements that are depicted for the posts 724*a-f* are selectable, which can allow a user to view the full post.

Referring to FIG. 7B, the GUI 701 includes the products tab 724 being selected, which presents that buttons 738-742 being presented to toggle between all products that have been saved by the user (738), products that have been saved publicly (740), and products that have been saved privately (742). Publicly saved products are products that can be viewed by other users in association with the logged-in user, such as in the home or activity feeds of other users, or by other users visiting the logged-in user's profile. Privately saved products are products that can only be viewed by the logged-in user in association with her account. Users can designate and toggle the private/public designation on saved products. An example list of products 744*a-c* are provided in a product summary area 736. In this example, the products 744*a-c* are grouped by product types 476*a-c* and include an icon 746 indicating that the product was saved privately, where applicable.

FIGS. 8A-F, 9A-D, 10A-B, and 11A-B are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the GUI 114 described above with regard to FIG. 1 and the system 100 on a social-retail platform. For example, the user-generated content elements 124, 132 and 148 (primary content elements) in the content stream 120 can be social posts/content elements and the secondary content elements 140*a-n* in the perpendicular stream 122 can be product content elements as described with regard to FIGS. 3A-B, 4A-B, 5A-B, 6A-B, 7A-B, 8A-F, 9A-D, 10A-B, and 11A-B.

Figures 8A, 8B:
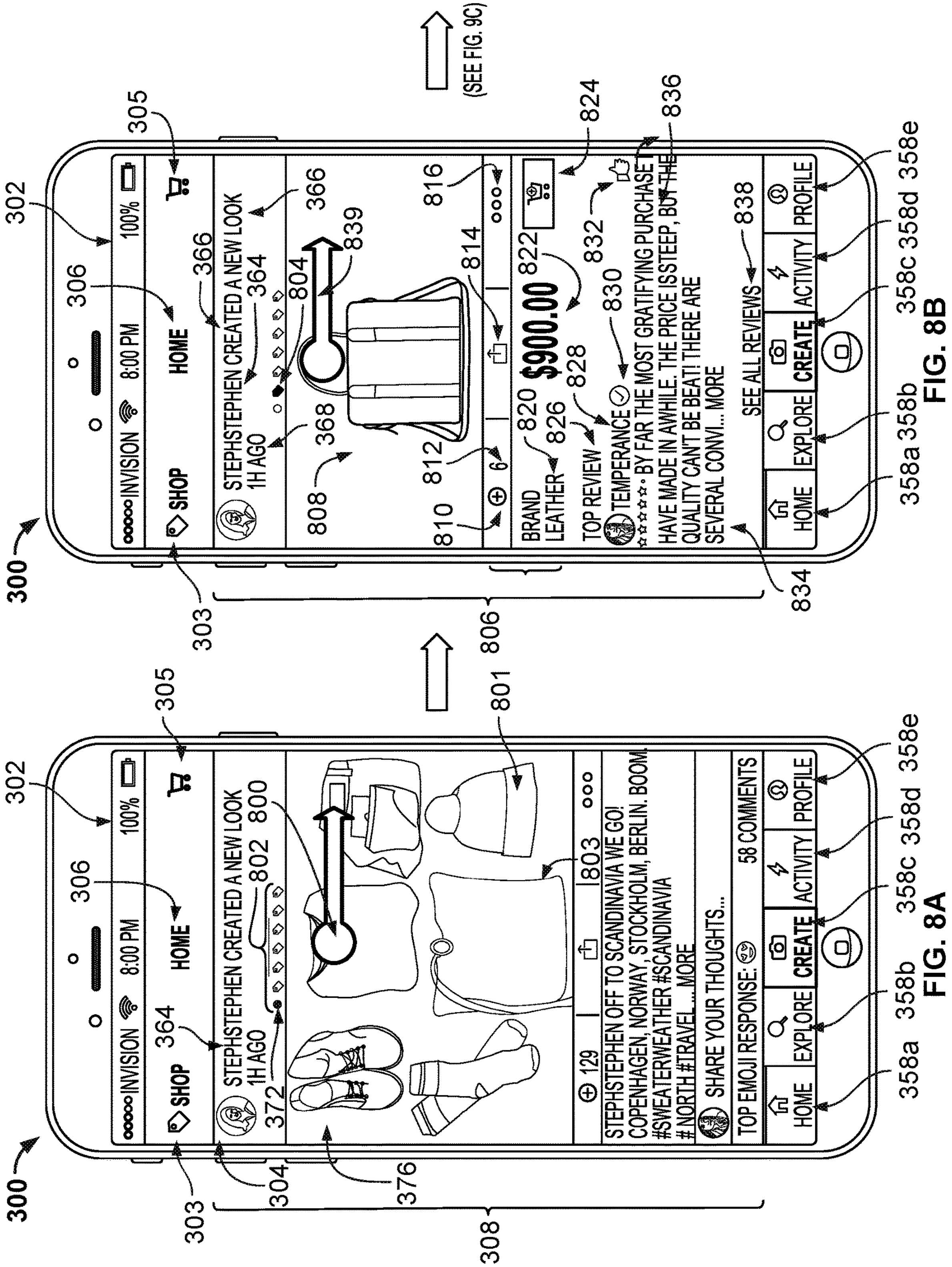
FIGS. 8A-F depict a sequence of screenshots and user interactions with a GUI for a home feed on an example platform.

Referring to FIGS. 8A-F, a sequence of screenshots depicting user interactions with the GUI 304 for the home feed on an example social-retail platform provided by the computer system 240 is depicted. Referring to FIG. 8A, the GUI 304 depicts the social post 308 with the user-generated image 376 showing a collection of products, including a knit hat 801 and a bag 803, and an visual indication 802 of six associated product elements. FIG. 8A is similar to FIG. 3B, and as described above, the six associated product elements can be accessible within the GUI 304 and its content stream (example of the content stream 120) by horizontally scrolling in the GUI 304 along a perpendicular content stream (example of the perpendicular content stream 122). As depicted in this example, user input 800 is provided to the GUI 304 in the form input to scroll to the right (e.g., swipe left in the GUI 304 to cause the content to scroll to the right) along the perpendicular content stream. For instance, as indicated by the icon 372 (which corresponds to the social post 308 in the perpendicular content stream) being highlighted/bold, the GUI 304 is currently showing the graphical element at the leftmost end of the perpendicular content stream. A user can provide right scrolling input until the graphical element at the rightmost end (corresponding to the rightmost product icons 802) of the perpendicular content stream is reached (or in implementations where the perpendicular content stream is "infinite," can continue to provide right scrolling input to cause the device 300 to retrieve additional content).

Referring to FIG. 8B, in response to receiving the user input 800, the GUI 304 can cause the perpendicular content stream to scroll to the right and to display the product content element 806, which corresponds to the product icon 804 (now highlighted/bold to indicate a current position along the perpendicular content stream). The example product content element 806 includes an image 808 for the product 803 depicted and tagged in the social post 308. The image 808 can be a merchant or manufacturer-provided image (as opposed to a user-generated, such as a photograph taken by a user). The image 808 can be, for example, an image that is presented for the product 803 on online stores/retailers and in online advertisements.

Like the social post 308, the product element 806 includes controls 810-816 through which users can interact with the product 803. For example, the controls include a selectable element 810 ("+" button) through which a user can "save" the product element 806 to her profile (see FIG. 7B). The selectable button 810 is paired with a counter 812 that identifies a number of other users who have already saved the product element 806. The controls further include another selectable element 814 (share icon) that can be selected to share the product element 806 either inside or outside of the social-retail platform provided by the computer system 240. For example, the user can select the element 814 to share the product element 806 with other users within the social-retail platform provided by the computer system 240, and/or to share the product element 806 on other social media platforms (e.g., FACEBOOK, TWITTER, PINTEREST). The controls also include another selectable element 816 (ellipses icon) that includes additional features that can be performed with regard to the product element 806 (e.g., transmit message with product information, flag as inappropriate).

The product element 806 further includes product information, such as a merchant 820 providing the product and a current price 822 for the product. The merchant information 820 can be selectable and can cause information about the merchant, such as user ratings for the merchant and other products offered by the merchant, to be presented (e.g., presented in an online store for the merchant either inside or outside of the social-retailer platform). The product element 806 additionally includes a selectable shopping cart icon 824 that a user can select to add the product 803 that is depicted in the social post 308 to the virtual shopping cart indicated by the icon 305. For example, by selecting the product element 806, the product 803 can be added to the shopping cart from within the social feed presented in the GUI 304 (without using another application or otherwise exiting the GUI 304). As described below with regard to FIGS. 9A-D, a user can add the product element 806 to the shopping cart and then continue scrolling vertically along the social feed or horizontally along the product feed (without having to reopen or refocus the computing device 300 on the GUI 304).

The product element 806 further includes a review section with user reviews for the product 803. The review section includes a "top review" portion 826, which in this example is a review by user 828 who is a member of the social-retail platform (as indicated by the icon 830). The review section further includes a selectable icon 832 to indicate whether this review is helpful/useful, a rating 834 that the user 828 gave the product, and a textual review 836 of the product. The review section also includes a selectable element 838 to expand/view all reviews (not just the top review 826). The product reviews can be from one or more user groups, such as users who are part of the social-retail platform and/or users of one or more online retail stores where the product 803 is offered.

Figure 8D:
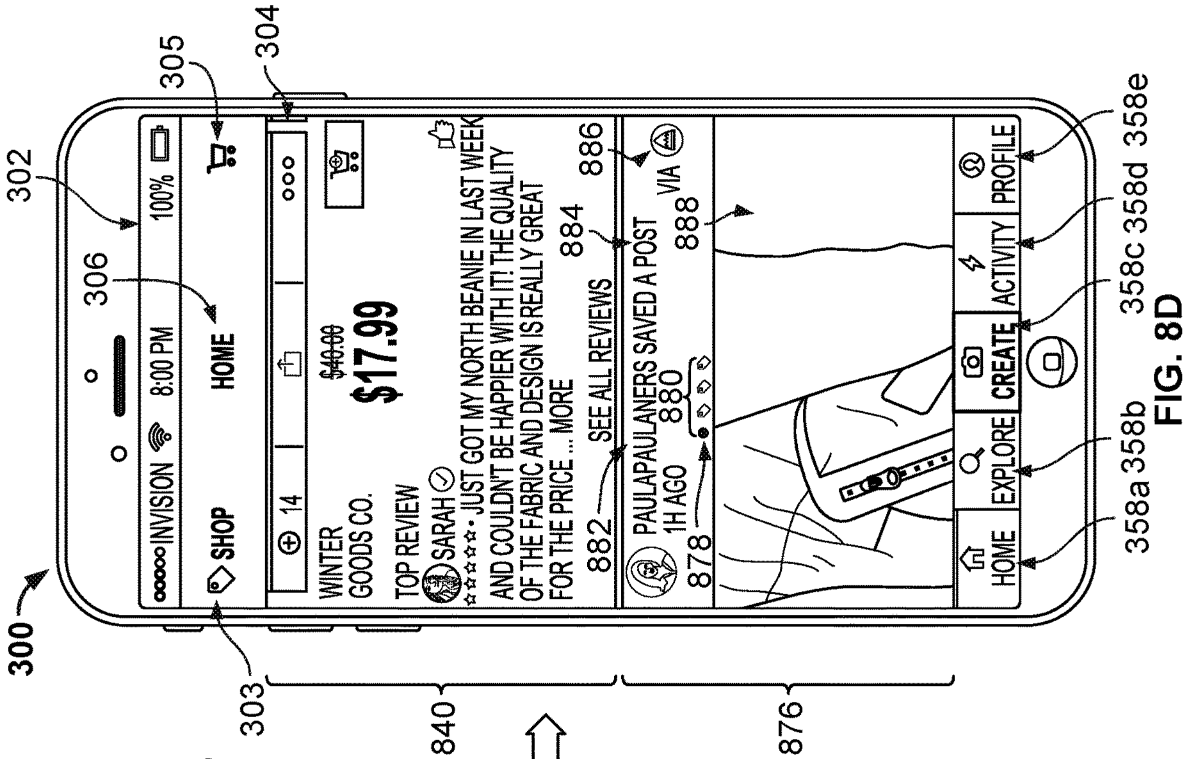
Figure 8C:
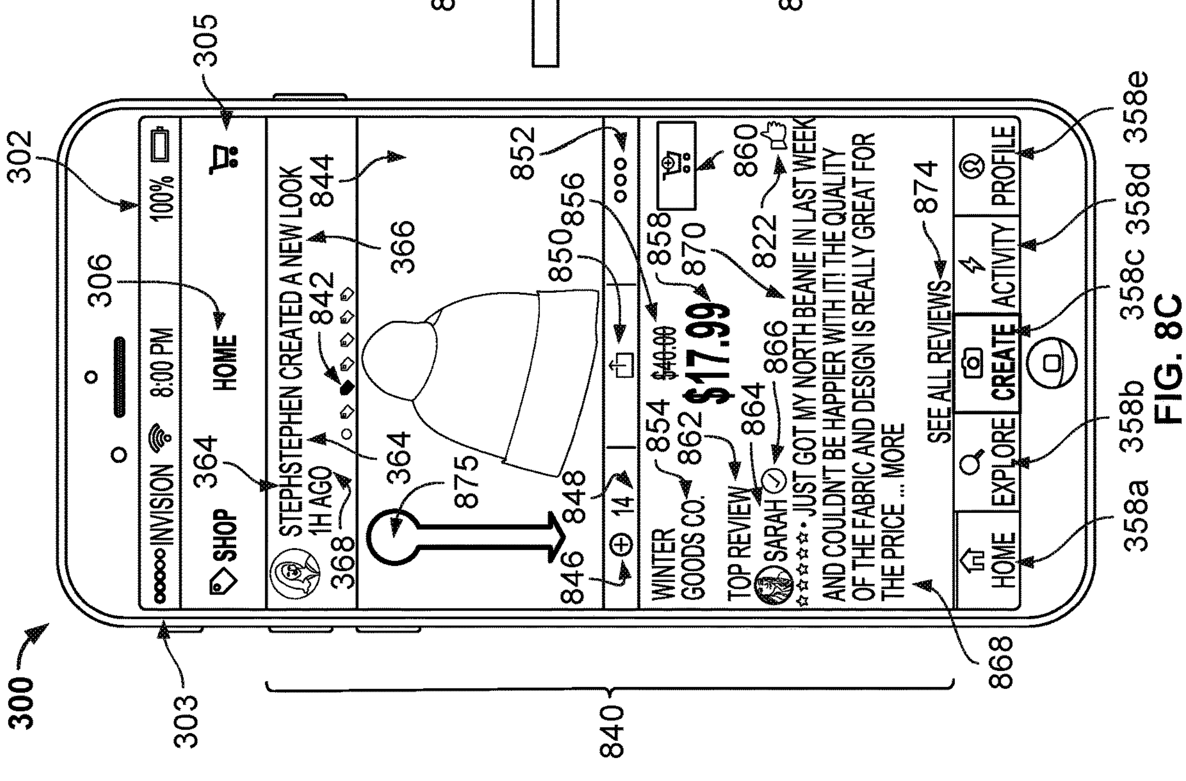

In the depicted example, further scrolling input 839 to move the product stream further to the right is provided through the GUI 304. Referring to FIG. 8C, this horizontal scrolling input 839 causes a next product element 840 (which corresponds to the product icon 842) to be presented in the GUI 304. The product element 840 includes an image 844 (e.g., merchant-provided image) that corresponds to the product 801 that is depicted and tagged in the social post 308. The product element 840 is includes similar graphical elements and features as those presented with the product element 806 for the product 803. For example, the product element 840 includes user controls 846-852 (similar to the controls 810-816), merchant information 854 (similar to merchant information 820), a current price 858 of the product (similar to the price 822), a selectable icon 860 to add the product 803 to the virtual cart 305 (similar to the selectable icon 824), and a review section with a top review 862 (and associated review information/features 864-872 and a feature to expand/display all reviews 874). The product element 840 further includes previous/original pricing information 856 for the product 803.

In the depicted example, vertical scrolling input 875 is received through the GUI 304 while the product element 840 is being displayed and while the GUI 304 has progressed partway down the horizontal product stream (as indicated by icon 842 corresponding to the product element 840 being bold/highlighted). Referring to FIG. 8D, in response to receiving the input 875 (to scroll down the social feed), a next social post 876 in the feed can be presented. In this example, the scrolling input 875 is depicted as having caused the product content element 840 to scroll partially up so as to still be visible, resulting in a bottom portion of the product element 840 being displayed simultaneously in the social feed as the social post 876 (which is also only partially presented in the GUI 304). Like the social post 308, which includes product tags (as indicated by the icons 802), the social post 876 also includes product tags, as indicated by the product icons 880—meaning that the social post 876 also includes a horizontal product stream that can be accessed through horizontal scrolling input provided with regard to the social post 876. Like the social post 308, the social post 876 includes the user-generated content element as the primary element in the product stream that is presented by default (as indicated by the bold/highlighted icon 878 corresponding to the social post 876).

Also like the social post 308, the social post 876 identifies a user 882 who performed an action 884 that caused the post 876 to be presented in the social feed. In this example, the action 884 is the user 882 saving to her profile the post 876, which was originally created by the user 886 indicated in the "via" element. The post 876 also includes a user-generated image 888 for the post 876, which is different from the merchant-provided images in the product elements, such as the merchant-provided image 844.

In contrast to the social post 308, which appears in the social feed based on the user 364 (to whom the logged-in user has a social connection) having created the post 308 (see FIGS. 3B, 8A), the social post 876 is appearing in the social feed based on the user 882 saving another user's post (user 886). In some implementations, the computer system 240 is programmed to treat each social post as a singular data element in the user generated content repository 248—meaning that saving, sharing, commenting, or performing other actions with regard to the post does not create a separate instance of the data element for the post that is now associated with the user performing the sharing/saving/commenting/other action. Instead, the computer system 240 can, for example, store information identifying (a) the sharing/saving/commenting/other action that has been performed (e.g., using action encodings), (b) the user (882) who performed the action, and (c) the social post (872) to which the action was performed. This configuration on the computer system 240 can allow each social post to always be attributed to the original creator of the post, as opposed to being attributed to a user who performs an action with regard to the post after it has been created. It can also allow for the original creator of a social post to maintain control over the content of the post, which can include editing the social post, managing comments associated with the post, product tags included in the post, and, if so desired by the creator, deleting the post. Additionally, such a configuration can reduce the amount of data that is stored in the repository 248 for shared/saved posts, which can improve the performance of the computer system 240 by reducing the storage requirements on the repository 248.

Figure 8F:
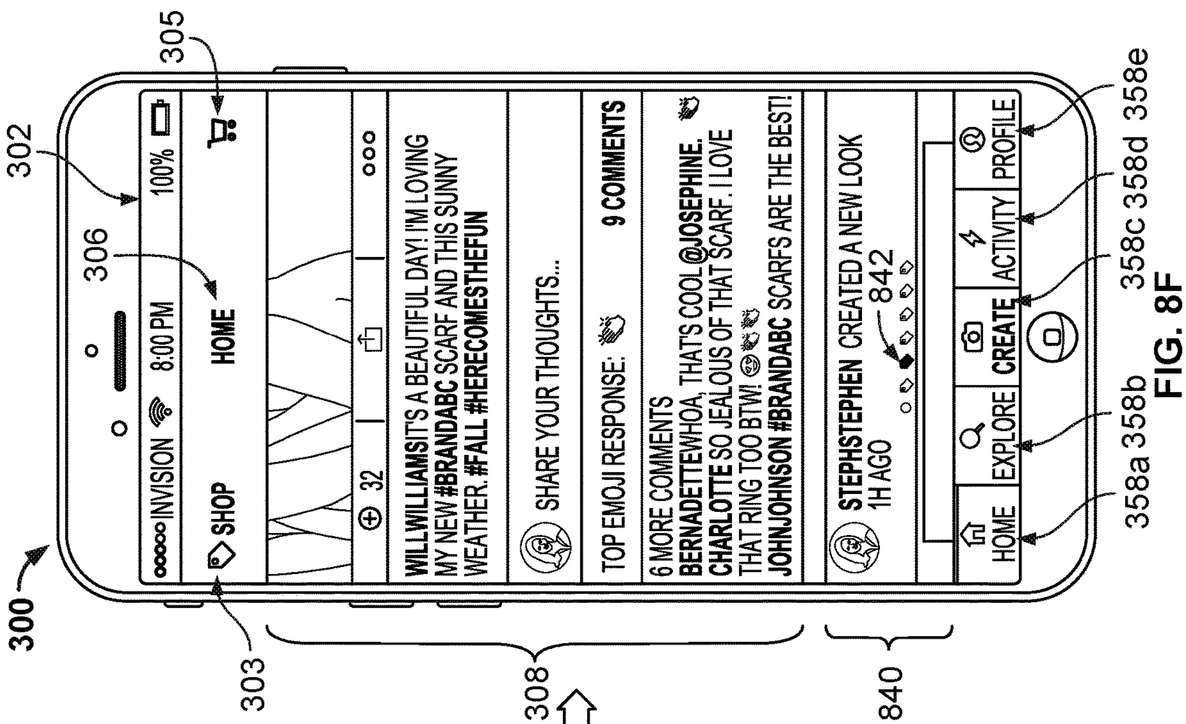
Figure 8E:
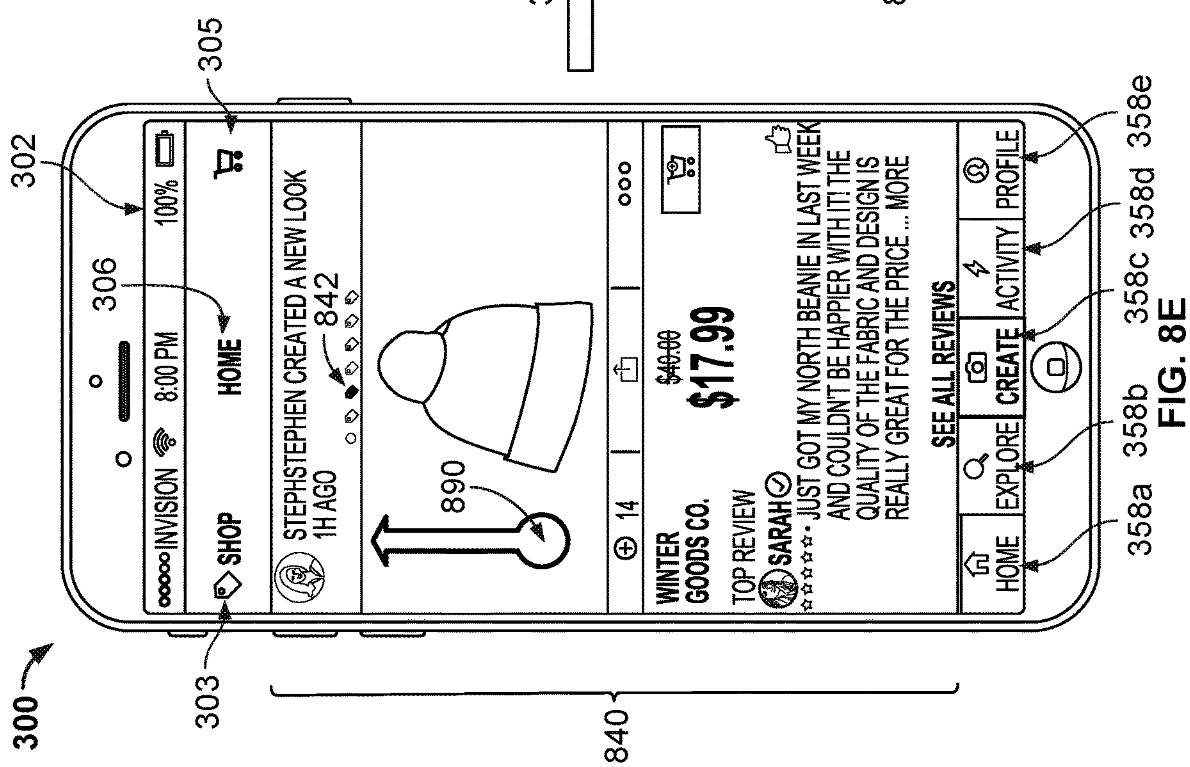

As discussed above with regard to the system 100 and FIG. 1, the current positions along both the social feed (vertical in this example) and the product feeds (horizontal in this example) can be maintained as scrolling along the other occurs. For example, as the user scrolls down the social feed, as depicted in FIG. 8D, the position in the product feed above, which is currently depicting the product element 840, can be maintained. For instance, if the user were to continue to scroll down the social feed (so that the product element 840 is no longer being presented) and then back up, the product element 840 would still be presented instead of the social post 308 tagging the product element 308. Similarly, if the user were to scroll horizontally along the product stream for the social post 876 until the rightmost product element is reached and then scroll up, the next element above the social post 876 (and its associated product elements) in the social feed (the social post 308 and the product element 806 and 840) would be presented. For example, referring to FIG. 8E, if upward scrolling input 890 were received in FIG. 8C (instead of the downward scrolling input 875), then the GUI 304 would present the next element above the product element 840 in the social feed, which is the social post 308, as depicted in FIG. 8F.

Referring to FIGS. 9A-D, a sequence of screenshots depicting user interactions with the GUI 304 for the home feed on an example social-retail platform provided by the computer system 240 is depicted. In this example sequence, a user adds the product element 806 to the virtual shopping cart 305 while within the social feed (see FIGS. 9A-B) and then proceeds to scroll along the social feed (see FIGS. 9C-D).

Figures 9A, 9B:
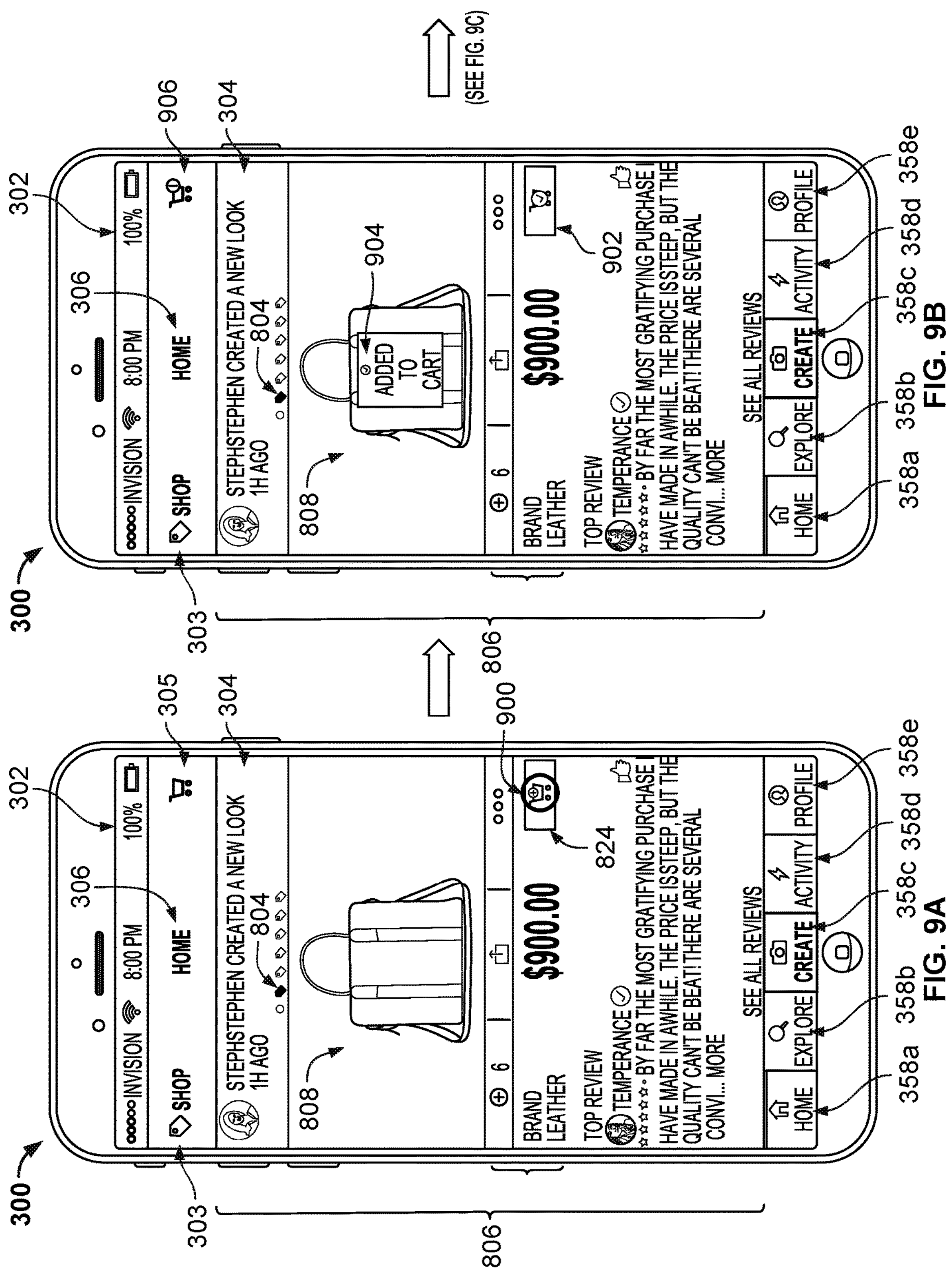
FIGS. 9A-D depict a sequence of screenshots and user interactions with a GUI for a home feed on an example platform.

Referring to FIG. 9A, instead of providing the horizontal scrolling input 839 in FIG. 8B, the user provides selecting input 900 to the shopping cart icon 824 that is presented with the product element 806 and within the social feed of the GUI 304. Referring to FIG. 9B, the selecting input 900 causes the product 808 for the product element 806 to be added to the virtual shopping cart, as indicated by a count on the shopping cart icon 305 increasing to "1" (previously no products in the cart). Adding the product 808 to the virtual shopping cart 305 can be performed locally on the computing device 300 and/or through communication with the computer system 240. For example, the computing device 300 can maintain local data identifying products included in the shopping cart. In such an example, adding the product 808 to the shopping cart can include the computing device 300 appending information for the product 808 to the local shopping card data. Confirmation that the product 808 has been successfully added to the cart can be determined by the absence of an error in the adding/appending process and/or through polling the local data to verify the presence of the product 808.

In another example, the data identifying the products included in the shopping cart can be maintained on the computer system 204, and information identifying a current number of items in the shopping cart can be provided to the computing device 300 (for presentation of the shopping cart count graphic 902). In such an example, adding the product 808 to the virtual shopping cart can include the computing device 300 transmitting a request to the computer system 240 to add the product 808. Such a request can include information identifying the product 808 (unique product identifier) and information identifying the logged-in user and/or the computing device 300 (e.g., username, MAC address for the computing device 300, other unique identifier). Once the request has been received and successfully processed by the computer system 240 (meaning the product 808 has been added to the shopping cart), a confirmation can be transmitted by the computer system 240 back to the computing device 300.

Once confirmation has been received that the product 808 was added to the virtual shopping cart, the GUI 304 can output a visual element 904 confirming that it has been added to the cart and the icon can include a visual indicator 902 (checkmark graphic) that indicates that the product 808 has already been added to the cart.

Figures 9C, 9D:
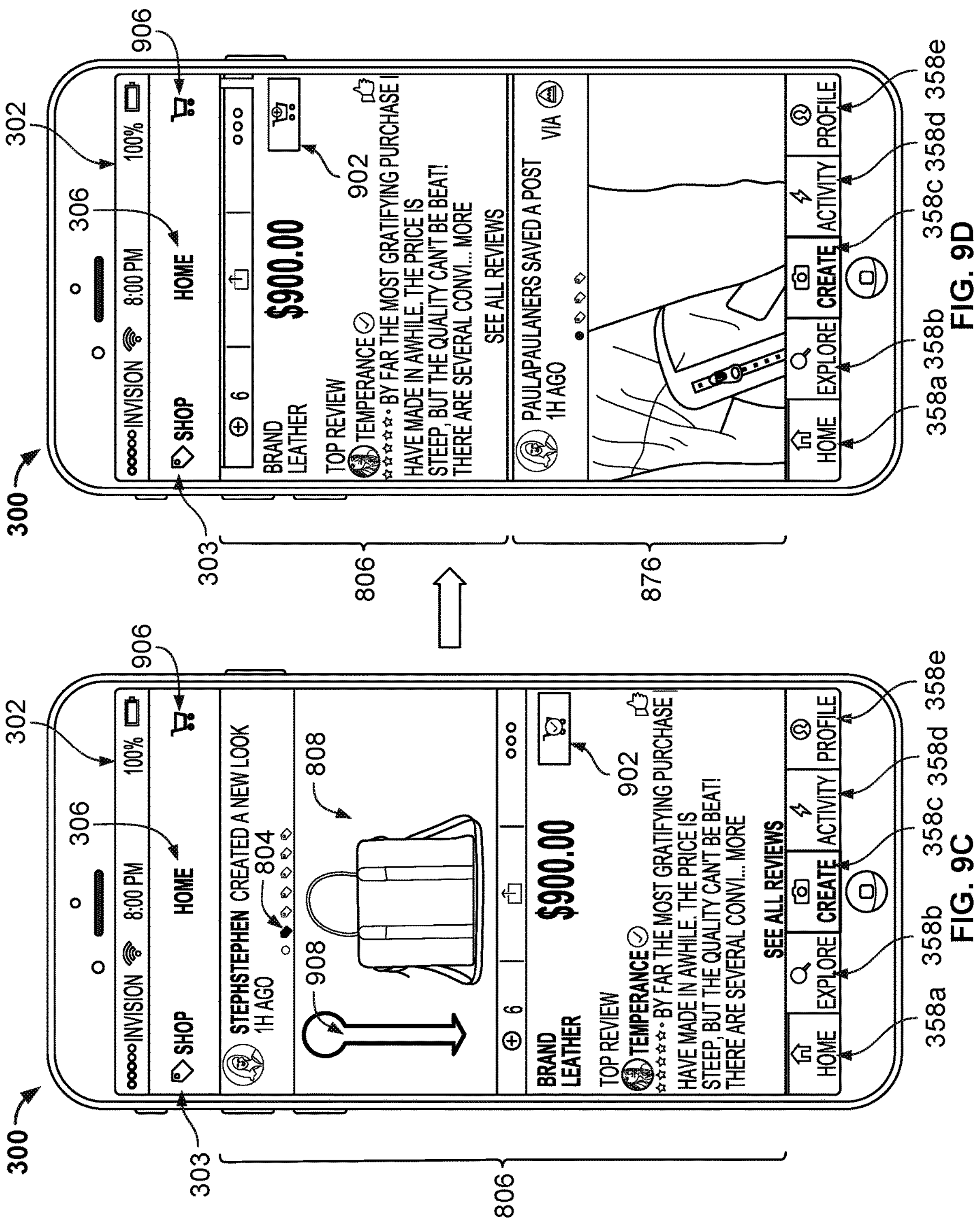

Referring to FIG. 9C, after adding the product 808 to the shopping cart 906, the user can provide vertical scrolling input 908. Referring to FIG. 9D, in response to receiving the scrolling input 908, the GUI 304 can scroll down the social feed to present a next element (social post 876). As indicated by the shopping cart 906 having a "1" graphic as the user scrolls down the social feed, the shopping cart can be persistently maintained within the social feed of the GUI 304. This can allow the user to add products from product elements tagged in other social posts (e.g., product elements associated with the social post 876) to the shopping cart. This can also allow the user to navigate between different interfaces on the computing device 300 within the social-retail platform to identify other products (e.g., through product tagging in social posts), such as discovering products in the discovery/search GUI 401, the activity feed GUI 601, and/or the profile GUI 701.

Figures 10A, 10B:
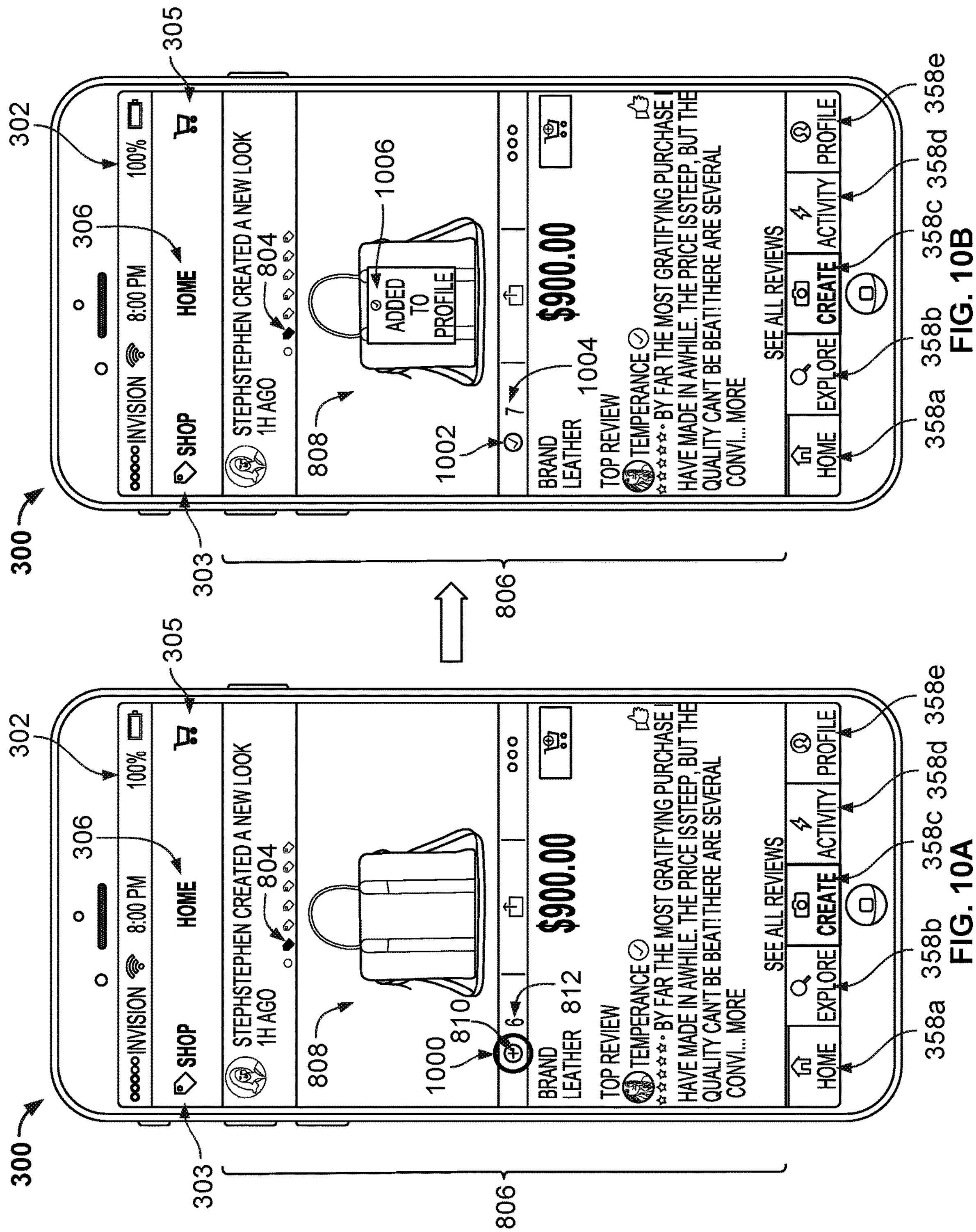
FIGS. 10A-B depict a sequence of screenshots and user interactions with a GUI for a home feed on an example platform.

Referring to FIGS. 10A-B, a sequence of screenshots depicting user interactions with the GUI 304 for the home feed on an example social-retail platform provided by the computer system 240 is depicted. In this example sequence, a user saves the product element 806 to her profile while within the social feed. Referring to FIG. 10A, instead of providing the horizontal scrolling input 839 in FIG. 8B, the user provides selecting input 1000 to the save icon 810 that is presented with the product element 806 and within the social feed of the GUI 304. Referring to FIG. 10B, the selecting input 1000 causes the product element 806 to be saved in association with the logged-in user's account on the social-retail platform, as indicated by the save icon 810 changing to a checkmark icon 1002 and the save counter incrementing from "6" (812) to "7" (1004).

Saving can cause the product element 806 to appear in product tab 724 in the profile GUI 701. The product element 806 may be saved by default as "private" (740) or "public" (742) depending on the user's settings (e.g., user may designate that saved products default as either public or private). Additionally or alternatively, the user may be presented with an option to save either publicly or privately when selecting the save icon 810. If the product element 806 is saved publicly, then the product element 806 can additionally appear in the home feeds (e.g., social post 876) and activity feeds (e.g., activity feed element 606*d*) of other users who are socially connected (e.g., following, friends) with the logged-in user.

Similar to the description above with regard to adding the product 808 to a virtual shopping cart, the product 808 can be saved locally on the computing device 300 and/or remotely by the computer system 240. For example, in response to receiving the selection 1000 of the save icon 810, the computing device 300 can transmit a request to the computer system 240 to save the product element 806 in association with the logged-in user and/or the computing device 300.

Figure 11B:
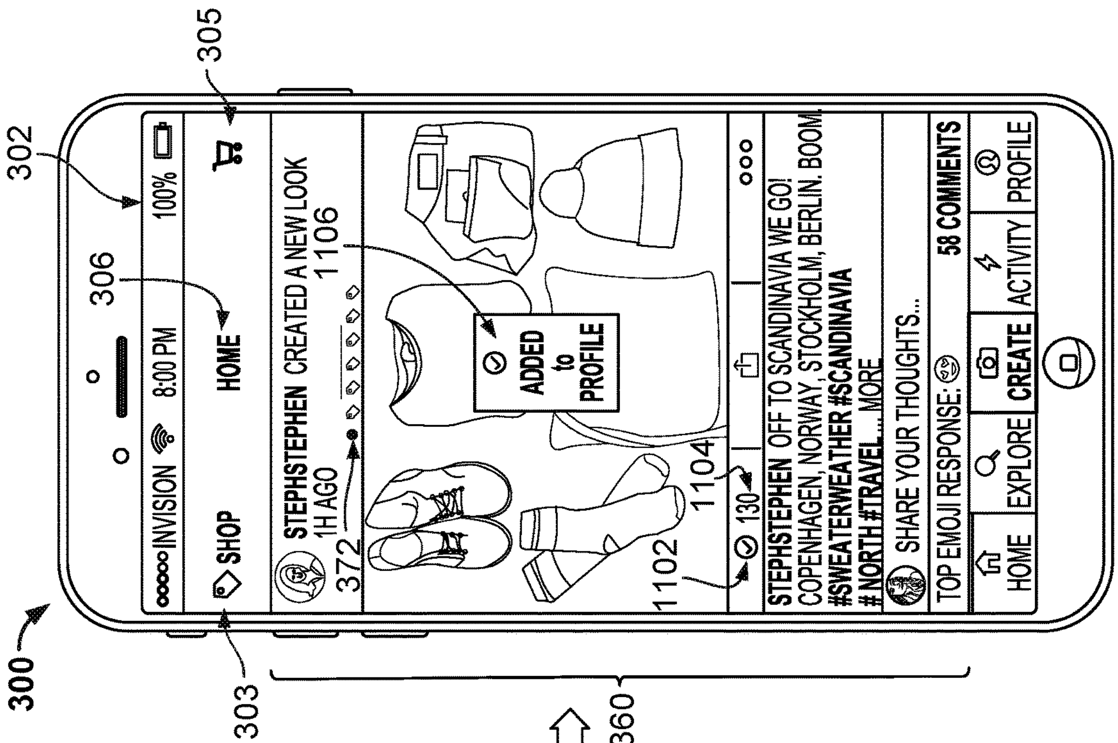
FIGS. 11A-B depict a sequence of screenshots and user interactions with a GUI for a home feed on an example platform.
Figure 11A:
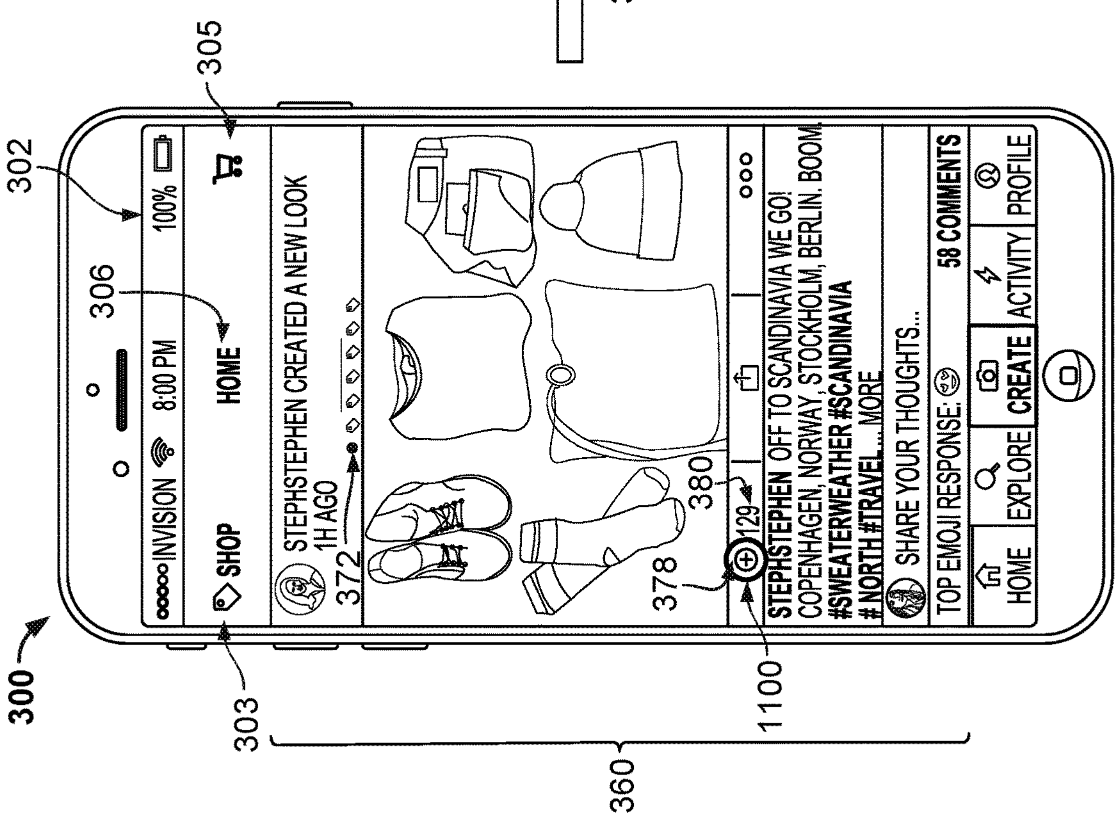

Referring to FIGS. 11A-B, a sequence of screenshots depicting user interactions with the GUI 304 for the home feed on an example social-retail platform provided by the computer system 240 is depicted. In this example sequence, a user saves social post 360 to her profile while within the social feed. Referring to FIG. 11A, instead of providing the horizontal scrolling input 800 in FIG. 8A, the user provides selecting input 1100 to the save icon 378 that is presented with the social post 360 and within the social feed of the GUI 304. Referring to FIG. 11B, the selecting input 1100 causes the social post element 360 to be saved in association with the logged-in user's account on the social-retail platform, as indicated by the save icon 378 changing to a checkmark icon 1102 and the save counter incrementing from "129" (380) to "130" (1104).

Saving can cause the social post 360 to appear in posts tab 722 in the profile GUI 701. The social post 360 can additionally appear in the home feeds (e.g., social post 876) and activity feeds (e.g., activity feed element 606*d*) of other users who are socially connected (e.g., following, friends) with the logged-in user.

Similar to the description above with regard to saving the product 808, the social post 360 can be saved locally on the computing device 300 and/or remotely by the computer system 240. For example, in response to receiving the selection 1100 of the save icon 378, the computing device 300 can transmit a request to the computer system 240 to save the social post 360 in association with the logged-in user and/or the computing device 300.

Figure 12:
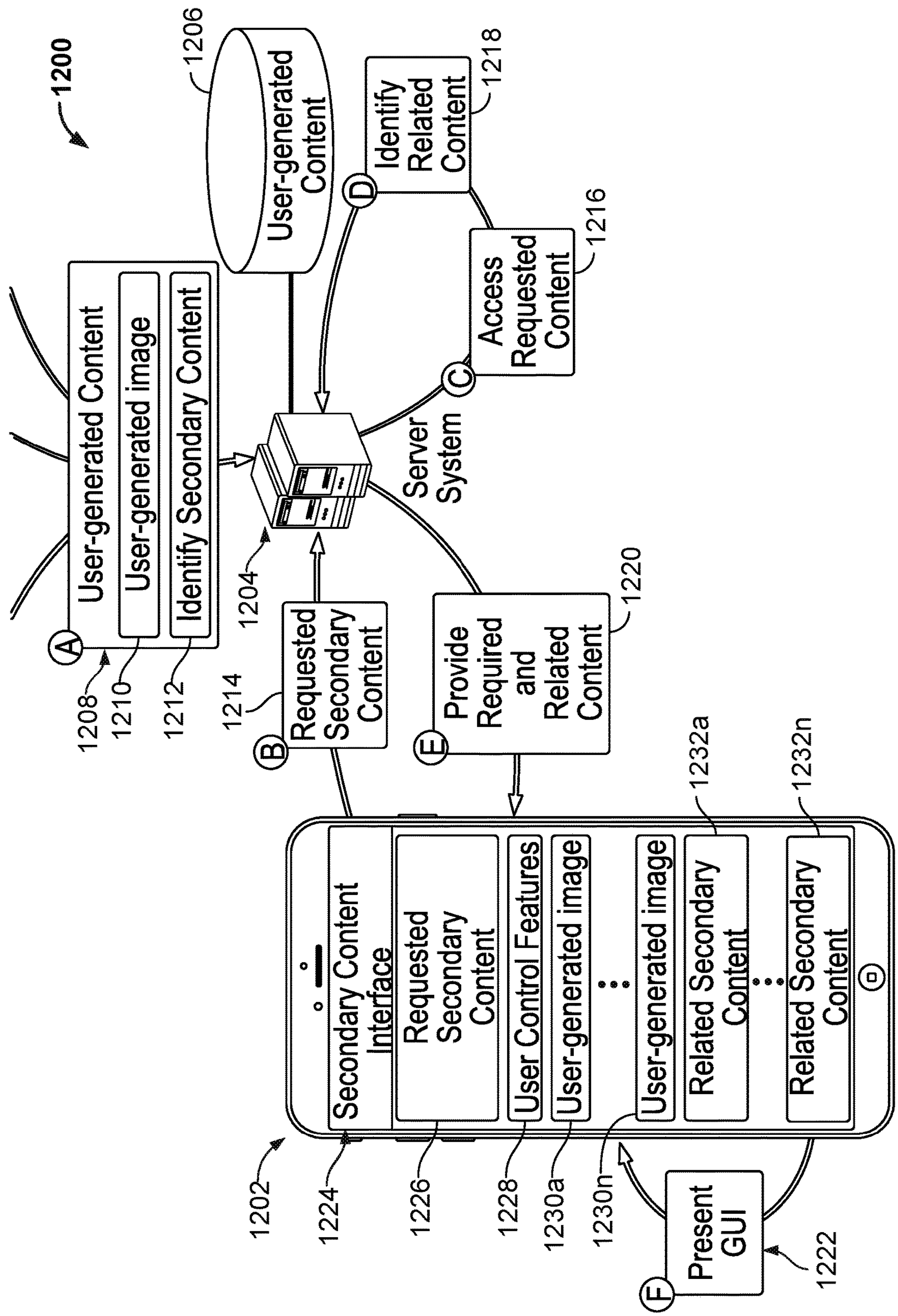
FIG. 12 is a conceptual diagram of an example system to provide an example GUI on an example client computing device.

Referring to FIG. 12, some embodiments of a system 1200 can be configured to provide an example GUI 1224 for presenting related content on an example client computing device 1202. For example, the GUI 1224 can present related content of different types within a common interface, such as social media content (e.g., user posts, comments, shared content) with other types of content (e.g., product content, messaging content, productivity application content, news content). The GUI 1214 can allow users to interact with the related content in a variety of ways, such as through social interactions (e.g., share, save, comment) and other interactions (e.g., purchasing, messaging, productivity, news distribution) without exiting the GUI 1214. For example, instead of providing a GUI that presents a single type content (e.g., social media content, product content) and that links to other applications/GUIs that are launched to present other types of content, the GUI 1214 is programmed present related content of multiple different types without launching or otherwise relying on another application/GUI.

The computing device 1202 can be any of a variety of client computing devices, such as a mobile computing device (e.g., smartphone, tablet, wearable device, smartwatch), laptop computer, desktop computer, and/or other types of user computing devices. The computing device 1202 can communicate with a server system 1204 over one or more networks (e.g., internet, local area network (LAN), wide area network (WAN), virtual private network (VPN), wireless network, mobile data network, or any combination thereof) to obtain multiple different types of content that are presented in the GUI 1214. The server system 1204 can be a computer system (e.g., cloud computer system) that either by itself or through affiliate networks is able to serve and provide features for multiple different types of content, such as social media, messaging, e-commerce, and/or other types of content. For example, the server system 1204 may directly provide social networking features and can communicate with other affiliate computer systems to provide product-related features (e.g., reviews, purchasing, order tracking). In other examples, the server system 1204 may directly provide both social networking features and product-related features. Other configurations of the server system 1204 among one or more other computer systems are also possible.

As indicated by step A, the server system 1204 can receive user-generated content 1208, which can include user-generated images 1210 and user-identified secondary content 1212 that is associated with the user-generated images 1210. For example, the server system 1204 can receive social media content (e.g., posts, comments, shared content) from other client computing devices. Such social media content can include, for example, photos (example user-generated images 1210) and tags (e.g., hashtags, user tags, product tags, location tags) that identify other content (example identified secondary content 1212) related to or included in the social media content. For example, a social media post (example user-generated content 1208) can include a photo of a user wearing a new jacket (example user-generated image 1210) and a product tag that identifies the new jacket (example identified secondary content 1212). The server system 1204 can receive the user-generated content 1208-1212 and can store it in a data repository 1206 (e.g., cloud storage system), from which it can be served by the server system 1204 to the client computing device 1202.

The server system 1204 can receive, store, and serve other types of content as well. For example, the server system 1204 can additionally obtain the secondary content (e.g., merchant-provided product content, news content, messaging content) that is identified (1212) by the user-generated content 1208. For example, if the identified secondary content 1212 is a product that is tagged in user-generated content 1208, the server system 1204 can obtain product information for the tagged product, such as an image for the product, a description of the product, a merchant selling the product, and other product details. In another example, if the identified secondary content 1212 is a news item is tagged in user-generated content 1208, the server system 1204 can obtain information about the tagged news item, such as the title/headline, a brief summary of the news item, an author, a time/date for the news item, and other news details.

As indicated by step B (1214), the computing device 1202 can transmit a request for secondary content to the server system 1204. Such a request can originate from the computing device 1202 in a variety of ways, such as through the computing device 1202 presenting the user-generated content 1208 and the user selecting a graphical element representing the identified secondary content 1212. For example, a social media post (example user-generated content 1208) can be presented on the computing device 1202 with a selectable tag or thumbnail for the secondary content (e.g., product, news item, productivity project, another user or entity), selection of which can cause the computing device 1202 to request the secondary content from the server system 1204. Some illustrative examples of such a request for secondary content originating from a client computing device are described below with regard to FIGS. 13A-C and 15-17.

As indicated by step C (1216), the server system 1204 can receive the request (which can uniquely identify the secondary content) and can proceed to access the requested content. For example, the server system 1204 can retrieve the requested secondary content from one or more storage devices/systems, and/or can request the secondary content from one or more other computer systems (e.g., affiliated computer systems).

As indicated by step D (1218), the server system 1204 can identify other content that is related to the requested secondary content. For example, the server system 1204 can identify user-generated content and/or other secondary content that is related to the requested secondary content. The related content can be identified and retrieved so that it can be presented in the GUI 1224 with the requested secondary content. The server system 1204 can use a variety of techniques to identify related content. For example, the server system 1204 can identify related content based on links between content (e.g., tag included with a content element that identifies another content element), overlapping user behavior patterns between content (e.g., similar sets of users have saved, shared, commented on, liked, or performed other actions with regard to two content items), similar or same annotations being applied to content (e.g., content annotated in the same product verticals), and/or other factors. For instance, the server system 1204 can identify user-generated content that includes an identifier (e.g., tag) identifying the requested secondary content. In another example, a common set of users having performed similar actions with regard to the requested secondary content and other content (e.g., user-generated content, other secondary content) can be used by the server system 1204 to identify the other content as being related to the requested secondary content. In a further example, the server system 1204 can identify other content (e.g., user-generated content, other secondary content) as being related to the requested secondary content based on the other content and the requested secondary content have similar annotations (e.g., hashtags, classifications, emojis).

As indicated by step E (1220), the server system 1204 can provide the requested secondary content and the related content to the computing device 1202. As indicated by step F (1222), the computing device 1202 can receive the secondary content and related content, and can present the content in the GUI 1224 using one or more graphical elements. For example, the computing device 1202 can present the requested secondary content 1226 in the GUI 1224 with various user control features 1228 related to the secondary content 1226, such as social interaction features (e.g., selectable buttons to like, save, share, comment on the secondary content 1226), product-specific features (e.g., purchase, add to virtual shopping cart, review, rate), and/or other features.

The secondary content 1226 can also be presented in the GUI 1224 with related user-generated images 1230*a-n* and related secondary content 1232*a-n* that the server system 1204 identified as being related. For example, the secondary content 1226 can be merchant-provided product information and the user-generated images 1230*a-n* can be user-generated photos depicting real-world use/application of the product described in the product information. In another example, the secondary content 1226 can be a news story and the user-generated images 1230*a-n* can be user-generated photos depicting aspects of the news story from different vantage points.

The user-generated images 1230*a-n* and the related secondary content 1232*a-n* can be selectable in the GUI 1224 and can cause the computing device 1202 to present the selected items (images 1230*a-n* and/or secondary content 1232*a-n*). The presentation of such other items can aid the user of the computing device 1202 in discovery new content that may be of interest to the user. For example, if the secondary content 1226 is product information and the user-generated images 1230*a-n* are photos depicting users using the product in combination with other products, the user can discover these other, related products that can be paired with the product identified in the secondary content 1226.

FIGS. 13A-J, 14A-D, 15, 16, and 17A-B are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the GUI 1224 described above with regard to FIG. 12 and the system 1200 on a social-retail platform. For example, the user-generated content 158 and user-generated images 130*a-n* can be social posts/content elements, and the secondary content 176, 132*a-n* can be product elements can be product content elements as described with regard to FIGS. 3A-B, 4A-B, 5A-B, 6A-B, 7A-B, 13A-J, 14A-D, 15, 16, and 17A-B.

Referring to FIGS. 13A-J, a sequence of screenshots depicting user interactions with the GUI 304 for the home feed on an example social-retail platform provided by the computer system 240 is depicted. In the example sequence, the GUI 304 permits a user to access and select a product element from within a social content stream (FIGS. 13A-C), and to view and interact (e.g., purchase product, add product to cart) with the product element in greater detail, including viewing social posts and other product elements that are related to the selected product element (FIGS. 13D-J).

Figures 13A, 13B:
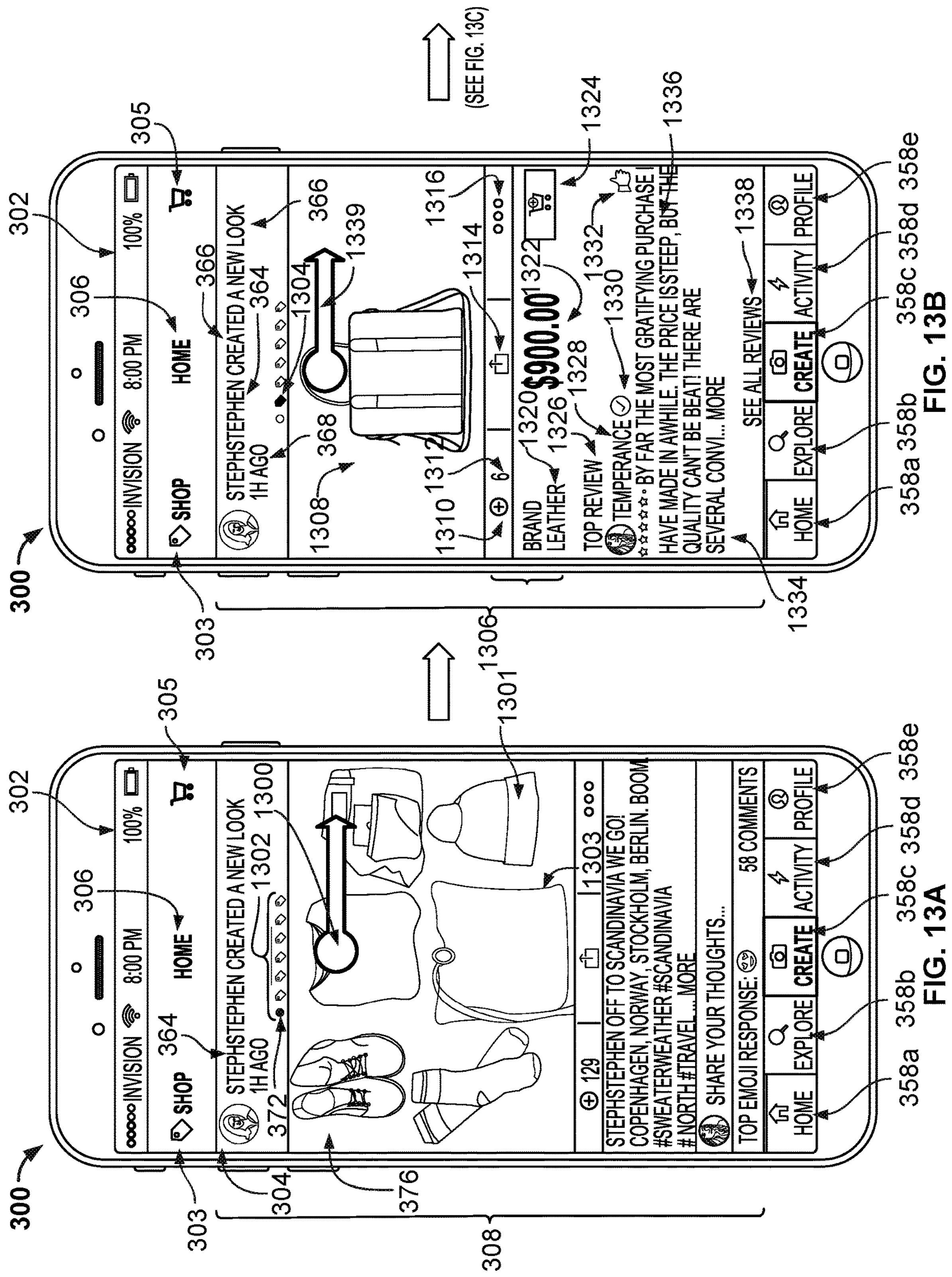
FIGS. 13A-J depict a sequence of screenshots and user interactions with a GUI for a home feed on an example platform.

Referring to FIG. 13A, the GUI 304 depicts the social post 308 with the user-generated image 376 showing a collection of products, including a knit hat 1301 and a bag 1303, and an visual indication 1302 of six associated product elements. FIG. 13A is similar to FIG. 3B, and as described above, the six associated product elements can be accessible within the GUI 304 and its content stream by horizontally scrolling in the GUI 304 along a perpendicular content stream. As depicted in this example, user input 1300 is provided to the GUI 304 in the form input to scroll to the right (e.g., swipe left in the GUI 304 to cause the content to scroll to the right) along the perpendicular content stream. For instance, as indicated by the icon 372 (which corresponds to the social post 308 in the perpendicular content stream) being highlighted/bold, the GUI 304 is currently showing the graphical element at the leftmost end of the perpendicular content stream. A user can provide right scrolling input until the graphical element at the rightmost end (corresponding to the rightmost product icons 1302) of the perpendicular content stream is reached (or in implementations where the perpendicular content stream is "infinite," can continue to provide right scrolling input to cause the device 300 to retrieve additional content).

Referring to FIG. 13B, in response to receiving the user input 1300, the GUI 304 can cause the perpendicular content stream to scroll to the right and to display the product content element 1306, which corresponds to the product icon 1304 (now highlighted/bold to indicate a current position along the perpendicular content stream). The example product content element 1306 includes an image 1308 for the product 1303 depicted and tagged in the social post 308. The image 1308 can be a merchant or manufacturer-provided image (as opposed to a user-generated, such as a photograph taken by a user). The image 1308 can be, for example, an image that is presented for the product 1303 on online stores/retailers and in online advertisements.

Like the social post 308, the product element 1306 includes controls 1310-816 through which users can interact with the product 1303. For example, the controls include a selectable element 1310 ("+" button) through which a user can "save" the product element 1306 to her profile (see FIG. 7B). The selectable button 1310 is paired with a counter 1312 that identifies a number of other users who have already saved the product element 1306. The controls further include another selectable element 1314 (share icon) that can be selected to share the product element 1306 either inside or outside of the social-retail platform provided by the computer system 240. For example, the user can select the element 1314 to share the product element 1306 with other users within the social-retail platform provided by the computer system 240, and/or to share the product element 1306 on other social media platforms (e.g., FACEBOOK, TWITTER, PINTEREST). The controls also include another selectable element 1316 (ellipses icon) that includes additional features that can be performed with regard to the product element 1306 (e.g., transmit message with product information, flag as inappropriate).

The product element 1306 further includes product information, such as a merchant 1320 providing the product and a current price 1322 for the product. The merchant information 1320 can be selectable and can cause information about the merchant, such as user ratings for the merchant and other products offered by the merchant, to be presented (e.g., presented in an online store for the merchant either inside or outside of the social-retailer platform). The product element 1306 additionally includes a selectable shopping cart icon 1324 that a user can select to add the product 1303 that is depicted in the social post 308 to the virtual shopping cart indicated by the icon 305. For example, by selecting the product element 1306, the product 1303 can be added to the shopping cart from within the social feed presented in the GUI 304 (without using another application or otherwise exiting the GUI 304). A user can add the product element 1306 to the shopping cart and then continue scrolling vertically along the social feed or horizontally along the product feed (without having to reopen or refocus the computing device 300 on the GUI 304).

The product element 1306 further includes a review section with user reviews for the product 1303. The review section includes a "top review" portion 1326, which in this example is a review by user 1328 who is a member of the social-retail platform (as indicated by the icon 1330). The review section further includes a selectable icon 1332 to indicate whether this review is helpful/useful, a rating 1334 that the user 1328 gave the product, and a textual review 1336 of the product. The review section also includes a selectable element 1338 to expand/view all reviews (not just the top review 1326). The product reviews can be from one or more user groups, such as users who are part of the social-retail platform and/or users of one or more online retail stores where the product 1303 is offered.

Figures 13C, 13D:
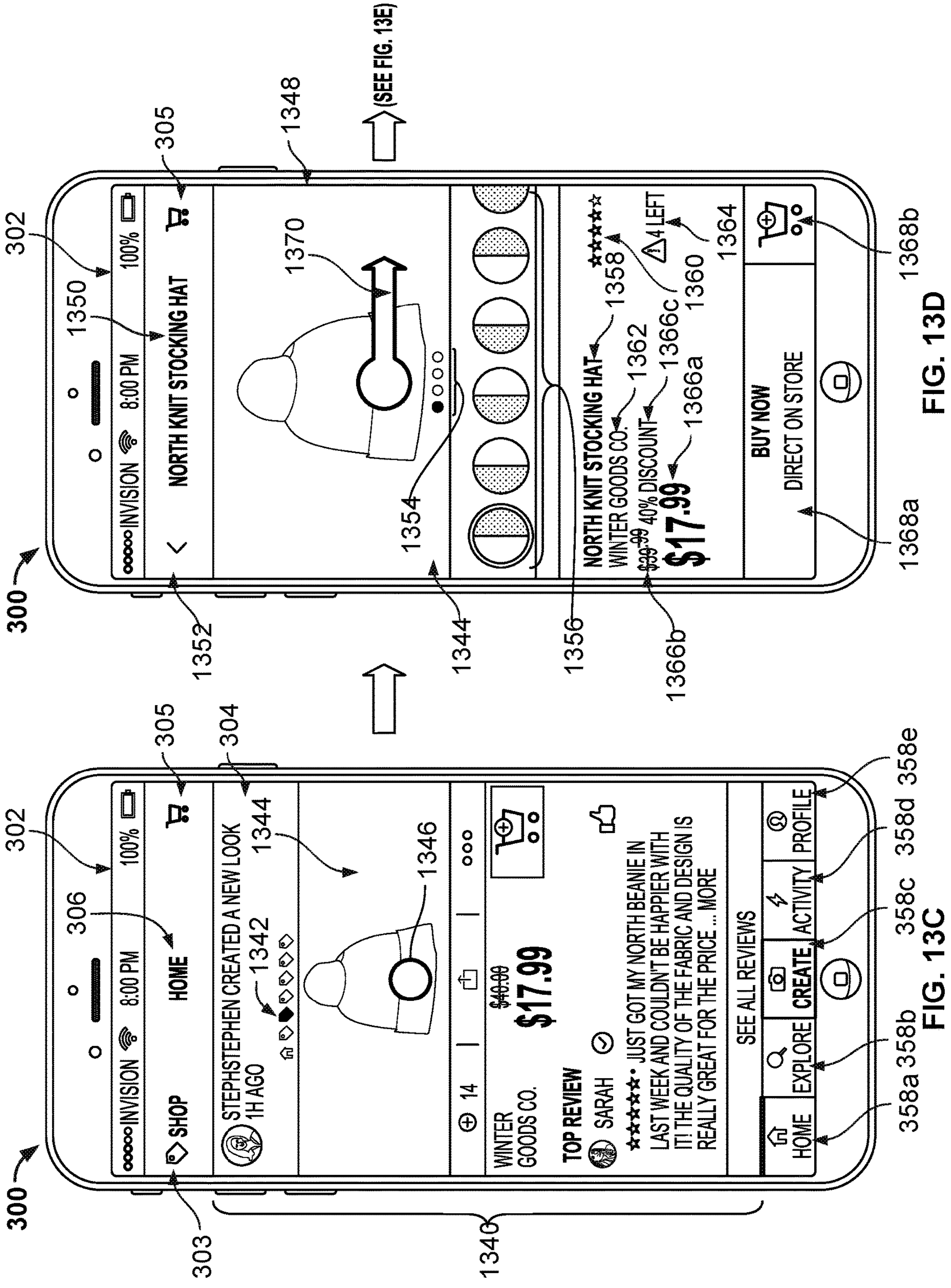

In the depicted example, further scrolling input 1339 to move the product stream further to the right is provided through the GUI 304. Referring to FIG. 13C, this horizontal scrolling input 1339 causes a next product element 1340 (which corresponds to the product icon 1342) to be presented in the GUI 304. The product element 1340 includes an image 1344 (e.g., merchant-provided image) that corresponds to the product 1301 that is depicted and tagged in the social post 308. The product element 1340 is includes similar graphical elements and features as those presented with the product element 1306 for the product 1303.

The image 1344 for and/or other portions of the product element 1340 can be selectable and, in the depicted example, selection input 1346 selecting the image 1344 is received through the GUI 304. Referring to FIG. 13D, the selection input 1346 can cause the GUI 304 to present a product interface 1348 for the product element 1340. The product interface 1348 can overlay the social content stream in the GUI 304, and can present the product element 1340 in greater detail than in the social content stream. The product interface 1348 can also present related social posts (e.g., social posts that tag/depict the product 1303) and related product elements (e.g., other products that may also be of interest to users who are interested in the product 1303). The related social posts and product elements can provide ways for users to navigate and discover new elements (e.g., posts, products, users) on the social-retail platform that may be of interest to the user.

The product interface 1348 includes a title 1350 of the product 1303, the virtual shopping cart icon 305, and a back button 1352 to navigate back to the location from which the product interface 1348 was launched, which in this example is the GUI 304 depicted in FIG. 13C. The product interface 1348 includes the image 1344 (enlarged from the presentation in the GUI 304) and a visual indication 1354 of three other images of the product 1303 are accessible via horizontal scrolling in the interface 1348. In this example, the leftmost indicator is highlighted/bold, indicating that scrolling to the right will cause a next image of the product 1303 to be presented. The product interface 1356 also includes selectable images 1356 of different colors/styles for the product 1303 that can be ordered/purchased. Selecting one of the selectable images 1356 can, in some implementations, cause the interface 1348 to replace the image 1344 with another image of the product 1303 with the selected colors/styles. The product interface 1348 also includes product information, such as a name 1358 for the product 1303, an aggregate user rating 1360 for the product 1303, a merchant 1363 providing the product 1303, a number of remaining products 1364 available for order with the merchant 1362, and pricing information 1366*a-c*. The pricing information 1366*a-c* includes an original price 1366*a*, a discounted price 1366*b*, and a discount 1366*c* that is being applied to the product 1303.

The product interface 1348 further includes controls 1368*a-b* to purchase/order the product 1303. For example, the control 1368*a* is a selectable button through which the user of the computing device 300 can order the product 1303 through a single action (e.g., selecting the control 1368*a*). The control 1368*b* is a selectable button through which the user of the computing device 300 can place the product 1303 in the virtual shopping cart 305 associated with the logged-in user. The virtual shopping cart 305 can be persistent across the interfaces 304, 401, 601, 701, and 1348, and can allow a user to add products to the cart 305 from any or all of these interfaces. The controls 1368*a-b* can be part of a footer that is persistently displayed at the bottom of the interface 1348.

Figures 13E, 13F:
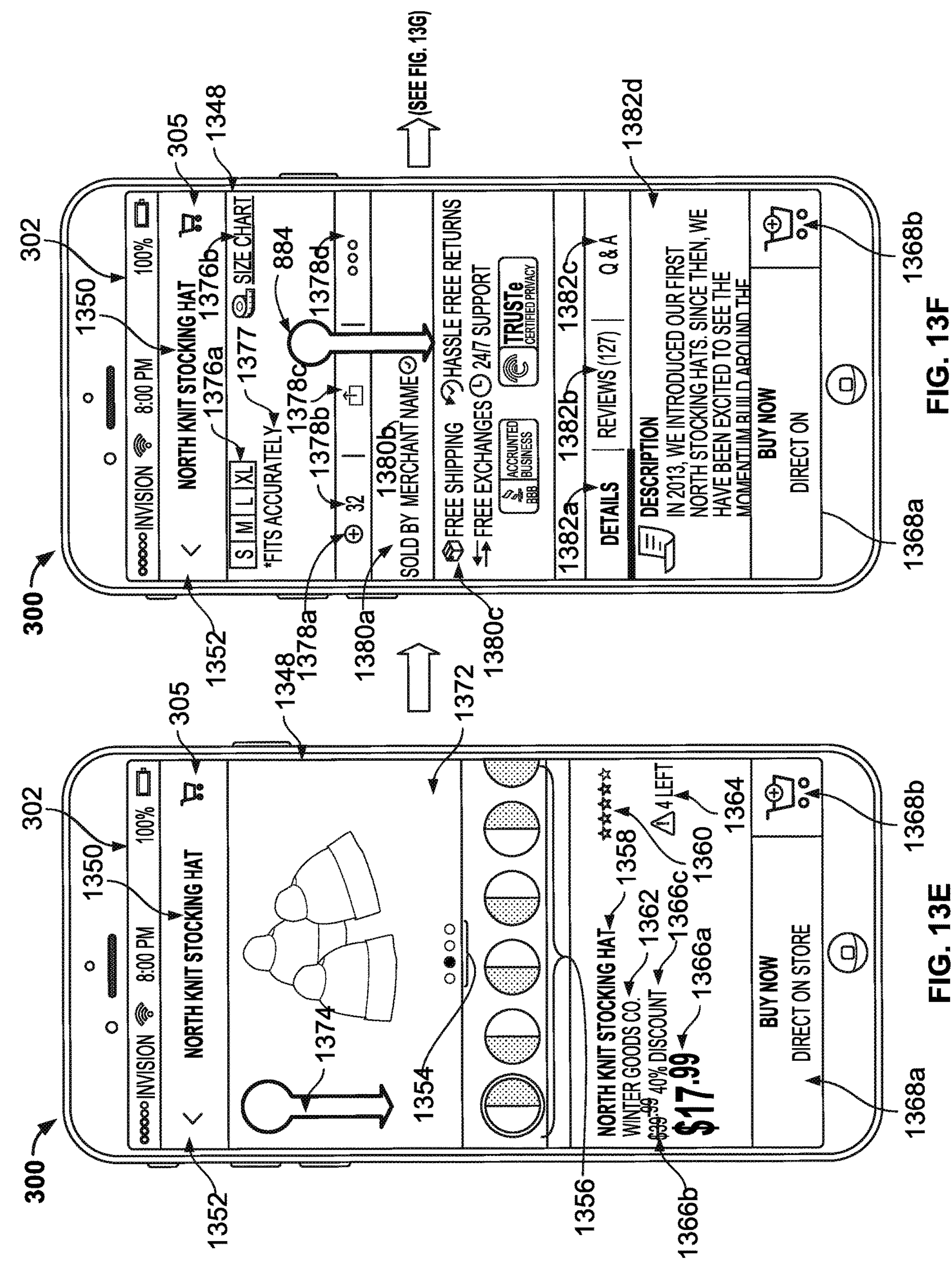

In the depicted example, horizontal scrolling input 1370 is provided in the interface 1348 to scroll an image stream for the product 1303 to the right. Referring to FIG. 13E, this scrolling input 1370 can cause a next image 1372 of the product 1303 to be displayed and for the second icon (that corresponds to the image 1372) in the indicator 1354 to be highlighted/bold, which can indicate a current position along the image stream for the product 1303.

In the depicted example, vertical scrolling input 1374 is provided in the interface 1348 to scroll down to view additional information and features related to the product 1303. Referring to FIG. 13F, the scrolling input 1374 can cause additional features from the interface to be presented. For example, the interface 1348 includes selectable buttons 1376*a* to select a product size and a selectable sizing chart 1376*b* to view a sizing information for the product 1303. The interface 1348 also includes an indication 1377 as to whether the product 1303 fits accurately (whether the selectable sizes 1376*a* are true to size). The indicator 1377 can be determined, for example, by the computer system 240 based on user reviews, ratings, and other feedback related to the product 1303. The product interface 1348 also includes social engagement features 1378*a-d* that are similar to the controls 1310-816 described above with regard to FIG. 13B. For example, selecting the save button 1378*a* in the product interface 1348 can cause the product 1303 to be saved to the user's profile, similar to the products 744*a-c*. Saving the product 1303 in the product interface 1348 can additionally cause the product 1303 to appear in the activity feed (i.e., activity feed item 606*d*) and/or in the home feed (i.e., social post 308) of other users who are social connected (e.g., followers, friends) to the logged-in user.

The product interface 1348 further includes merchant information 1380*a-c* indicating that the product 1303 is sold by a particular merchant (880*a-b*) and the product purchase terms 1380*c* (e.g., shipping, exchanges, returns, support) with the merchant 1380*b*. The interface 1348 additionally includes tabs 1382*a-c* to view information related to the product, including details for the product 1303 (tab 1382*a*), reviews of the product 1303 (tab 1382*b*), and questions/answers for the product (tab 1382*c*). The details can include a product description 1382*d* and product features 1382*e*. Additional scrolling input 1384 is provided through the product interface 1348, which causes the interface 1348 to further scroll down.

Figure 13H:
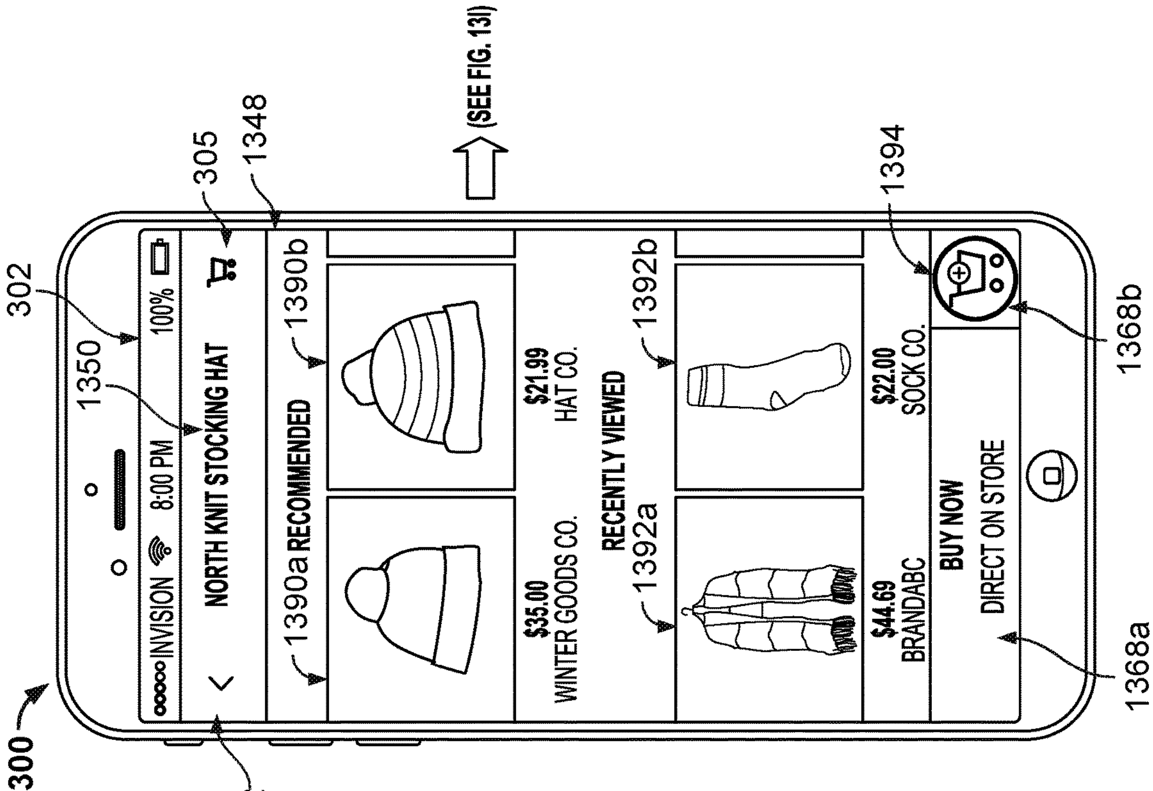
Figure 13G:
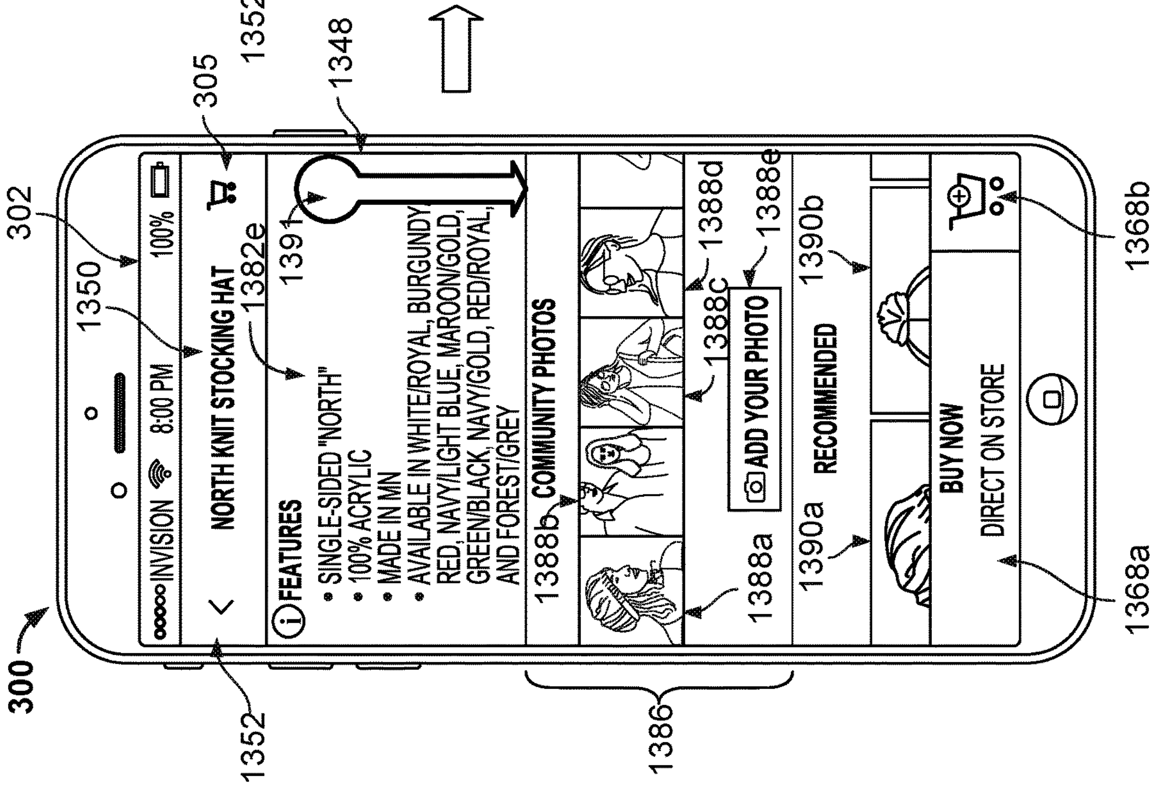

Referring to FIG. 13G, the additional scrolling input 1384 causes the interface 1348 to depict additional features related to the product 1303, including a section 1386 with user-generated photos 1388*a-d* that depict the product 1303 and with a selectable feature 1388*e* to upload photos of the product 1303. The photos 1388*a-d* can be selected from social posts that, for instance, tag the product 1303. The photos 1388*a-d* are examples of the related user-generated images 130*a-n* described above with regard to FIG. 1. The photos 1388*a-d* can be selectable, which can cause the selected photo to be presented in greater detail and/or for social posts from which the photos were identified. Presentation of social posts in response to selection of the photos 1388*a-d* can allow the user of the computing device 300 to explore and discover, for example, other products that other users have paired with the product 1303. For example, the photo 1388*a* depicts a user wearing the product 1303 (hat) and a jacket. Selecting the photo 1388*a* can cause a social post with photo 1388*a* to be presented, which can include information (e.g., tags, product elements) for other products (jacket) depicted in the photo 1388*a* as well. Furthermore, through the shopping cart features (i.e., control 1368*b*) that are persistently included across the interfaces 304, 401, 601, 701, and 1348, the logged-in user can assemble a collection of related products in the virtual shopping cart 305 via the photos 1388*a-d*. For example, the user can navigate to social posts through the photos 1388*a-d* and can add products tagged in the social posts that she is interested in to the shopping cart 305 (e.g., selection of control 1324). The photos 1388*a-d* can additionally and/or alternatively be selected based on user uploads of photos through the feature 1388*e*.

In the depicted example, further scrolling input 1391 is received through the interface 1348 to cause the interface 1348 to scroll down further. Referring to FIG. 13H, the further scrolling input can cause a section of recommended other products 1390*a-b* and a section of recently viewed products 1392*a-b* to be presented. The recommended products 1390*a-b* can be selected and served by the computer system 240 based on any of a variety of factors, such as comparisons of product information (e.g., product verticals, product descriptions, product details) for the product 1303 and other products (e.g., identify similar products as the product 1303), comparisons of the logged-in user's actions (e.g., product purchases, saves, shares, comments, reviews) with other products (e.g., identify products that the logged-in user has a history of being interested in), and/or the actions of other users (e.g., shares, saves, purchases, comments, ratings, reviews). For example, the computer system 240 can identify the recommended products 1390*a-b* based a group of users having performed similar actions (e.g., shares, saves, purchases, comments, ratings, reviews) for the recommended products 1390*a-b* and the product 1303. For instance, if a group of users who have expressed interest in the product 1303, such as by saving the product 1303, have also expressed interest in the recommended products 1390*a-b*, such as by also saving the products 1390*a-b*, then the computer system 240 can determine that the logged-in user has a high probability of also being interested in the products 1390*a-b*. The recommended products 1390*a-b* can provide an additional avenue for the logged-in user to discover new products and other content across the example social-retail platform.

The recently viewed products 1392*a-b* can be selected and served by the computer system 240 based on previous actions by the logged-in user. For example, the computer system 240 can track product elements that the user views in the GUI 304 and/or the product interface 1348, and can identify the recently viewed products 1392*a-b* based on such product views.

In the depicted example, selecting input 1394 for the control feature 1368*b* in the product interface 1348 for the virtual shopping cart is received. Referring to FIG. 13I, the selecting input 1394 causes the product 1303 depicted in the interface 1348 to be added to the virtual shopping cart, as indicated by a count on the shopping cart icon 1395*b* increasing to "1" (previously no products in the cart). Adding the product 1303 to the virtual shopping cart 1395*b* can be performed locally on the computing device 300 and/or through communication with the computer system 240. For example, the computing device 300 can maintain local data identifying products included in the shopping cart. In such an example, adding the product 1303 to the shopping cart can include the computing device 300 appending information for the product 1303 to the local shopping card data. Confirmation that the product 1303 has been successfully added to the cart can be determined by the absence of an error in the adding/appending process and/or through polling the local data to verify the presence of the product 1303.

In another example, the data identifying the products included in the shopping cart can be maintained on the computer system 204, and information identifying a current number of items in the shopping cart can be provided to the computing device 300 (for presentation of the shopping cart count graphic 1395*b*). In such an example, adding the product 1303 to the virtual shopping cart can include the computing device 300 transmitting a request to the computer system 240 to add the product 1303. Such a request can include information identifying the product 1303 (unique product identifier) and information identifying the logged-in user and/or the computing device 300 (e.g., username, MAC address for the computing device 300, other unique identifier). Once the request has been received and successfully processed by the computer system 240 (meaning the product 1303 has been added to the shopping cart), a confirmation can be transmitted by the computer system 240 back to the computing device 300.

Once confirmation has been received that the product 1303 was added to the virtual shopping cart, the product interface 1348 can output a visual element 1395*c* confirming that it has been added to the cart and the control element 1368*b* can include a visual indicator 1395*a* (checkmark graphic) that indicates that the product 1303 has already been added to the cart.

In the depicted example, the swipe/flick input 1396 is received in the product interface 1348 after the product 1303 has been added to the virtual shopping cart. The product interface 1348 can be programmed to monitor for such input (regardless of whether the product has been added to the cart or purchased) and, in response to receiving and recognizing the swipe/flick input 1396, can return to the GUI 304 from which the user entered the product interface 1348. The swipe/flick input 1396 can be similar to the user selecting the back button 1352, but can be input that is more convenient for a user to provide on the device 300 (e.g., the swipe/flick input 1396 can be provided anywhere on the display—no need to contact a specific location on the screen). Additionally and/or alternatively, other types of input can be detected through the product interface 1348 to return back to the GUI 304, like reaching the bottom of the product interface 1348 (as depicted in FIG. 13H) and flicking/swiping upward with at least a threshold amount of force/velocity as detected, for example, through a touch/pressure sensitive screen on the computing device 300. Other operations to return back to the GUI 304 from a gesture or input other than selecting the back button 1352 are also possible.

Figure 13J:
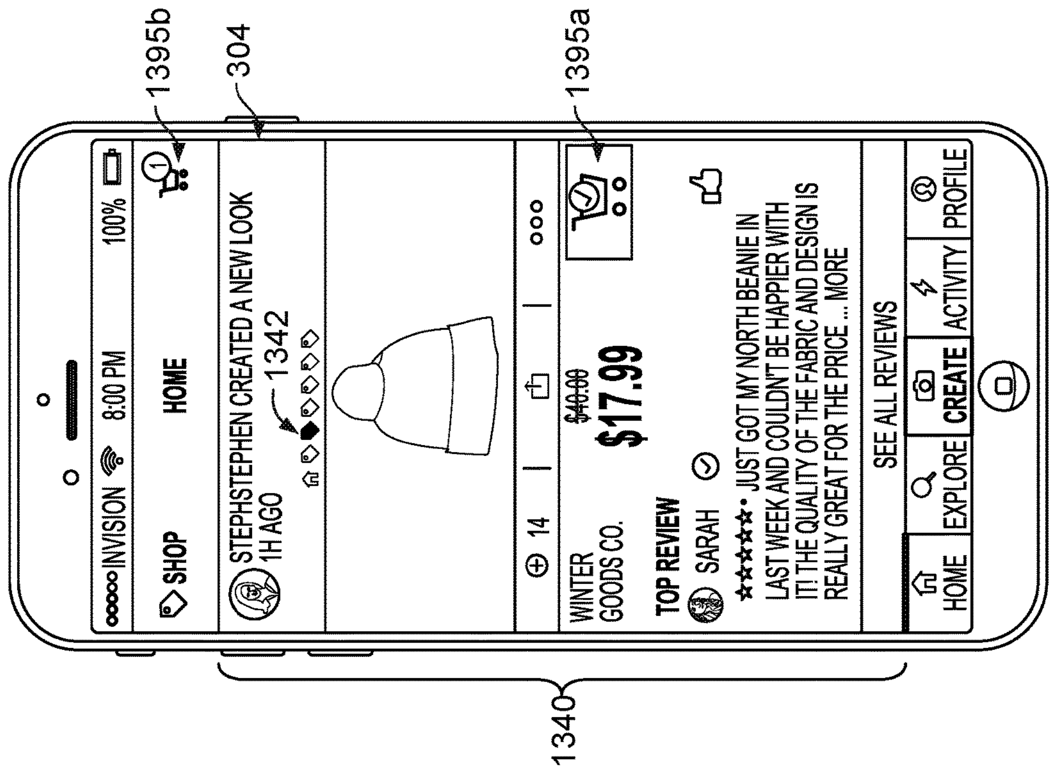
Figure 13I:
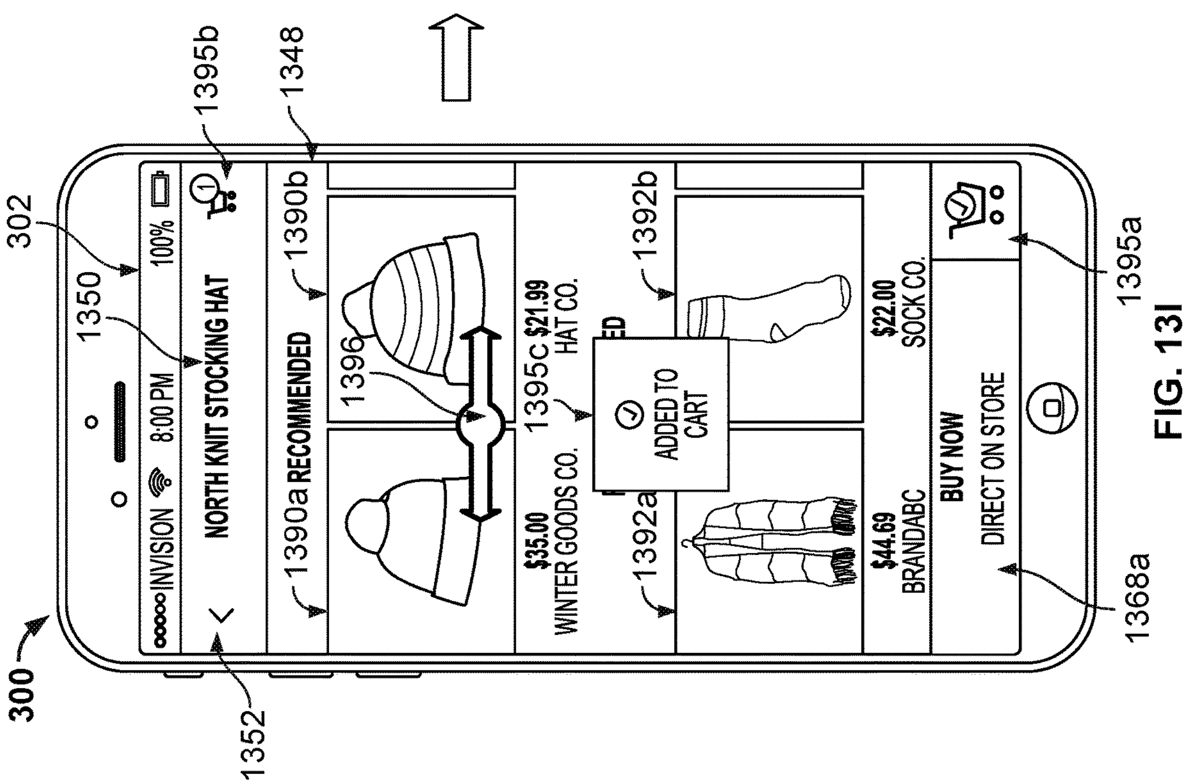

Referring to FIG. 13J, in response to receiving the swipe/flick input 1396, the GUI 304 can be presented at the same positions along the social feed and the perpendicular product feed that they were in when the selection input 1346 was received (see FIG. 13C). The virtual shopping cart can be persistent across the GUI 304 and the product interface 1348 such that actions performed in the product interface 1348 with regard to the product 1303 and the virtual shopping cart (e.g., adding the product 1303 to the cart, removing the product from the cart) can carry over to the GUI 304. For example, the GUI 304 depicted in FIG. 13J includes the shopping cart 1395*b* having the "1" graphic and the shopping cart icon in the GUI 304 now having the checkmark icon 1395*a*. Such actions preformed in the product interface 1348 can be persistent and combined with actions performed within the social feed of the GUI 304, which can allow the user to add products from the product interface 1348 and from the social feed. For example, the user can also add products from the social feed to the shopping cart 1395*b* by selecting the shopping cart icon for product elements tagged in other social posts in the social feed. This can also allow the user to navigate between different interfaces on the computing device 300 within the social-retail platform to identify other products (e.g., through product tagging in social posts), such as discovering products in the social feed GUI 304, the product interface 1348, the discovery/search GUI 401, the activity feed GUI 601, and/or the profile GUI 701.

Figure 14B:
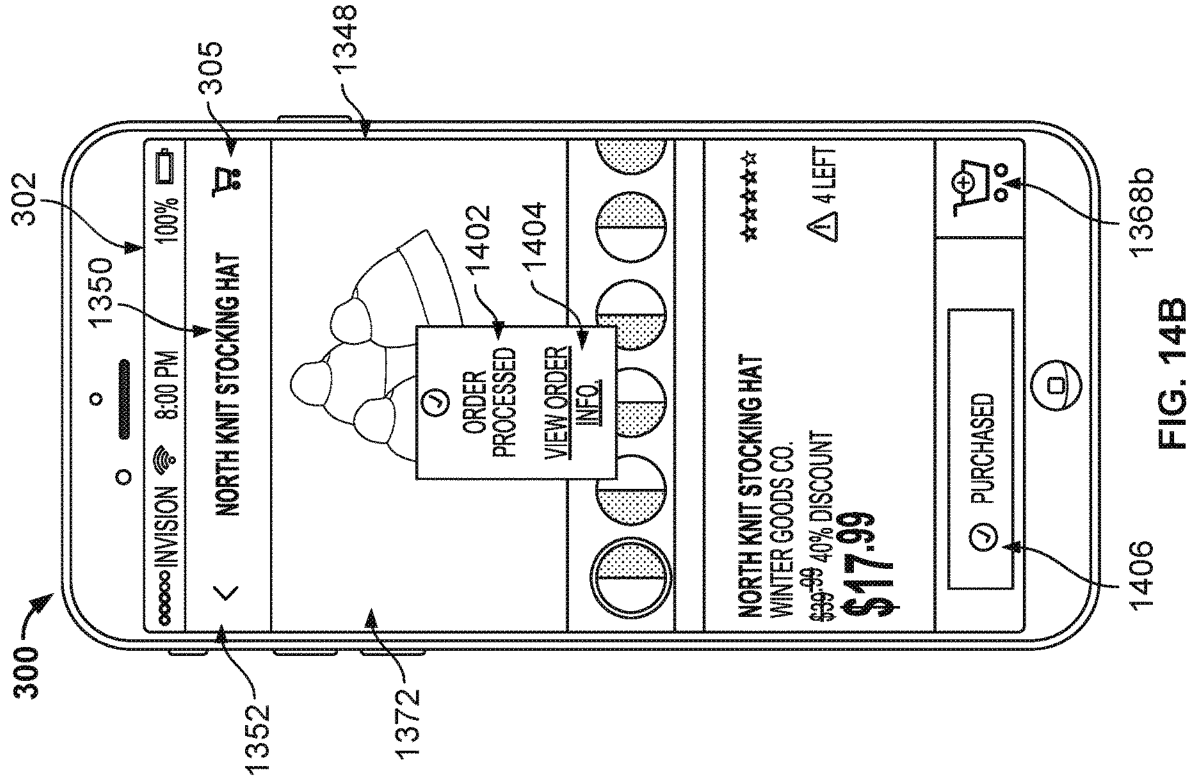
FIGS. 14A-B depict a sequence of screenshots and user interactions with a product interface on an example platform.
Figure 14A:
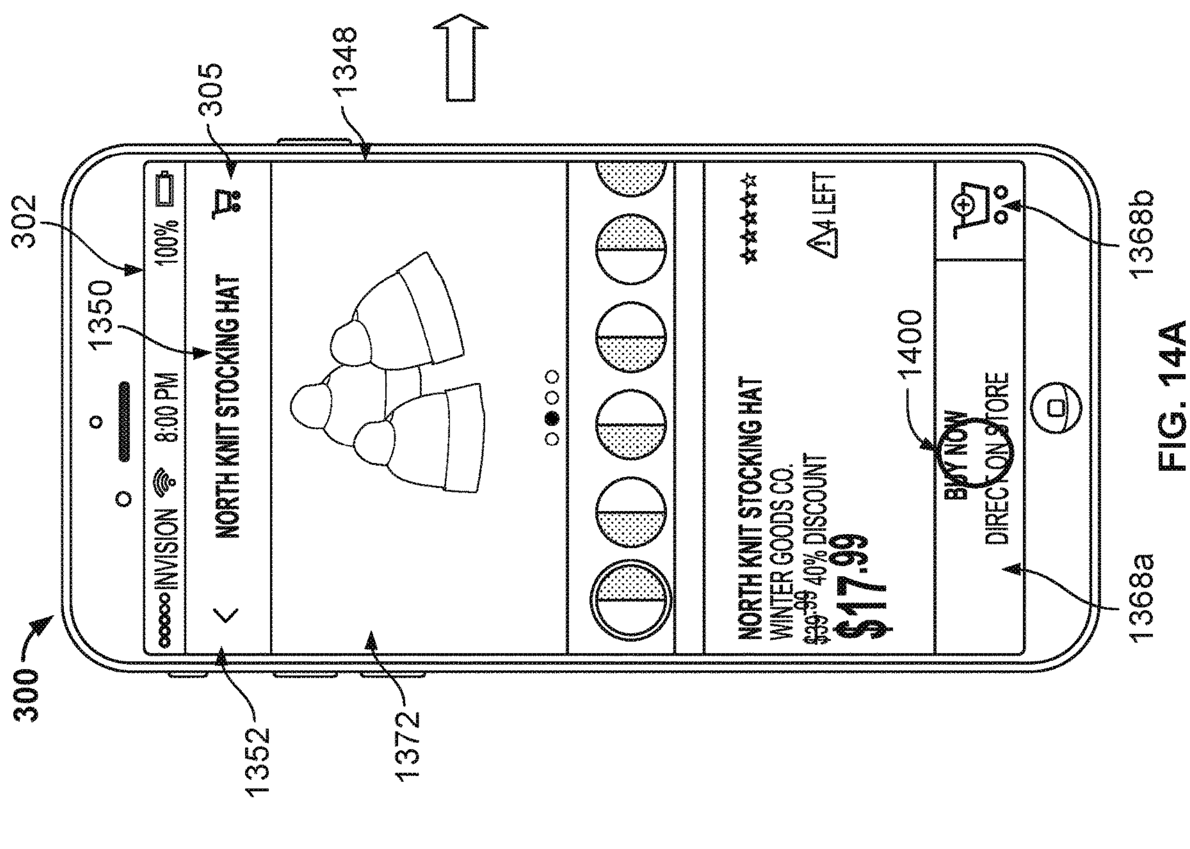

Referring to FIGS. 14A-B, a sequence of screenshots depicting user interactions with the product interface 1348 on an example social-retail platform provided by the computer system 240 is depicted.

Referring to FIG. 14A, instead of providing the selecting input 1394 for the shopping cart control feature 1368*b* in FIG. 13H, the user provides selecting input 1400 for the purchase control feature 1368*a* in the product interface 1348. Selection of the control feature 1368*a* can cause the computing device 300 to transmit an order/purchase request for the product 1303 to the computer system 240 through the single, selecting input action 1400 (e.g., selecting the control 1368*a*).

The computer system 240 can receive the request, along with information identifying the logged-in user and/or the device 300 with the computer system 240, and can process the request (alone or in combination with one or more of the affiliated computer systems 260). Processing the request can include, for example, the computer system 240 verifying that the product 1303 is available (e.g., in stock), authenticating the logged-in user and/or the computing device 300, and verifying a valid payment method (e.g., stored financial account information) associated with the logged-in user. Once the order has been successfully processed, the computer system 240 can transmit confirmation back to the computing device 300. Referring to FIG. 14B, in response to receiving such confirmation, the product interface 1348 can present a visual indicator 1402 confirming that the order has been processed. The interface 1348 can also replace/augment the control feature 1368*a* with information 1406 indicating that the product has been purchased. The interface 1348 can also provide a selectable feature 1404 to view current order status information (e.g., shipping information, order status information). The user can provide swipe/flick input, like the swipe/flick input 1396, in the interface 1348 after placing the order to return back to the GUI 304 as well.

The product interface 1348 can be accessed in a variety of different ways from within the social-retail platform. For example, the user can access the product interface 1348 by selecting a product depicted in a product element in a home/social feed, as depicted and described with regard to FIGS. 13A-D. The product interface 1348 can be accessed in other ways as well, such as from the explore/search interface 401 (as described below with regard to FIG. 15), the activity feed interface 601 (as described below with regard to FIG. 16), and/or the profile interface 701 (as described below with regard to FIGS. 17A-B).

Figure 15:
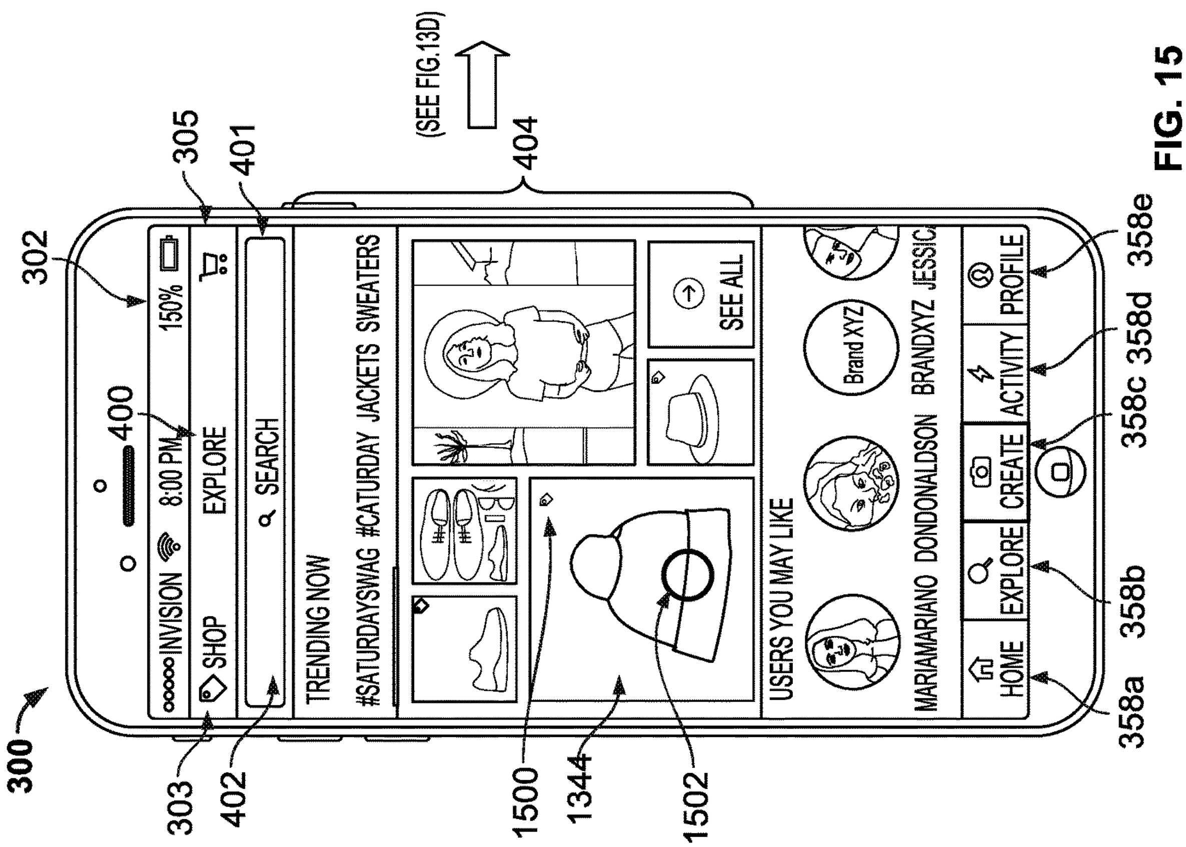
FIG. 15 depicts a screenshot and user interactions with an explore/search interface on an example platform.

Referring to FIG. 15, a screenshot depicting user interaction with the explore/search interface 401 on an example social-retail platform provided by the computer system 240 is depicted. In particular, FIG. 15 depicts the explore/search interface 401 described above with regard to FIGS. 4A-B. However, in FIG. 15 the image 1344 for the example product that is the subject of FIGS. 13A-J and 14A-B is included in the interface. The image 1344 includes a product icon 1500, indicating that it is a product (as opposed to a social post). A user can access the product interface 1348 for the product depicted in image 1344 by selecting the image 1344, as indicated by the selecting input 1502. In response to receiving the selecting input 1502, the product interface 1348 depicted in FIG. 13D can overlay the GUI 401 for the explore/search interface. After being launched, the user can interact with the product interface 1348 in the same manner as described above with regard to FIGS. 13D-I, but the swipe/flick input 1396 provided in this instance would return to the GUI 401 as opposed to the GUI 304 (depicted across FIGS. 13I-J). Similar to the description above with regard to FIG. 13J, though, upon returning to the GUI 401 after adding a product to the virtual shopping cart through the product interface 1348, the shopping cart icon 305 in the GUI 401 can be updated (e.g., display the count icon 1395*b* in the GUI 401).

Figure 16:
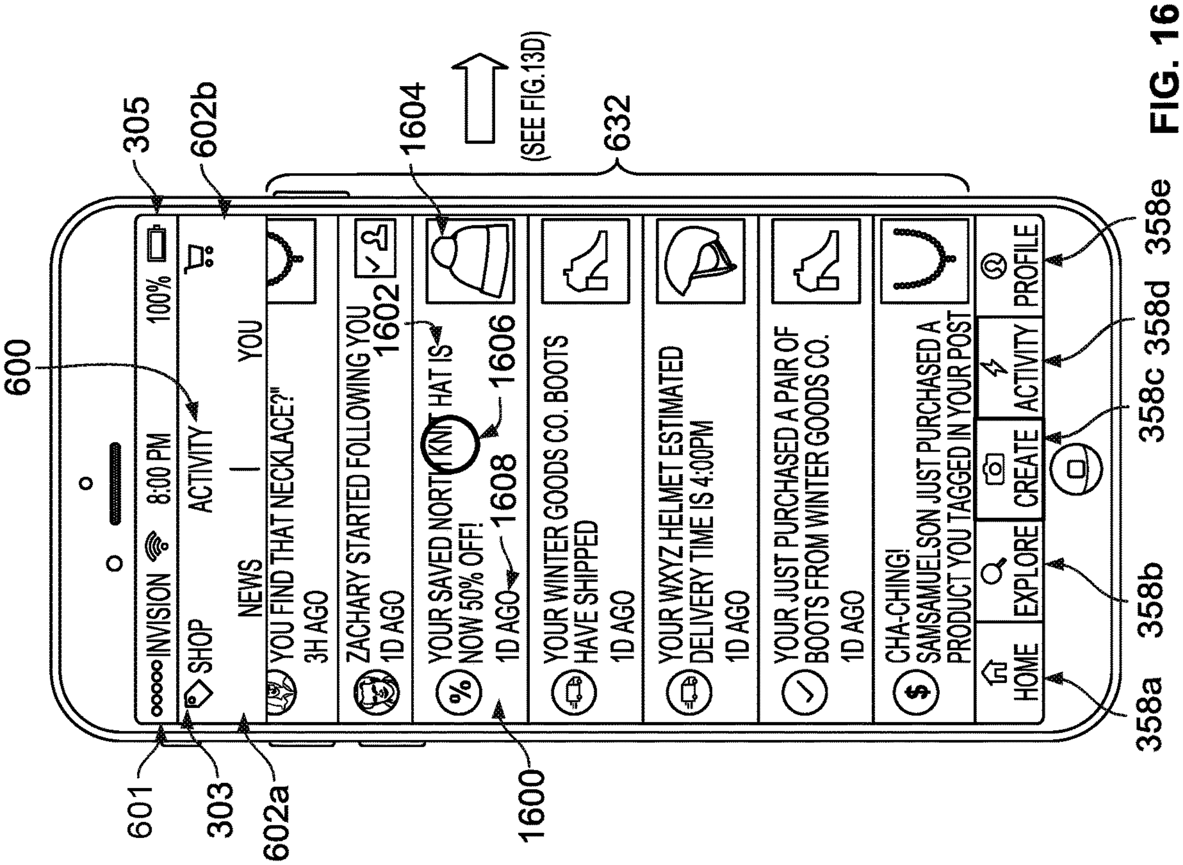
FIG. 16 depicts a screenshot and user interactions with an activity feed on an example platform.

Referring to FIG. 16, a screenshot depicting user interaction with the activity feed interface 601 on an example social-retail platform provided by the computer system 240 is depicted. In particular, FIG. 16 depicts the tab 602*b* in the activity feed described above with regard to FIGS. 6A-B having been selected. However, in FIG. 16 an entry 1600 for the example product that is the subject of FIGS. 13A-J and 14A-B is included in the interface. In particular, the entry 1600 includes information 1602 identifying the product and why it is appearing in the feed, a thumbnail image 1604 for the product, and a time 1608 at which the entry 1600 was created.

A user can access the product interface 1348 for the product 1602 by selecting the entry 1600, as indicated by the selecting input 1606. In response to receiving the selecting input 1606, the product interface 1348 depicted in FIG. 13D can overlay the GUI 601 for the activity feed. After being launched, the user can interact with the product interface 1348 in the same manner as described above with regard to FIGS. 13D-I, but the swipe/flick input 1396 provided in this instance would return to the GUI 601 as opposed to the GUI 304 (depicted across FIGS. 13I-J). Similar to the description above with regard to FIG. 13J, though, upon returning to the GUI 601 after adding a product to the virtual shopping cart through the product interface 1348, the shopping cart icon 305 in the GUI 601 can be updated (e.g., display the count icon 1395*b* in the GUI 601).

Figures 17A, 17B:
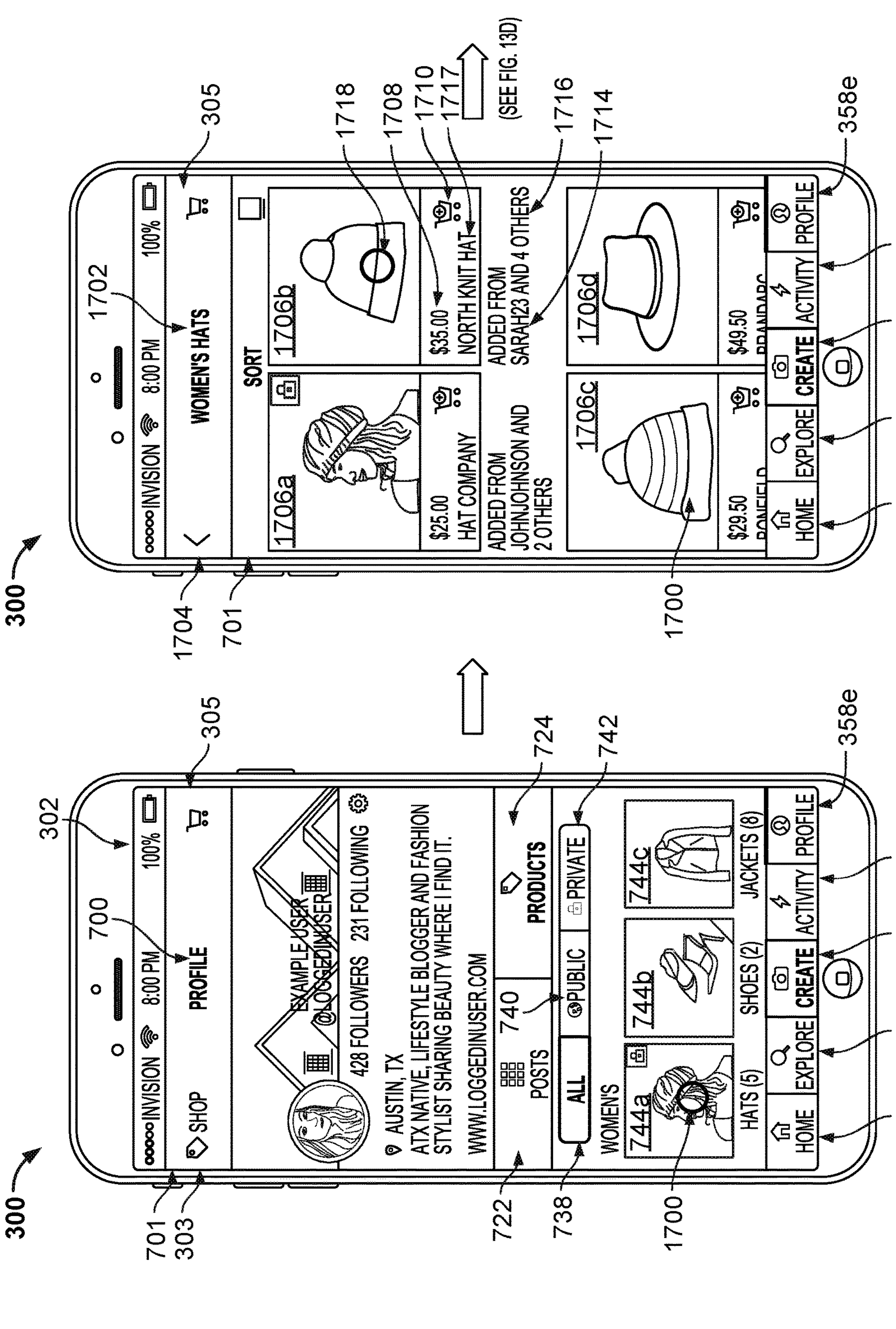
FIGS. 17A-B depict a sequence of screenshots and user interactions with a profile interface on an example platform.

Referring to FIGS. 17A-B, a sequence of screenshots depicting user interaction with the profile interface 701 on an example social-retail platform provided by the computer system 240 is depicted. Referring to FIG. 17A, user input 1700 is depicted as selecting the product category element 744*a*, which represents a collection of saved products ("hats"). Referring to FIG. 17B, in response to receiving the user input 1700, the GUI 701 presents product elements 1706*a-d* that have been saved by the logged-in user and that fall under selected product category element 744*a*. The GUI 701 includes the title 1702 of the selected category and a back button 1704 to navigate back to FIG. 17A. Each of the product elements 1706*a-d* includes features related to a corresponding product, such as price information 1708, information identifying users 1714 who created social posts that tagged the product (including surfacing the name 1712 of a user within who is within the logged-in user's social network), and a shopping cart icon 1710 to directly add the product element 1706*b* to the shopping cart 305.

A user can access the product interface 1348 by selecting the product element 1706, as indicated by the selecting input 1718. In response to receiving the selecting input 1718, the product interface 1348 depicted in FIG. 13D can overlay the GUI 701 for the profile interface. After being launched, the user can interact with the product interface 1348 in the same manner as described above with regard to FIGS. 13D-I, but the swipe/flick input 1396 provided in this instance would return to the GUI 701 as opposed to the GUI 304 (depicted across FIGS. 13I-J). Similar to the description above with regard to FIG. 13J, though, upon returning to the GUI 701 after adding a product to the virtual shopping cart through the product interface 1348, the shopping cart icon 305 in the GUI 701 can be updated (e.g., display the count icon 1395*b* in the GUI 701).

Figure 18:
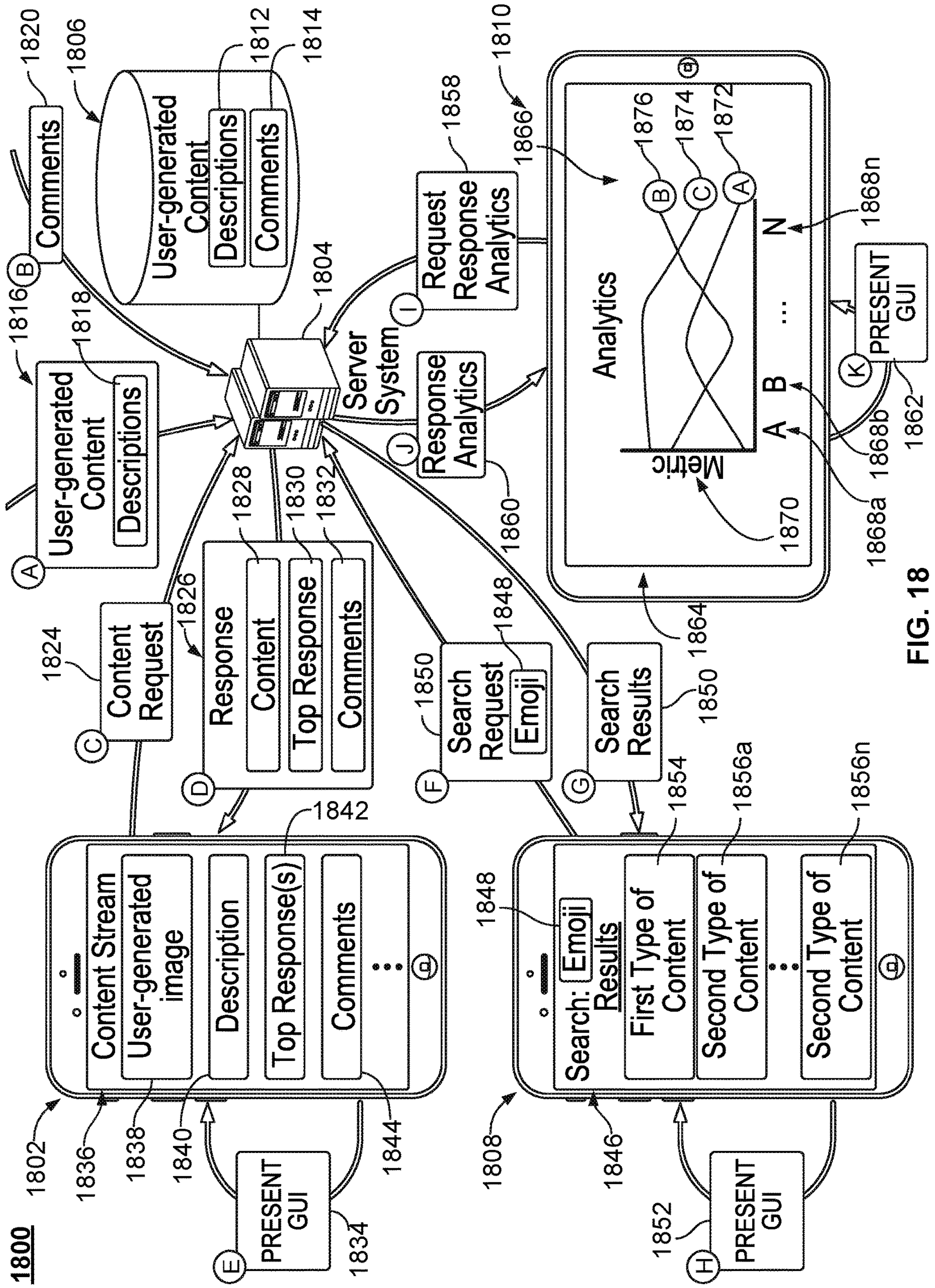
FIG. 18 is a conceptual diagram of an example system to provide an example GUI on an example client computing device.

Referring to FIG. 18, some embodiments of a system 1800 can be configured to provide example GUIs 1836, 1846, and 1864 for presenting content summary features on an example client computing devices 1802, 1808, and 1810. For example, the GUI 1836 presents a content element with a corresponding content summary in a content stream, such as a social feed for a social network. In another example, the GUI 1846 presents a search interface for searching content based on corresponding content summaries. In a further example, the GUI 1864 presents content summary analytics for content elements with regard to one or more metrics. Other content summary related features, including combinations of these and other features, are also possible with the system 1800.

The computing devices 1802, 1808, and 1810 can be any of a variety of client computing devices, such as a mobile computing device (e.g., smartphone, tablet, wearable device, smartwatch), laptop computer, desktop computer, and/or other types of user computing devices. The computing devices 1802, 1808, and 1810 can communicate with a server system 1804 over one or more networks (e.g., internet, local area network (LAN), wide area network (WAN), virtual private network (VPN), wireless network, mobile data network, or any combination thereof) to obtain content, content summaries, and/or other information to present in the GUIs 1836, 1846, and 1864. The server system 1804 can be a computer system (e.g., cloud computer system) that either by itself or through affiliate networks is able to serve and provide features related to content summaries, such as content summaries across multiple different types of content, like social media content, messaging content, product content, e-commerce content, and/or other types of content. For example, the server system 1804 may directly provide social networking features and can communicate with other affiliate computer systems to provide product-related features (e.g., reviews, purchasing, order tracking). In other examples, the server system 1804 may directly provide both social networking features and product-related features. Other configurations of the server system 1804 among one or more other computer systems are also possible.

As indicated by step A, the server system 1804 can receive user-generated content 1816, which can include, for instance, user-generated images and corresponding descriptions 1818. For example, the server system 1804 can receive social media content (e.g., social media posts) from other client computing devices. Such social media content can include, for example, media elements (e.g., photos, videos, links to external content) and descriptions 1818 (e.g., text, hashtags, user tags, product tags, location tags, emojis) that describe or otherwise annotate the media elements. For example, a social media post (example user-generated content 1816) can include a photo of a user wearing a new outfit (example user-generated image) and a textual description of the new outfit, including product tags that identifies the individual clothing items in the outfit.

The server system 1804 can also receive other user-generated content that is related to the user-generated content 1816, such as comments 1820 that include user reactions and/or responses to the user-generated content 1816. For example, in instances where the user-generated content 1816 is a social media post that is provided to the server system 1804 by a first user, the server system 1804 can receive the comments 1820 from other users (and in some instances, the first user as well) that comment on, react, and/or otherwise respond to the social media post and/or comments to the social media post. The comments 1820 can be similar to the user-generated content 1816 in that they can include media elements (e.g., photos, videos, links to external content) and/or descriptions (e.g., text, hashtags, user tags, product tags, location tags, emojis). However, the comments 1820 can be associated with and/or can depend, directly or indirectly, from a user-generated content element, such as the user-generated content 1816.

The server system 1804 can receive the user-generated content 1816-1820 and can store it in a data repository 1806 (e.g., cloud storage system), from which it can be served by the server system 1804 to the client computing devices 1802, 1808, and 1810.

The server system 1804 can, additionally, determine and store content summaries in the data repository 1806. The content summaries can be determined based on the user-generated content 1816-1820. For example, a content summary can be determined from the comments 1820 that correspond to a particular content element, such as a social media post (example user-generated content 1816-1818). For instance, a content summary can be one or more emojis (icons or other graphical symbols that are encoded by one or more characters), keywords, hashtags, other tags (e.g., user tags, product tags, location tags), images, links, and/or other content elements that occur across the comments 1820 associated with a social media post. Such content elements can be identified as content summaries by the server system 1804 in any of a variety of ways. For example, one or more emojis can be identified as content summaries for a social media post based on the one or more emojis occurring across the comments 1820 for the social media post with a greatest frequency (e.g., most commonly occurring emoji(s)), at least a threshold frequency (e.g., emoji(s) occurring at least a minimum number of times), a greatest comment frequency (e.g., emoji(s) occurring in the greatest number of comments), at least a threshold comment frequency (e.g., emoji(s) occurring in at least a minimum number of comments), with a greatest weighted frequency (e.g., weighting emoji occurrences in newer comments more heavily, weighting emoji occurrences in older comments more heavily), and/or other factors (e.g., weighting emoji occurrences based on direct and/or indirect user responses to comments within which the emojis occur). Content summaries for other types of content elements, such as keywords, images, links, hashtags, and/or other elements, can be determined in a similar manner.

Content summaries can be stored in the repository 1806 and continually updated by the server system 1804 in response to user-generated content 1816 and/or comments 1820 being received. For example, every time a new comment associated with a social media post is received, the server system 1804 can determine whether the comment changes the content summary for the social media post and, if so, can update the content summary for the post in the data repository 1806. Such continual updating can allow for the content summaries to be quickly and efficiently served, searched, and/or processed in association with requests from client devices, such as requests for content, search requests, and requests for analytics information. For instance, instead of analyzing all of the comments to determine a content summary in response to a request for a content element, the server system 1804 can have the content summary predetermined and stored in the repository 1806, and can simply serve the stored content summary to the requesting client device. This can allow for the content summary to be served more quickly and efficiently by the server system 1804, thus reducing the amount of computational resources on the server system 1804 that are used to process requests and also reducing response latency.

The server system 1804 can receive, store, and serve other types of content as well. For example, the server system 1804 can additionally obtain the secondary content (e.g., merchant-provided product content, news content, messaging content) that is identified, for example, by the user-generated content 1816-1820. For example, if a product is tagged in the user-generated content 1816, the server system 1804 can obtain product information for the tagged product, such as an image for the product, a description of the product, a merchant selling the product, and other product details. In another example, if a news item is tagged in the user-generated content 1816, the server system 1804 can obtain information about the tagged news item, such as the title/headline, a brief summary of the news item, an author, a time/date for the news item, and other news details.

Still referring to FIG. 18, as indicated by step C (1824), the client computing device 1802 can transmit a request for content to include in the content stream in the GUI 1836. For example, the client computing device 1802 can poll the server system 1804 for new content to present in the content stream on a periodic basis (e.g., every second, every 180 seconds, every minute) and/or in response to various events occurring on the client computing device 1802 (e.g., the application presenting the GUI 1836 loading, the GUI 1836 receiving focus on the display of the device 1802). The server system 1804 can retrieve, from the content repository 1806, and transmit content for the client computing device 1802, as indicated by step D (1826). In this example, the response includes content 1828 (e.g., user-generated content, such as a social media post), a top response 1830 (example content summary), and comments 1832 that are responsive to the content 1828. Responses from the server system 1804 can additionally and/or alternatively include different information and/or content.

The client computing device 1802 can receive the response and can present it in the GUI 1836, as indicated by step E (1834). For example, the GUI 1836 in this example presents graphical elements for a user-generated image 1836 (e.g., photo, video), a description 1840 (e.g., text, hashtags, emojis) that corresponds to the image 1836, one or more top responses 1842 (e.g., keywords, hashtags, emojis, phrases, links, images) to the user-generated content 1838-1840, and one or more comments 1844 that are associated with the user-generated content 1838-1840. The one or more top responses 1842 can be, for example, summaries of the comments 1844 that are determined the server system 1804 by on any of a variety of factors, as described above. The graphical element in the GUI 1836 for the comments 1844 may include only a portion of the total number of comments for the user-generated content 1838-1840, and the GUI 1836 may present the graphical element for the top responses 1842 instead of the complete set of comments 1844. In aggregate, the graphical element for the top responses 1842 and the presented portion of the comments 1844 can occupy less area in the GUI 1836 than an area that would otherwise be occupied by the complete set of comments 1844. This can allow area in the GUI 1836 to be conserved while still presenting a user of the computing device 1802 with substantially the same amount of information as if the user had viewed the complete set of comments 1844. Additionally, network traffic can be reduced by transmitting only a portion of the comments 1844 to the client computing device 1802 with the top response 1842, instead of transmitting the complete set of comments 1844. The complete set of comments 1844 may be requested by the user of the client computing device 1802 (e.g., the user may select a link to view all comments). In some implementations, the top response 1842 may be transmitted alone and without the comments 1844, which may be requested by a user of the client computing device 1802.

In some implementations, the client computing device 1802 can receive the complete set of comments 1844 for the user-generated content 1838-1840 and can determine the top response 1842 locally on the computing device 1802 (instead of by the server system 1804). In such implementations, the server system 1804 may offload the content summary determination to client computing devices, which may optionally (e.g., based on user configuration settings) be determined by the client computing device 1802 and in particular-designated ways (e.g., user may designate particular type/way that the content summary should be determined/presented on the device 1802). Such implementations can alternatively provide advantages to the server-side determinations described above, such as providing for variation in content summaries across various client devices, which may include no content summary determination, and/or conserving server system 1804 processing cycles by offloading the determinations to the client-side. Even with the client-side determined content summaries (e.g., the top responses 1842), the client computing device 1802 can, by default, present only a portion of the comments 1844 (even though the complete set of comments 1844 may have been received) in combination with the top responses 1842 in order to conserve display area in the GUI 1836 (e.g., conserve for the presentation of additional user-generated content elements, such as social media posts, in the content stream).

Additionally and/or alternatively to determining and providing content summaries for user-generated content, the server system 1804 can determine content summaries for other content to which users may also react, such as the secondary content (e.g., merchant-provided product content, news content, messaging content) described above. For example, product pages can include comment and review sections in which users can provide comments/reviews for particular products, and view comments/reviews provided for products by other users. The server system 1804 can determine and store content summaries for user-generated content portions (e.g., comments, review, ratings) that are associated with other types of content (e.g., secondary content), and can serve those to the client device 1802, similar to the discussion regarding GUI 1836.

Referring now to the GUI 1846 (FIG. 18), content summaries can be used by the server system 1804 to allow for additional and/or alternative searching features on the server system 1804. For example, the client computing device 1808 (which can be the same as or different from the client computing device 1802) can enter a search query, which in this example is an emoji 1848. Other types of search queries are also possible, such as keywords, phrases, images, hashtags, other types of tags (e.g., product tags, user tags, location tags), and/or other search query parameters. The client computing device 1808 transmits the search query (emoji 1848) to the server system 1804, as indicated by step F (1850). The server system 1804 can process the search query (emoji 1848) across the content summaries that have been predetermined and stored in the data repository 1806, and can provide search results back to the client computing device 1808, as indicated by step G (1850). The search that is performed by the server system 1804 can be made more efficient by searching across content summaries instead of across a larger data set of content that is summarized, for example, by using fewer computational resources (e.g., fewer disc access operations, less memory) to perform the operations. Additionally, by having non-conventional search parameters, such as emojis, additional search features are provided by the server system 1804.

The client computing device 1808 can receive the search results and present them in the GUI 1846, as indicated by step H (1852). In this example, the search results include a first type of content 1854 and a second type of content 1856*a-n*. For example, the first type of content 1854 can be user-generated content, such as social media posts, and the second type of content 1856*a-n* can be secondary content, such as product content, productivity content, messaging content, and/or other types of content. Both the first and second types of content 1854 and 1856*a-n* can be determined by the server system 1804 based on content summaries determined by the server system 1804 for the content elements, such as based on user comments associated with the content elements.

For example, the GUI 1846 (as well as the GUI 1836) can allow for different types to be presented within a common interface, such search results that include social media content (e.g., user posts, comments, shared content) with other types of content (e.g., product content, messaging content, productivity application content, news content). These content types can be related to each other (e.g., through tags in user-generated content to other types of content elements) and presented in a common interface, such as the GUIs 1836 and 1846. For example, the GUIs 1836 and 1846 can allow users to interact with the related content in a variety of ways, such as through social interactions (e.g., share, save, comment) and other interactions (e.g., purchasing, messaging, productivity, news distribution) without exiting the GUIs 1836 and 1846. For example, instead of providing a GUI that presents a single type content (e.g., social media content, product content) and that links to other applications/GUIs that are launched to present other types of content, the GUIs 1836 and 1846 are programmed present related content of multiple different types without launching or otherwise relying on another application/GUI, such as in the search results depicted in the GUI 1846.

Referring now to the GUI 1864, the server system 1804 can also use the content summaries to provide analytics related to content elements on the client computing device 1800 (which can be the same as or different from the computing devices 1802 and/or 1808). For example, a user may be interested in tracking responses to content that the user has posted on one or more social media sites, such as whether users appear to have enthusiastic, excited, happy, or other reactions to each post. The server system 1804 can leverage the content summaries as a way to quickly and efficiently gauge broader user reactions to the social media posts. Similarly, other content providers, such as merchants and/or manufacturers, can use reaction analytics from content summaries through the server system 1804 as a way to gauge user engagement and/or interest in particular products. Other extensions of content summary-based analytics are also possible.

The client computing device 1810 can transmit a request for user response analytics to the server system 1804, as indicated by step I (1858). The request can include a unique identifier for an account (e.g., user account) associated with content distributed by the server system 1804 (e.g., user-generated content, secondary content). The server system 1804 can use the account identifier to identify content that is associated with the account (e.g., content that was created or otherwise distributed through the account) and summaries of user reactions to that content. The server system 1804 can generate analytics along one or more metrics, such as frequency, percentage, count, and/or other metrics. The response analytics can be provided to the client computing device 1810, as indicated by step J (1860), and presented in the GUI 1864, as indicated by step K (1862).

In the depicted example, the GUI 1864 includes an example graph 1866 that depicts user responses A-N (1868*a-n*) across a metric 1870 for content elements A-C (1872-1876). The content elements A-C (1872-1876) in this example are content elements associated with the account logged-in on the client computing device 1810, such as social media posts that the logged-in user has generated. The responses A-N (1868*a-n*) can include, for example, various types of elements that would be present in content summaries generated by the server system 1804, such as keywords, hashtags, other tags, emojis, images, links, and/or other content elements. The metric 1870 can be, for example, a frequency with which each of the responses A-N (1868*a-n*) occur for each of the content elements A-C (1872-1876). Other metrics are also possible, such as weighted frequencies, number of comments with an occurrence of each response, and/or other metrics. The responses A-N (1868*a-n*) may be ordered along the x-axis of the graph 1866, for example, from positive to negative so as to provide a visible spectrum of responses in the graph 1866.

FIGS. 19A-B, 20A-F, and 21A-B are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the GUIs 1836 and 1846 described above with regard to FIG. 18 and the system 210 on a social-retail platform. For example, the user-generated content 1838-1840 and first type of content 1854 can be social posts/content elements, and the second types of content 1856*a-n* can be product elements can be product content elements as described with regard to FIGS. 3A-B, 4A-B, 5A-B, 6A-B, 7A-B, 20A-F, and 21A-B.

Figures 19A, 19B:
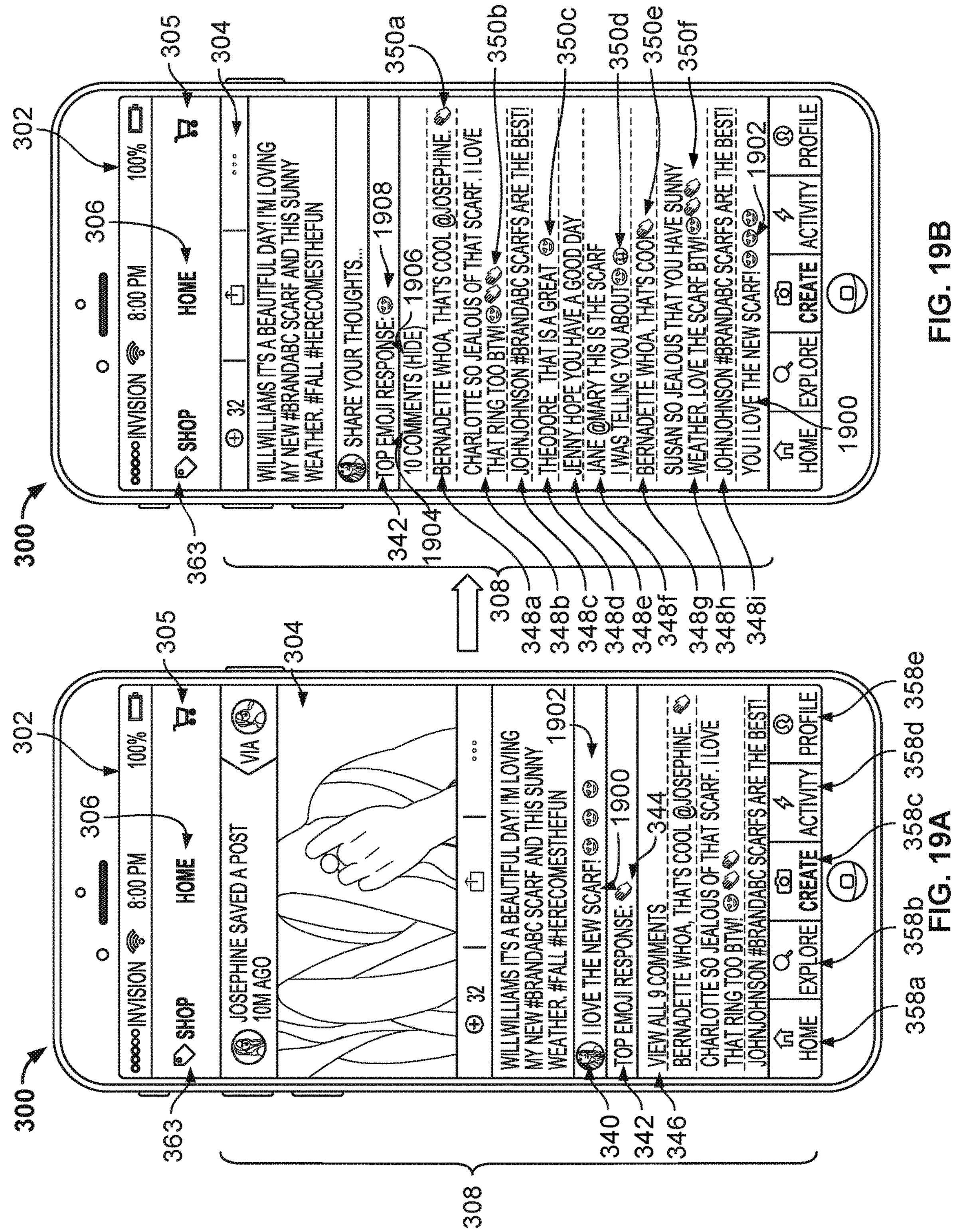
FIGS. 19A-B depict a sequence of screenshots and user interactions with a GUI for a home feed on an example platform.

Referring to FIGS. 19A-B, a sequence of a sequence of screenshots depicting user interactions with the GUI 304 for the home feed on an example social-retail platform provided by the computer system 240 is depicted. In the example sequence, the GUI 304 permits a user to interact with and comment on social post within a social content stream, and allows the content summary for the post, which in this example is a top emoji response, to dynamically change based on the user's comment.

Referring to FIG. 19A, the GUI 304 depicts the social post 308 with the content summary 342 section indicating that the top emoji response (example content summary) for the comments 346 to the post 308 is a hands-clapping emoji 344. As described above with regard to FIG. 1, the computer system 240 can determine the content summary in this example—the top emoji response 344—based on any of a variety of techniques, such as frequency, weighted frequency, and/or other factors. Additionally and/or alternatively, the computing device 300 may determine the top emoji response 344 locally based, for example, on the received comments 346. The GUI 304 also includes the comment field 340 through which a user of the computing device 300 can provide a comment for the post 308. In the depicted example, the user has provided the comment 1900 ("I love the new scarf!"), which includes three smiling emojis 1902.

The user can submit the comment 1900 through the GUI 304, which can cause the computing device 300 to transmit the comment 1900 to the computer system 240. The computer system 240 can receive, save, and process the comment 1900, which can include updating the top emoji response for the post 308. Referring to FIG. 19B, in the depicted example, the new comment 1900 causes the content summary 342 to change from the clapping-hands emoji 344 to the smiling face emoji 1908. For example, if the computer system 240 (or the computing device 300 when the determination is performed locally) is determining the top emoji response based on the frequency with which emojis occur across the comments 348*a-i* and 1900, then in this example the smiling face emoji is determined to be the new top emoji response 1908. For instance, the clapping-hands emoji occurs in comment 348*a* once (350*a*), in comment 348*b* twice (350*b*), in comment 348*g* once (350*e*), and in comment 348*h* twice (350*f*) for a total of six occurrences. In contrast, the smiling face emoji occurs in comment 348*b* once (350*b*), in comment 348*d* once (350*c*), in comment 348*f* once (350*c*), in comment 348*h* once (350*f*), and in comment 1900 three times (1902) for a total of seven occurrences. In response to determining that the new top emoji response 1908 for the post 308, the computer system 240 transmit an update to the computing device 300, which can present the new top emoji response 1908 in place of the previous response 1902. Similar updates can be provided to other user devices that are currently or at a future time will be displaying the post 308.

In the depicted example, the comments 348*a-i* and 1900 are all presented, as indicated by the comment count 1904 and the selectable option 1906 to hide the comments. Such an expansion of all of the comments 348*a-i* and 1900 may be performed, for example, in response to the user selecting an option in the GUI 304 to view all comments and/or in response to the user adding a new comment (or otherwise interacting with the comments and/or the post 308). The comments 348*a-i* and 1900 may otherwise be collapsed initially in the presentation of the post 308, and instead the GUI 304 may present the summary section 342 and the current top emoji response 1902/808, which can reduce display space on the display 302 and in the GUI 304.

Although the summary section 342 in this example is described as being for emojis, other and additional types of content summaries can be surfaced in the summary section 342. For example, other content from user comments can be identified and provided in the summary section 342, such as keywords, hashtags, other tags (e.g., product tags, user tags, location tags), images, links, and/or other content derived from the user comments.

Figure 20B:
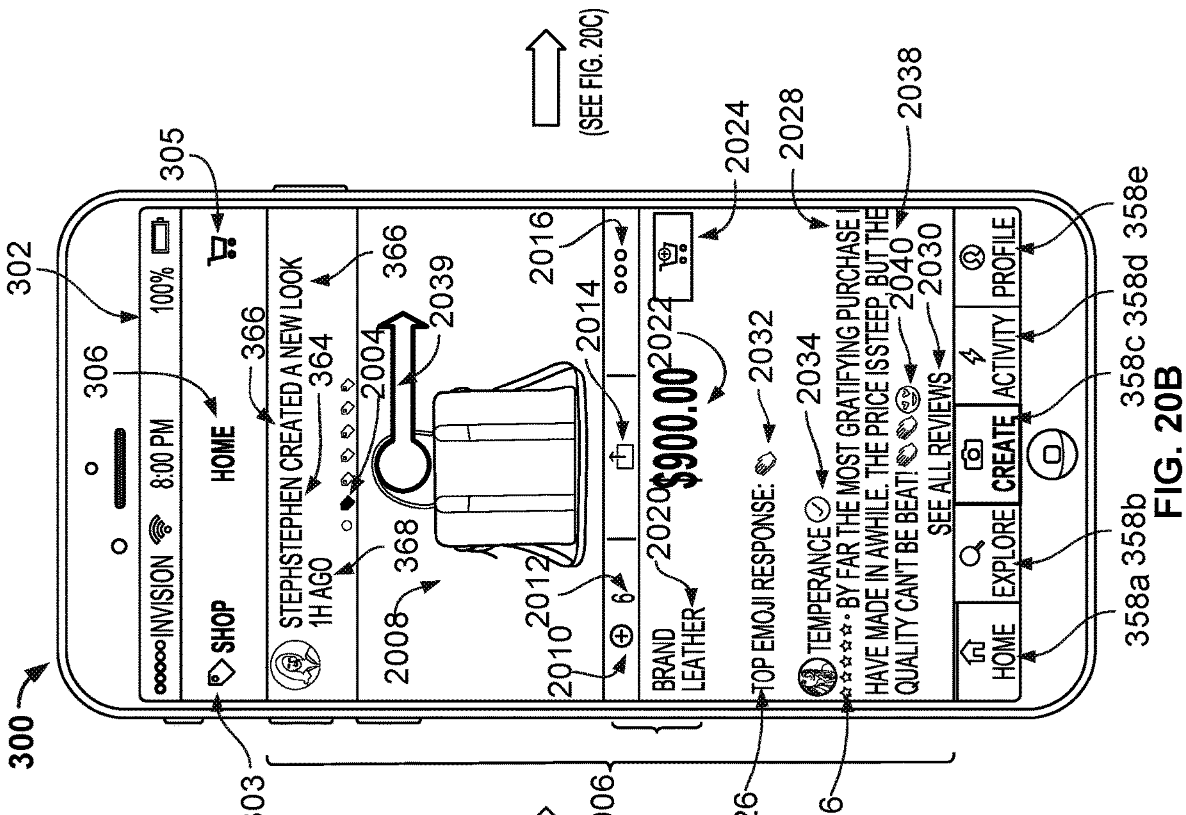
FIGS. 20A-F depict a sequence of screenshots and user interactions with a product interface on an example platform.
Figure 20A:
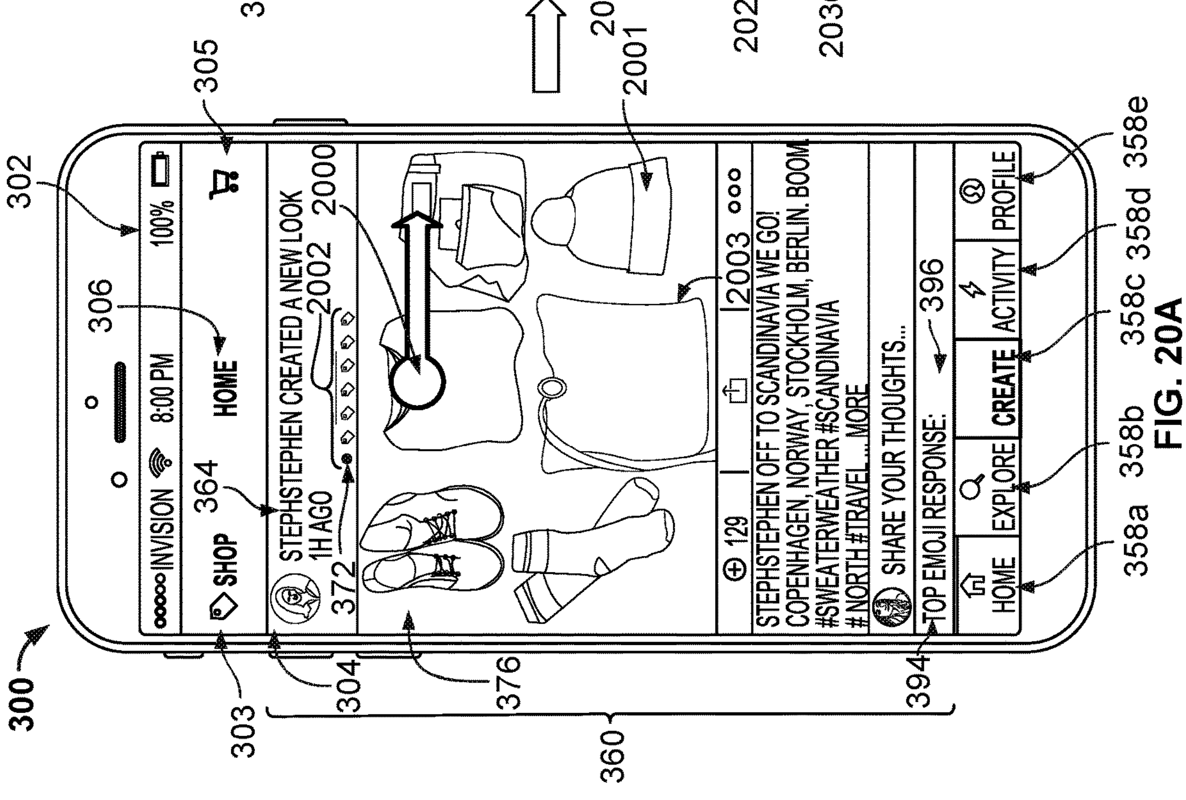

Referring to FIGS. 20A-F, a sequence of screenshots depicting user interactions with the GUI 304 for the home feed on an example social-retail platform provided by the computer system 240 is depicted. Referring to FIG. 20A, the GUI 304 depicts the social post 360 with the user-generated image 376 showing a collection of products, including a knit hat 2001 and a bag 2003, and an visual indication 2002 of six associated product elements. The GUI 304 further depicts the content summary section 394 that provides a top emoji response 396 for the social post 360, which can be determined by the computer system 240 from user comments for the social post 360.

FIG. 20A is similar to FIG. 3B, and as described above, the six associated product elements can be accessible within the GUI 304 and its content stream (example of the content stream 120) by horizontally scrolling in the GUI 304 along a perpendicular content stream (example of the perpendicular content stream 122). As depicted in this example, user input 2000 is provided to the GUI 304 in the form input to scroll to the right (e.g., swipe left in the GUI 304 to cause the content to scroll to the right) along the perpendicular content stream. For instance, as indicated by the icon 372 (which corresponds to the social post 308 in the perpendicular content stream) being highlighted/bold, the GUI 304 is currently showing the graphical element at the leftmost end of the perpendicular content stream. A user can provide right scrolling input until the graphical element at the rightmost end (corresponding to the rightmost product icons 2002) of the perpendicular content stream is reached (or in implementations where the perpendicular content stream is "infinite," can continue to provide right scrolling input to cause the device 300 to retrieve additional content).

Referring to FIG. 20B, in response to receiving the user input 2000, the GUI 304 can cause the perpendicular content stream to scroll to the right and to display the product content element 2006, which corresponds to the product icon 2004 (now highlighted/bold to indicate a current position along the perpendicular content stream). The example product content element 2006 includes an image 2008 for the product 2003 depicted and tagged in the social post 360. The image 2008 can be a merchant or manufacturer-provided image (as opposed to a user-generated, such as a photograph taken by a user). The image 2008 can be, for example, an image that is presented for the product 2003 on online stores/retailers and in online advertisements.

Like the social post 360, the product element 2006 includes controls 2010-2016 through which users can interact with the product 2003. For example, the controls include a selectable element 2010 ("+" button) through which a user can "save" the product element 2006 to her profile (see FIG. 7B). The selectable button 2010 is paired with a counter 2012 that identifies a number of other users who have already saved the product element 2006. The controls further include another selectable element 2014 (share icon) that can be selected to share the product element 2006 either inside or outside of the social-retail platform provided by the computer system 240. For example, the user can select the element 2014 to share the product element 2006 with other users within the social-retail platform provided by the computer system 240, and/or to share the product element 2006 on other social media platforms (e.g., FACEBOOK, TWITTER, PINTEREST). The controls also include another selectable element 2016 (ellipses icon) that includes additional features that can be performed with regard to the product element 2006 (e.g., transmit message with product information, flag as inappropriate).

The product element 2006 further includes product information, such as a merchant 2020 providing the product and a current price 2022 for the product. The merchant information 2020 can be selectable and can cause information about the merchant, such as user ratings for the merchant and other products offered by the merchant, to be presented (e.g., presented in an online store for the merchant either inside or outside of the social-retailer platform). The product element 2006 additionally includes a selectable shopping cart icon 2024 that a user can select to add the product 2003 that is depicted in the social post 360 to the virtual shopping cart indicated by the icon 305. For example, by selecting the product element 2006, the product 2003 can be added to the shopping cart from within the social feed presented in the GUI 304 (without using another application or otherwise exiting the GUI 304). A user can add the product element 2006 to the shopping cart and then continue scrolling vertically along the social feed or horizontally along the product feed (without having to reopen or refocus the computing device 300 on the GUI 304).

The product element 2006 further includes a review section with user reviews for the product 2003. The review section includes content summary section 2026 (similar to the content summary section 342), a first or top review 2028, and a selectable link to view all or more of the reviews 2030. Similar to the example described above in FIGS. 19A-B, the content summary section 2026 in this example is a top emoji response 2032, which can be determined by the computer system 240 (and/or by other, affiliated computer systems) based on emojis that are used in the review 2028 and the other reviews 2030 for the product 2003. Similar techniques can be used to determine the top emoji response as described above with regard to FIGS. 1 and 19A-B, but the set of content that is analyzed to determine the response are the user-generated product reviews instead of the comments to social media posts. Additionally and/or alternatively, the content summary section 2026 can include other types of content summaries (other than emojis), such as keywords, hashtags, other tags (e.g., user tags, location tags, product tags), links, and/or other content included in product reviews.

The depicted example product review 2028 includes a user identifier 2034 (e.g., user name, image), a rating 2036 provided for the product 2003 by the user, and text 2036 for the review, which in this example includes emojis 2040. The product reviews can be from one or more user groups, such as users who are part of the social-retail platform and/or users of one or more online retail stores where the product 2003 is offered. However, the content summary section 2026 can allow for continuity across the different types of content—social media content and product content—which can help improve the GUI 304.

Figures 20C, 20D:
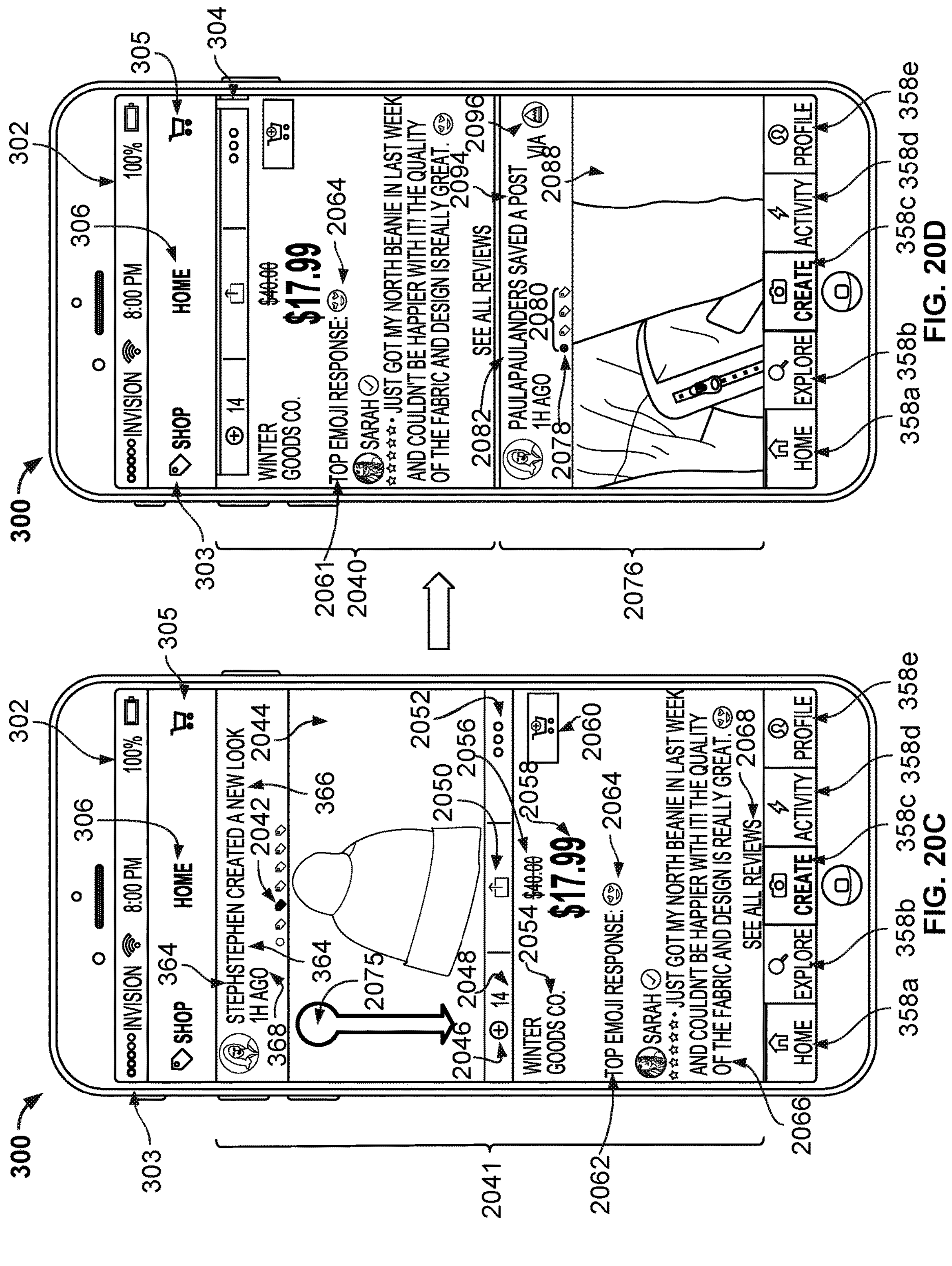

In the depicted example, further scrolling input 2039 to move the product stream further to the right is provided through the GUI 304. Referring to FIG. 20C, this horizontal scrolling input 2039 causes a next product element 2041 (which corresponds to the product icon 2042) to be presented in the GUI 304. The product element 2041 includes an image 2044 (e.g., merchant-provided image) that corresponds to the product 2001 that is depicted and tagged in the social post 360. The product element 2041 is includes similar graphical elements and features as those presented with the product element 2006 for the product 2003. For example, the product element 2041 includes user controls 2046-2052 (similar to the controls 2010-2016), merchant information 2054 (similar to merchant information 2020), a current price 2058 of the product (similar to the price 2022), a selectable icon 2060 to add the product 2003 to the virtual cart 305 (similar to the selectable icon 2024), and a review section with a content summary section 2062 detailing a top emoji response 2062, a first or top review 2064, and a selectable link to view more or all reviews 2068 (similar to the review elements 2026-2040). The product element 2041 further includes previous/original pricing information 2056 for the product 2003.

In the depicted example, vertical scrolling input 2075 is received through the GUI 304 while the product element 2041 is being displayed and while the GUI 304 has progressed partway down the horizontal product stream (as indicated by icon 2042 corresponding to the product element 2041 being bold/highlighted). Referring to FIG. 19D, in response to receiving the input 2075 (to scroll down the social feed), a next social post 2076 in the feed can be presented. In this example, the scrolling input 2075 is depicted as having caused the product content element 2041 to scroll partially up so as to still be visible, resulting in a bottom portion of the product element 2041 (including the content summary section 2062 and the top emoji response 2064) being displayed simultaneously in the social feed as the social post 2076 (which is also only partially presented in the GUI 304). Like the social post 360, which includes product tags (as indicated by the icons 2002), the social post 2076 also includes product tags, as indicated by the product icons 2080—meaning that the social post 2076 also includes a horizontal product stream that can be accessed through horizontal scrolling input provided with regard to the social post 2076. Like the social post 360, the social post 1976 includes the user-generated content element as the primary element in the product stream that is presented by default (as indicated by the bold/highlighted icon 2078 corresponding to the social post 2076). Although not depicted, the social post 1976 and each of the product elements accessible via horizontal scrolling input for the post 1976 can each include content summaries similar to the content summaries 394, 396, 2026, 2032, 2062, and 2064.

Also like the social post 360, the social post 2076 identifies a user 2082 who performed an action 2084 that caused the post 2076 to be presented in the social feed. In this example, the action 2084 is the user 2082 saving to her profile the post 2076, which was originally created by the user 2086 indicated in the "via" element. The post 2076 also includes a user-generated image 2088 for the post 2076, which is different from the merchant-provided images in the product elements, such as the merchant-provided image 2044.

In contrast to the social post 360, which appears in the social feed based on the user 364 (to whom the logged-in user has a social connection) having created the post 360 (see FIGS. 3B, 20A), the social post 2076 is appearing in the social feed based on the user 2082 saving another user's post (user 2086). In some implementations, the computer system 240 is programmed to treat each social post as a singular data element in the user generated content repository 248—meaning that saving, sharing, commenting, or performing other actions with regard to the post does not create a separate instance of the data element for the post that is now associated with the user performing the sharing/saving/commenting/other action. Instead, the computer system 240 can, for example, store information identifying (a) the sharing/saving/commenting/other action that has been performed (e.g., using action encodings), (b) the user (2082) who performed the action, and (c) the social post (2072) to which the action was performed. This configuration on the computer system 240 can allow each social post to always be attributed to the original creator of the post, as opposed to being attributed to a user who performs an action with regard to the post after it has been created, such as leaving comments that can be used to generate a content summary. It can also allow for the original creator of a social post to maintain control over the content of the post, which can include editing the social post, managing comments associated with the post, product tags included in the post, and, if so desired by the creator, deleting the post. Additionally, such a configuration can reduce the amount of data that is stored in the repository 248 for shared/saved posts, which can improve the performance of the computer system 240 by reducing the storage requirements on the repository 248.

Figure 20F:
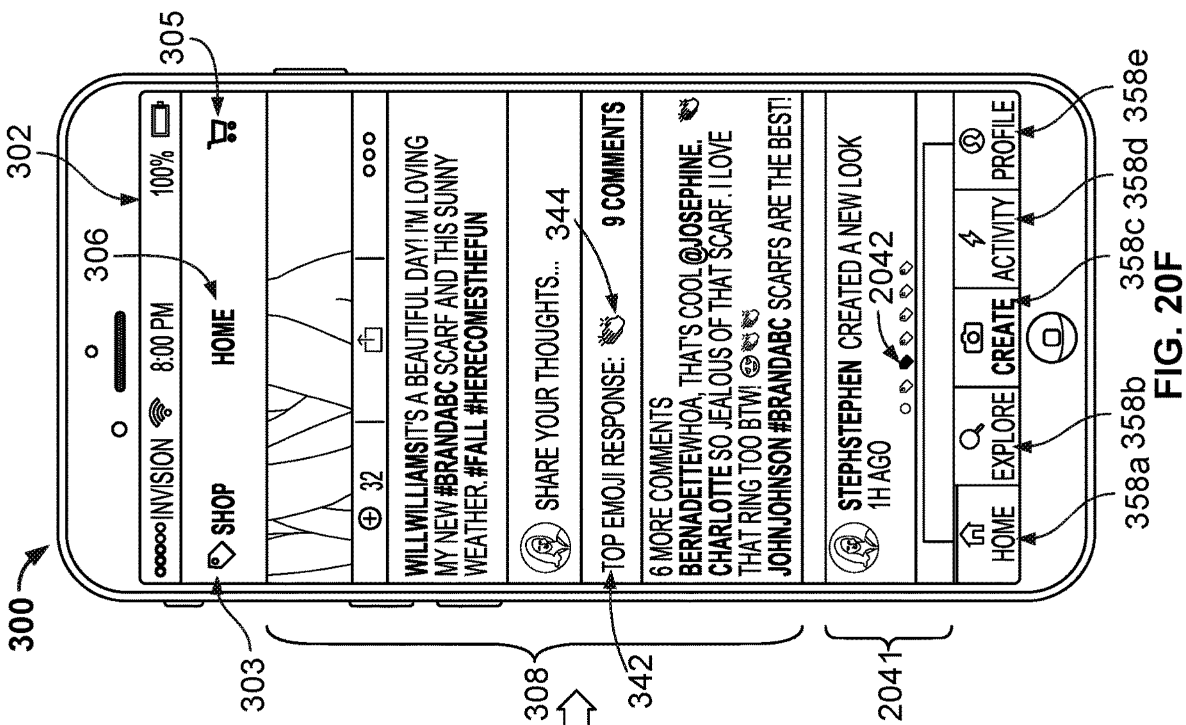
Figure 20E:
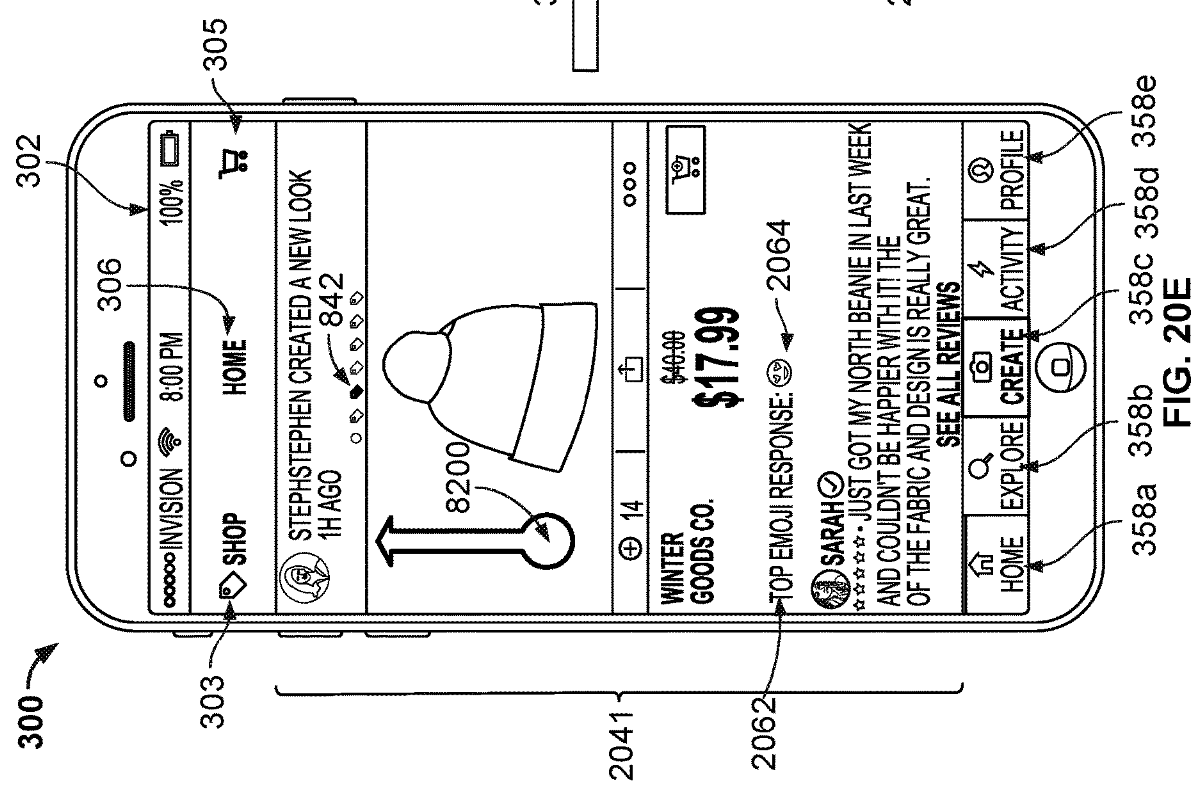

The current positions along both the social feed (vertical in this example) and the product feeds (horizontal in this example) can be maintained as scrolling along the other occurs. For example, as the user scrolls down the social feed, as depicted in FIG. 20D, the position in the product feed above, which is currently depicting the product element 2041, can be maintained. For instance, if the user were to continue to scroll down the social feed (so that the product element 2041 is no longer being presented) and then back up, the product element 2041 would still be presented instead of the social post 360 tagging the product element 360. Similarly, if the user were to scroll horizontally along the product stream for the social post 2076 until the right-most product element is reached and then scroll up, the next element above the social post 2076 (and its associated product elements) in the social feed (the social post 360 and the product elements 2006 and 2041) would be presented. For example, referring to FIG. 20E, if upward scrolling input 2090 were received in FIG. 20C (instead of the downward scrolling input 2075), then the GUI 304 would present the next element above the product element 2041 in the social feed, which is the social post 308, as depicted in FIG. 20F with the content summary section and corresponding top emoji response for the post 308.

Figure 21B:
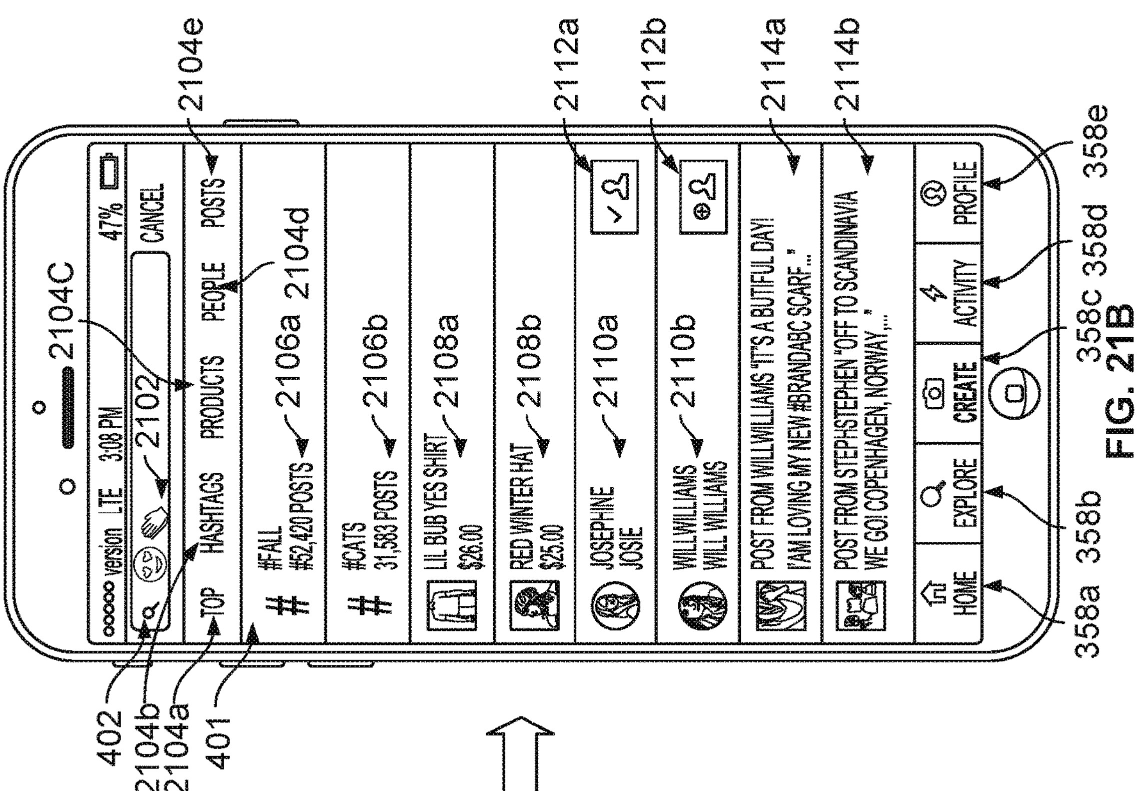
FIGS. 21A-B depict screenshots and user interactions with an explore/search interface on an example platform.
Figure 21A:
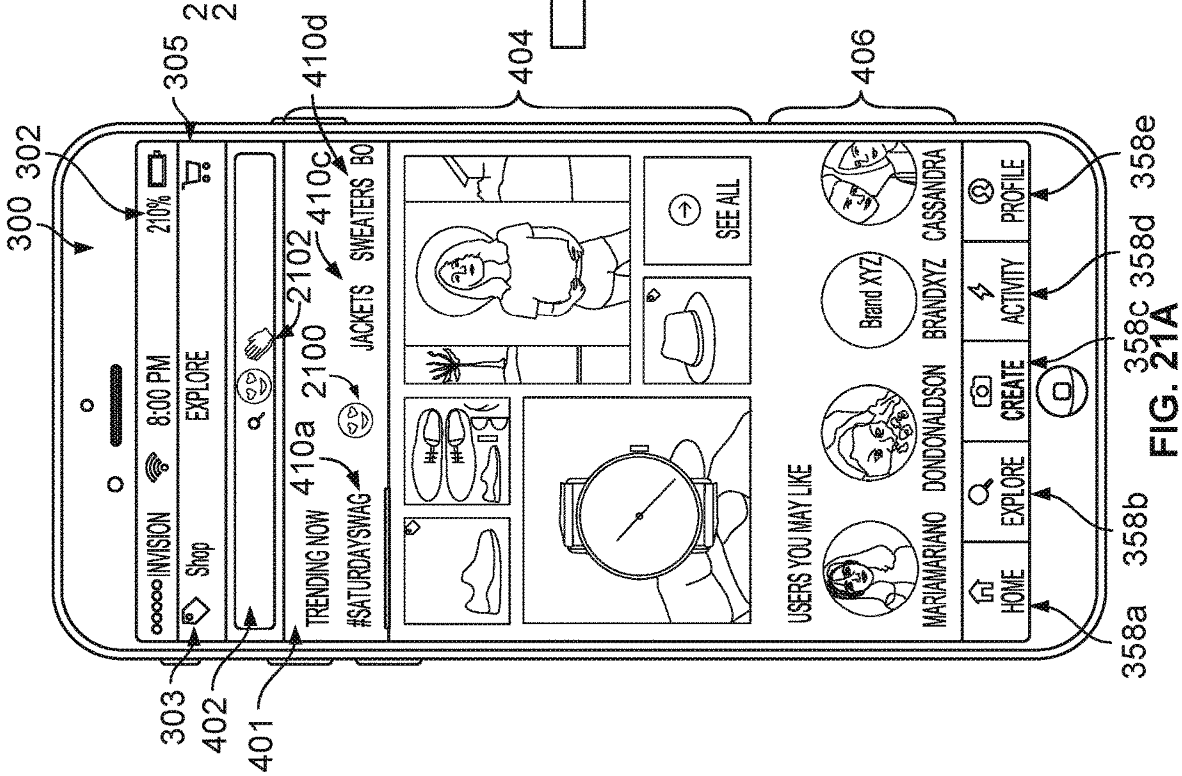

Referring to FIGS. 21A-B, a sequence of screenshots depicting user interactions with the explore/search interface on an example social-retail platform provided by the computer system 240 is depicted.

Referring to FIG. 21A, the GUI 401 includes a search field 402 through which a user can provide a search query, which in this example is a collection of emojis 2102. The search field 402 can have one or more user input features to permit emoji submission in search queries, such as a virtual keyboard that is displayed on the screen with features to identify and select the emojis 2102. The GUI 401 for the explore/search interface further includes a selectable option 2100 to view content elements (e.g., social media posts, product elements) that are associated with currently trending emojis. The selectable option 2100 can be similar to the other selectable options 410*a* and 410*c-d*. For example, the trending emoji 2100 can be identify by the computer system 240 based on it being used frequently across a variety of different social media posts, comments, product elements, product reviews, and/or other content elements.

In response to submitting the emoji-based search query 2102, the client computing device 300 can transmit the search query 2102 to the computer system 240, which can receive and process the search query 2102. For example, the computer system 240 can access content summaries for social media posts, product elements, and other content, and can use the content summaries to identify search results for the query. The search results can include a variety of different content types, such as social media posts, product elements, hashtags, users on one or more social networks, and/or other content types. For example, the computer system 240 can identify social media posts that have the combination of emojis in the search query 2102 in the content summary (content summaries can include more than one content element). In another example, the computer system 240 can identify product elements that have content summary review with the combination of emojis in the search query 2102. In a further example, the computer system 240 can identify users in the results based on the user having created social media posts and/or tagged product elements with content summaries that include the emojis in the search query 2102. In another example, the computer system 240 can identify hashtags in the results based on hashtags being used in the descriptions of social media posts and/or products that have content summaries including the emojis in the search query 2102. Additionally and/or alternatively, the computer system 240 can identify results using all content and not just the content summaries.

Referring to FIG. 21B, the computer system 240 can serve the results to the search query 2102 back to the computing device 300, which can present them in the GUI 401. The example search results include example tabs/categories 2104*a-e* for results that can be presented, with the top results 2104*a* being a combination of results across all categories, the hashtag results 2104*b* being hashtag results, the products results 2104*c* being product element results, the people results 2104*d* being identified users, and the post results 2104*e* being social media posts. In the depicted example, the top results tab 2104*a* is selected, which causes mixed-type results 2106-2114 to be presented in the GUI 401. The example results include example hashtag results 2106*a-b*, example product results 2108*a-b*, example user results 2110*a-b*, and example social media post results 2114*a-b*. Each of the graphical elements for the results 2106-2114 are selectable, selection of which can cause the computing device 300 to present a corresponding element (e.g., social media post) on the computing device. The user results 2110*a-b* further include selectable buttons 2112*a-b* to select whether to follow or unfollow the users identified in the results. In this example, the logged-in user is already following the user 2110*a* (as indicated by the check mark in the button 2112*a*), but is not yet following the other user 2110*b* (as indicated by the plus symbol in the button 2112*b*).

Figure 22:
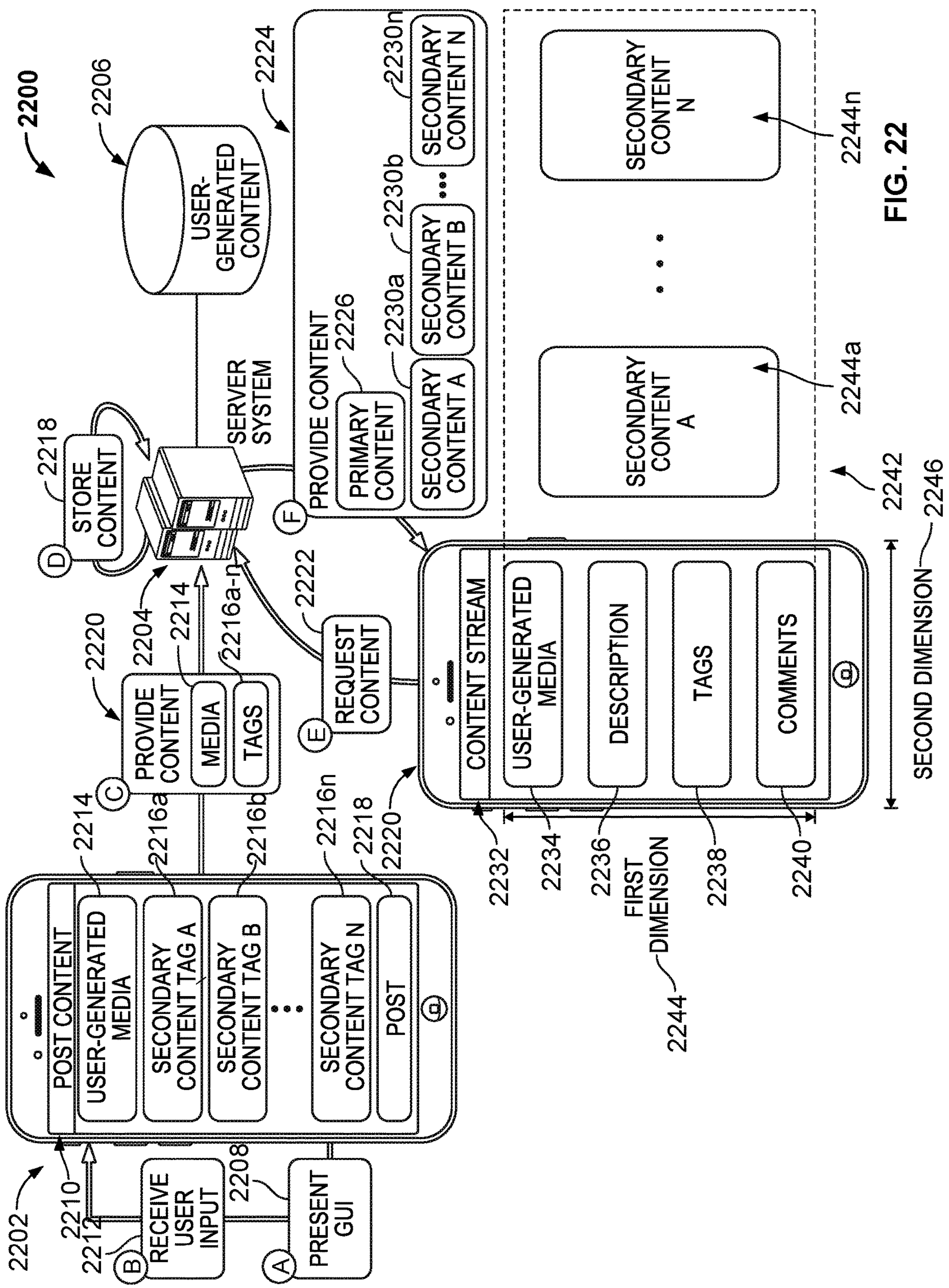
FIG. 22 is a conceptual diagram of an example system to provide an example GUI on an example client computing device.

Referring to FIG. 22, some embodiments of a system 2200 can be configured to provide an example GUI 2210 on an example client computing device 2202 for associating multiple different types of content for presentation within a common content stream in another example GUI 2232 on another example client computing device 2220. For example, the GUI 2210 can present an interface through which a user of the device 2202 can identify a first type of content, such as social medial content (e.g., user posts, comments, shared content) with other types of content (e.g., product content, messaging content, productivity application content, news content) so that they can be uploaded to and served by a server system 2204 to the other computing device 2220 for presentation in the GUI 2220. For instance, the GUI 2210 can include interfaces and controls that allow users to tag second types of content in first types of content, such as tagging product elements (example second type of content) in user-generated images that are included in social media posts (example first type of content). The client computing device 2202 can upload content associations, such as content tags, which can be used by the server system 2204 to serve multiple different associated content elements to the client computing device 2220 for presentation in the GUI 2232.

For example, the GUI 2232 can present and seamlessly integrate social media content (e.g., user posts, comments, shared content) with other types of content (e.g., product content, messaging content, productivity application content, news content) using interfaces and controls that allow users to interact with each of the content items within the GUI 2232 and its common content stream. The GUI 2232 can allow users to interact with content in a variety of ways, such as through social interactions (e.g., share, save, comment) and other types of interactions (e.g., purchasing, messaging, productivity, news distribution) without exiting the GUI 2232 and its content stream to use other, specifically designed applications or interfaces. For example, instead of providing a GUI that presents a single type content (e.g., social media content, product content) and that links to other applications/GUIs that are launched to present other types of content, the GUI 2232 is programmed present multiple types of content without launching or otherwise relying on another application/GUI.

The computing devices 2202 and 2220 can be any of a variety of client computing devices, such as a mobile computing device (e.g., smartphone, tablet, wearable device, smartwatch), laptop computer, desktop computer, and/or other types of user computing devices. The computing devices 2202 and 2220 can communicate with the server system 2204 over one or more networks (e.g., internet, local area network (LAN), wide area network (WAN), virtual private network (VPN), wireless network, mobile data network, or any combination thereof) to obtain, associate, and present multiple different types of content that in the GUIs 2210 and 2232. The server system 2204 can be a computer system (e.g., cloud computer system) that either by itself or through affiliate networks is able to serve and provide features for multiple different types of content, such as social media, messaging, e-commerce, and/or other types of content. For example, the server system 2204 may directly provide social networking features and can communicate with other affiliate computer systems to provide product-related features (e.g., reviews, purchasing, order tracking). In other examples, the server system 2204 may directly provide both social networking features and product-related features. Other configurations of the server system 2204 among one or more other computer systems are also possible.

As indicated by step A (2208), the client computing device 2202 presents the GUI 2210, which can include a variety of features through which a user of the client computing device 2202 can select a first type of content and associate to it second types of content. For example, the GUI 2210 can include features to select one or more files that are local and/or remotely accessible to the computing device 2202, such as selecting photos that are stored locally and/or remotely in association with a account for a user who is logged into the device 2202. In another example, the GUI 2210 can include features through which a user can enter text and/or otherwise annotate files that have been selected, such as text boxes, text input fields, speech-to-text interfaces, and/or other features to permit the user to provide content. Such features can allow for a user to enter/designate user-generated content that can be uploaded to the server system 2204 for distribution to other computing devices. For example, the GUI 2210 can include control and interface features through which a user can create a social media post with media content (e.g., images, videos, graphics), text (e.g., descriptions of the media content, hashtags, emojis, tags), and/or other content elements, which can be uploaded to the server system 2204 by the client computing device 2202. Examples of such GUI features to designate user-generated content are described below with regard to FIGS. 23A-D.

The GUI 2210 can also include features through which the user of the device 2202 can associate secondary content with the user-generated content, such as associating merchant-provided product content, news content, messaging content, and/or other content. For example, the GUI 2210 can include one or more features through which the user can tag other types of content in the user-generated content, such as tagging products that are depicted, described, identified, or otherwise affiliated with the user-generated content. For instance, the GUI 2210 can include selectable features through which the user can identify and associate products elements (example other type of content) that are depicted in user-generated media items, such as selecting merchant-provided product information and purchasing interfaces through which additional information about the products can be viewed and through which the products can be purchased. Examples of such GUI features to tag secondary content in user-generated content are described below with regard to FIGS. 23E-J and 24A-B.

As indicated by step B (2212), user input is received to designate both user-generated content and associated secondary content. Example results of the user input are depicted in the GUI 2210, which includes a user-generated media element 2214 (e.g., image, video, graphic, audio file, text) as well as multiple secondary content tags A-N (2216*a-n*). For example, the user-generated media element 2214 can be a photo depicting a new outfit and the secondary content tags A-N (2216*a-n*) can be product tags applied to the individual clothing items that are depicted in the photo as being part of the outfit. Product tags can be, for example, an identifier for a product that is offered for sale on one or more merchant sites. Product tags may include some details about the identified product, such as a product image (from among a group of product images) selected by the user as best representing the product in the user-generated media element 2214, but may not be a full product element that would be presented in the GUI 2234, which may include manufacturer-provided product information, user-provided product reviews, pricing and purchase information, and features to order the product.

Other embodiments of the user-generated media 2214 and the secondary content tags A-N (2216*a-n*) are also possible. For example, the user-generated media element 2214 can be a collection of photos and videos depicting a trip and the secondary content tags A-N (2216*a-n*) can be tags for stores, restaurants, hotels, and other destinations that are depicted in the photos. In another example, the user-generated media element 2214 can a textual narrative, such as a call to action in view of a natural disaster, and the secondary content tags A-N (2216*a-n*) can tags for donation pages, news stories, and/or other items/elements through which users can answer/learn about the call to action. Other examples are also possible.

The GUI 2210 also includes a post button 2218 that a user can select to cause the computing device 2202 to upload the user-generated content 2214 and the tagged secondary content 2216*a-n* to the server system 2204 for distribution to other computing devices. For example, the server system 2204 can distribute content that is uploaded by the client computing device 2202 to other computing devices that are associated with other users who are socially connected (e.g., following, friends) to the user who is logged into the computing device 2202. In response to selecting the post button 2218, the computing device 2202 can provide the content (2214, 2216*a-n*) to the server system 2204, as indicated by step C (2220). The server system 2204 can receive and store the content in a data repository 2206 (e.g., cloud storage system) for subsequent distribution to other computing devices, as indicated by step D (2218).

As indicated by step E (2222), the client computing device 2220 (which can be the same as or different from the computing device 2202) can request content from the server system 2204. For example, the client computing device 2220 can poll the server system 2204 for new content to present in the content stream (e.g., social feed) in the GUI 2232 on a periodic basis (e.g., every second, every 220 seconds, every minute) and/or in response to various events occurring on the client computing device 2220 (e.g., the application presenting the GUI 2232 loading, the GUI 2232 receiving focus on the display of the device 2220). The server system 2204 can retrieve, from the content repository 2206, and transmit content for the client computing device 2220, as indicated by step F (2224). In this example, the response includes primary content 2226 (e.g., user-generated content, such as a social media post) and secondary content 2230*a-n* (e.g., product elements tagged in the social media post, new elements tagged in the social media post, productivity elements tagged in the social media post, and/or combinations thereof). The primary content 2226 can be the same as or similar to the user-generated media 2214 that was designated in the GUI 2210.

The secondary content 2230*a-n* can be different from the secondary content tags 2216*a-n*, though. For instance, the secondary content tags 2216*a-n* can, at their most basic level, simply identify the secondary content elements 2230*a-n*, whereas the secondary content elements 2230*a-n* can include additional content (e.g., product descriptions, product pricing, product images, user reviews, merchant information) and additional features (e.g., interactive interface features to purchase the identified product) that are not present in the secondary content tags 2216*a-n*. For example, in the secondary content tags 2216*a-n* can be unique identifiers for the secondary content elements 2230*a-n* (as hosted by the server system 2204 and/or one or more affiliated computer systems), which the server system 2204 can receive and use to retrieve the secondary content elements 2230*a-n*.

The client computing device 2220 can present the primary content element 2226 with the secondary content elements 2230*a-n* in the same GUI 2232—meaning that the GUI 2232 can allow for a user of the device 2220 to seamlessly interact with both the primary and secondary content types without needing to navigate away from or launch a separate application on the device 2220. A variety of features can be used to present the primary and secondary content elements 2226, 2230*a-n* together in the GUI 2232. For example, the GUI 2232 can be programmed to present bi-directional content streams that are oriented along a first dimension 2244 of the device 2220 and a substantially perpendicular second dimension 2246 of the device 2220, respectively. For example, a first type of content can be presented in the first dimension (2244) content stream and a second type of content can be presented in the second, perpendicular content stream 2242 (along the second dimension 2246), which can improve the GUI 2232 so that users are able to navigate effectively between content types without having to navigate to or launch other applications/GUIs.

In the depicted example, the vertical content stream along the first dimension 2244 can be "infinite"—meaning that client computing device 2220 is programmed to obtain additional content from the server system 2204 when scrolling along the vertical stream approaches a current end of the content that has been downloaded onto the client computing device 2220. The vertical content stream, in this example, presents user-generated content items, such as social media content items, and the perpendicular content stream 2242 presents secondary content items that are associated with the user-generated content items. For example, the vertical content stream includes a single user-generated content elements that includes user-generated media 2234, a user-generated description 2236, user-designated tags 2238, and user comments 2240. For instance, the vertical content stream can be a social media content stream for a user who is logged into the computing device 2220, and the user-generated content element 2234 (e.g., social media posts, shares, saves, comments) can be user-generated social media content items for other users in the user's social network (e.g., friends, following).

In the depicted example, the user-generated content element 2234 is depicted as being displayed by the computing device 2220. If the user were to scroll down or up in the GUI 2232, then other user-generated content elements in the content stream would be displayed in the GUI 2232. Each of the user-generated content elements in the content stream can include associated secondary content that is accessible along a perpendicular stream that is specific to each user-generated content element, such as the perpendicular content stream 2242 that is specific to the user generated content element 2234. For example, the user-generated content element 2234 can be a social media post with product tags 2238 for products depicted in an example image 2234, and the secondary content elements 2244*a-n* can be product elements for each of the products tagged in the image 2234. The secondary content elements 2244*a-n* can be, for example, different from the user-generated content elements 2234 in terms of what the elements include and/or in terms of the features associated with the elements. For instance, in instances where the element 2234 is a social media content element, a user may be presented with features in the GUI 2232 to interact with the elements, like commenting, liking, sharing, saving, or otherwise reacting to the elements 2234. In contrast, in instances where the secondary content elements 2244*a-n* are product elements, a user may be presented with different information (e.g., product information as opposed to user-generated content, product ratings/reviews instead of user comments) and may be presented with different features (e.g., product purchase features instead of social interaction features).

The example secondary content elements 2244*a-n* can each, for instance, include an image (e.g., image depicting a product), text (e.g., text describing a product), and selectable features (e.g., selectable button to purchase or add the product to a virtual shopping cart, selectable button to save the product to the user's profile, compose and transmit message). The secondary content elements 2244*a-n* can include additional and/or alternate elements, such as multiple images, associated other products, associated other user-generated content (other user-generated content items), and/or other features.

The secondary content elements 2244*a-n* in the second content stream 2242 can be displayed in the GUI 2232 in response to scrolling input along the second dimension 2246 while the user-generated content element 2234 is being displayed. For example, if the user scrolls horizontally (related to the user-generated content element 2234) in the GUI 2232 can cause the secondary content element 2244*a* to be displayed in the GUI 2232. The horizontal scrolling along the second dimension 2246 can cause the secondary content element 2244*a* to replace, at least partially, the user-generated content element 2234 (e.g., replace through horizontal scrolling animation of the content elements 2234 and 2244*a* that coincides with the scrolling input). The other secondary content elements 2244*b-n* can also be displayed in the GUI 2232 based on further horizontal scrolling along the second dimension 2246. Horizontal scrolling can be either way (left or right) along the second dimension 2246, to allow the user to navigate forward and backward along the content stream 2242, which may be limited in length (contain a finite number of element) or which may be infinite (as described above with regard to the vertical stream.

The user of the device 2202 can interact with the secondary content elements 2244*a-n* when they are displayed in the GUI 2232, such as selecting the selectable features included in the secondary elements 2244*a-n*. Such interactions can take place without transitioning outside of the GUI 2232 or causing the GUI 2232 (or the vertical content stream) to lose focus. For instance, instead of providing links that would cause another application to be launched, the selectable features in the secondary content 2244*a-n* are provided within the vertical content stream by horizontally scrolling through the perpendicular content stream 2242. For example, the user-generated content element 2234 can be social media content and the secondary content elements 2244*a-n* can be product content, which can be added to a virtual shopping and/or purchased from within the GUI 2232 by selecting the selectable features included in the secondary content elements 2244*a-n*.

FIGS. 23A-J, 24A-C, and 25 are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the GUI 2210 described above with regard to FIG. 22 and the system 2200 on a social-retail platform. For example, the user-generated content element 2214 (primary content elements) can be social posts/content elements and the secondary content tags 2216*a-n* can be product tags as described with regard to FIGS. 3A-B, 4A-B, 5A-B, 6A-B, 7A-B, 23E-J and 24A-C.

Figure 23B:
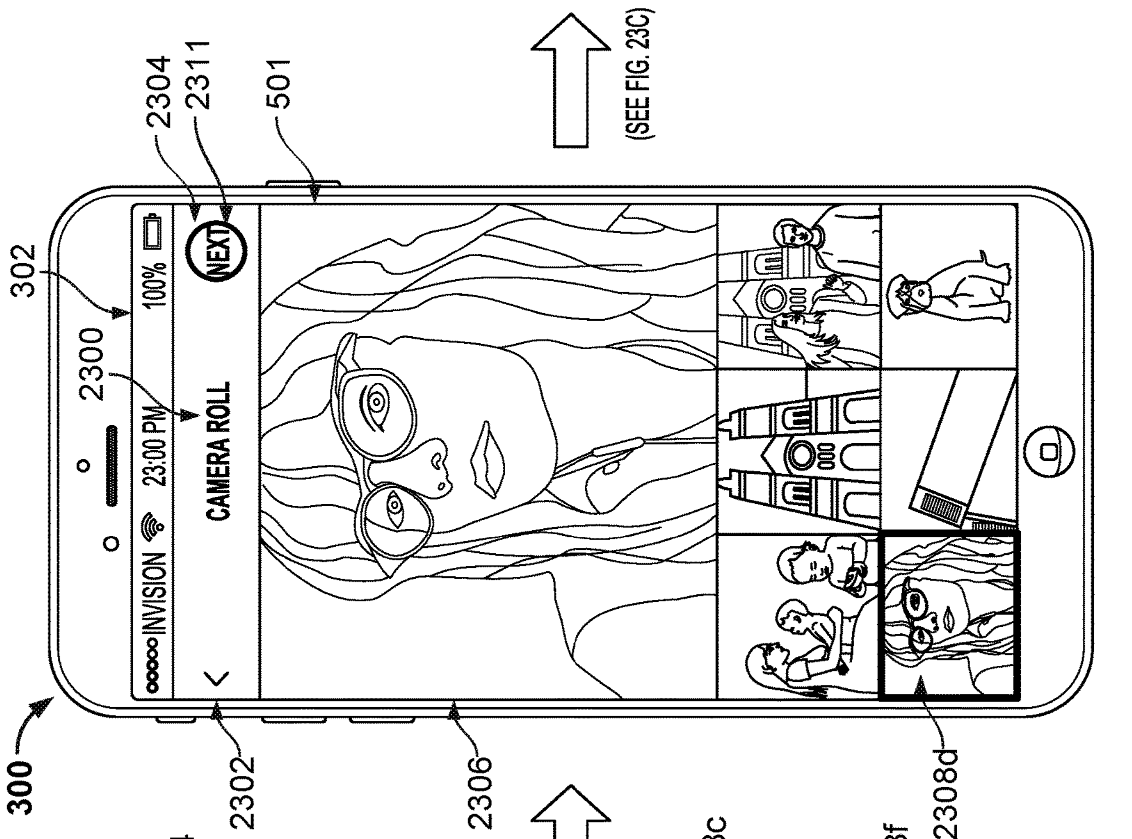
FIGS. 23A-J depict a sequence of screenshots and user interactions with a GUI to create a post on an example platform.
Figure 23A:
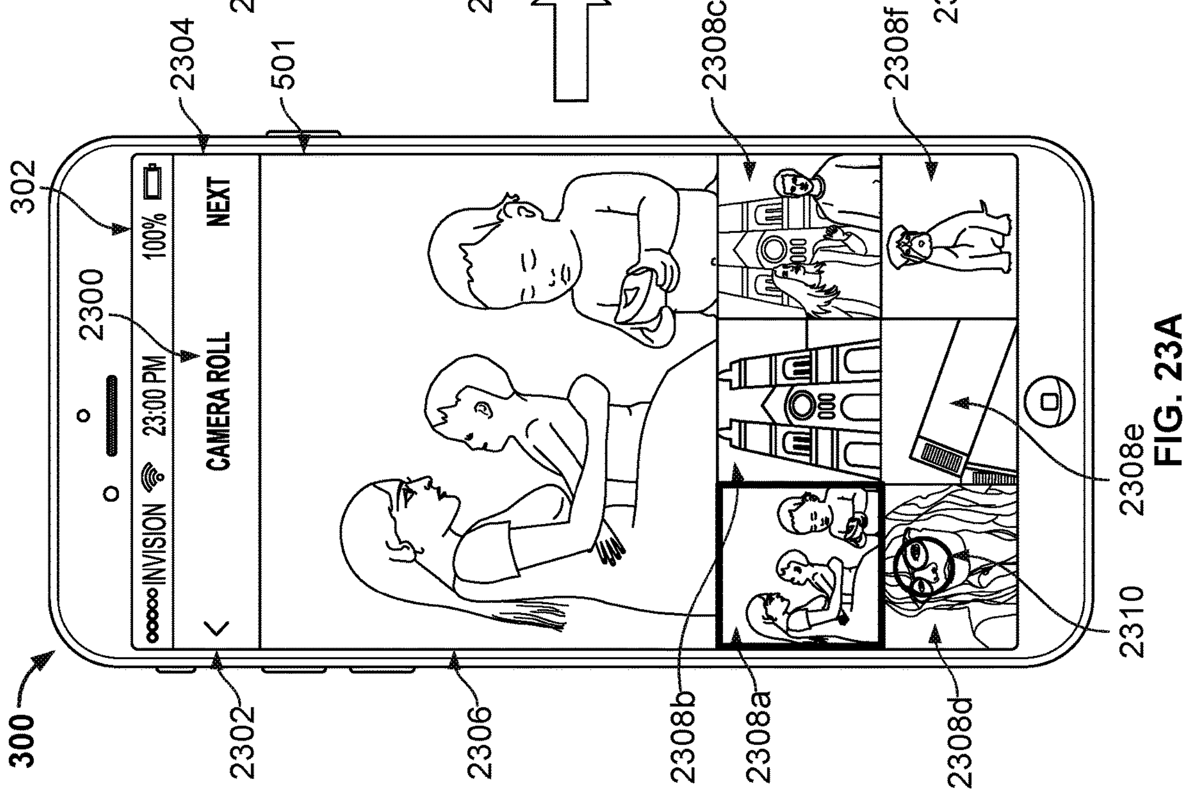

Referring to FIGS. 23A-J, a sequence of screenshots depicting user interactions with the GUI 501 to create a post on the example social-retail platform provided by the computer system 240 is depicted. Referring to FIG. 23A, the GUI 501 presents an interface to select a user-generated image (e.g., photo) to use for the post from one or more data sources that are accessible to the device 300, such as a local storage system on the device 300 and/or a remote storage system that is accessible to the device 300 (e.g., cloud-based photo storage system that the device 300 is logged into). The GUI 501 includes a collection of photo thumbnails 2308*a-f* that can be selected. In the depicted example, the first photo 2308*a* is selected by default, as indicated by the border around the thumbnail 2308*a* and the image appearing in the selection area 2306 of the GUI 501.

The GUI 501 further includes a header that includes a title 2300 ("Camera Roll") indicating the current state of the GUI 501, as well as navigation features 2302 and 2304 to return to a previous screen and to move to a next screen, respectively. For example, the GUI 501 can be launched by selecting the create button 358*c* at the footer 356 of the various GUIs described above. Selecting the back arrow 2302 can cause the GUI 501 to navigate back to the screen that was presented when the button 358*c* was selected. Selecting the next feature 2304 can proceed with creating the post using the currently selected photo, which in this example is the photo 2308*a* that is depicted in the selection area 2306.

In the depicted example, the user provides selection input 2310 through the GUI 501 by selecting the photo 2308*d*. Referring to FIG. 23B, the selecting input 2310 causes the photo 2308*d* to have a border around it (indicating that it is selected) and for the photo 2308*d* to appear in the selection area 2306. With the photo 2308*d* selected, additional selecting input 2311 that selects the next feature 2304 is received through the GUI 501.

Figure 23D:
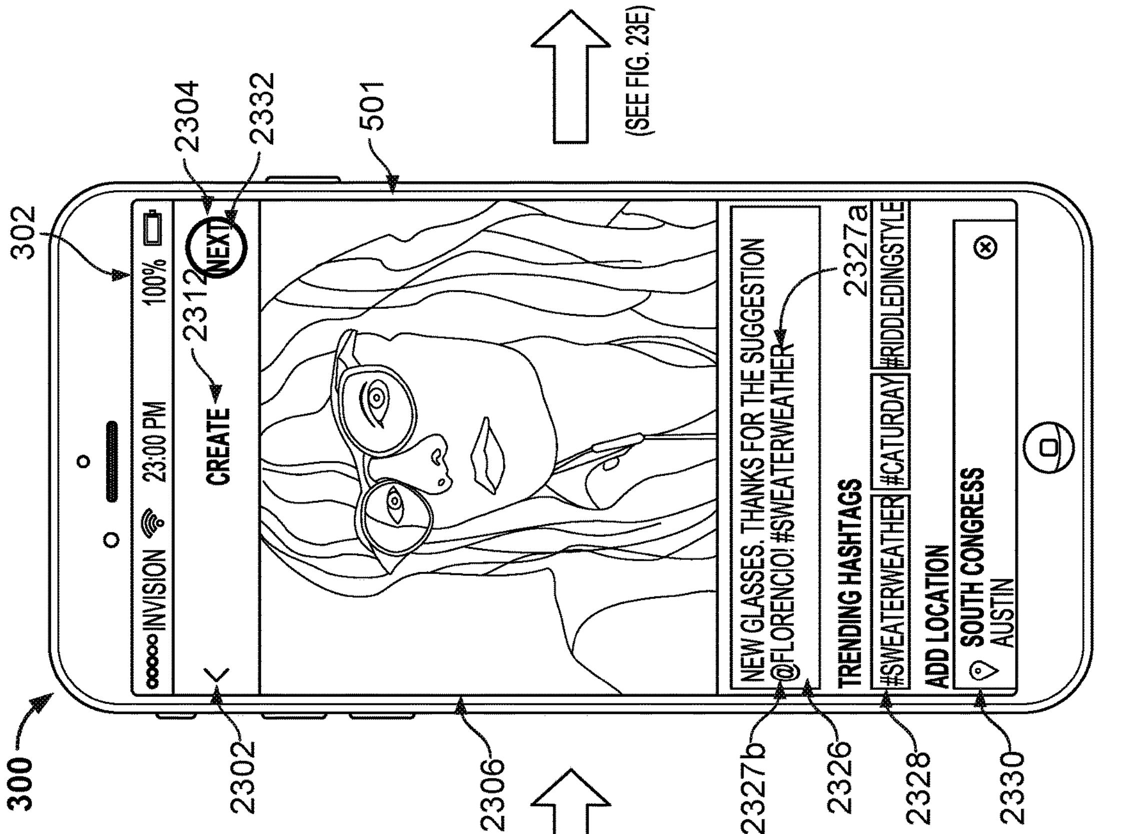
Figure 23C:
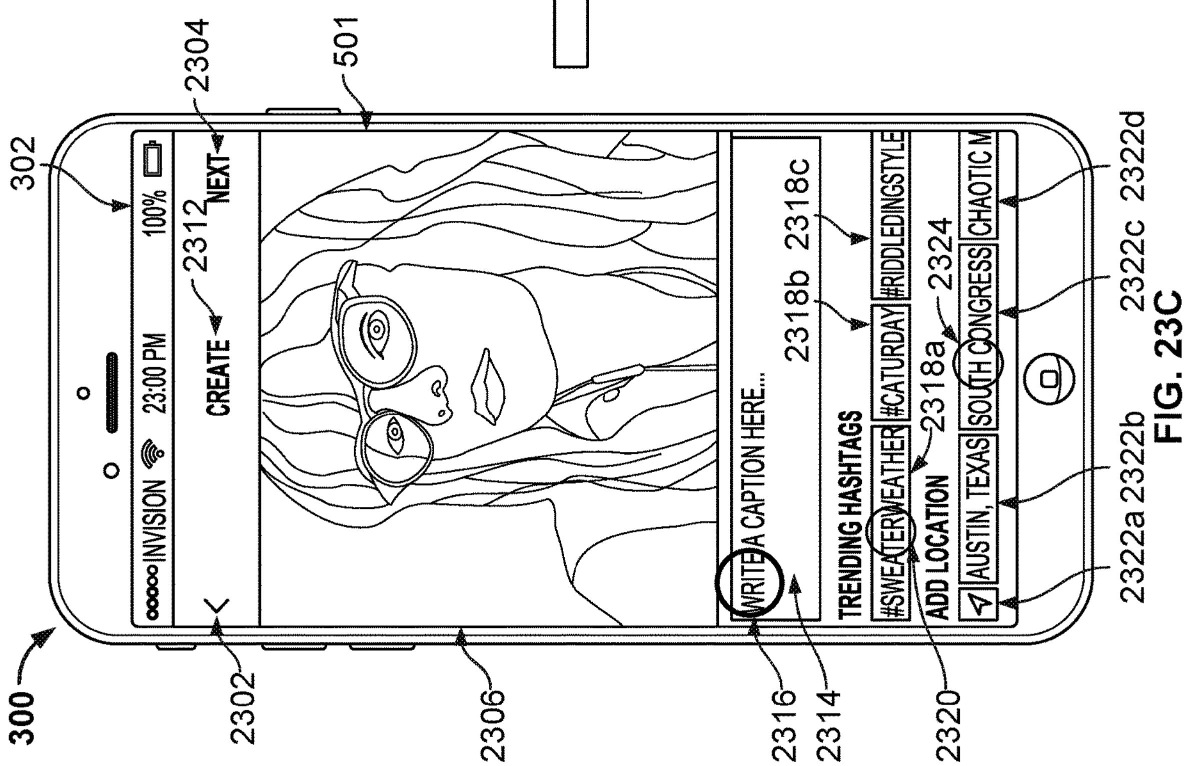

Referring now to FIG. 23C, in response to receiving the selecting input 2311, a next screen in the post creation interface is presented with the selected photo 2306. In the next screen of the GUI 501, the title 2312 is updated (to "Create") and input features 2314, 2318*a-c*, and 2322*a-d* are presented for the user to further create the post based on the selected image 2306. The input feature 2314 is a text box through which a user can enter a textual description and/or caption that is associated with the photo 2306. Such a textual description and/or caption can include, for example, words and phrases, as well as hashtags, emojis, and/or other character-based features.

The input feature 2318*a-c* are selectable buttons for suggested hashtags to include with the post. The hashtags can be suggested by the client device 300 and/or by the server system 240, such as based on hashtags that are currently popular or trending across one or more user populations (e.g., global user population, regional user population within which the user is located, social network for the user). Other mechanisms for selecting the hashtags 2318*a-c* to suggest to the user are also possible, such as analyzing hashtags that the user previously used in social media posts across one or more social networks, optically analyzing the photo 2306 to identify one or more relevant topics that are depicted in the photo 2306, and/or other factors. The suggested hashtags 2318*a-c* can improve the GUI 501 for the user by allowing the user to select a relevant hashtag in a single action (e.g., select one of the hashtag buttons 2318*a-c*) instead of having to type out the hashtag, which can be cumbersome and can involve more actions on, for example, the touchscreen of a mobile computing device. Only a portion of the suggested hashtag buttons 2318*a-c* are depicted—additional hashtag suggestions can be accessed through horizontally scrolling across an area in the GUI 501 where the hashtag buttons 2318*a-c* are depicted. By having additional hashtags that are accessible via horizontal scrolling, the GUI 501 can further be improved for a user by allowing the user to access a large cache of pre-canned hashtags with a minimal amount of space on the display 302 being occupied (e.g., only a single row of hashtags 2318*a-c* are presented).

The input features 2322*a-d* are similar to the hashtag features 2318*a-c*, but that the features 2322*a-d* are for tagging one or more locations that are relevant to the post. In the depicted example, a first location 2322*a* corresponds to the current location of the device 300 and/or its user, which can trigger a geolocation procedure on the device 300 to be performed (e.g., GPS-based location determination, Wi-Fi or other terrestrial beacon-base location determination). The other example locations 2322*b-d* that are depicted can be suggested locations that are determined by the client computing device 300 and/or the remote computer system 240. For example, the locations 2322*b-d* can be determined and suggested based on locations where the user and/or the device 300 were previously located (e.g., based on geolocation tracking on the computing device 300, based on location check-ins through one or more social media platforms, based on calendar/schedule information), where the user is scheduled to be located in the future (e.g., based on calendar/schedule information), and/or other relevant location factors. Such location information can be accessed with user permission provided on the computing device 300. Like the hashtag buttons 2318*a-c*, the location buttons 2322*a-d* can improve the GUI 501 for a user by allowing a user to designate a relevant location in a single action (button selection) as opposed to having to type or otherwise identify a geographic location on the device 300. Additionally, the location buttons 2322_a-d_ can also be horizontally scrollable, which can further improve the GUI 501 by permitting a larger selection of locations to be suggested while minimizing the area on the display 302 that is occupied by the location buttons 2322_a-d_ (only a single row occupied).

In the depicted example, a user provides input 2316 through the textbox 2314, selecting input 2320 with regard to the suggested hashtag 2318_a_, and selecting input 2324 with regard to the suggested location tag 2322_c_. Referring to FIG. 23D, in response to the inputs 2316, 2320, and 2324 the textbox includes an example description 2326 (including tags 2327_a-b_), the hashtag 2318_a_ is selected (2328), and the location 2322_c_ is selected (2330). For example, selecting the hashtag 2318_a_ can cause it to appear in the text box as hashtag 2327_a_. The user can designate other hashtags, location tags, and other tags (such as the user tag 2327_b_) through the text box as well.

Figure 23E:
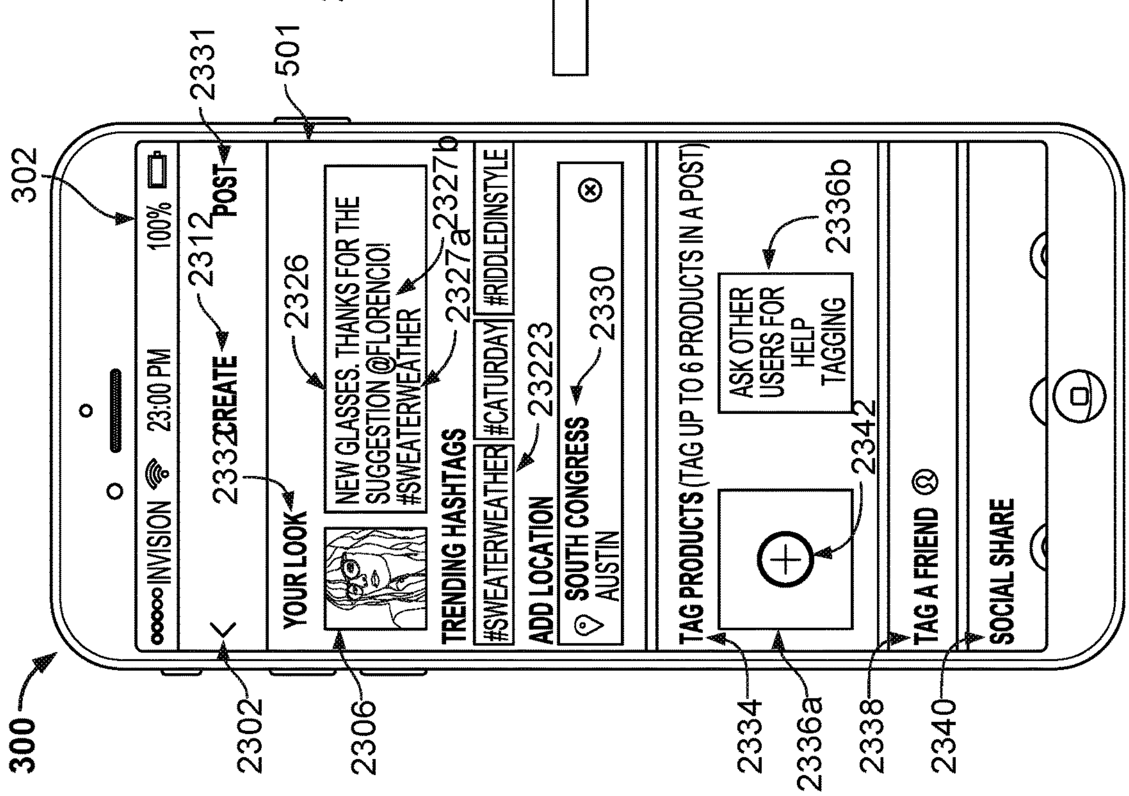

With the contents of the post created, selecting input 2332 is received with regard to the next button 2304. Referring to FIG. 23E, in response to receiving the selecting input 2332, a next screen of the GUI 501 is presented. A top portion of the GUI 501 includes a summary 2332 of the post, including the selected photo 2306, the description 2326 for the post, and the user-selected tags 2327_a-b_, 2328, and 2330. The bottom portion of the GUI 501 includes additional tagging features 2334 and 2338 to tag products that are depicted/described in the post and to tag other users (friends), respectively. In the example product tagging feature 2334, a first selectable button 2336_a_ is presented to proceed to a product tagging interface (see FIGS. 23F-H) and a second selectable button 2336_b_ is presented to request assistance from other users in tagging products in the post (see FIGS. 24A-C). In the example user tagging feature 2338, options are provided to tag other users in the post, such as viewing a list of users within the logged-in user's social network, such as friends and/or followers.

Figure 23F:
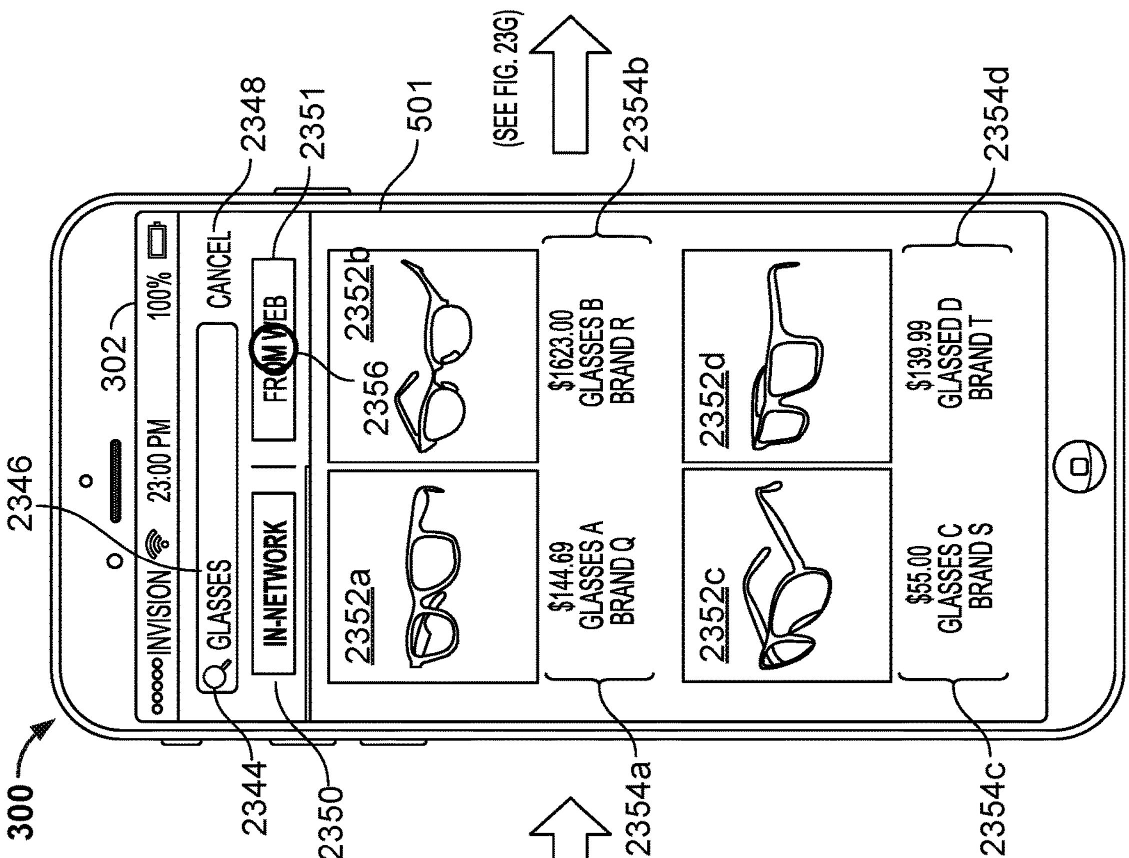

In the depicted example, selecting input 2342 is received with regard to the button 2336_a_ to tag a product in the post. Referring to FIG. 23F, in response to receiving the input 2342, a product tagging interface is presented in the GUI 501 through which the user can select a product to tag (example of a secondary content tag 2216_a-n_, as described above with regard to FIG. 22) in the image 2306 included in the post. The product tagging interface includes a search field 2344 through which a user can enter a search query to identify the correct product to tag in the post. In the depicted example, the user has entered the example keyword "glasses" 2346 in the search field 2344. Although the example search 2346 is fairly generic, more specific queries can also be submitted, such as queries that include the make and model of the product that is being identified. Results are organized under two different tab—an "in-network" tab 2350 that presents products that are offered within a network of known/affiliate merchants and a "from web" tab 2351 that presents product that are offered outside of this network. Such a network may include, for example, the server system 240 by itself and/or the server system 240 in combination with one or more affiliated computer systems 260. The in-network merchant offerings in the tab 2350 may provide assurances with regard to reliability and quality based on the merchants being known and approved through the computer system 240.

In the depicted example, the in-network tab 2350 is selected. Example in-network products 2352_a-d_ matching the search query 2346 are presented in the GUI 501 with product images and corresponding product descriptions 2354_a-d_. If the user were to find the correct product within these product options 2352_a-d_, the user could simply select the correct product and a product tag for that product would be applied to the post. To return to previous interface depicted in FIG. 23E (meaning, the user is not going to apply a product tag), the user can select the cancel feature 2348 that is located next to the search field 2344.

Figure 23H:
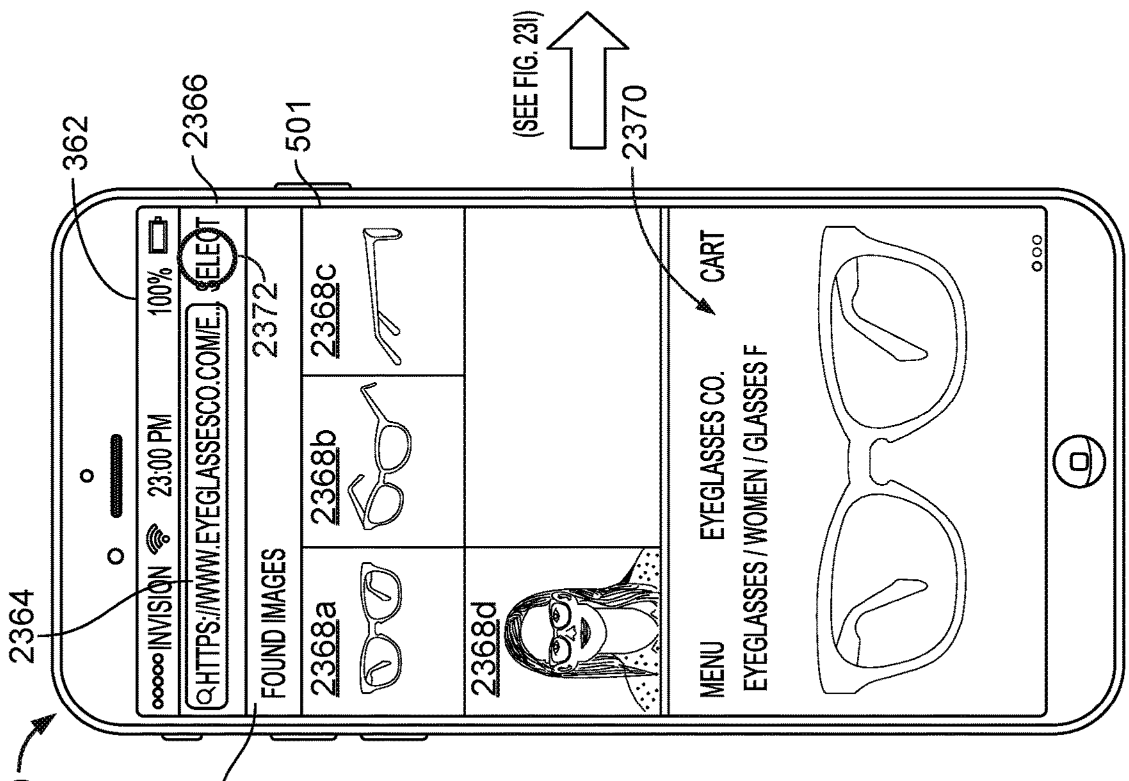
Figure 23G:
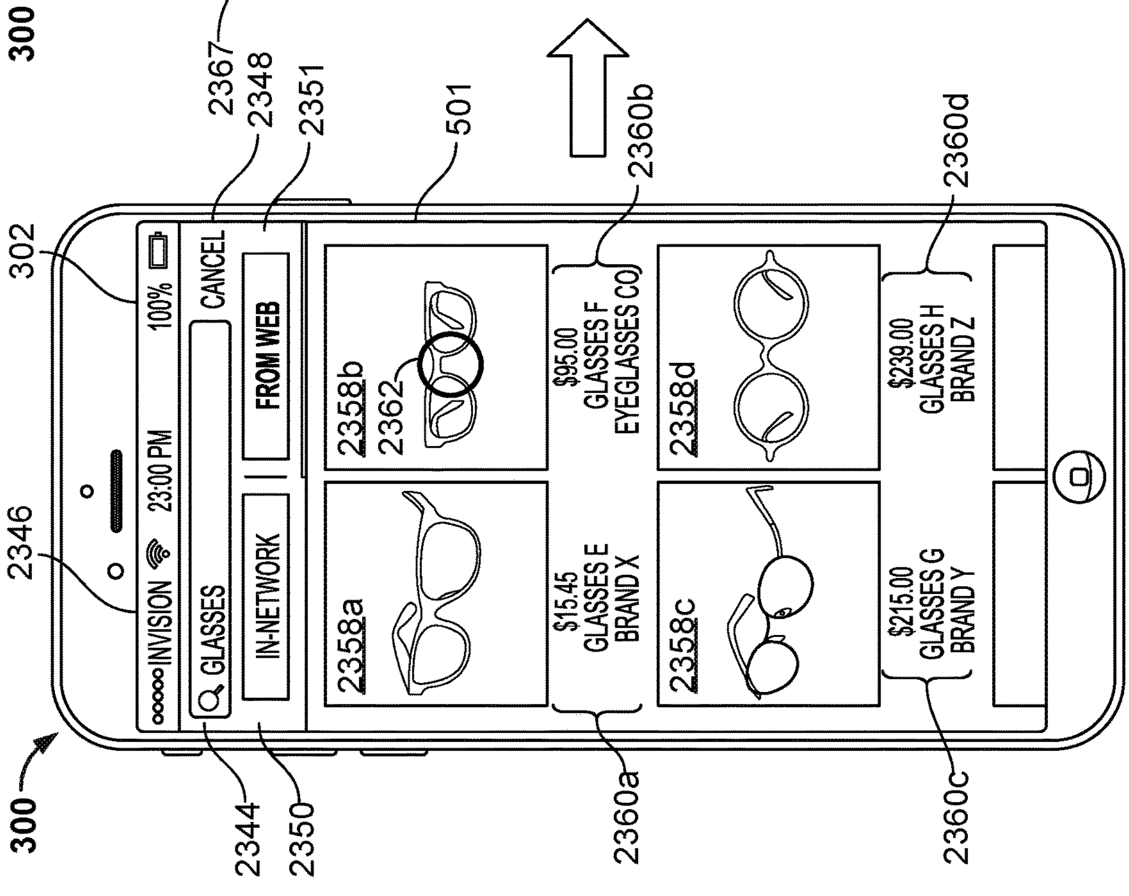

In the depicted example, the user provides selecting input 2356 for the from web tab 2351. Referring to FIG. 23G, out of network product results 2358_a-d_ are presented for the search query 2346 are presented in the from web tab 2351. The product results 2358_a-d_ are selectable and are presented with additional product information 2360_a-d_. In the depicted example, the user provides selecting input 2362 for the out of network product 2358_b_. Referring to FIG. 23H, an interface for the selected product 2358_b_ is presented in the GUI 501 in response to the selecting input 2362. A variety of information about the product 2358_b_ can be presented, such as merchant/manufacturer provided images 2368_a-d_ of the product in an images section 2367 and as well as product information 2370, such as the product name, description, sizing, colors, price, and/or other product details. When multiple product images 2368_a-d_ are presented, a user can select one of the product images 2368_a-d_ to be presented as the default product image for a tagged product, which in this example is the selected image 2368_b_ (indicated by the border around the image 2368_b_). A user can scroll down in the GUI 501 to view additional details. The GUI 501 further includes a URL 2364 from which the product information is being obtained. Such a URL 2364 may be included as well with in-network products as well, or it may be replaced with a unique product identifier or description that is predetermined on the computer system 240. The GUI 501 further includes a button 2366 to select the product 2358_b_ as a product tag to include with the post.

In the depicted example, selecting user input 2372 is received for the select button 2366, indicating that the product 2358_b_ that is presented in the GUI 501 is the correct product from the user-generated image 2306 and should be tagged in association with the user post. Referring to FIG. 23I, in response to the selecting user input 2372, the product tag 2374 for the selected product 2358_b_ is added to the post. The user can tag additional products in the image 2306 through selecting the selectable button 2336_a_ again. The user can upload the post to the server system 240 by selecting a post feature 2331, which can cause the post (as outlined in the GUI 501) to be transmitted by the computing device 300 to the server system 240 for processing, storage, and distribution to other users through their computing devices.

As depicted in the example, selecting user input 2376 related to the post button 2331 is received through the GUI 2350. In response to the user selecting the post button 2331, the computing device 300 uploads the post to the server system 240, which can store the post in association with an account for the user who is logged-in to the computing device 300 (user who is creating the post). Storage of the post can include, for example, storing three parts—(22) the user-generated content in the post (photo 2306, description 2326, hashtags 2327_a_ and 2328, user tag 2327_b_, and location tag 2330), (2) a product element for the tagged product (if the server system 240 has not already stored the product element), and (3) the product tag linking the post to the product element. The first data element (user-generated content) that is stored by the computing device 240 can be added to the user-generated content repository 248 using the post information that is received from the computing device 300.

The second data element (product element) can be first cross-referenced against previously stored product elements (such as product elements in the other content repository 250) to determine whether it already exists on the system and/or needs updating. If the product element is not present on the system or is out of date (needs updating), then the server system 240 can proceed to retrieve current information for the tagged product that can be stored as a product element to be served with the user-generated content. Such retrieval can involve, for example, the computer system 240 requesting information (e.g., product images, product descriptions, merchant information, price) for the tagged product from one or more other computer systems, such as the affiliate computer system 260 and/or other non-affiliated computer systems. The product information can be obtained by the computer system 240 so that it can readily and efficiently be served to client computing devices without needing to contact other computer systems before serving the requested content to the client computing devices.

The third data element (product tag) can be an internal tag within the server system 240 (e.g., a locally addressed identifier within one or more data repositories used by the server system 240) and/or a universal tag (e.g., URL for the product that is maintained by the server system 240). For example, the product tag that is stored by the server system 240 to associate the user-generated post with the tagged product can include an identifier for the post and another identifier that links the post to the product. This other identifier can, for example, be an identifier for the product element stored in the other content repository 250, which may be an internal/local identifier and/or a universal identifier. In another example, this other identifier can be a unique identifier for the product (not specifically the product element) that the server system 240 may cross-reference in one or more tables to the product element stored in the other content repository 250.

Figure 23J:
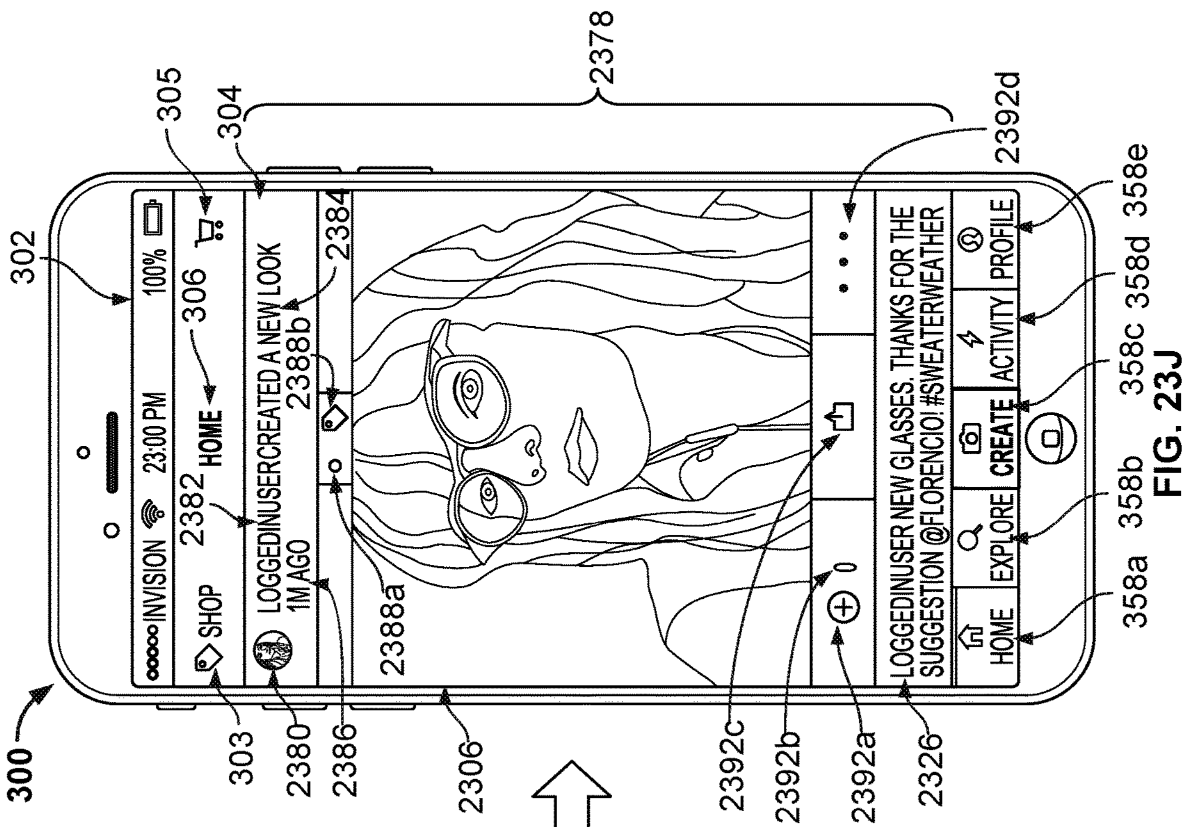
Figure 23I:
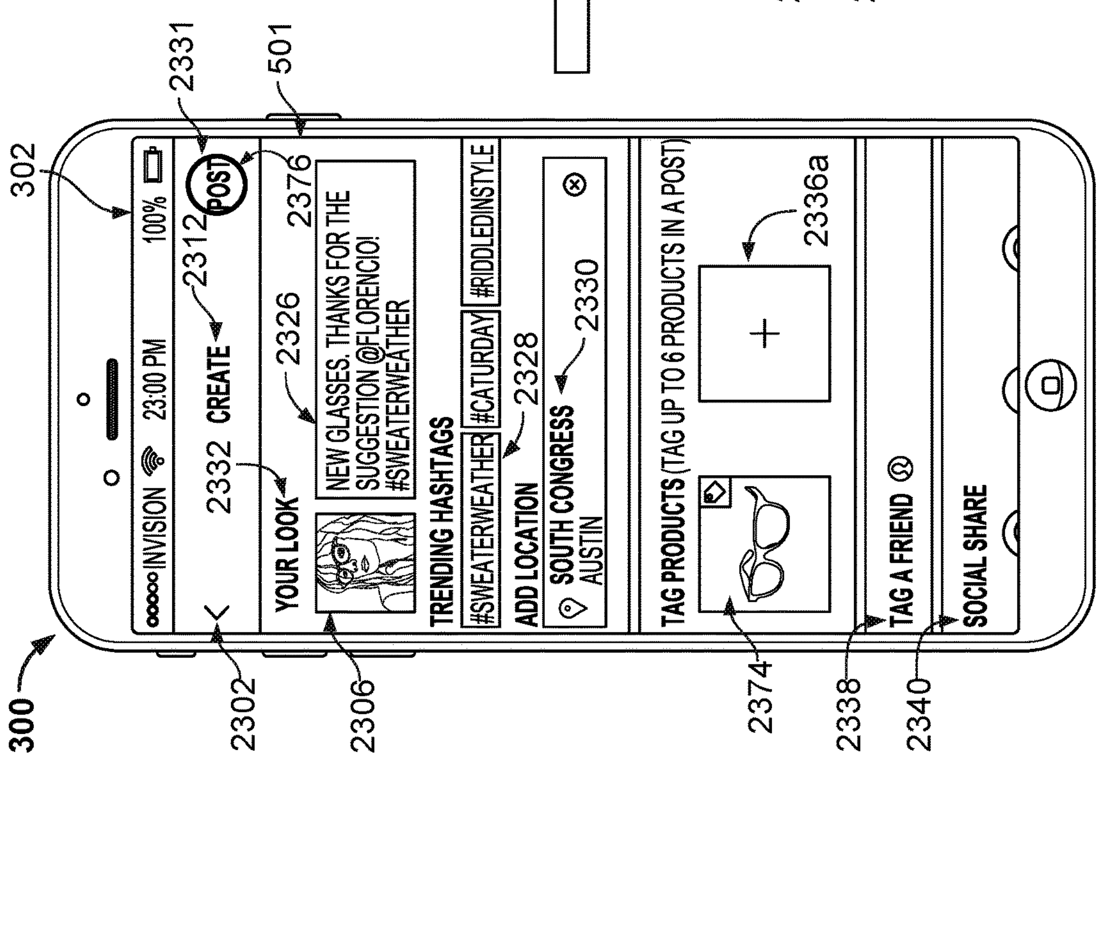

Referring to FIG. 23J, in response to the user input 2376 to upload the post and the server system 240 storing the post (as described above), the post can then be served by the server system 240, such as in a social network feed. For instance, the post 2378 is depicted in the GUI 304, similar to the posts described above with regard to FIGS. 3A-B. In this example, the post 2378 includes the user-selected photo 2306, the user-generated description 2326, and an indicators 2388*a-b* that the post 2378 includes a tagged product. For example, as discussed above, the circle symbol 2388*a* can represent the social post 2378 and the product symbol 2388*b* can indicate that there is a tagged product (the tagged product 2358*b*) with a corresponding product element that can be viewed by horizontally scrolling with regard to the post 2378 (see description above in FIG. 22 with regard to horizontally scrolling to access the tagged product, which is an example secondary content element). The computing device 300 can further be programmed to present additional information for the post 2378 in the GUI 304, such as attributing creation of the post 2378 to a user associated with the image 2380 and user name 2382, information on what action that user took (2384), a time since that action was taken (2386), and selectable features 2392*a-d* for a user viewing the post 2378 to interact with the post (e.g., save, share). Although the post 2378 is presented in the same computing device 300 as the computing device used to create the post 2378, it can additionally or alternatively be served by the server system 240 to other users who are different from the user who created the post.

Figures 24A, 24B:
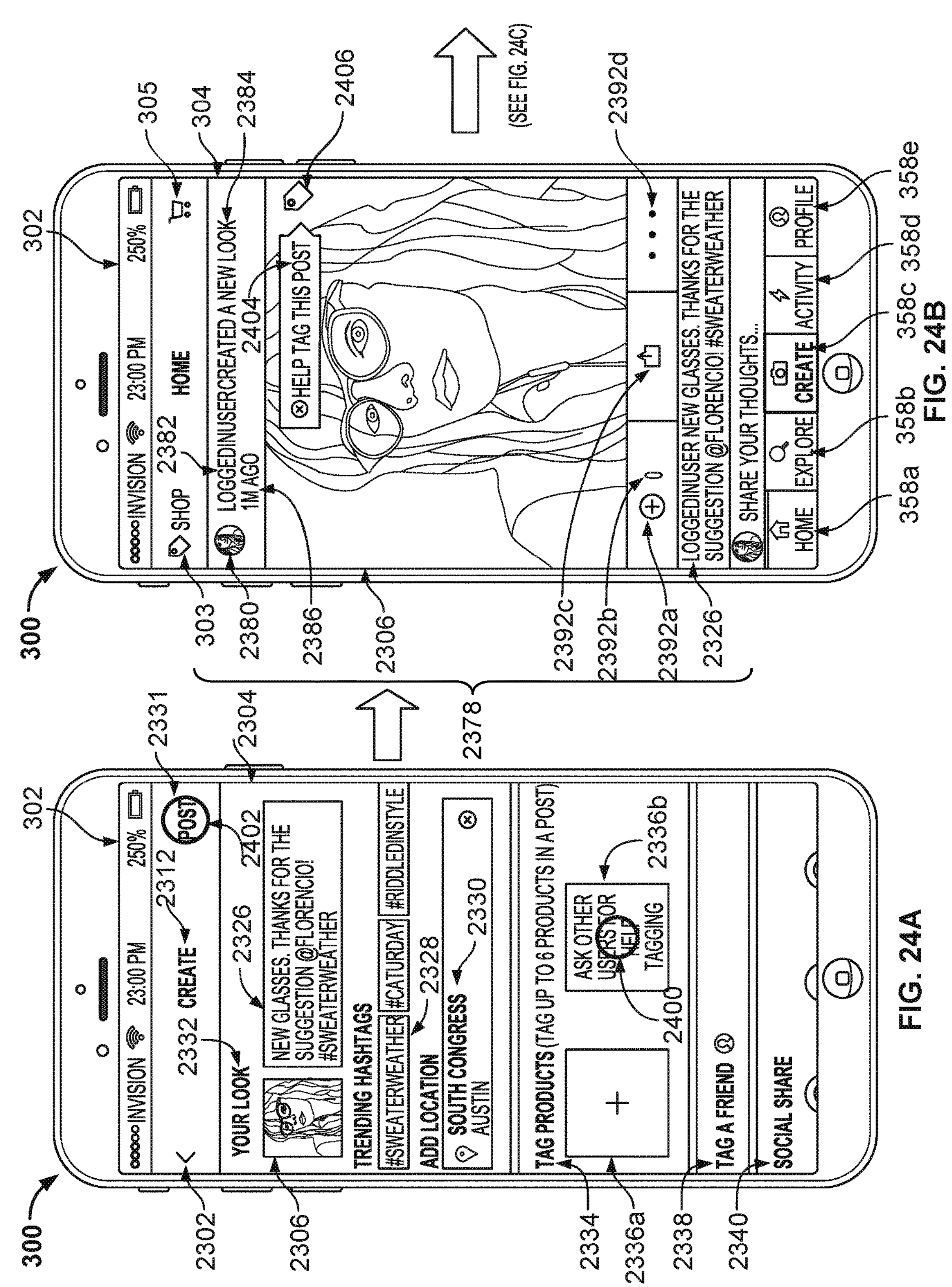
FIGS. 24A-C depict a sequence of screenshots and user interactions with a GUI to create a post on an example platform.
Figure 24C:
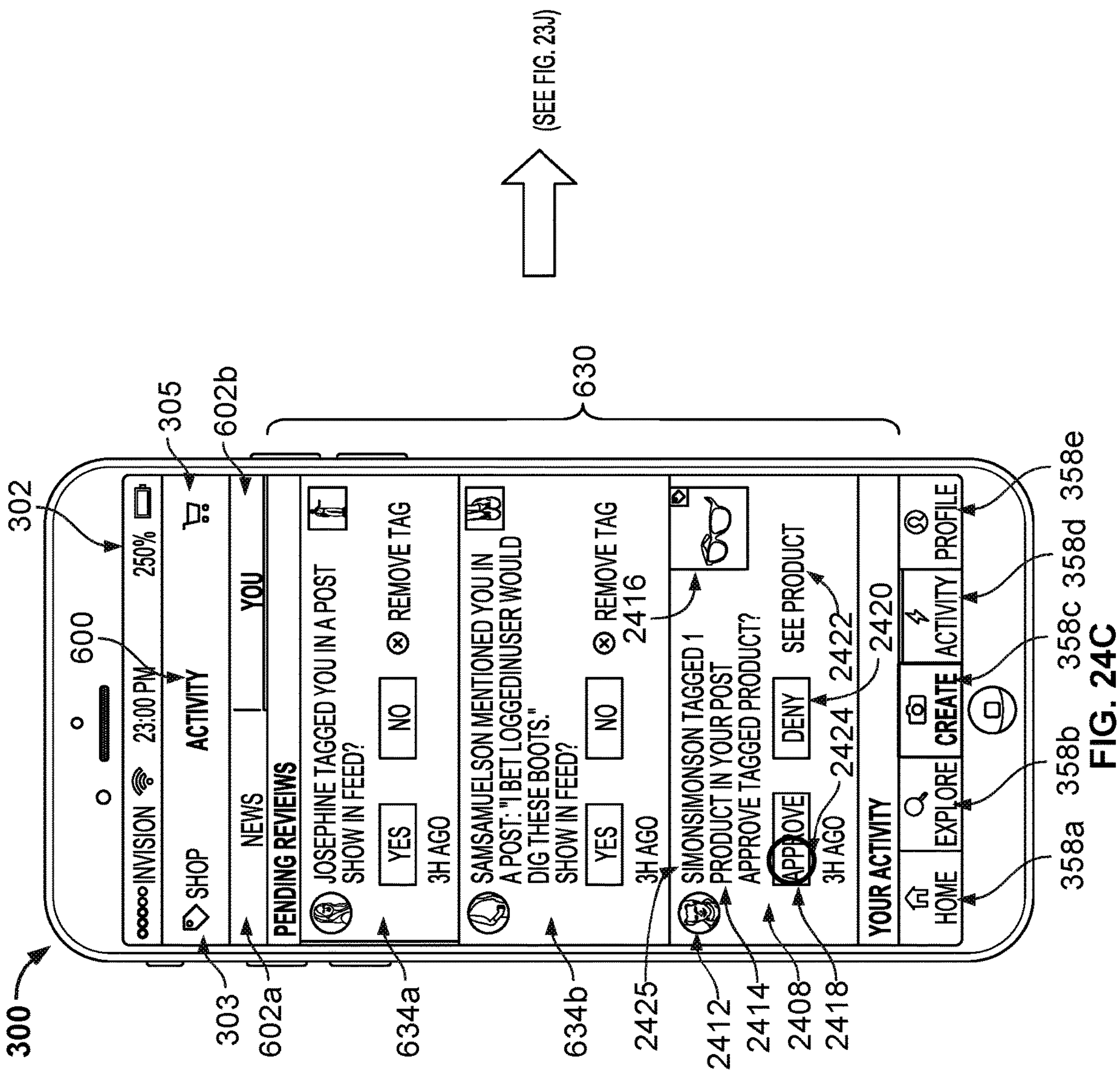

Referring to FIGS. 24A-C, a sequence of screenshots depicting user interactions with the GUI 501 to create a post on the example social-retail platform provided by the computer system 240 is depicted. Referring to FIG. 24A, the same state of the post creation from FIG. 23E is depicted, but in this instance, the user provides selecting input 2400 for the option 2336*b* to ask other users to assist the user creating the post in tagging products in the image 2306. After selecting the option 2336*b*, the user then provides additional selecting input 2402 to the post button 2331, which causes the computing device 300 to transmit the post to the server system 240 with an explicit request to leverage the user's social network to tag products in the post. Alternatively, the user could have not selected either of the options 2336*a* or 2336*b*, and the post would have been uploaded to the server system 240 without any product tags and without a request for other users to assist in tagging products.

In this example, the server system 240 can store the transmitted post from the computing device 300 in a similar manner to the storage described above, but in this instance the post can be stored with a flag to request other user assistance in tagging the product instead of storing a product tag and corresponding product element in association with the post. Referring to FIG. 24B, storing the flag with the post can cause the post to be presented on computing device 300 (and other computing devices) with selectable features 2404 and 2406 to request user assistance in tagging products in the post 2378. Unlike how the post 2378 was presented in FIG. 23J, in FIG. 24B the post 2378 does not include the indicators 2388*a-b* that a product was tagged. Additionally, horizontal scrolling with regard to the post 2378 will not cause a product element to be presented within the GUI 304 based on no products having been tagged in association with the post 2378. Selection of these features 2404 and/or 2406 (and/or other particular inputs, such as horizontal scrolling when the features 2404 and/or 2406 are presented) in the GUI 304 can cause an interface to identify product tags for the post 2378 to be presented, such as the product tagging interface presented in FIGS. 23F-H. Once a user (who can be different from the user who created the post 2378) has selected a product to tag (such as through the interface in FIGS. 23F-H), the tag can be provided to the user who created the post for approval before the tag is formally applied to the post 2378.

Referring to FIG. 24C, in response to a user proposing a product tag, an entry 2408 in the post creator's private ("you") activity feed 602*b* can be presented to obtain a decision from the creator on whether to apply the tag to the post 2378. For example, the entry 2408 includes information identifying the user who has suggested the post (2410, 2412), a link 2414 to view information on the product that has been tagged, a thumbnail image 2416 of the tagged product, an option 2418 to approval the proposed tag, an option 2420 to decline the proposed tag, and another link 2424 to view more product information. In the depicted example, user input 2424 selecting the approve option 2418 is received through the interface, which can cause the client computing device 300 to transmit approval for the product tag to the server system 240. Such approval can cause the server system 240 to store the product tag in association with the post 2378, as discussed above with regard to FIG. 23I. Once the product tag has been applied to the post 2378, then the post 2378 will appear in the GUI 304 with the product tag applied, as depicted in FIG. 23J.

Figure 25:
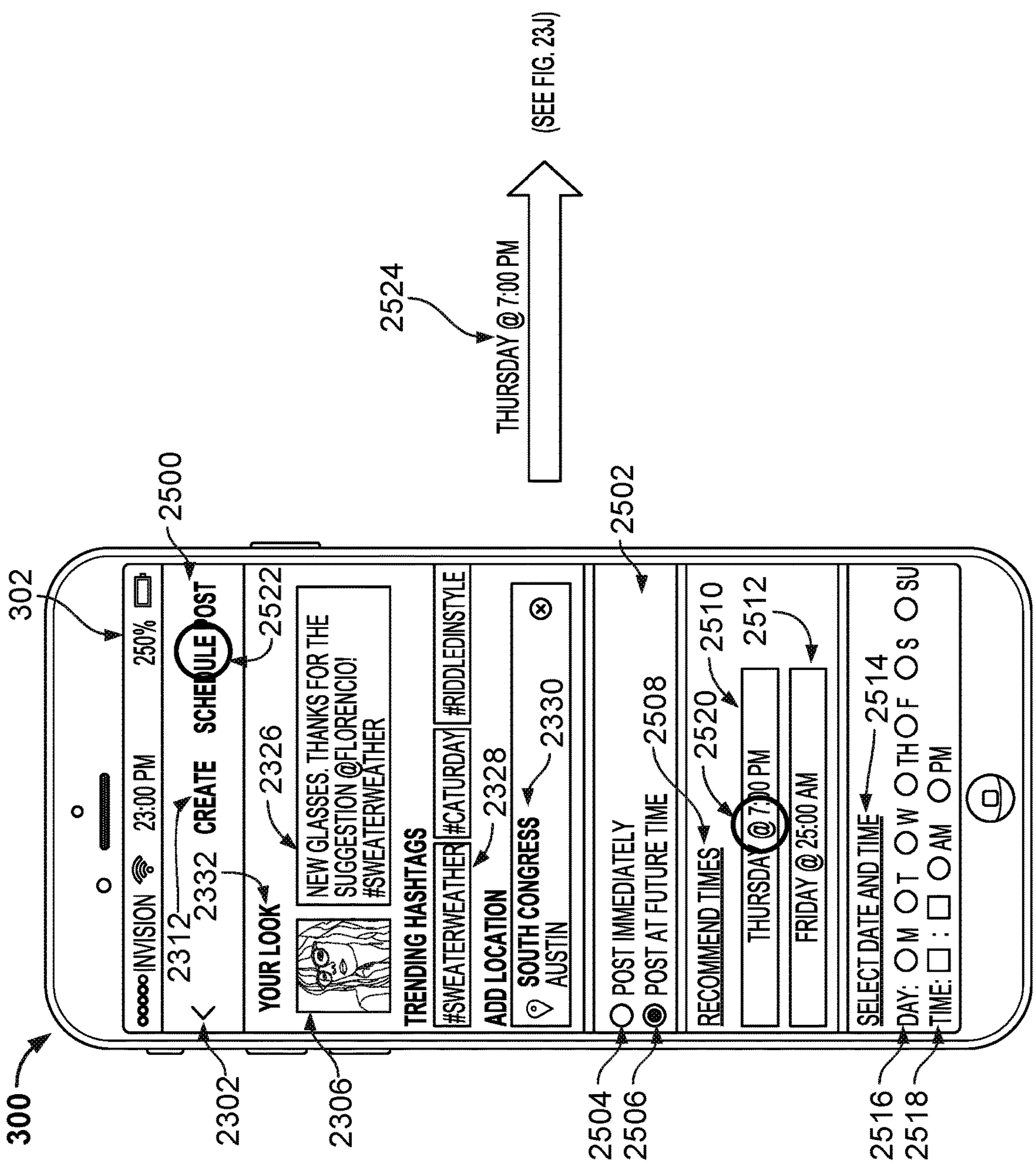
FIG. 25 depict a sequence of screenshots and user interactions with a GUI to create a post on an example platform.

Referring to FIG. 25, a sequence of screenshots depicting user interactions with the GUI 501 to create a time-scheduled post on the example social-retail platform provided by the computer system 240 is depicted. FIG. 25 depicts the same state of the post creation as in FIG. 23E, but in this example additional features 2500-2518 are added to schedule the post for a future time (as opposed to posting when the user selects the post button 2331). For example, the GUI 501 includes a section 2502 with selectable radio buttons 2504 and 2506 to allow a user to select between posting immediately and delaying the post until a future time. In the depicted example, the delay option 2506 is selected. The GUI 501 further includes recommended future days and times to post (2508), which in this example include Thursday at 7:00 pm (2510) and Friday at 25:00 am (2512). The times can be determined and recommended by the server system 204 based on a variety of factors, such as the past performance of posts (e.g., number of view, number of saves, number of product purchases, number of shares) by the user at various times and/or the past performance of posts by other users. The GUI 501 further includes options 2514 to allow a user to designate a specific day (2516) and time (2518) for the post to go live on the server system 240.

In the depicted example, the user selects (2520) the proposed option 2510 and then selects (2522) the schedule post feature 2500. This user input 2520-2522 causes the client computing device 300 to transmit the post with the delayed/future post information to the server system 240, which can schedule the post to go live (change from being private to public) at the user-designated time. For instance, as indicated by the arrow 2524, in the depicted example the server system 240 will delay the post from going live until Thursday at 7:00 pm (option 2510), at which point the post 2378 will be presented in the GUI 304 (as depicted in FIG. 23J) of the creator and/or other users (e.g., friends, followers) who are socially connected to the user who created the post 2378.

Figure 26:
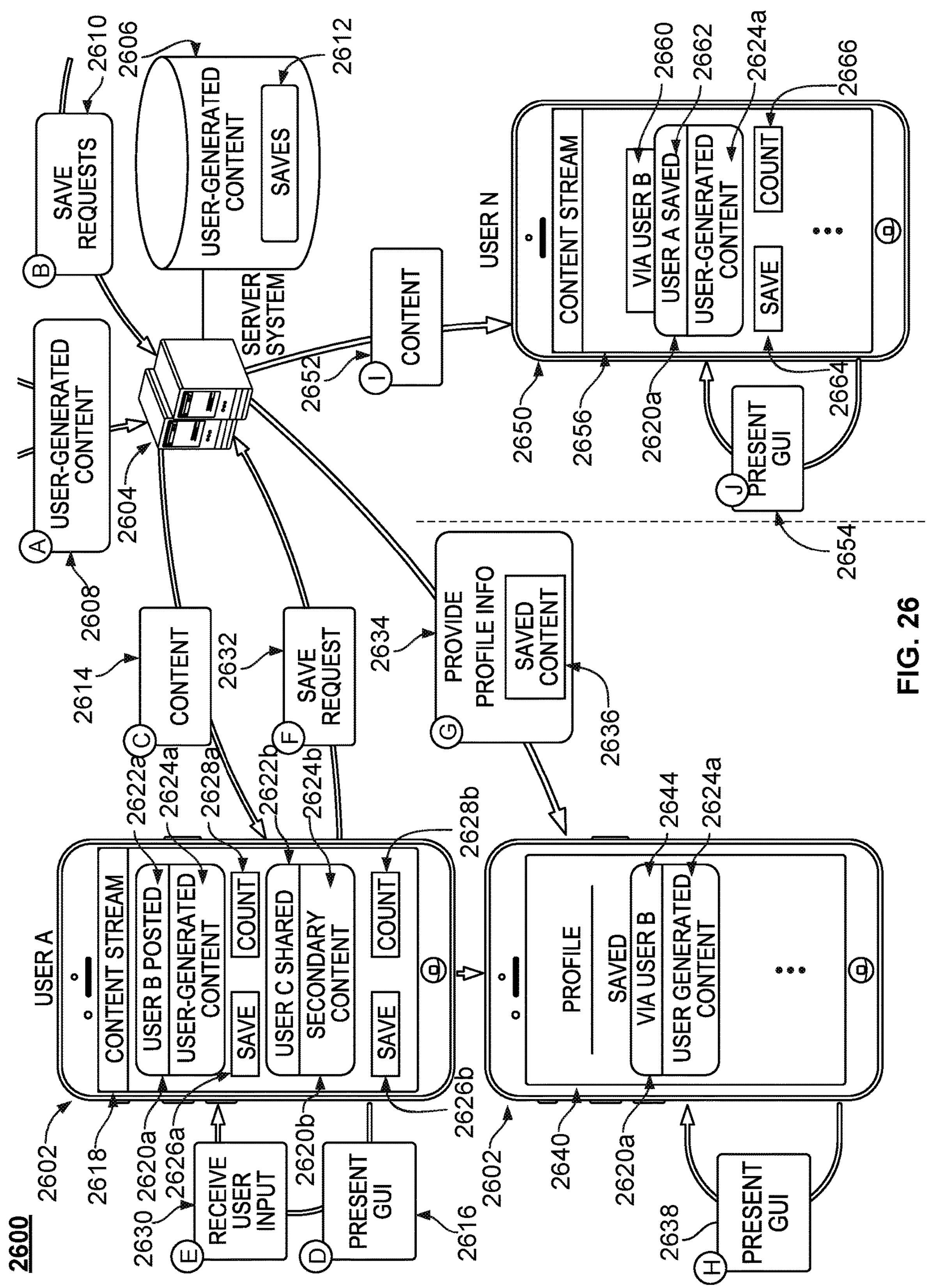
FIG. 26 is a conceptual diagram of an example system to provide an example GUI on an example client computing device.

Referring to FIG. 26, some embodiments of a system 2600 can be configured to provide example GUIs on example client computing devices 2602 and 2650 for presenting and interacting with content. In this embodiment, the GUI implementations that are depicted include an example content stream 2618 and an example profile page 2640 on a first computing device 2602, and an example content stream 2656 on a second computing device 2650. These example interfaces can present content, such as social media content (e.g., user posts, comments, shared content) and other types of content (e.g., product content, messaging content, productivity application content, news content), with controls that allow users to interact with each of the content items. User interactions with the content items, which can be of different types, can cause content to be presented, persistently or temporarily, in other interfaces for the user who interacted with the content or in interfaces for other users. For example, an example user A can be associated with the computing device 2602 and another user N can be associated with the other computing device 2650. User A's interactions with content included in the content stream 2618 on the computing device 2602 can cause that same content to appear, for instance, persistently in the example profile 2640 for user A and temporarily in the content stream 2656 for user N.

The computing devices 2602 and 2650 can allow users to interact with content in a variety of ways, such as through social interactions (e.g., share, save, comment) and other types of interactions (e.g., purchasing, messaging, productivity, news distribution) without exiting the GUIs to use other, specifically designed applications or interfaces. For example, instead of providing a GUI that presents a single type content (e.g., social media content and/or product-shopping content) and that links to/launches other applications/GUIs that for independently presenting other types of content, the respective GUI presented on each of the computing devices 2602 and 2650 can be programmed to contemporaneously present multiple types of content without necessarily linking to/launching another application/GUI for independently presenting one of the multiple types of content.

The computing devices 2602 and 2650 can be any of a variety of client computing devices, such as a mobile computing device (e.g., smartphone, tablet, wearable device, smartwatch), laptop computer, desktop computer, and/or other types of user computing devices. The computing devices 2602 and 2650 can communicate with a server system 2604 over one or more networks (e.g., internet, local area network (LAN), wide area network (WAN), virtual private network (VPN), wireless network, mobile data network, or any combination thereof) to obtain multiple different types of content that are presented in the GUIs. The server system 2604 can be a computer system (e.g., cloud computer system) that either by itself or through affiliate networks is able to serve and provide features for multiple different types of content, such as social media, messaging, e-commerce, and/or other types of content. For example, the server system 2604 may directly provide social networking features and can communicate with other affiliate computer systems to provide product-related features (e.g., reviews, purchasing, order tracking). In other examples, the server system 2604 may directly provide both social networking features and product-related features. Other configurations of the server system 2604 among one or more other computer systems are also possible.

As indicated by step A (2608), the server system 2604 can receive content, such as user-generated content and other types of content (e.g., merchant-provided product content, news content, messaging content). For example, the server system 2604 can receive social media content (e.g., posts, comments, shared content) from other client computing devices and can receive product-related content (e.g., product information, product images, product reviews) from merchant computer systems. The server system 2604 can store the received user-generated content in a data repository 2606 (e.g., cloud storage system), from which it can be served by the server system 2604A to the client computing device 2602. The server system 2604 can store other types of content as well.

As indicated by step B (2610), the server system 2604 can also receive save requests from other client computing devices. The save requests can relate to user-generated content received in step A (2608) and/or other types of content (e.g., retail content, productivity content, product content, news content), and can indicate a request from users to "save" particular content elements to user profiles and/or accounts (e.g., social networking profiles, user accounts on the server system 2604). Such save requests can cause the server system 2604 to add entries 2612 to the repository 2606 associating user accounts/profiles with particular content items as saved content. Such data entries 2612 can affect the way that the server system 2604 selects content for distribution to and presentation in GUIs on user devices. For example, a save request can cause content to be persistently saved in association with a user's account or profile on the server system 2604—meaning that it can be viewable in a persistent location over time (as opposed to being viewable within a continually changing interface, such as a content stream), such as being presented in an account/profile page for a user that is viewable by both the user and other users. Such persistent locations can additionally group different types of content elements that have been saved by a user, such as grouping social media content, product content, productivity content, news content, and/or other types of content that have been saved by a user. In another example, a save request by a user for a particular content item can cause the server system 2604 to distribute that item to other users (e.g., friends of the user, followers of the user), such as in content streams that are presented for the other users. Such saved content can be distributed in content streams with, for example, additional information annotating the saved content, such as with information (e.g., text, images, graphics, animations, icons) identifying that the identity of the user (e.g., profile photo, username, first and/or last name), the action taken by the user (e.g., saved the content element), information identifying the original creator/distributor of the content item (e.g., identifying the user/entity who originally created/distributed the content item that was saved), and/or other information.

The server system 2604 can provide content to the client computing device 2602, as indicated by step C (2614), which can be presented by the computing device 2602 in the example the content stream 2618, as indicated by step D (2616). The content can be selected by the server system 2604 for the user who is associated with the client computing device 2602 (e.g., user who is logged-in), which in this example is user A. For example, the server system 2604 can select content that has been generated (e.g., social media post) or otherwise interacted with (e.g., shared, saved, commented on, liked, viewed) by other users who are within a user's social network (e.g., friends, other users who are being followed, followers). The content can be of multiple different types and can be presented in a common GUI (content stream 2618). For instance, in the depicted example the content stream includes a user-generated content element 2620*a* (e.g., social media post, user-generated image/video, user-generated text) and a secondary content element 2620*b* (e.g., product information, news article, productivity project). The user-generated content element 2620*a* can include content (e.g., images, videos, text) that is generated by a user, whereas the secondary content element 2620*b* can include non-user generated content (e.g., merchant-generated content, news organization generated) that is associated with one or more user-generated content elements (e.g., tagged-in user-generated content, linked-to by user-generated content, shared as part of user-generated content element). For example, the secondary content element 2620*b* can be a product element that identifies a product that is tagged in a social media post (example user-generated content element) that includes a photo of a user wearing/using the product. In another example, the secondary content element 2620*b* can be a productivity element that identifies a coding project that is tagged in a social media post (example user-generated content) describing the project and opportunities to collaborate on the project. Other examples are also possible.

In the depicted example, the user-generated content element 2620*a* includes information 2622*a* identifying an action performed by another user that caused the element 2620*a* to be presented in the content stream 2618 (e.g., post, share, save, like, comment) and the user-generated content 2624*a* (e.g., image, video, text, hashtag). In this example, the content element 2620*a* is a post by user B with user-generated content 2624*a*. The user-generated content element 2620*a* is also presented with a selectable save feature 2626*a* through which the user of the device 2602 can save the content element 2624*a* in association with her profile/user account on the server system 2604. The user-generated content element 2620*a* also includes a count 2628*a* that indicates how many other users, globally (e.g., all users of the server system 2604) and/or locally (e.g., users within user A's social network, users within user B's social network, users within a combination of user A and B's social network), have saved the content element 2620*a*. The count 2628*a* can provide an indication of how many other users have been interested in persistently associating the content element 2620*a* with her account/user profile. Saving (persistently associating) may be considered to be a more significant GUI interaction with a content element and to more accurately represent a significant interest in a content element than, for example, merely "liking" or providing another reaction to a content element.

The example secondary content element 2620*b* includes similar features as the user-generated content element 2620*a*, including information 2622*b* identifying an action performed by another user that caused the element 2620*b* to be presented in the content stream 2618 (e.g., post, share, save, like, comment) and the secondary content 2624*b* (e.g., product information, productivity information, messaging information, news information). In this example, another user C "shared" the secondary content element 2620*b*, such as through a GUI presented on a client device through the server system 2604 (e.g., GUI similar to the content stream 2618) and/or through GUIs presented on third-party sites (e.g., selectable feature to share secondary content element via the server system 2604). The secondary content element 2620*b* is also presented with a selectable save feature 2626*b* through which the user of the device 2602 can save the secondary content element 2624*b* in association with her profile/user account on the server system 2604 (similar to saving the user-generated content element 2620*a*). The secondary content element 2620*b* also includes a count 2628*b* that indicates how many other users, globally (e.g., all users of the server system 2604, all users on another server system hosting the secondary content element 2620*b*) and/or locally (e.g., users within user A's social network, users within user B's social network, users within a combination of user A and B's social network), have saved the content element 2620*b*.

As discussed above, the content stream 2618 can include different types of content elements. These different types of content elements (relevant to user A of the computing device 2602) can be presented in and organized in any of a variety of ways in the content stream 2618. For instance, in the depicted example the user-generated content element 2620*a* and the secondary content element 2620*b* are depicted as being presented in sequence along a dimension of the content stream 2618, which in this example is a vertical dimension. Other presentations are also possible, such as presenting bi-directional content streams are oriented along a first dimension of the device 2602 and a substantially perpendicular second dimension of the device 2602. For example, content elements that are selected for presentation to the user A (e.g., content elements 2620*a-b*) can be presented along the vertical dimension of the content stream 2618 and other content elements that are related to the selected content elements (e.g., other content elements that are tagged in the content elements 2620*a-b*) can be presented in second, perpendicular content streams that are accessible along a horizontal dimension. For instance, if the user-generated content element 2620*a* tags secondary content elements, those secondary content elements can be accessible in the content stream 2618 by providing horizontally scrolling input (e.g., swipe left/right) provided with regard to the user generated content 2620*a*.

As indicated by step E (2630), in the depicted example the user of the computing device 2602 provides user input (e.g., touchscreen input, voice command, pointer selection, gesture-based input) selecting the save feature 2626*a* for the user-generated content element 2620*a*. In response to receiving the user input, the computing device 2602 transmits a save request regarding the content element 2620*a* to the server system 2604, as indicated by step F (2632). The server system 2604 can add a data entry 2612 to the repository 2606 in response to receiving the save request that associates the user A with the user-generated content element 2620*a*. Such save requests and data entries 2612 can include additional attributes, such as whether the save is public or private. A public save, for example, can create an association between the user A and the content element 2620*a* that is "publicly" viewable—meaning that it is viewable by other users who are socially-connected to the user A (e.g., friends of user A, followers of user A, being followed by user A) and/or to the user B who generated the content (e.g., friends of user B, followers of user B, being followed by user B), all users of the server system 2604, and/or other subsets of the user base on the server system 2604. A private save, for example, can create an association between the user A and the content element 2620*a* that is "privately" viewable—meaning that it is only viewable to the user A. Content can be saved by default as public or private, and can be changed through user designations on the server system 2604. Other attributes for the data entries 2612 can additionally and/or alternatively be used.

As discussed above, such a data entry 2612 can cause the server system 2604 to persistently associate the content element 2620*a* with an account/profile for the user A, which may or may not be viewable to users other than user A depending on attributes for the data entry 2612 (e.g., private or public save attributes). As indicated by step G (2634), the server system 2604 can provide profile information for user A to the computing device 2602 that is associated with user A (e.g., user A can view her profile on with the system 2604). Such profile information can include saved content 2636, which can be received by the computing device 2602 and presented in the profile page 2640 (example GUI), as indicated by step H (2638). For example, the profile page 2640 for the user A in this example includes a "saved" portion of the profile that includes the user-generated content element 2620*a* that was saved in the content stream 2618 (via user input received through step E (2630)). In this example, the content element 2620*a* includes information 2644 attributing the content element 2620*a* to the user B (who created the content element in this example) and the user-generated content 2624*a*. The content element 2620*a* can be presented to the user A in her profile page 2640 regardless of whether the content element 2620*a* was saved publicly or privately. However, other users may or may not be able to view the content element 2620*a* in the profile page 2640 for the user A depending on whether the content element 2620*a* was saved publicly or privately (or some other attribute designation) by the user A.

As also discussed above, the data entry 2612 for the saved content element 2620*a* can additionally cause the server system 2604 to distribute the saved content element 2620*a* to other users, such as the user N who is associated with the computing device 2650. For example, the computing device 2650 can present a content stream 2656 for user N that is similar to the content stream 2616 for user A. In presenting the content stream 2656, the computing device 2650 can request content from the server system 2604 that is relevant to user N. In response to such a request, the server system 2604 can select and distribute content to the computing device 2650, as indicated by step I (2652). In response to receiving the content, the computing device 2650 can present the content in a GUI (the content stream 2656), as indicated by step J (2654). In the depicted example, one of the content items that has been selected and distributed to the computing device 2650 by the server system 2604 is the content element 2620*a* that was saved by the user A. For example, the server system 2604 can determine that the user N can be socially-connected to the user A (e.g., friend of user A, follower of user A, being followed by user A) and can select content elements that the user A has created or otherwise interacted with (e.g., saved, liked, commented on, shared, viewed, reacted to) for distribution in the content stream 2656 for the user N. The content element 2620*a* is presented in the content stream 2656 with information 2660 attributing the content element 2620*a* to the user B (example original creator of the content element 2620*a*), information 2662 identifying the socially-connected user and the action that user performed with regard to the content element 2620*a* (e.g., user B saved the content element 2620*a*) to cause it to appear in the content stream 2656, and the user generated content 2624*a*.

The content element 2620*a* is additionally presented in the content stream 2656 with a selectable save feature 2664 (similar to the save features 2626*a-b*) and an updated count 2666 (similar to the counts 2628*a-b*) indicating a current number of times that for the content element 2620*a* has been saved. For example, the user N can select the save feature 2664 to also save the content element 2620*a*, which can cause the content element 2620*a* to be persistently associated with the account/user profile for user N and/or to be distributed to other users who are socially-connected to the user N (similar to the association in user A's profile 2640 and distribution to the computing device 2650 from user A saving the content element 2620*a* described above). If user N were to save the content element 2620*a* through the save feature 2664, the user B (original creator) can similarly be attributed to the content element 2620*a* in association with the user N saving the content element 2620*a* (e.g., information 2644, information 2660) even though the content element 2620*a* directly appeared in the content stream 2656 based on user A's actions. Such attribution through graphical elements presented in the GUIs on the computing devices 2602 and 2650 can allow original content creators to continue to be identified as having created particular content items as their content is distributed to users inside and outside of their social network.

FIGS. 27A-L, 28A-C, 29A-C, 30, and 31 are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the system 2600 and the example GUIs (content streams 2618 and 2656, and the profile page 2640) described above with regard to FIG. 26 on a social-retail platform. For example, the user-generated content element 2620*a* in the content stream 2618 can be social posts/content elements and the secondary content element 2620*b* can be product content elements as described with regard to FIGS. 3A-B, 4A-B, 5A-B, 6A-B, 7A-B, 27A-L, 28A-C, 29A-C, 30, and 31.

Figures 27A, 27B:
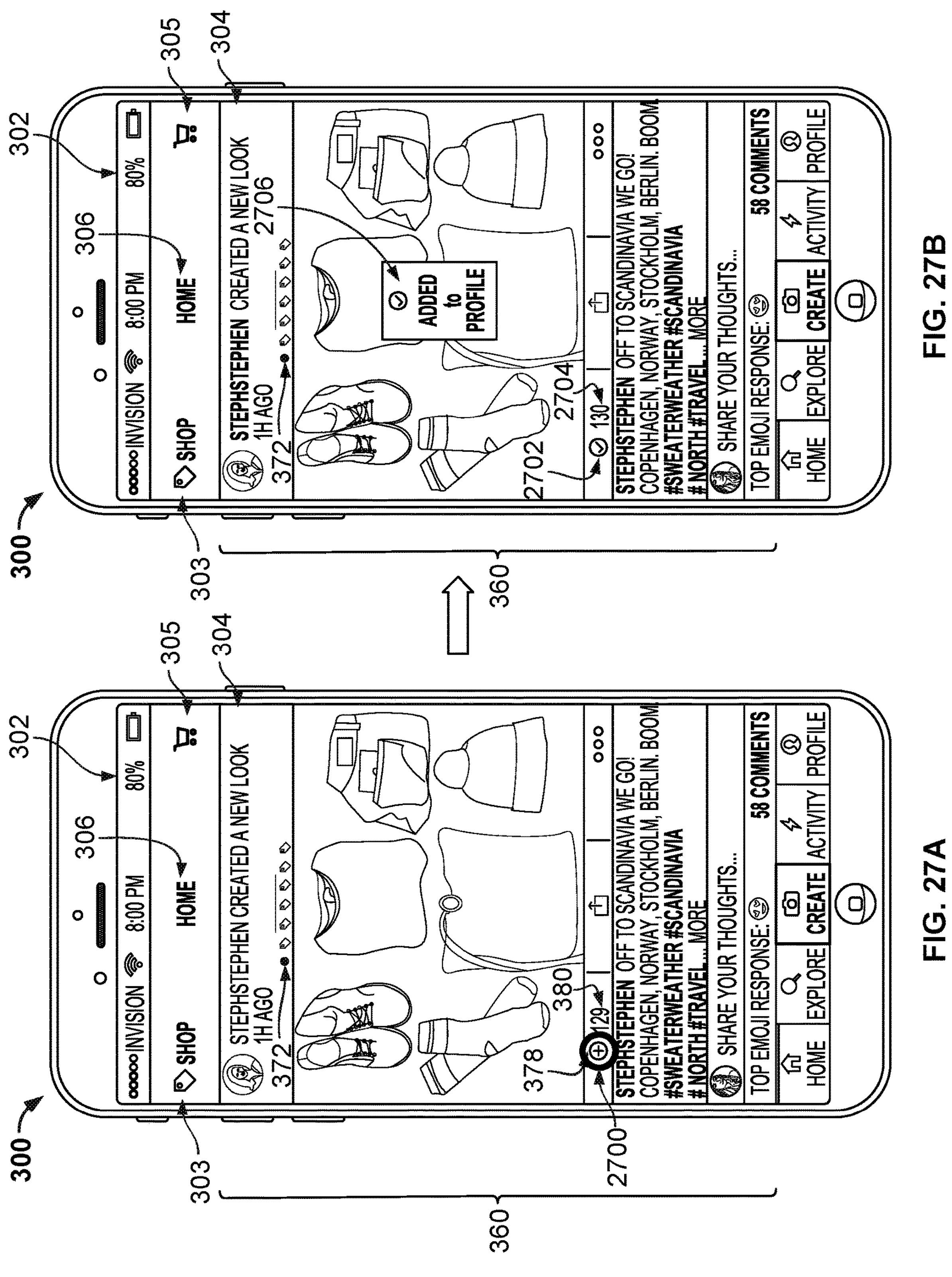
FIGS. 27A-L depict a sequence of screenshots and user interactions with a GUI for a home feed on an example platform.

Referring to FIGS. 27A-L, a sequence of screenshots depicting user interactions with the GUI 304 for the home feed and the GUI 701 for the user profile on an example social-retail platform provided by the computer system 240 is depicted. Referring to FIG. 27A, the user provides selecting input 2700 to the save icon 378 that is presented with the social post 360 and within the social feed of the GUI 304. Referring to FIG. 27B, the selecting input 2700 causes the social post element 360 to be saved in association with the logged-in user's account on the social-retail platform, as indicated by the save icon 378 changing to a checkmark icon 2702 and the save counter incrementing from "129" (380) to "130" (2704). As described above with regard to FIGS. 26 and 7A-B, saving can cause the social post 360 to appear in posts tab 722 in the profile GUI 701. The social post 360 can additionally appear in the home feeds (e.g., saved content element 2620*a* in the content stream 2656) and activity feeds (e.g., activity feed element 606*d*) of other users who are socially connected (e.g., following, friends) with the logged-in user (see FIG. 30).

The social post 360 can be saved locally on the computing device 300 and/or remotely by the computer system 240. For example, in response to receiving the selection 2700 of the save icon 378, the computing device 300 can transmit a request to the computer system 240 to save the social post 360 in association with the logged-in user and/or the computing device 300. In another example, the computing device 300 can maintain local data social posts that are saved in association with the user account. In such an example, saving the social post 360 can include the computing device 300 appending information for the post 360 (e.g., unique identifier for the post) to the local save post/product data. Confirmation that the post 360 has been successfully added to logged-in user's profile can be determined by the absence of an error in the adding/appending process and/or through polling the local data to verify the presence of the post 360.

Figure 27D:
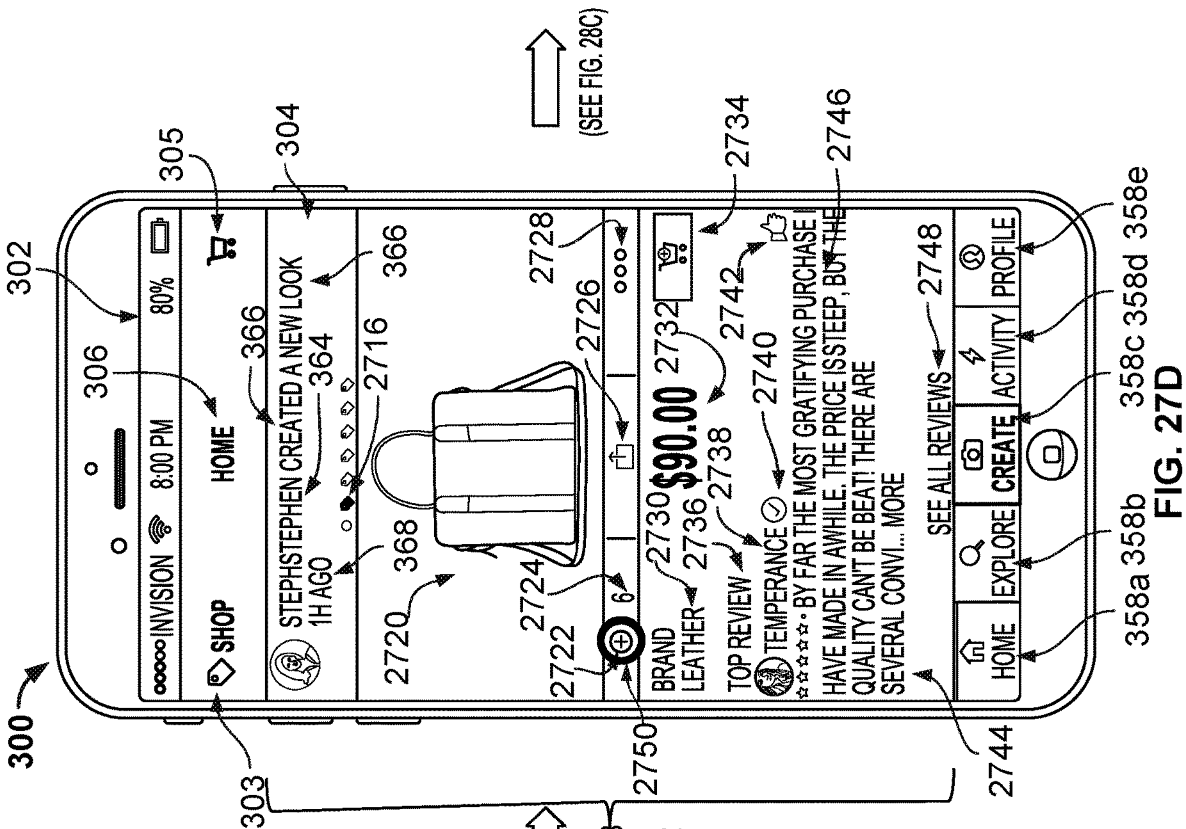
Figure 27C:
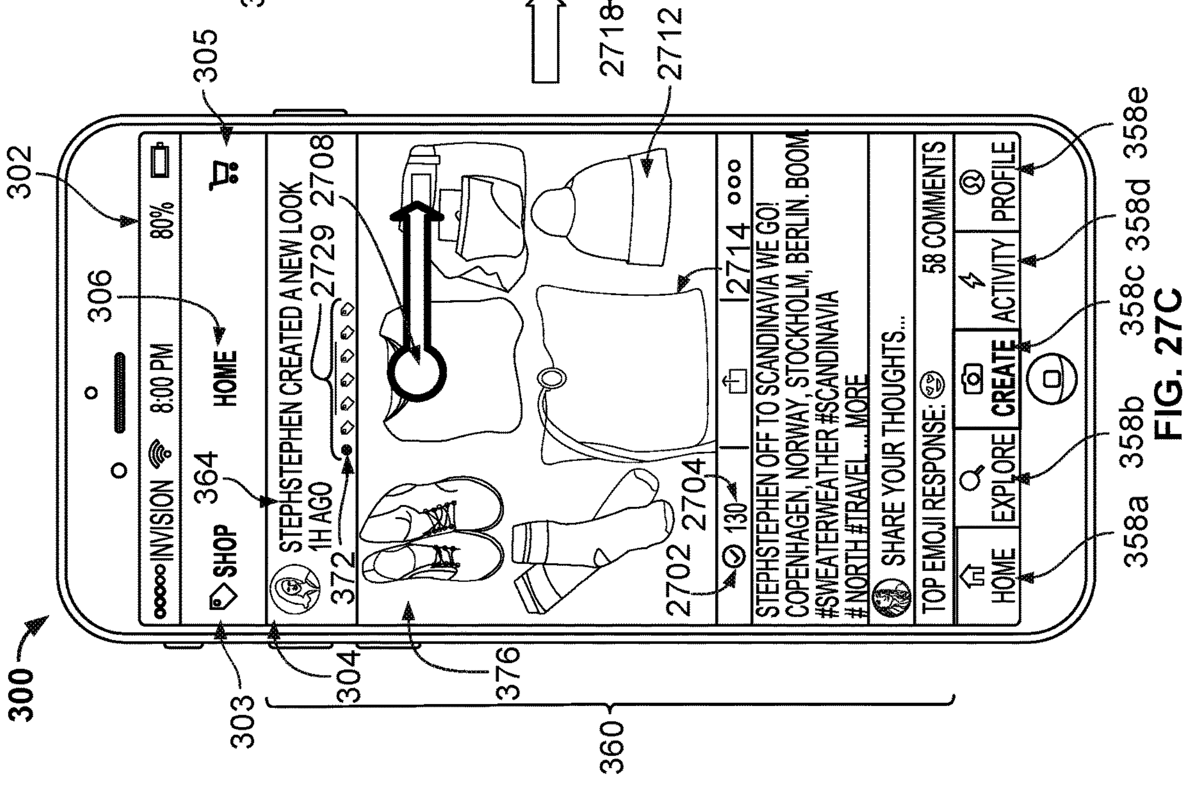

Referring to FIG. 27C, the GUI 304 depicts the horizontal scrolling input 2708 being received with regard to the social post 360 after it has been saved to the logged-in user's account. As described above with regard to FIG. 3B, the social post 360 includes six product tags for the collection of products, including a knit hat 2712 and a bag 2714, that are depicted in the user-generated image 376 (digital photo), which are indicated by visual indications 2710 of six associated product elements. These associated product elements can be accessible within the GUI 304 and its content stream (example of the content stream 2618) by horizontally scrolling in the GUI 304 along a perpendicular content stream. As depicted in this example, user input 2708 is provided to the GUI 304 in the form input to scroll to the right (e.g., swipe left in the GUI 304 to cause the content to scroll to the right) along the perpendicular content stream. For instance, as indicated by the icon 372 (which corresponds to the social post 360 in the perpendicular content stream) being highlighted/bold, the GUI 304 is currently showing the graphical element at the leftmost end of the perpendicular content stream. A user can provide right scrolling input until the graphical element at the rightmost end (corresponding to the rightmost product icons 2710) of the perpendicular content stream is reached (or in implementations where the perpendicular content stream is "infinite," can continue to provide right scrolling input to cause the device 300 to retrieve additional content).

Referring to FIG. 27D, in response to receiving the user input 2708, the GUI 304 can cause the perpendicular content stream to scroll to the right and to display the product content element 2718, which corresponds to the product icon 2716 (now highlighted/bold to indicate a current position along the perpendicular content stream). The example product content element 2718 includes an image 2720 for the product 2714 depicted and tagged in the social post 360. The image 2720 can be a merchant or manufacturer-provided image (as opposed to a user-generated, such as a photograph taken by a user). The image 2720 can be, for example, an image that is presented for the product 2714 on online stores/retailers and in online advertisements.

Like the social post 360, the product element 2718 includes controls 2722-2728 through which users can interact with the product 2714. For example, the controls include a selectable element 2722 ("+" button, example of the selectable save features 2626*a-b* and 2664) through which a user can "save" the product element 2718 to her profile (see FIG. 7B). The selectable button 2722 is paired with a counter 2724 (example of the counter elements 2628*a-b* and 2666) that identifies a number of other users who have already saved the product element 2718. The controls further include another selectable element 2726 (share icon) that can be selected to share the product element 2718 either inside or outside of the social-retail platform provided by the computer system 240. For example, the user can select the element 2726 to share the product element 2718 with other users within the social-retail platform provided by the computer system 240, and/or to share the product element 2718 on other social media platforms (e.g., FACEBOOK, TWITTER, PINTEREST). The controls also include another selectable element 2728 (ellipses icon) that includes additional features that can be performed with regard to the product element 2718 (e.g., transmit message with product information, flag as inappropriate).

The product element 2718 further includes product information, such as a merchant 2730 providing the product and a current price 2732 for the product. The merchant information 2730 can be selectable and can cause information about the merchant, such as user ratings for the merchant and other products offered by the merchant, to be presented (e.g., presented in an online store for the merchant either inside or outside of the social-retailer platform). The product element 2718 additionally includes a selectable shopping cart icon 2734 that a user can select to add the product 2714 that is depicted in the social post 360 to the virtual shopping cart indicated by the icon 305. For example, by selecting the shopping cart icon 2734, the product 2714 can be added to the shopping cart from within the social feed presented in the GUI 304 (without using another application or otherwise exiting the GUI 304). A user can, for instance, add the product element 2718 to the shopping cart and then continue scrolling vertically along the social feed or horizontally along the product feed (without having to reopen or refocus the computing device 300 on the GUI 304).

The product element 2718 further includes a review section with user reviews for the product 2714. The review section includes a "top review" portion 2736, which in this example is a review by user 2738 who is a member of the social-retail platform (as indicated by the icon 2740). The review section further includes a selectable icon 2742 to indicate whether this review is helpful/useful, a rating 2744 that the user 2738 gave the product, and a textual review 2746 of the product. The review section also includes a selectable element 2748 to expand/view all reviews (not just the top review 2736). The product reviews can be from one or more user groups, such as users who are part of the social-retail platform and/or users of one or more online retail stores where the product 2714 is offered.

Figures 27E, 27F:
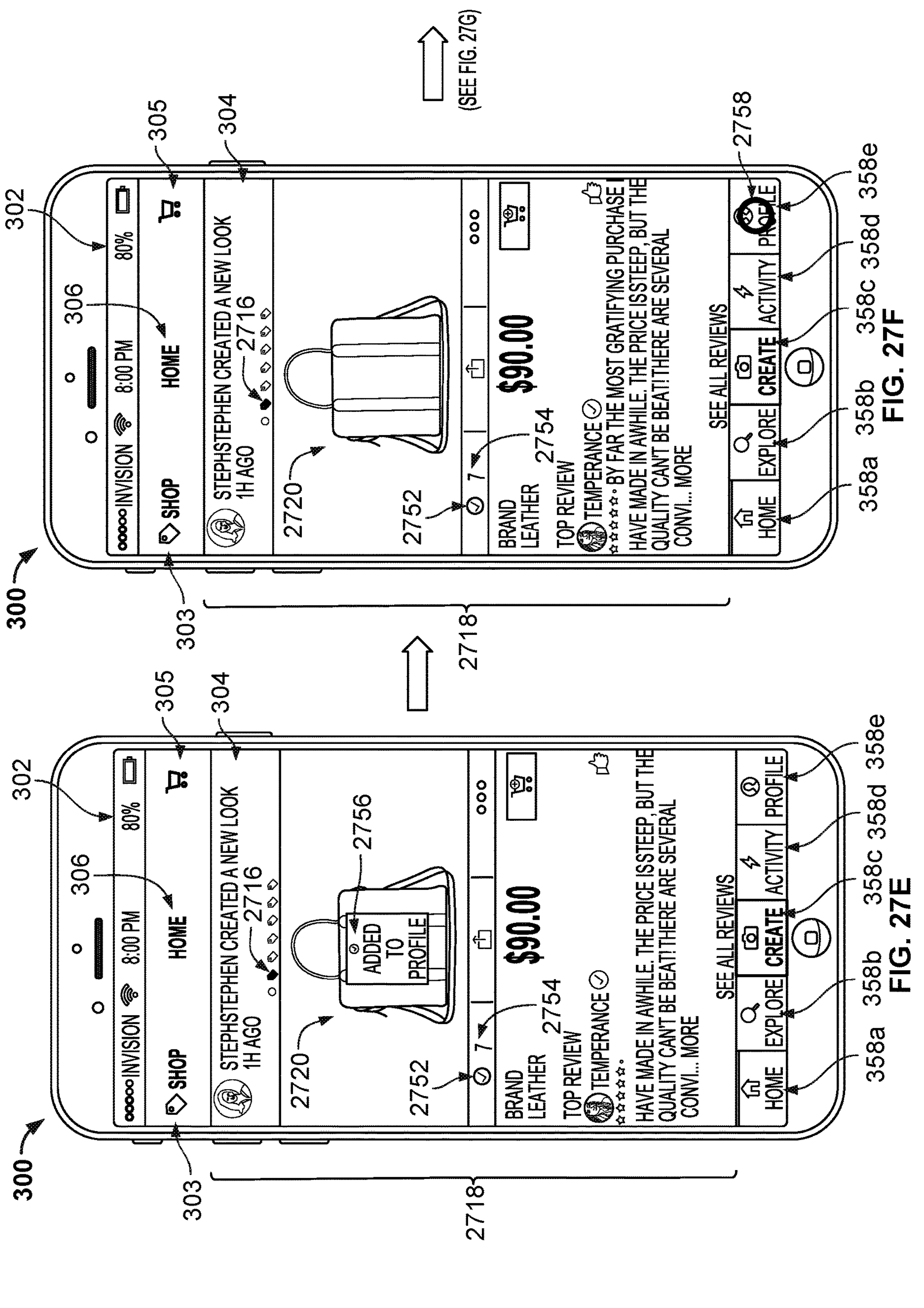

In the depicted example, the user provides selecting input 2750 to the save icon 2722 that is presented with the product element 2718 and within the social feed of the GUI 304. Referring to FIG. 27E, the selecting input 2750 causes the product element 2718 to be saved in association with the logged-in user's account on the social-retail platform, as indicated by the save icon 2722 changing to a checkmark icon 2752, the save counter incrementing from "6" (2724) to "7" (2754), and the save confirmation message 2756 being presented in the GUI 304.

Similar to saving the social post 360 (described above with regard to FIGS. 27A-B), saving can cause the product element 2718 to appear in product tab 724 in the profile GUI 701. The GUI 304 can allow for different types of content, like the user-generated social post 360 and the product element 2718, to be presented and saved within a common GUI 304, and to be saved for persistent association and common presentation in the user profile GUI 701. Additionally, the GUI 304 can allow for user-generated content (e.g., the social post 360) and particular product elements (e.g., product element 2718) to be saved independently and separately from each other, regardless of whether they are tagged by each other. For instance, the example user input 2700 and 2750 causes the social post 360 and the product element 2718 to be saved independently from each other in association with the logged-in user account. Such saves can be distributed independently by the server system 240 (e.g., distributed as separately in social feeds and activity feeds of other users) and to be accorded separate associations with the logged-in user's account.

Similar to the social post 360, the product element 2718 may be saved by default as "private" (740) or "public" (742) depending on the user's settings (e.g., user may designate that saved products default as either public or private) and/or settings on the computer system 240 (e.g., default saved products as private or public). Additionally or alternatively, the user may be presented with an option to save either publicly or privately when selecting the save icon 2722. If the product element 2718 is saved publicly, then the product element 2718 can additionally appear in the home feeds (e.g., content element 2620*a* in the content stream 2656) and activity feeds (e.g., activity feed element 606*d*) of other users who are socially connected (e.g., following, friends) with the logged-in user (see FIG. 31).

Similar to the description above with regard to saving the social post 360, the product 2714 can be saved locally on the computing device 300 and/or remotely by the computer system 240. For example, in response to receiving the selection 2750 of the save icon 2722, the computing device 300 can transmit a request to the computer system 240 to save the product element 2718 in association with the logged-in user and/or the computing device 300.

Figure 27H:
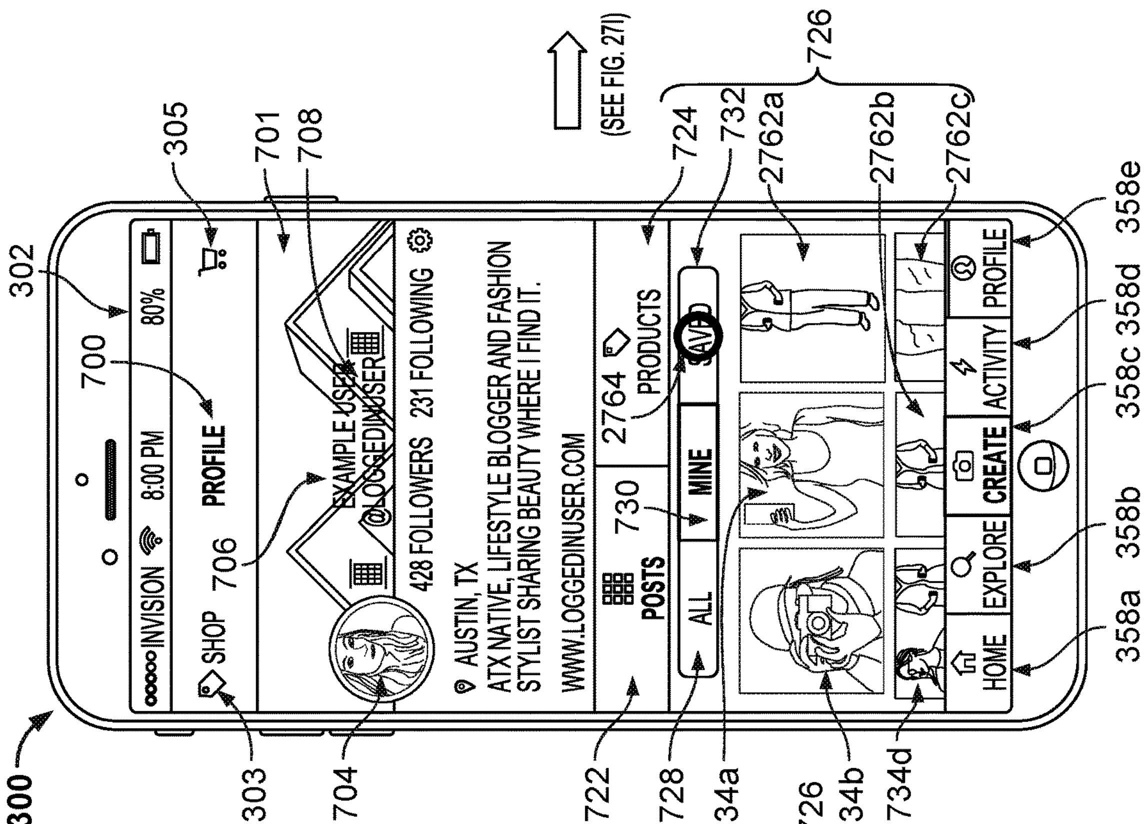
Figure 27G:
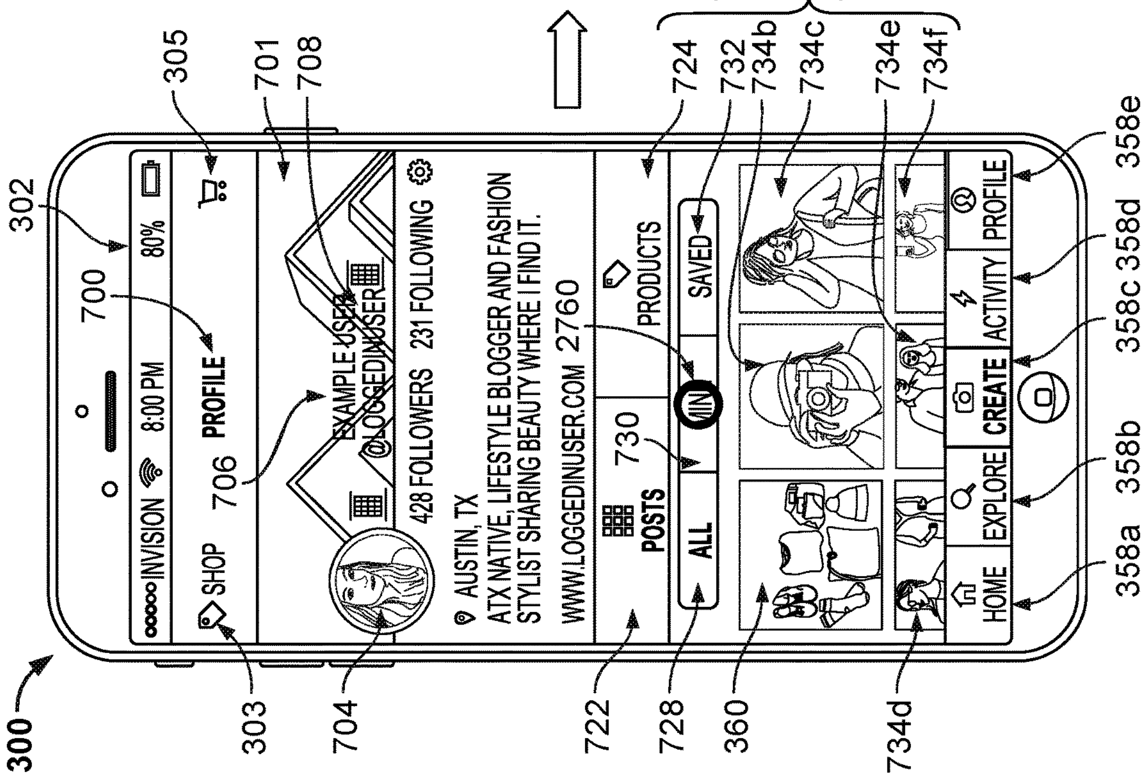

Referring now to FIG. 27F, after saving the social post 360 and the product element 2718, the user provides selecting input 2758 with regard to the profile icon 358*e* to navigate to the profile for the logged-in user. Referring now to FIG. 27G, in response to selecting the profile icon 358*e*, the profile GUI 701 is presented for the logged-in user, who is identified as example user "Molly Jones" (706) with example username "memyselfandi" (708) and profile picture 704. In the depicted example, the post tab 722 is selected (products tab 724 is deselected) and the all button 728 is selected (mine button 730 and saved button 732 are deselected). As described above, selection of the button 728 causes the GUI 701 to present all posts created and saved by the user, which in this example "memyselfandi" (708). In the depicted example, the post 360 is presented among a group of example posts 734*b-f* in an post area 726 of the GUI 701 for the logged-in user 708 based on the post 360 being saved by the user input 2700 received through the GUI 304, as described above with regard to FIGS. 27A-B.

Example user input 2760 selecting the mine button 730 is received through the GUI 701, which causes the GUI 701 to present only posts that were created by the user 708. Referring to FIG. 27H, a collection of posts (example posts 734*a-b*, 734*d*, 2762*a-c*) that the logged-in user 708 created are presented in the post area 726 of the GUI 701 in response to the user input 2760. The saved post 360 is not depicted in this area based on it having been saved by the user 708 instead of being created by the user 708.

Figure 27J:
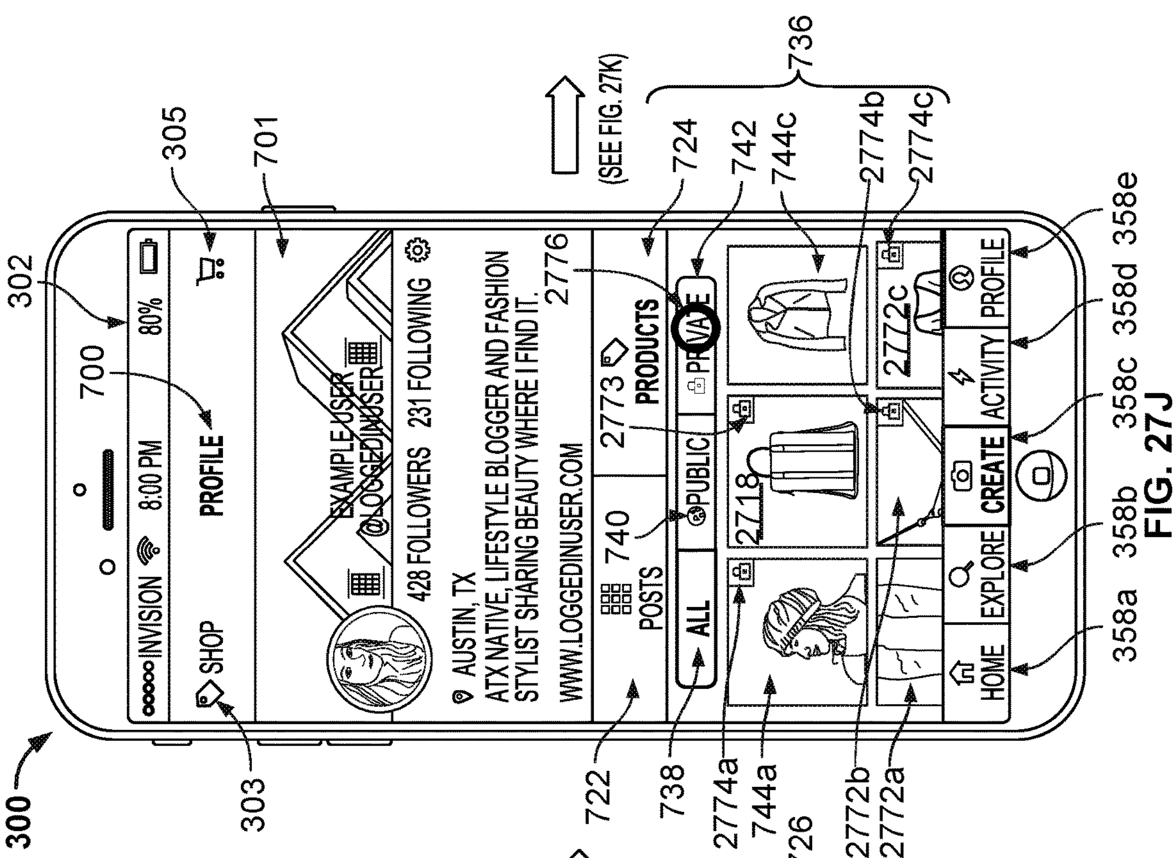
Figure 27I:
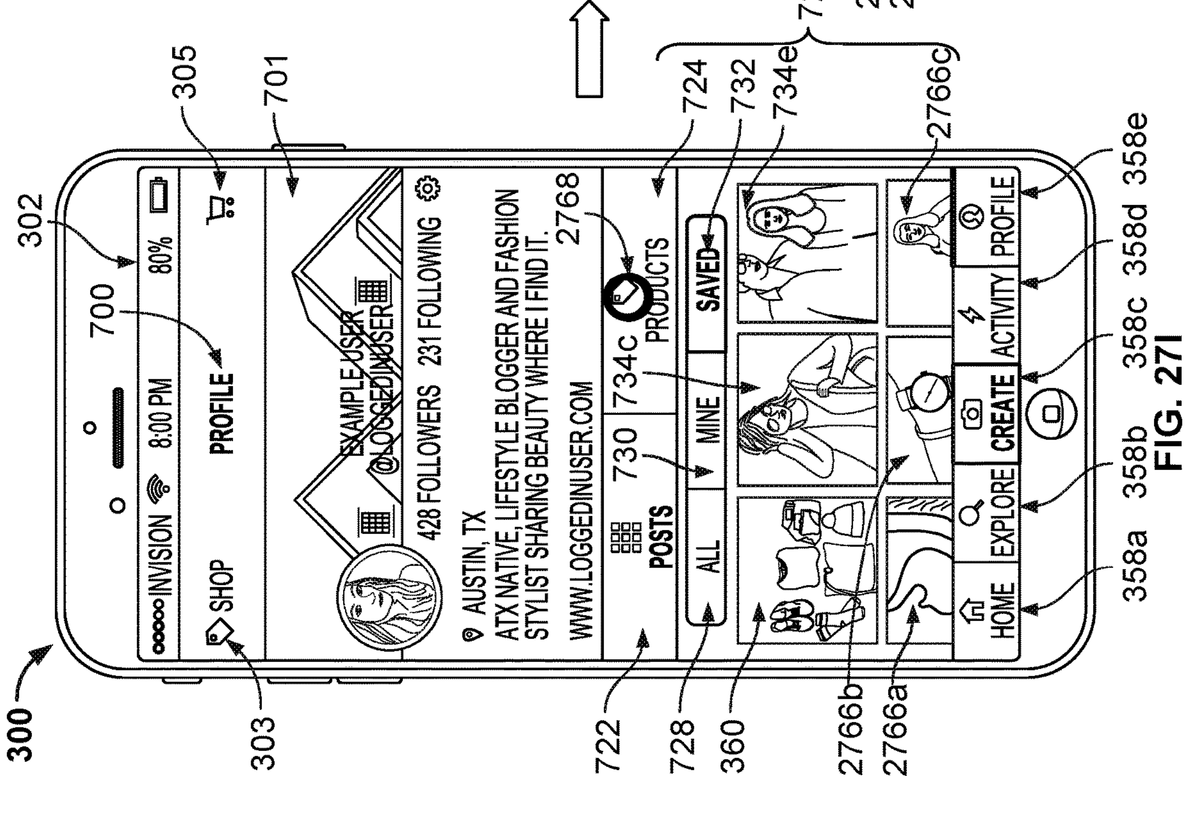

Example user input 2764 selecting the saved button 732 is received through the GUI 701, which causes the GUI 701 to present only posts that were saved by the user 708. Referring to FIG. 27I, a collection of saved posts (360, 743*c*, 734*e*, 2766*a-c*) are presented in the post area 726. Each of these posts can have been saved in the same or similar manner as the post 360 was saved, as described above with regard to FIGS. 27A-B. Although the saved posts are depicted as including simply thumbnails of the user-generated images that are part of the posts, other graphical features can additionally and/or alternatively be presented in the post area 726, such as current save counts for each of the posts, information identifying a user who created the posts, information identifying actions that the logged-in user has taken with regard to the posts (e.g., date when the logged-in user saved the post, comments, shares, reactions, purchases of products tagged in the posts, product reviews and/or ratings for products tagged in the posts), one or more top reactions to the posts (e.g., one or more top emoji responses in the comments for the posts), information identifying changes in status for products tagged in the posts (e.g., information identifying current discounts and/or other promotions for the tagged products, information identifying limited remaining quantities of the tagged products), and/or other relevant information. One or more of these information items can be selected and presented with the posts in the post area 726, and can allow users to receive updates on saved posts and products tagged in saved posts without having to select each post individually. Each of the posts identified in the post area 726 are also selectable and can present the posts in an interface similar to the GUI 304 to present additional information regarding the selected post.

Example user input 2768 selecting the products tab 724 is received through the GUI 701, which causes the GUI 701 to present the product elements that the logged-in user 708 has saved. Referring to FIG. 27J, in response to receiving the input 2768, the buttons 738-742 for viewing all saved product elements (button 738), privately saved product elements (button 740), and publicly saved product elements (button 742) are presented in the GUI 701, along with the corresponding saved product elements in the product area 736. In the depicted example, the all button 738 is selected and all saved products elements are depicted, including the product element 2718 that was saved based on the user input 2750 described above with regard to FIGS. 27D-E. The depicted saved products include both privately saved products 744*a*, 2718, 2772*b*, and 2772*c*, which are indicated as being privately saved based on the lock icons 2773 and 2774*a-c* being depicted. The saved products also include publicly saved products 744*c* and 2772*a*, which do not have lock icons. As discussed above, publicly saved product elements can be viewable by other users viewing the profile of the logged-in user 708 and/or can be distributed to other users, such as through their social and/or activity feeds. Privately saved product elements, however, may only be viewable by the logged-in user, such as in the profile GUI 701. In the depicted example, the saved product element 2718 is privately saved, which may be the designation by default for newly saved product elements (e.g., based on user settings, system settings, device settings, and/or other configurations).

Figure 27L:
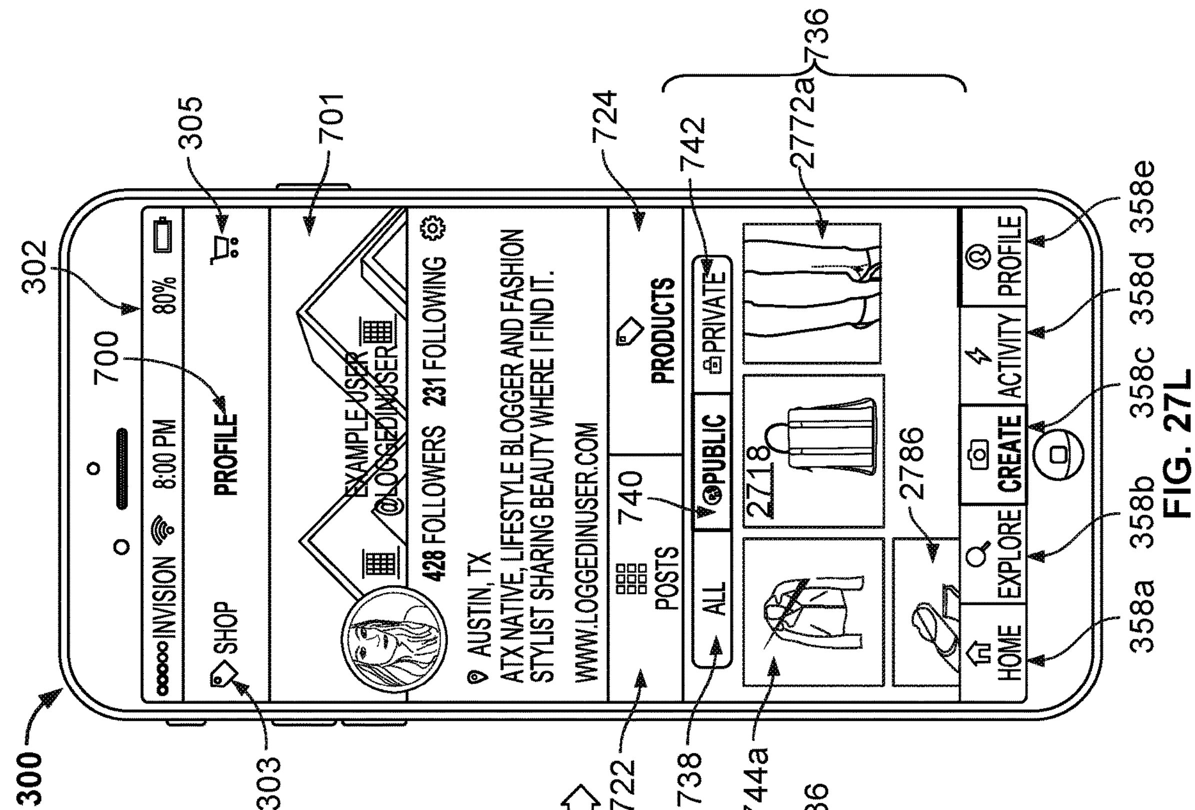
Figure 27K:
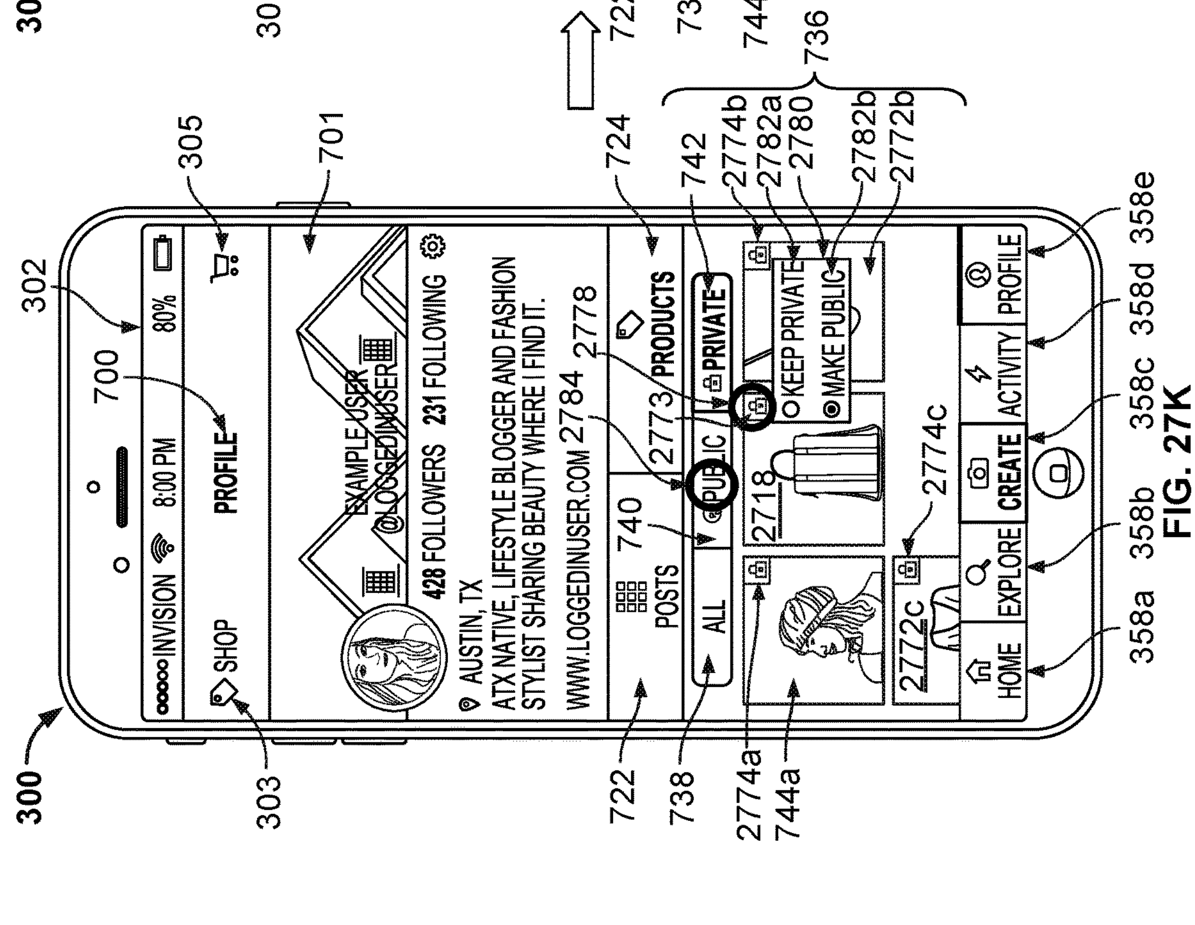

Example user input 2776 selecting the private button 742 is received through the GUI 701, which causes only privately saved product elements to be presented in the product area 736. Referring to FIG. 27K, only privately saved product elements are presented in the product area 736 in response to receiving the user input 2776. In this example, the icons 2773 and 2774*a-c* are selectable, which can cause the GUI 701 to present an interface through which a user can toggle between private and public designations. Example user input 2778 selecting the icon 2773 is received, which causes the interface 2780 to be presented. The interface 2780 includes selectable options 2782*a-b* to either keep the product element 2718 either privately saved (2782*a*) or to change it to being publicly saved (2782*b*). In this example, the user selects the 2782*b* option to designate the product element 2718 as being publicly saved for the logged-in user's account, which causes the product element 2718 to no longer be presented with the other privately saved product elements. Example user input 2784 selecting the public button 730 is received to view the publicly saved product elements. Referring to FIG. 27L, in response to the user input 2784 the publicly saved products are presented in the product area 736, which now includes the product element 2718 based on the user input selecting the public save option 2782*b*.

Although not depicted, the saved product elements in the product area 736 can include additional information in association with saved product elements. For example, other graphical features can additionally and/or alternatively be presented in the product area 736, such as current save counts for each of the products, information identifying users and/or social posts that have tagged product elements, information identifying actions that the logged-in user has taken with regard to the product elements (e.g., date when the logged-in user saved the product element, comments, reviews, ratings, shares, reactions, product purchases), one or more top reactions to the product elements (e.g., one or more top emoji responses in the comments for the product elements), information identifying changes in status for product elements (e.g., information identifying current discounts and/or other promotions for the products, information identifying limited remaining quantities of the products), and/or other relevant information. One or more of these information items can be selected and presented with the product elements in the product area 736, and can allow users to receive updates on saved product elements without having to select each product individually. Each of the product elements identified in the product area 736 are also selectable and can present the product in an interface similar to the GUI 304 and/or in other interfaces, such as the example interface depicted in FIGS. 28A-C.

The graphical elements and features (e.g., tabs 722-724, buttons 728-732, buttons 738-742, display areas 726 and 736) presented in the profile GUI 701 allow for users to view different types of saved content elements—saved social posts and product elements in the depicted examples—in combination with each other within a single interface. Additionally, these features allow for users to readily navigate and locate relevant saved items, such as through narrowing the set of saved items that are depicted in the GUI to a smaller group based on selection of the tabs 722-724 and the buttons 728-732 and 738-742. Other features for organizing and locating saved content elements in the GUI 701 are also possible, such as search fields, automatic categorization (see FIGS. 29A-C), and other graphical elements/features to allow users to readily view a subset of all saved content based on, for example, user-designated parameters.

Information about saved posts and product elements (and other content elements) can additionally be output in the activity feed GUI 601 described above with regard to FIGS. 6A-B. For example, updates related to the saved post 360 (e.g., new comments on the post 360, updated emoji icon summary for the post 360, new products tagged in the post 360 by the post creator and/or other users, discounts or other promotions related to the tagged products in the post 360) can be provided by the computer system 240 to the computing device 300 and output in the news tab 602*a* and/or the user's tab 602*b* of the GUI 601. In another example, updates related to the saved product element 2718 (e.g., new reviews of the product element 2718, updated rating for the product element 2718, updated emoji icon summary for the product element 2718, discounts and/or other promotions related to the product element 2718) can be provided by the computer system 240 to the computing device 300 and output in the news tab 602*a* and/or the user's tab 602*b* of the GUI 601.

Similarly, information about saved posts and product elements (and other content elements) can additionally be output in the activity feeds of other users. For example, the activity feed for a post creator can present information identifying other users who have saved that post and/or saved product elements that are tagged in the post. In another example, the activity feed for a first user who is socially-connected to a second user (e.g., friends, followers) can present information identifying when the second user has saved posts and/or product elements.

Figure 28B:
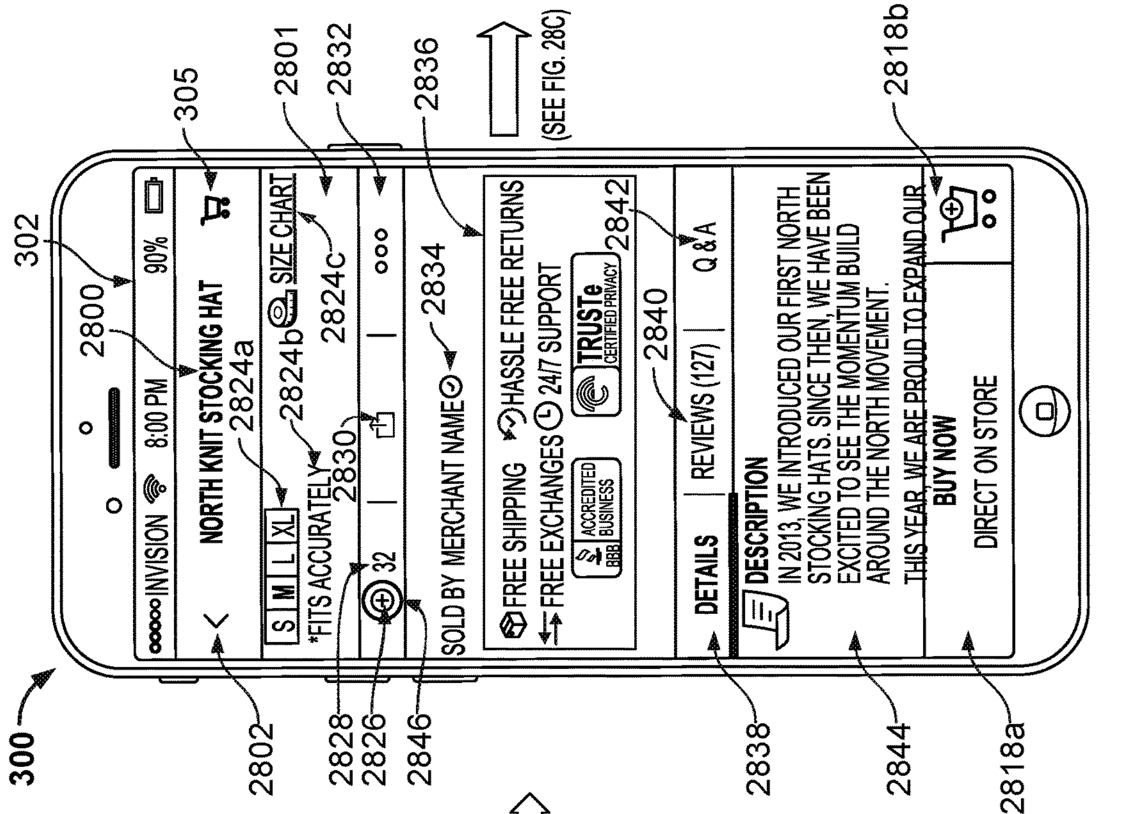
FIGS. 28A-C depict a sequence of screenshots and user interactions with a product interface on an example platform.
Figure 28A:
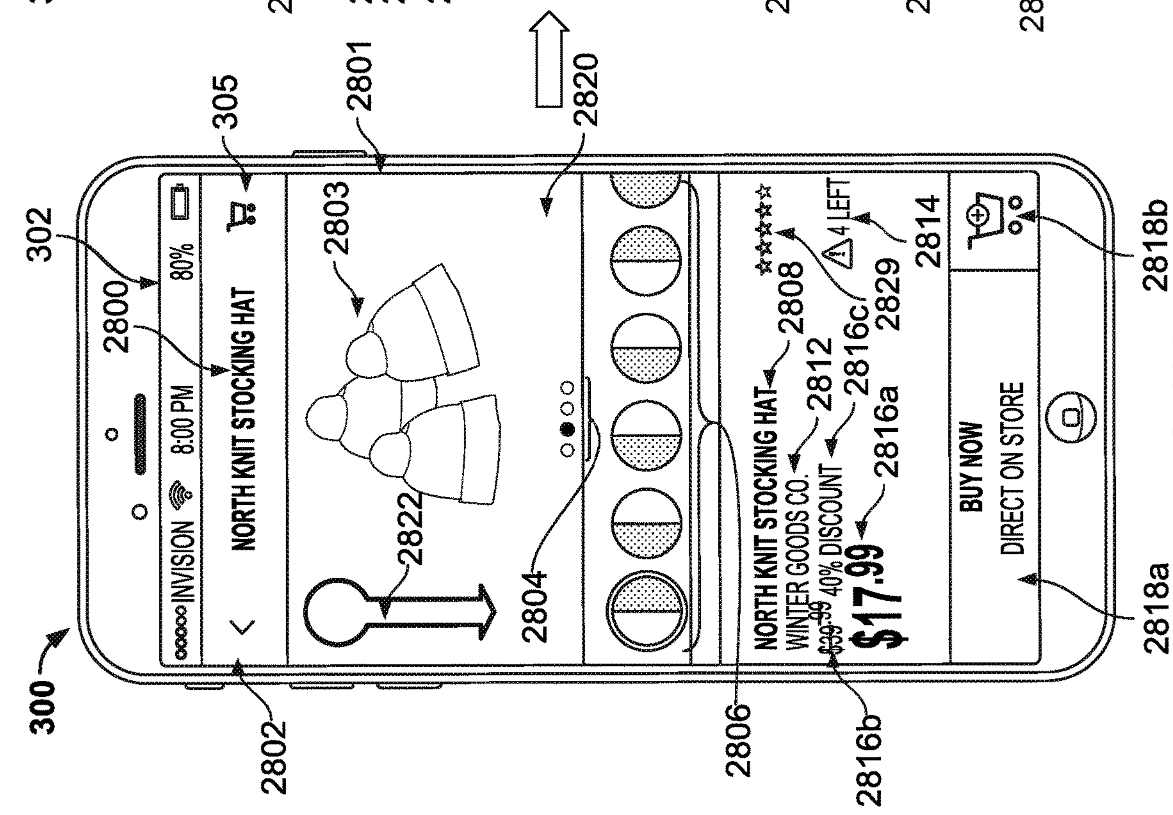
Figure 28C:
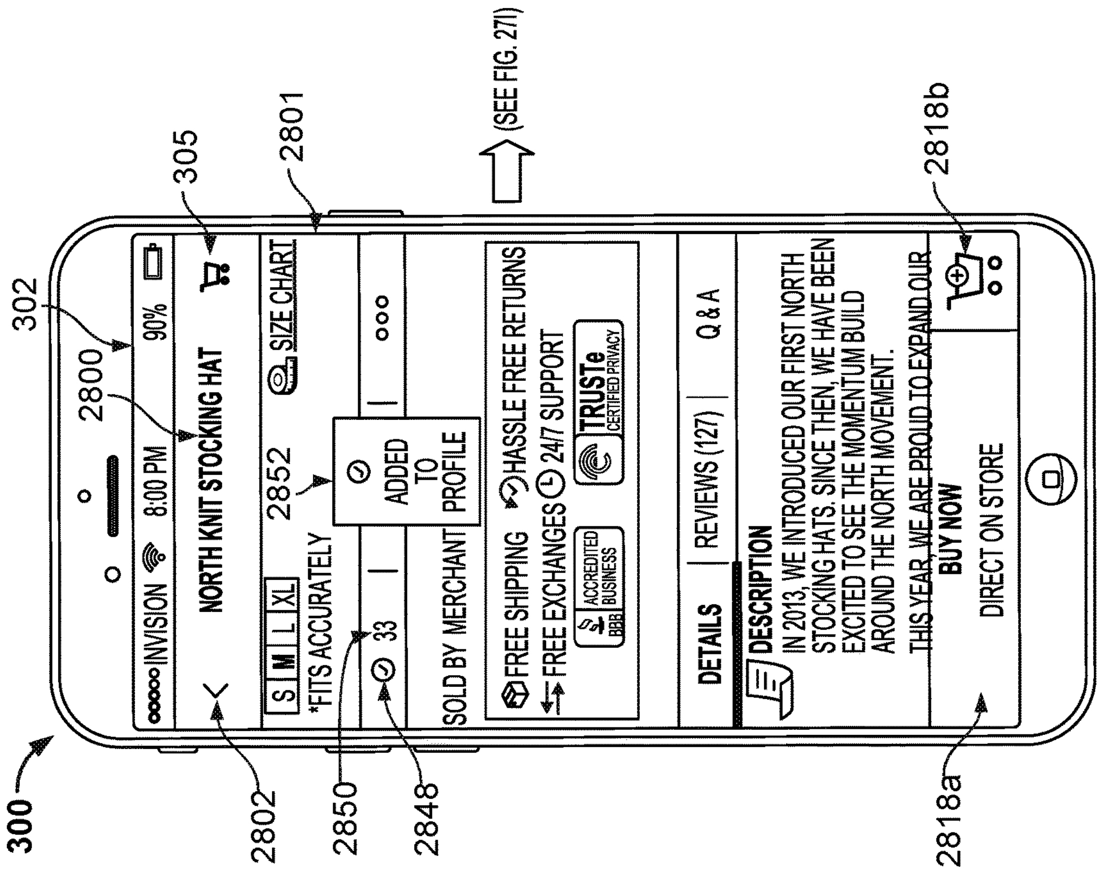

Referring to FIGS. 28A-C, a sequence of screenshots depicting user interactions with a product interface 2801 for a product element on an example social-retail platform provided by the computer system 240 is depicted. In this example sequence, a user saves a product element to her profile/user account via the product interface 2801 (instead of via the GUI 304, as described above with regard to FIGS. 27A-L). Saving a product element via the product interface 2801 can have the same effect with regard to product element and the user saving the product element described above with regard to FIGS. 27A-L (e.g., saved product element is persistently associated with the user's account/profile, saved product appears in the social and activity feeds of other users). Referring to FIG. 28A, the product interface 2801 for a product element 2820 is presented. The product interface 2801 can be presented, for example, after selection of a product element, such as product elements presented in the social feed GUI 304, the discovery/exploration GUI 401, the activity feed GUI 601, and/or the profile GUI 701. The product interface 2801 can present the product element 2820 in greater detail than in these other interfaces (e.g., social content stream, activity feed, profile) and can include controls through which a user can save the product element 2820. The product interface 2801 can also present related social posts (e.g., social posts that tag/depict the product) and related product elements (e.g., other products that may also be of interest to users who are interested in the product). The related social posts and product elements can provide ways for users to navigate and discover new elements (e.g., posts, products, users) on the social-retail platform that may be of interest to the user.

The product interface 2801 includes a title 2800 of the product 2820, the virtual shopping cart icon 305, and a back button 2802 to navigate back to the location from which the product interface 2801 was launched. The product interface 2801 includes an image 2803 and a visual indication 2804 of three other images of the product 2820 are accessible via horizontal scrolling in the interface 2801. The product interface 2801 also includes selectable images 2806 of different colors/styles for the product 2820 that can be ordered/purchased. Selecting one of the selectable images 2806 can, in some implementations, cause the interface 2801 to replace the image 2803 with another image of the product 2820 with the selected colors/styles. The product interface 2801 also includes product information, such as a name 2808 for the product 2820, an aggregate user rating 2810, a merchant 2812, a number of remaining products 2814 available for order with the merchant 2812, and pricing information 2816*a-c*.

The product interface 2801 further includes controls 2818*a-b* to purchase/order the product 2820. For example, the control 2818*a* is a selectable button through which the user of the computing device 300 can order the product 2820 through a single action (e.g., selecting the control 2818*a*). The control 2818*b* is a selectable button through which the user of the computing device 300 can place the product 2820 in the virtual shopping cart 305 associated with the logged-in user. The virtual shopping cart 305 can be persistent across the interfaces 304, 401, 601, 701, and 2748, and can allow a user to add products to the cart 305 from any or all of these interfaces. The controls 2818*a-b* can be part of a footer that is persistently displayed at the bottom of the interface 2801.

In the depicted example, vertical scrolling input 2822 is provided in the interface 2801 to scroll down to view additional information and features related to the product 2820. Referring to FIG. 28B, the scrolling input 2822 can cause additional features from the interface to be presented. For example, the interface 2801 includes selectable buttons 2824*a* to select a product size and a selectable sizing chart 2824*c* to view a sizing information for the product 2820. The interface 2801 also includes an indication 2824*b* as to whether the product 2820 fits accurately (whether the selectable sizes 2824*a* are true to size). The product interface 2801 also includes social engagement features 2826-2832 that are similar to the controls 2722-2728 described above with regard to FIG. 27D. For example, selecting the save button 2826 in the product interface 2801 can cause the product 2820 to be saved to the user's profile/user account. Saving the product 2820 in the product interface 2801 can additionally cause the product 2820 to appear in the activity feed (i.e., activity feed item 606*d*) and/or in the home feed (i.e., social post 308) of other users who are social connected (e.g., followers, friends) to the logged-in user.

The product interface 2801 further includes merchant information 2834, product purchase terms 2836, and tabs 2838-2842 to view information related to the product, including details for the product 2820 (tab 2838), reviews of the product 2820 (tab 2840), and questions/answers for the product 2820 (tab 2842). The details can include a product description 2844. Additional scrolling input can be provided through the product interface 2801 to view additional information for the product 2820, include user-generated images and posts that tag the product, and other related products. In the depicted example, user input 2846 is received selecting the save button 2826. Selecting the save button 2826 can cause the computing device 300 to save the product element 2820 similar to the description above with regard to FIGS. 27D-E.

Referring to FIG. 28C, confirmation that the product element 2820 has been saved in association with the logged-in user's account/profile is output in the interface 2801. For example, the save button 2826 has changed to a checkmark icon 2848, the count has been incremented by one (2850), and a message 2852 confirming that the product element has been added is presented.

Figure 29B:
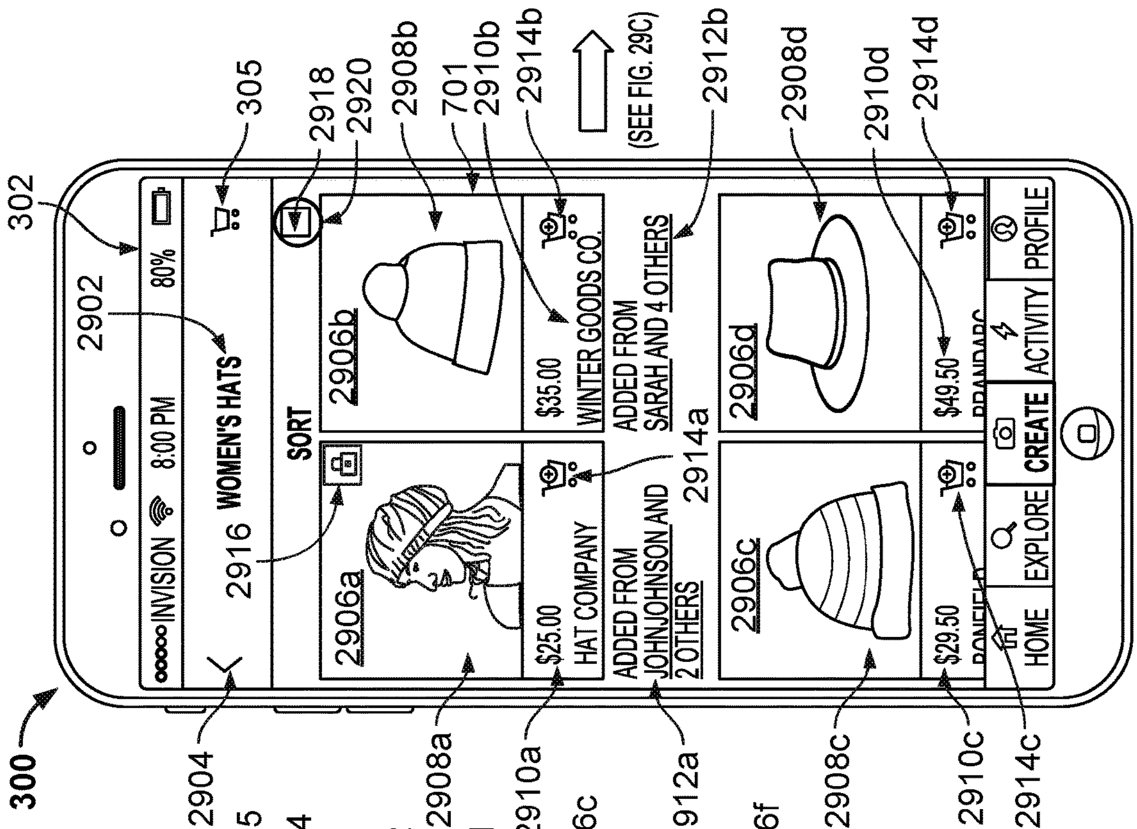
FIGS. 29A-C depict a sequence of screenshots and user interactions with a profile GUI on an example platform.
Figure 29A:
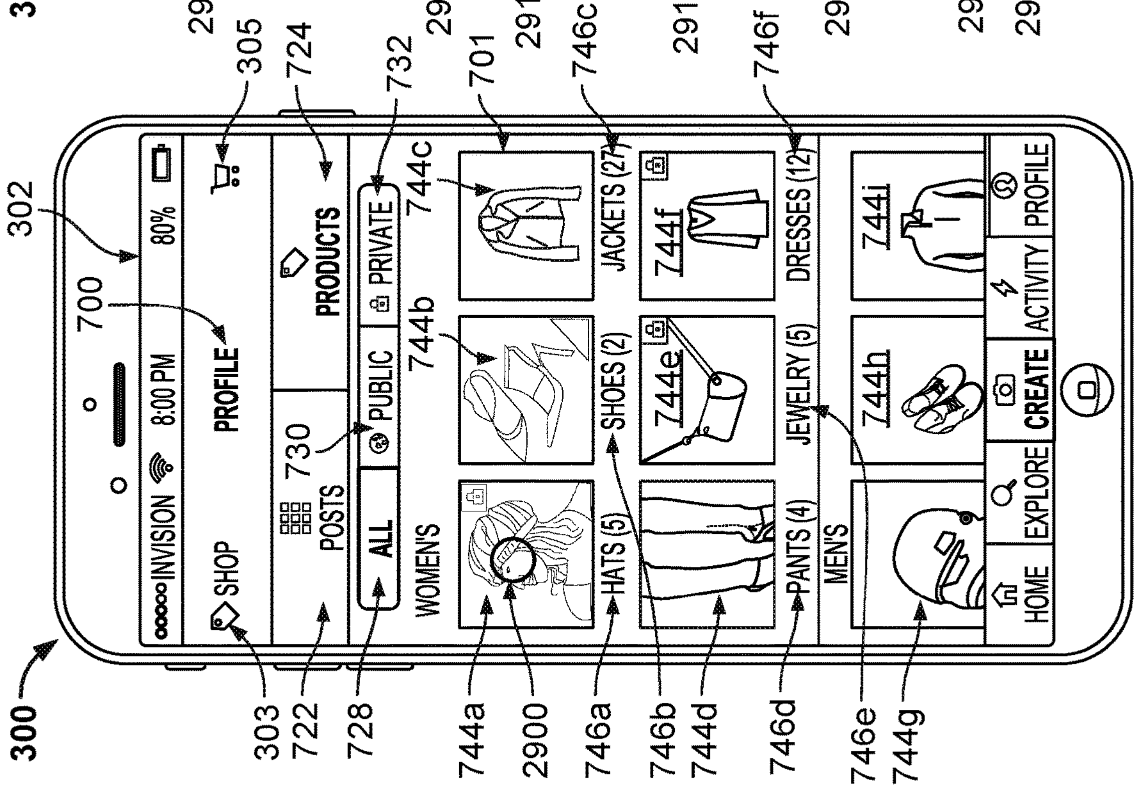
Figure 29C:
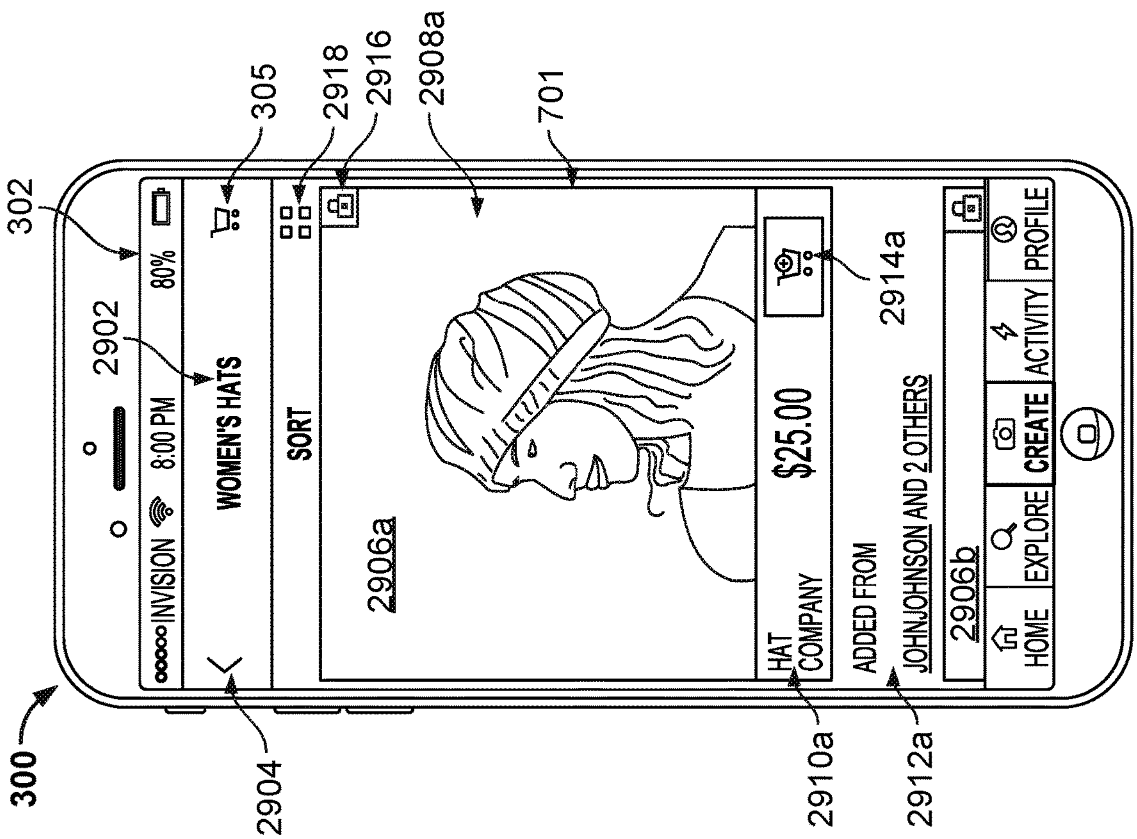

Referring to FIGS. 29A-C, a sequence of screenshots depicting user interactions with the profile GUI 701 on an example social-retail platform provided by the computer system 240 is depicted. In particular, the FIGS. 29A-C depicts saved products being automatically organized in the GUI 701 based on product taxonomy, such as a product taxonomy maintained by the computer system 240 and/or by third party computer systems (e.g., GOOGLE's product taxonomy). Referring to FIG. 29A, the saved products are organized into product categories that are presented as graphical elements 744*a-i*. Each of the categories includes a textual description and a count of the number of saved products that are included in the category (746*a-f*). Each of the graphical elements 744*a-i* and category descriptors/counts 746*a-f* are selectable. Example user input 2900 selecting the first category 744*a* is depicted.

Referring to FIG. 29B, example product elements 2906*a-d* that are included in the first category 744*a* are presented in the GUI 701 in response to the user input 2900. The product elements 2906*a-d* each include an image 2908*a-d* (e.g., merchant-provided image), product information 2910*a* (e.g., price, merchant, manufacturer), controls 2914*a* to add the corresponding product to the cart 305 (and/or to purchase the corresponding product), and social information 2912*a-b* that identifies other users who are relevant to the corresponding product. For example, the social information 2912*a-b* can identify other users who tagged the corresponding product in one or more posts, other users who also saved the corresponding product, and/or other users who otherwise provide a path through which the product element was presented to and saved by the logged-in user. For instance, the social information 2912*a-b* can identify the specific user who created a social post through which the logged-in user viewed and saved the product element. The social information 2912*a-b* can be selectable to allow the logged-in user to explore and discover other posts/products/users on the social-retail platform that may be of interest.

Additionally and/or alternatively, the social information 2912*a-b* can identify and provide links to the social posts from which the product elements 2906*a-b* were saved. For example, if the logged-in user originally saved a particular post that tagged the product element 2906*a* (which caused the product element 2906*a* also to be saved to the logged-in user's profile), the social information 2912*a* can provide a link to the particular post. In another example, if the logged-in user directly saved the product element 2906*a* when it was presented in the social feed based on the product element 2906*a* having been tagged in a particular social post, the social information 2912*a* can provide a link to the particular post. Other types of contextual around the saved product element 2906*a-b* can also be provided and/or linked to in the GUI 701, such as information identifying a date and time when the product element 2906*a-b* was saved, a location of the logged-in user when she saved the product element 2906*a-b*, and/or other relevant information.

The GUI 701 additionally includes a header with a back button 2904 to navigate back to the product taxonomy view in FIG. 29A, a title 2902 for the category that is currently being presented, and the virtual shopping cart icon 305. The GUI 701 further includes a button 2918 to toggle views between a tiled view (presented in FIG. 29B) and a list view (presented in FIG. 29C). Example input 2920 is presented selecting the button 2918. Referring to FIG. 29C, a list view of the GUI 701 is presented with the product elements 2906*a-d* being presented in a scrollable list. In the depicted example, the product element 2906*a* is presented with a larger image 2908*a* and the view is scrollable to see the other product elements 2906*b-d*. Selection of one of the product elements 2906*a-d* can cause the computing device 300 to present that selected product element in a product interface, similar to the interface 2801 described above with regard to FIGS. 28A-C.

Figure 30:
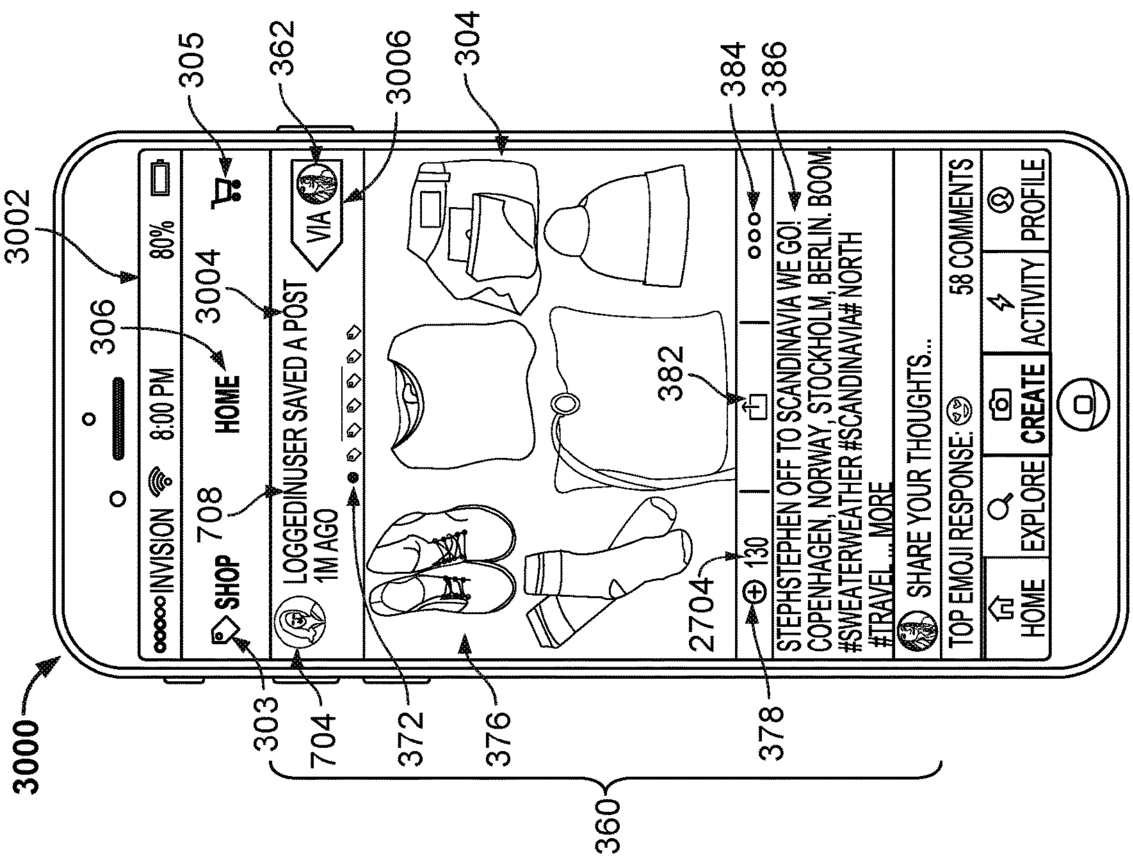
FIG. 30 depict a sequence of screenshots and user interactions with a GUI for a home feed on an example platform.

Referring to FIG. 30, a screenshot depicting the example GUI 304 being presented on the display 3002 of another computing device 3000 that is associated with a different user from the example user 708 who is described above as having saved the post 360 (with regard to FIGS. 27A-B and 27G). In this example, the user who is logged-in to the computing device 3000 can be socially connected with the user 708, such as being a friend, follower, collaborator, fan, and/or other socially-connected designations between users. Accordingly, the server system 240 can select posts that the user 708 has created and/or otherwise interacted with to present in the social feed for the user who is logged-in to the computing device 3000 based on the social connection. In the depicted example, the server system 240 selects the social post 360 for presentation on the computing device 3000 based on the user 708 having saved the post 360 (see FIGS. 27A-B) and the social connection between the users. The social post 360 is presented with the same information and graphical elements (376, 378, 2704, 382-386) as it is in FIG. 27A for the user 708, but on the computing device 3000 the user 708 is identified as having saved the post (3004) via the user 362 who originally created the post 360 (3006). The graphical elements representing both the user 708 who saved the post 360 (which caused it to be presented in the social feed for the logged-in user) and the original creator 362 in the GUI 304 are selectable, which can cause the computing device 300 to present a profile interface for the selected user. By attributing the social post 360 to the original creator, users are able to discover and connect with other users (as well as the posts and products they have created and saved), such as the user 362 who may not have a direct social connection with the user who is logged-in to the device 3000, but who may have an indirect social connection through the user 708.

The computer system 240 can maintain a single instance of the post 360 in the data repository 248—meaning that separate instances of the post 360 may not be created when a user saves or shares the post. For example, when the user 708 saves the post, the computer system 240 can simply add a record of the save with an identifier for the post and an identifier for the user 708. Doing this can provide a variety of benefits, such as allowing the original creator 362 to maintain control of and attribution to the post 360 (e.g., creator 362 can manage product tags and comments, other users can readily identify the creator 362 and view other content created and/or saved by the creator 362, creator 362 can delete/hide/remove the post 360), providing a common comment and response area for the post 360 across all shares and saves (e.g., provide an area for previously unconnected users to interact), and/or minimizing an amount of data that the computer system 240 maintains for the post 360 as it is shared and saved.

For example, if the user who is logged-in to the computing device 3000 were to save the post 360 (similar to the user 708 saving the post 360, as described above with regard to FIGS. 27A-B), another data entry associating the logged-in user with the post 360 (e.g., entry associating a unique identifier for the user with a unique identifier for the post 360) can be added by the computer system 240. The computer system 240 can then distribute the post 360 to other users who are socially-connected with the logged-in user in a similar manner as described here with regard to FIG. 30, but with the logged-in user's information replacing the image 704 and the username 708. The user 362 can still be identified as the creator of the post 360 in the graphical element 3006, which can allow for the post 360 to be properly attributed.

Figure 31:
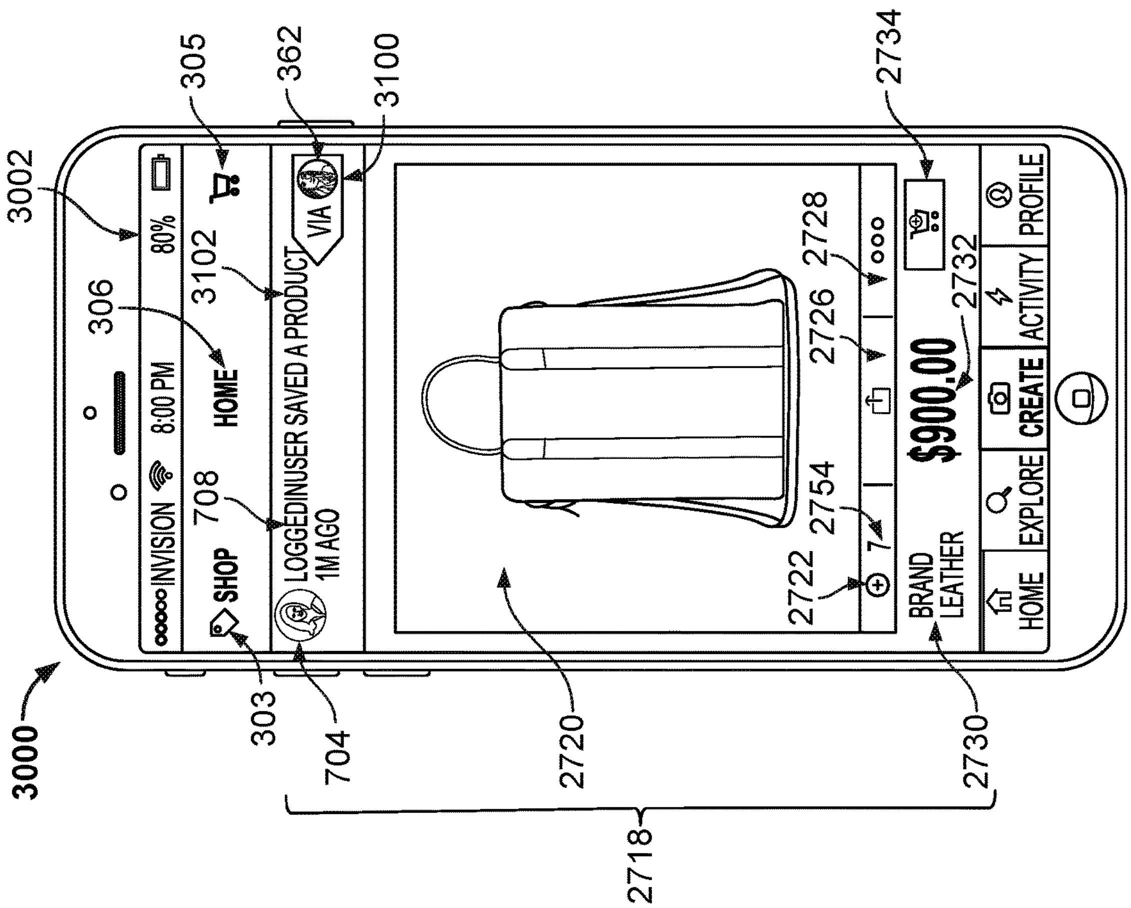
FIG. 31 depict a sequence of screenshots and user interactions with a GUI for a home feed on an example platform.

Referring to FIG. 31, a screenshot depicting the example GUI 304 being presented on the display 3002 of the other computing device 3000 that is associated with the different user from the example user 708 who is described above as having saved the product element 2718 (with regard to FIGS. 27D-E and 27J). The example screenshot in FIG. 31 depicts the saved product element 2718 being presented to another user on the computing device 3000, similar to the screenshot in FIG. 30 depicting the saved post 316 being presented to another user on the computing device 3000. As described above, the user who is logged-in to the computing device 3000 can be socially connected with the user 708 and the server system 240 can select product elements that the user 708 has interacted with to present in the social feed on the computing device 3000. In the depicted example, the server system 240 selects the product element 2718 for presentation on the computing device 3000 based on the user 708 having saved the product element 2718 (see FIGS. 27D-E) and the social connection between the users. The product element 2718 is presented with the same information and graphical elements (2720, 2722, 2754, 2726-2734) as it is in FIGS. 27D-E for the user 708, but on the computing device 3000 the user 708 is identified as having saved the product (3102) via the user 362 who originally tagged the product element in the post 360 (3100). As described above, the graphical elements representing both the user 708 and the user 362 in the GUI 304 are selectable.

Similar to the single instance of the post 360, the computer system 240 can maintain a single instance of the product element 2718 in the data repository 250—meaning that separate instances of the product element 2718 may not be created when a user saves or shares the product. For example, when the user 708 saves the product element 2718, the computer system 240 can simply add a record of the save with an identifier for the product element 2718 and an identifier for the user 708. Doing this can provide a variety of benefits as described above with regard to saving the post 360 with a single instance.

In some instances, instead of identifying the user 362 in the graphical element 3100, other people/entities and/or posts may be identified in the graphical element 3100. For example, the original post 360 from which the product element 2718 was saved by the user 708 may be identified additionally and/or alternatively in the graphical element 3100. In another example, the merchant and/or manufacturer of the product identified in the product element 2718 may be identified in the graphical element 3100.

Figure 32:
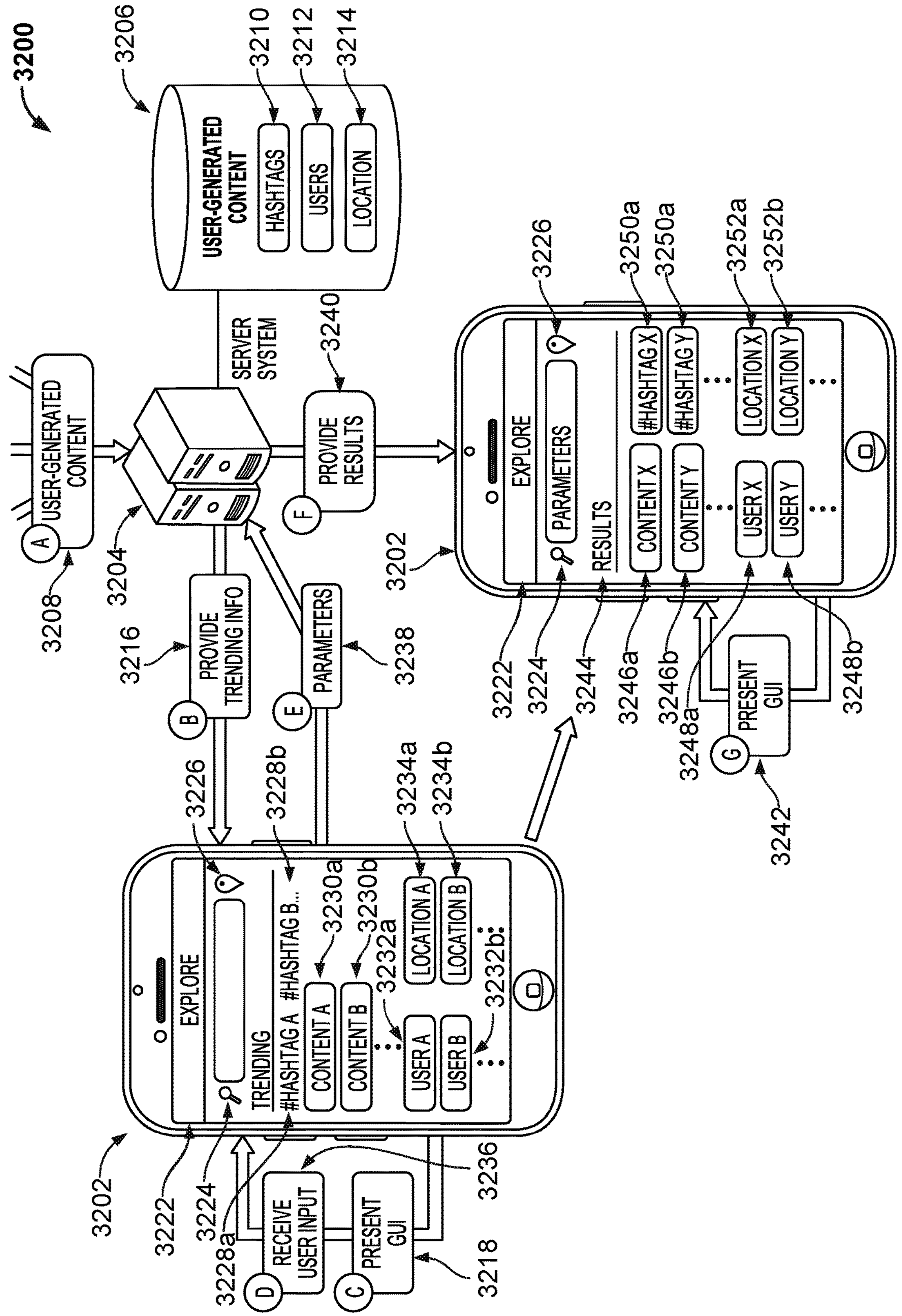
FIG. 32 is a conceptual diagram of an example system to provide an example GUI on an example client computing device.

Referring to FIG. 32, some embodiments of a system 3200 can be configured to provide an example GUI 3222 for exploring and discovering content on an example client computing device 3202. For example, the example GUI 3222 presents graphical elements for exploring and discovering graphical elements, including providing suggested content in the GUI 3222 across multiple different content types and providing content search results in the GUI 3222 based on a variety of different search parameters.

The computing device 3202 can be any of a variety of client computing devices, such as a mobile computing device (e.g., smartphone, tablet, wearable device, smartwatch), laptop computer, desktop computer, and/or other types of user computing devices. The computing device 3202 can communicate with a server system 3204 over one or more networks (e.g., internet, local area network (LAN), wide area network (WAN), virtual private network (VPN), wireless network, mobile data network, or any combination thereof) to obtain content, content summaries, and/or other information to present in the GUI 3222. The server system 3204 can be a computer system (e.g., cloud computer system) that either by itself or through affiliate networks is able to serve and provide features related to content summaries, such as content summaries across multiple different types of content, like social media content, messaging content, product content, e-commerce content, and/or other types of content. For example, the server system 3204 may directly provide social networking features and can communicate with other affiliate computer systems to provide product-related features (e.g., reviews, purchasing, order tracking). In other examples, the server system 3204 may directly provide both social networking features and product-related features. Other configurations of the server system 3204 among one or more other computer systems are also possible.

As indicated by step A, the server system 3204 can receive user-generated content 3208, which can include, for instance, user-generated images and corresponding descriptions, user comments, identifiers for users who generated content, location identifiers, and various other tags annotating the content (e.g., hashtags). For example, the server system 3204 can receive social media content (e.g., social media posts) from other client computing devices. Such social media content can include, for example, media elements (e.g., photos, videos, links to external content) and descriptions (e.g., text, hashtags, user tags, product tags, location tags, emojis) that describe or otherwise annotate the media elements. For example, a social media post can include a photo of a user wearing a new outfit (example user-generated image) and a textual description of the new outfit, including hashtags identifying features in the outfit (e.g., outfit style, products, theme), product tags that identifies the individual clothing items in the outfit, and location tags identifying a location where the photo was taken.

The server system 3204 can receive the user-generated content 3208 and can store it in a data repository 3206 (e.g., cloud storage system), from which it can be served by the server system 3204 to the client computing device 3202 (and other client computing devices). The server system 3204 can organize data for the user-generated content 3208 in the data repository 3206 using any of a variety of data storage structures (e.g., database tables, indices, hash tables) and techniques (e.g., relational database storage techniques, cloud-based storage techniques, hashing techniques, indexing techniques) to permit for efficient searching and data retrieval. The data for the user-generated content 3208 can be organized along one or more data elements, such as hashtags 3212 that are included in the content, user identifiers 3212 for users who created the content, and/or location identifiers 3214 for locations that are tagged in the content. Additional and/or alternative data elements can be used to organize the data in the data repository 3206, such as other types of tags (e.g., product tags), specific content elements that are included in the data elements (e.g., emojis, keywords), media element details (e.g., types of media elements, resolution, color composition), and/or other data elements. For example, the data repository 3206 can assign the user generated content 3208 unique identifiers that are used for content identification and retrieval, can extract data elements (e.g., hashtags 3210, user identifiers 3212, location identifiers 3214) from the content 3208, and can store the extracted data elements in association with the unique identifiers for the content 3208 in one or more readily searchable data structures (e.g., hash tables, indices, relational database tables). By organizing and storing the user-generated content 3208 in such a way in the data repository 3206, the server system 3204 can search, identify, and serve content to client computing devices more efficiently and quickly (e.g., using fewer computing resources, such as processor cycles, RAM, disc reads/write operations).

The server system 3204 can, additionally, determine and store content summaries in the data repository 3206. The content summaries can be determined based on the user-generated content 3208. For example, a content summary can be determined from the comments that correspond to a particular content element, such as a social media post (example user-generated content 3208). For instance, a content summary can be one or more emojis (icons or other graphical symbols that are encoded by one or more characters), keywords, hashtags, other tags (e.g., user tags, product tags, location tags), images, links, and/or other content elements that occur across the comments associated with a social media post. Such content elements can be identified as content summaries by the server system 3204 in any of a variety of ways. For example, one or more emojis can be identified as content summaries for a social media post based on the one or more emojis occurring across the comments for the social media post with a greatest frequency (e.g., most commonly occurring emoji(s)), at least a threshold frequency (e.g., emoji(s) occurring at least a minimum number of times), a greatest comment frequency (e.g., emoji(s) occurring in the greatest number of comments), at least a threshold comment frequency (e.g., emoji(s) occurring in at least a minimum number of comments), with a greatest weighted frequency (e.g., weighting emoji occurrences in newer comments more heavily, weighting emoji occurrences in older comments more heavily), and/or other factors (e.g., weighting emoji occurrences based on direct and/or indirect user responses to comments within which the emojis occur). Content summaries for other types of content elements, such as keywords, images, links, hashtags, and/or other elements, can be determined in a similar manner.

The server system 3204 can additionally store the content and data elements in the data repository 3206 with timestamps that can be used, for example, to identify "trending" information—meaning currently popular and/or of interest to users. Trending information can be identified in any of a variety of ways by the server system 3204, such as being identified based on frequency of occurrence within a rolling time window (e.g., frequency over the past hour, past six hours, past 322 hours, past day, past week), weighted frequency of occurrence based on how recently instances occurred (e.g., frequency of occurrence where more recently occurring instances are weighted more than instances that occurred further in the past, weighting based on time decay function), weighted frequency of occurrence based on user engagement with content element (e.g., social media post with a large number of shares/saves/comments weighted more than post with fewer number of shares/saves/comments), and/or other factors. Trending information can be determined with regard to particular user-generated content (e.g., social media posts, user-generated images/videos) and/or across multiple different user-generated content elements. For example, a particular social media post can be identified as trending based on a large number of other users being engaged/interacting with the post (e.g., through comments, likes, shares, saves, views, and/or other) over a recent time period (e.g., past 6 hours). In another example, a particular hashtag can be identified as trending based on the hashtag occurring with a high frequency across user-generated content (e.g., social media posts, user comments, and/or other user generated content) over a recent time period (e.g., past 6 hours).

Trending information can be stored (cached) in the repository 3206 and continually updated by the server system 3204, such as in response to user-generated content 3208 being received and/or on a recurring basis (e.g., every minute, every 5 minutes, every 320 minutes, every 30 minutes, every hour, every day). For example, every time a new social media post or action related to a social media post (e.g., save, share, comment, like, view) is received, the server system 3204 can determine whether it alters the currently trending information on the server system 3204. In another example, the server system 3204 can evaluate user-generated content and actions related thereto every 320 minutes to determine whether the trending information has been altered by content and action received since the preceding determination 320 minutes earlier. Such continual updating can allow the trending information to be quickly and efficiently served, searched, and/or processed in association with requests from client devices, such as requests for content, search requests, and requests for analytics information. For instance, instead of analyzing all user-generated content in the data repository 3206 to determine trending information in response to each request from a client computing device (which could result in redundant and wasted use of computational resources by the server system 3204), the server system 3204 can maintain pre-determined and cached trending information in the repository 3206, and can simply serve the stored trending information to the requesting client device. For example, when a client computing device 3202 launches a search interface and before receiving a specific search query, the client computing device 3202 can request trending information from the server system 3204, which the server system 3204 can retrieve as pre-determined trending information and can serve to the client computing device 3202 for presentation in a GUI. By having the trending information pre-determined (as opposed to determining it in response to client computing device request), the server system 3204 can provide the trending information to the client computing device 3202 more quickly and efficiently, thus reducing the amount of computational resources on the server system 3204 that are used to process requests and also reducing response latency.

Additionally, to further reduce the latency in the presentation of trending information in a GUI on the client computing device 3202, the client computing device 3202 can periodically request trending information from the server system 3204 in the background and without specific direction to present a search interface. For example, the client computing device 3202 can request updates on trending information from the server system 3204 and can update a local cache of trending information on the client computing device 3202 based on the updates from the server system 3204. For example, the client computing device 3202 can request updates every hour, two hours, six hours, 322 hours, every day, and/or other time intervals. The client computing device 3202 may be restricted to background requests for trending information to instances when such requests will not adversely affect the device's performance and/or data usage. For example, the client computing device 3202 may only request trending information when current usage of one or more computational resources (e.g., CPU usage, network bandwidth, RAM, available data storage) are below threshold levels (e.g., CPU usage below certain percentage, little or no current network traffic, at least a threshold amount of RAM available, at least a threshold amount of capacity in one or more local storage devices are available). In another example, the client computing device ay only request trending information when the client computing device 3202 has a network connection that does not have a data cap (e.g., connected to unlimited Wi-Fi network) and/or has at least a threshold amount of remaining data for a billing cycle (e.g., mobile data plan has at least a threshold amount of data available for transmission). By obtaining trending information from the server system 3204 in advance of the client computing device 3202 presenting a search interface, the trending information can be presented in the GUI instantaneously (without delay associated with network transmissions between the device 3202 and the server system 3204), which can improve the GUI performance on the client computing device 3202.

The server system 3204 can receive, store, and serve other types of content as well. For example, the server system 3204 can additionally obtain the secondary content (e.g., merchant-provided product content, news content, messaging content) that is identified, for example, by the user-generated content 3208. For example, if a product is tagged in the user-generated content 3208, the server system 3204 can obtain product information for the tagged product, such as an image for the product, a description of the product, a merchant selling the product, and other product details. In another example, if a news item is tagged in the user-generated content 3208, the server system 3204 can obtain information about the tagged news item, such as the title/headline, a brief summary of the news item, an author, a time/date for the news item, and other news details.

Still referring to FIG. 32, as indicated by step B (3216), the server system 3204 can provide trending information to the client computing device 3202. For example, the server system 3204 can identify trending information as described above and can transmit the trending information to the client computing device 3202 in response to a request from the client computing device 3202 (e.g., background request transmitted by the computing device 3202, request transmitted by the computing device 3202 in response to a user of the device 3202 launching a search interface). As describe above, the trending information can be pre-determined by the server system 3204 and can be served by the server system 3204 from a cache of trending information to the client computing device 3202, which can reduce the latency of serving the trending information to the client computing device 3202. The trending information can include any of a variety of content and data elements, such as trending content elements (e.g., trending social media posts, trending productivity elements), trending tags (e.g., trending hashtags, trending product tags, trending location tags), trending users (e.g., users who have added a number of followers and/or whose user-generated content is trending), and/or other trending elements.

The client computing device 3202 can receive the trending information and can present it in the GUI 3222, as indicated by step C (3218). For example, the GUI 3222 in this example presents graphical elements for trending information that includes trending hashtags 3228*a-b*, trending content elements 3230*a-b* (e.g., trending social media posts, trending product elements, trending productivity projects, trending news articles), trending users 3232*a-b*, and trending location identifiers 3234*a-b* (e.g., neighborhoods, cities, states, countries, events). Other types of trending information can additionally and/or alternatively be output in the GUI 3222. The server system 3204 may additionally personalize the trending information that is identified for the user of the computing device 3202, such as based on explicitly and/or implicitly identified user interests (e.g., user explicitly identified interest in types of content, user interest implied through viewing particular types of content).

The graphical elements 3228-3234 can be selectable. Selection of the graphical elements 3228-3234 by a user of the computing device 3202 can cause the computing device 3202 to present additional information regarding the selected trending element in the GUI 3222 through communication with the server system 3204. For example, user selection of the example hashtag A (3228*a*) through the GUI 3222 (e.g., touch-based selection of the graphical element 3228*a*, pointer-based selection of the graphical element 3228*a*, voice-based selection of the graphical element 3228*a*) can cause the computing device 3202 to request additional information from the server system 3204 regarding the hashtag A (3228*a*), such as recent content elements (e.g., social media post, user comments, product elements) that have included the hashtag A, other tags (e.g., product tags, other hashtags, location tags) that have also been commonly associated with the hashtag A (e.g., used together in the recent content elements with the hashtag A), and/or other attributes associated with the hashtag A (e.g., information on users who are associated with the recent content elements with the hashtag A). The server system 3204 can identify such other content related to the hashtag A (3228) (e.g. using the organization in the data repository 3206 around the hashtags 3210, users 3212, and locations 3214) and can serve it to the computing device 3202, which can present the other related content in the GUI 3222.

The computing device 3202 can present additional information regarding the other graphical elements 3228-3234 in a similar manner. For example, selection of the example content element A (3230*a*) can cause the computing device 3202 to request and the server system 3204 to serve the content element A and other related content (e.g., comments, images, hashtags, other tags), which can be presented in the GUI 3222. In another example, selection of the example user A (3232*a*) can cause the computing device 3202 to request and the server system 3204 to serve information related to the user A (e.g., content elements generated by the user A, content elements in which the user A is tagged, content elements that the user A has interacted with (shared, saved, commented on, viewed)), which can be presented in the GUI 3222. In a further example, selection of the example location A (3234*a*) can cause the computing device to request and the server system 3204 to serve information related to the location A (e.g., content elements that have included a tag for the location A, other tags that have been commonly used with the tag for the location A, users who are located at or near the location A), which can be presented in the GUI 3222.

By presenting the trending information using the selectable graphical elements 3228-3234, the GUI 3222 can be improved. For example, presenting the trending information on the device 3202 can allow a user to view and navigate to information that may be of interest without first needing to provide input to request the trending information with minimal input (e.g., single input selecting one of the graphical elements 3228-3234), instead of having to type or otherwise indicate parameters for a search query. Such features can allow a user to more readily and easily request information that may be of interest in the GUI 3222. For instance, on some devices, like devices with touchscreens (e.g., smartphones, tablet computing devices), it can be difficult to provide textual input and other types of inputs. By presenting the trending information in the GUI 3222, a user can simply be presented with options that can be selected instead of needing to type or otherwise define parameters for a search query.

The GUI 3222 also includes example features 3224-3226 through which a user can designate one or more parameters for a search query to locate any of a variety of different types of content (e.g., user-generated content, social media content, product elements, users, content categories). The feature 3224 is a search field through which a user of the device 3202 can enter one or more search parameters, such as keywords, tags, symbols (e.g., emojis, images), location identifiers, other types of search parameters, and/or combinations thereof. For example, selection of the feature 3224 can cause a virtual keyboard to be presented on the GUI 3222 through which the user can designate the one or more search parameters. The feature 3226 is a location field through which a user of the device 3202 can designate one or more location-based parameters for the search query. For example, selection of the example feature 3226 can cause the GUI 3222 to present one or more features through which a user of the device 3202 can designate location-based search parameters, such as an interactive map through which a user can designate geographic locations and/or areas to be searched, a selectable icon/feature through which a user can select a current location/area, and/or other features through which a user can designate location parameters. Multiple different types of search parameters can be combined through the GUI 3222 and used to search for content. Additional and/or alternative search feature can be output in the GUI 3222.

As indicated by step D (3236), the client computing device 3202 receives user input through the GUI 3222. The user input can include, for example, selection of one or more of the graphical elements 3228-3234 for the suggested trending information and/or parameters designated through one or more of the features 3224-3226. For example, a user can select a single one of graphical elements 3228-3234, can select multiple graphical elements 3228-3234, can designate one or more parameters through the elements 3224-3226, and/or can combine selection of one or more of the graphical elements 3228-3234 with parameters designated through the elements 3224-3226.

In response to receiving the input, the client computing device 3202 can transmit one or more parameters for a search query to the server system 3204, as indicated by step E (3238). In response to receiving the parameters, the server system 3204 can identify results to serve to the client computing device 3202 across multiple different types of content (e.g., user-generated content, social media content, product elements, users, content categories), such as the content that is stored in the content repository 3206. For example, the server system 3204 can use the organizational structures (e.g., hash tables, indices, database tables) in the repository 3206 to readily and efficiently identify content elements and other associated elements (e.g., hashtags, users, location tags, associated secondary content elements) that satisfy one or more of the parameters. The server system 3204 can use various search techniques to identify results from the content repository 3206, such as using scoring techniques to rank and select content elements, fuzzy logic search techniques, Boolean logic search techniques, artificial intelligence-based search techniques, classification-based search techniques, and/or other search techniques.

As indicated by step F (3240), the server system 3204 can transmit the results to the client computing device 3202, which can receive and present the results in the GUI 3222, as indicated by step G (3242). For instance, in the depicted example the computing device 3202 receives and present a search result area 3244 in the GUI 3222 that includes multiple different types of content and associated elements, such as example content elements 3246*a-b* (e.g., social media content, product elements), example user identifiers 3248*a-b* (e.g., social media users), example hashtags 3250*a-b* (e.g., categories of content), and example location identifiers 3252*a-b*. As indicated in the depicted example, the search results 3246-3252 are different from the trending information based on the search parameters transmitted to and processed by the server system 3204.

Each of the search results 3246-3252 can be presented as selectable graphical elements that a user of the computing device 3202 can select to present additional information and/or to present results for another search query in the GUI 3222. For example, the content element X is represented by the graphical element 3246*a* (e.g., thumbnail image of one or more images includes in content element X, textual summary of one or more portions of content element X, animation/video snippet for content element X, and/or combinations thereof), selection of which can cause the computing device 3202 to request (from the server system 3204) and display the content element X (e.g., overlay the content element X on top of the search results 3244, present a new page in the GUI 3222 depicting the content element X, expand an area below/above/adjacent to the graphical element 3246*a* in which to present the content element X). For instance, the content element X can be a social media post and the graphical element 3246*a* can be thumbnail of an image included in the social media post.

In another example, the user X is represented by the graphical element 3248*a* (e.g., thumbnail of a profile picture for the user X, username for the user X), selection of which can cause the computing device 3202 to request (from the server system 3204) and display information (e.g., user profile, user information, list of content elements created, list of content elements interacted with) for the user X (e.g., overlay the information for user X on top of the search results 3244, present a new page in the GUI 3222, expand an area below/above/adjacent to the graphical element 3248*a*). For instance, the user X can be a user on a social platform and selecting the graphical element 3248*a* can cause a profile for the user X on the social platform with information about the user X, content that the user X has created/published on the platform, content that the user X has saved/shared/commented on/reacted to on the platform, and controls to connect with (e.g., friend, follow) or interact with (e.g., message) the user X.

In a further example, the hashtag X is represented by the graphical element 3250*a* (e.g., text, image), selection of which can cause the computing device 3202 to request (from the server system 3204) and display search results related to the hashtag X (e.g., overlay the search results for hashtag X on the search results 3244, present a new page in the GUI 3222, expand an area below/above/adjacent to the graphical element 3250*a*). For instance, the parameters (step E, 3238) can be keywords (e.g., "handbag") and the hashtag X (3250*a*) can be a hashtag (e.g., "#prada") relevant to the keywords that, when selected, causes result for the hashtag ("#prada") to be generated and presented in the GUI 3222.

In another example, the location X is represented by the graphical element 3252*a* (e.g., textual description of the location X, image of the location X, and/or combination thereof), selection of which can cause the computing device 3202 to request (from the server system 3204) and display search results related to the location X (e.g., overlay the search results for location X on the search results 3244, present a new page in the GUI 3222, expand an area below/above/adjacent to the graphical element 3252*a*). For instance, the parameters (step E, 3238) can be keywords (e.g., "scarfs") and the location X (3252*a*) can be a location (e.g., "Minnesota") relevant to the keywords that, when selected, causes result for the location (e.g., content elements tagging Minnesota, content elements created by users who are located in Minnesota) to be generated and presented in the GUI 3222.

Other types of elements and information can additionally and/or alternatively be presented as part of the results in the GUI 3222. For example, other types of elements, such as secondary content elements (e.g., merchant-provided product content, news content, messaging content) that may be tagged in the user-generated content elements (e.g., social media posts), can be presented as search results.

FIGS. 33A-K, 34A-B, and 35A-B are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the GUI 3222 described above with regard to FIG. 32 and the system 3200 on a social-retail platform. For example, the user-generated content elements 3230*a-b* and 3246*a-b* can be social posts/content elements that tag product content elements, the user elements 3232*a-b* and 3248*a-b* can be users on the social-retail platform, the hashtags 3228*a-b* and 3250*a-b* can be hashtags included in social media posts, user comments/reviews, and product elements, and the location elements 3234*a-b* and 3252*a-b* can be locations that are identified in social media posts, user comments/reviews, and product elements as described with regard to FIGS. 3A-B, 4A-B, 5A-B, 6A-B, 7A-B, 34A-B, and 35A-B.

Referring to FIGS. 33A-K, a sequence of a sequence of screenshots depicting user interactions with the GUI 401 for the explore/search interface on an example social-retail platform provided by the computer system 240 is depicted. In the example sequence, the GUI 401 permits a user to explore and search for content across multiple different dimensions on the social-retail platform, such as social posts, hashtags, product elements, and users, each of which can be interconnected and linked through attribution and/or tags. The GUI 401 can present a navigable web of content elements that are interconnected across the multiple different dimensions of the social-retail platform. For example, the GUI 401 can present graphical elements through which a user of the device 300 can navigate between hashtags, social media posts, product elements, users, locations, content summaries (e.g., emoji-based reactions), and/or other features. For instance, a user can select a hashtag in the GUI 401, then select a user who is associated with the selected hashtag, then select a product element saved by the selected user, and then select a social media post that included a user-generated image that tagged the product element. Other inter-connected navigation and discovery among different types of content elements are also possible.

Figures 33A, 33B:
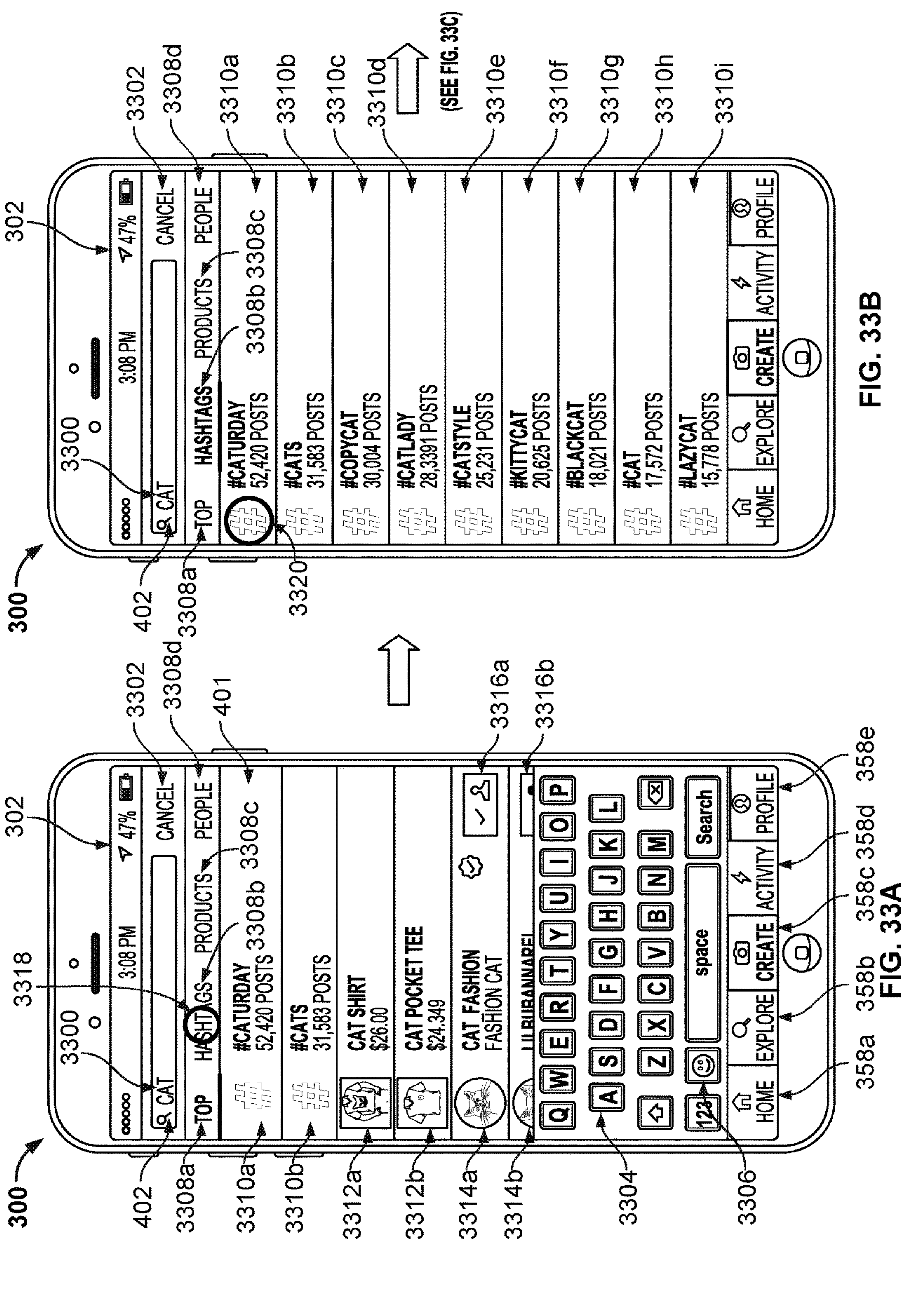
FIGS. 33A-K depict a sequence of screenshots and user interactions with a GUI for an explore/search interface on an example platform.

Referring to FIG. 33A, the GUI 401 depicts an example search query 3300 ("cat") being submitted through the search field 402 and example search results 3310-3314 for the search query 3300. The search query 3300 can be entered, for example, in the search field 402 while trending information is presented in the GUI 401, as described above with regard to FIGS. 4A-B, and with regard to the GUI 3222 and the search field 3225 in FIG. 32. The search query 3300 can be entered through any of the components of the input subsystem 216, such as through touch-based input on a virtual keyboard 3304 that is presented in the GUI 401, speech input through a microphone, gesture-based inputs, a physical keyboard/buttons, or any combination thereof. The virtual keyboard 3304 presents alphanumeric characters that can be selected as well as other types of parameters, such as emojis 3306, that can be selected as part of the search query 3300. Non-traditional search parameters, like emojis 3306, can be included as part of the search query 3300 and can be used to generate search results (see FIGS. 35A-B).

After the search query 3300 is entered through the GUI 401, it can be transmitted by the computing device 300 to the computer system 240, which can determine search results for the query 3300 across multiple different types of content (e.g., user-generated content, social media content, product elements, users, content categories), as discussed above with regard to FIG. 32. For example, the computer system 240 can determine search results for the query 3300 from social posts, product elements, comments, reviews, emoji-based summaries of content (e.g., social posts, comments, product elements, reviews), hashtags, location tags, product tags, user tags and attribution, and/or other elements. The computer system 240 can be programmed to store the underlying data in particular databases and to use particular data structures that can reduce the computational resources used to perform the search and can reduce the latency with which results are provided to the computing device 300. For example, the computer system 240 can maintain one or more hash tables that map keywords to content elements that include the keywords. Once the search results are determined, they can be served by the computer system 240 to the computing device 300 and presented in the GUI 401. The search results can include a variety of information for each of the results, such as brief textual summary for each of the results, a thumbnail image, scores indicating how relevant each of the results are to the search query (e.g., match score indicating how closely the computer system 240 has determined each of the results match the search query 3300), and/or a unique identifier for the content element that is represented by the results (e.g., unique identifier for social post in the results, URL), which can be used to request the full content elements (as opposed to the abbreviated summary in the search results) from the computer system 240.

In the depicted example, the search results presented in the GUI 401 include multiple different types of content elements, including hashtags 3310*a-b*, product elements 3312*a-b*, and users 3314*a-b*. These content elements 3310-3314 are selectable and can cause additional information for the selected element to be presented in the GUI 401, such as through expanding an area in the GUI 401 for the selected element, overlaying the additional information, and/or presenting an additional/different page with the additional information. Examples of presenting additional information in response to selecting the search results 3310-3314 are described below with regard to FIG. 33B-K.

The GUI 401 presents several selectable tabs 3308*a-d* that the can allow a user to view subsets of the results in the GUI 401 with a single selection input and without having to navigate to submenu or other screen of the GUI 401, or to provide more complex inputs, such as designating a filter for the results. For example, the tabs 3308*a-d* include a top tab 3308*a* that presents the top results across all of the different types of search results, a hashtag tab 3308*b* that presents the hashtag results, a products tab 3308*c* that presents the product results, and a people tab 3308*d* that presents the people/users results. Other tabs for other types of results (and/or combinations of types of results) are also possible, such as a social post tab that presents social post results.

In the depicted example, the top tab 3308*a* is selected by default and the top results 3310-3314 from among multiple different types of content elements (e.g., user-generated content, social media content, product elements, users, content categories) are presented. These heterogeneous results are depicted as being grouped together by content types, with the hashtag results 3310*a-b* being presented adjacent to each other, the product results 3312*a-b* being presented adjacent to each other, and the people/user results 3314*a-b* being presented adjacent to each other. The GUI 401 can order the grouped result types based on any of a variety of factors, such as a predetermined ordering, a top relevance score for each of the result groups, an aggregate relevance score for each of the result groups, an average relevance score for each of the result groups, and/or other factors. The relevance scores as determined by the computer system 240 can provide a normalized metric across which the different types of results can be compared on a standardized scale. For example, the relevance score for the hashtag results 3310*a-b* can be determined along the same scale (e.g., numerical scale) as the product results 3312*a-b* and the people results 3314*a-b*. The results within each of the groups can be ordered using any of a variety of factors, such as relevance scores, alphabetical ordering based on text in the results, numerical ordering based on one or more numbers included in the results, and/or other factors. For instance, the hashtag result 3310*a*, which has a larger number of posts (and more associated content under the hashtag 3310*a*), is ordered above the hashtag result 3310*b*. The other result groups 3312*a-b* and 3314*a-b* can be ordered using the same or different ordering techniques. These ordering techniques for ordering the result groups and then the results within each of the groups can improve upon the GUI 401 on a smaller form factor display 302 by presenting and highlighting results across multiple different content types in an intuitive and efficient way that allows a user to readily view and interact with results with minimal additional inputs to locate relevant content.

Although the different types of results are grouped together in this example (e.g., the hashtag results 3310*a-b* are presented adjacent to each other), they can be interleaved and ordered in the GUI 401 so that the different types of results are not grouped together. For example, the GUI 401 can order the individual results 3310-3314 regardless of the type of result type and instead based on one or more factors, such as relevance scores (determined by the computer system 240), which can provide a way the results 3310-3314 to be compared across a common metric even though they are different types of content elements.

Still referring to FIG. 33A, other features that are depicted in the GUI 401 include a cancel button 3302 to cancel/clear a search query that has been entered into the search field 402. For example, in response to pressing the cancel button 3302, the results 3310-3314 can be replaced in the GUI 401 with trending information, which may be the same as or different from the trending information previously displayed in the GUI 401 (as described above with regard to FIG. 4A).

The results 3310-3314 can also include graphical elements for a user to directly interact with the results 3310-3314 from within the GUI 401 (without having to navigate to a specific page to view additional information for the results). For example, the people/user results 3314*a-b* each include buttons 3316*a-b* through which a user of the computing device 300 can engage (e.g., follow, friend, add) or dis-engage (e.g., unfollow, unfriend, remove) with the users who are identified in the results 3314*a-b*. For instance, the user of the computing device 300 is already following the user 3314*a* (as indicated by the checkmark in the button 3316*a*) and can press the button 3316*a* to unfollow the user 3314*a*. The user of the computing device 300 can press the button 3316*b* to begin following the user identified in the people result 3314*b*. Although not depicted in this example, the product elements 3312*a-b* can have buttons (similar to the buttons 3316*a-b*) through which the user of the device 300 can add the product elements 3312*a-b* to the virtual shopping cart 305 and/or can save the product elements 3312*a-b* to the user's profile (e.g., save products to the profile, as depicted in FIG. 7B) from within the GUI 401. Similarly, other content elements that can be presented as search results as in the GUI 401, like social posts, can include a button through which a user of the device 300 can save the social posts to the user's profile (e.g., save posts to the profile, as depicted in FIG. 7B) from within the GUI 401.

Example user input 3318 is provided through the GUI 401 selecting the hashtag tab 3308*b*. Referring to FIG. 33B, in response to receiving the input 3318, the computing device 300 can present hashtag results 3310*a-i* for the hashtag tab 3308 in the GUI 401. The hashtag results 3310*a-i* can be ordered based on one or more factors, such as relevance scores determined by the computer system 240, information included with the hashtag results 3310*a-i* (e.g., alphabetical ordering), and/or information indicating the popularity of the hashtags identified in results 3310*a-i* (e.g., number of posts using the hashtags, number of product elements using the hashtag, number of comments using the hashtag). In the depicted example, the hashtag results 3310*a-i* are ordered based on the popularity of the hashtags as indicated by the number of social posts using the hashtags (e.g., hashtags 330 being used in the social post 308). The number of posts using the hashtags can be determined over all time (all posts considered regardless of when the post occurred) or over a more recent subset of all posts (e.g., all posts within the last day, week, month, year).

Figure 33D:
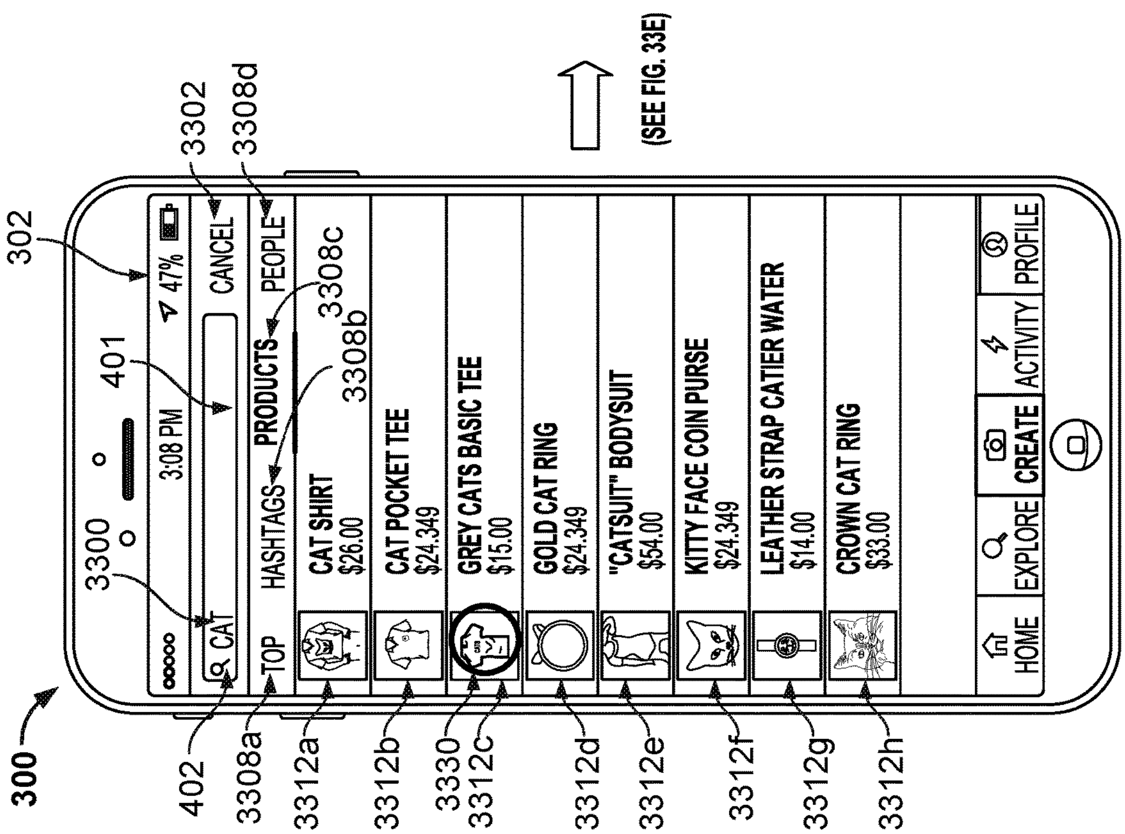
Figure 33C:
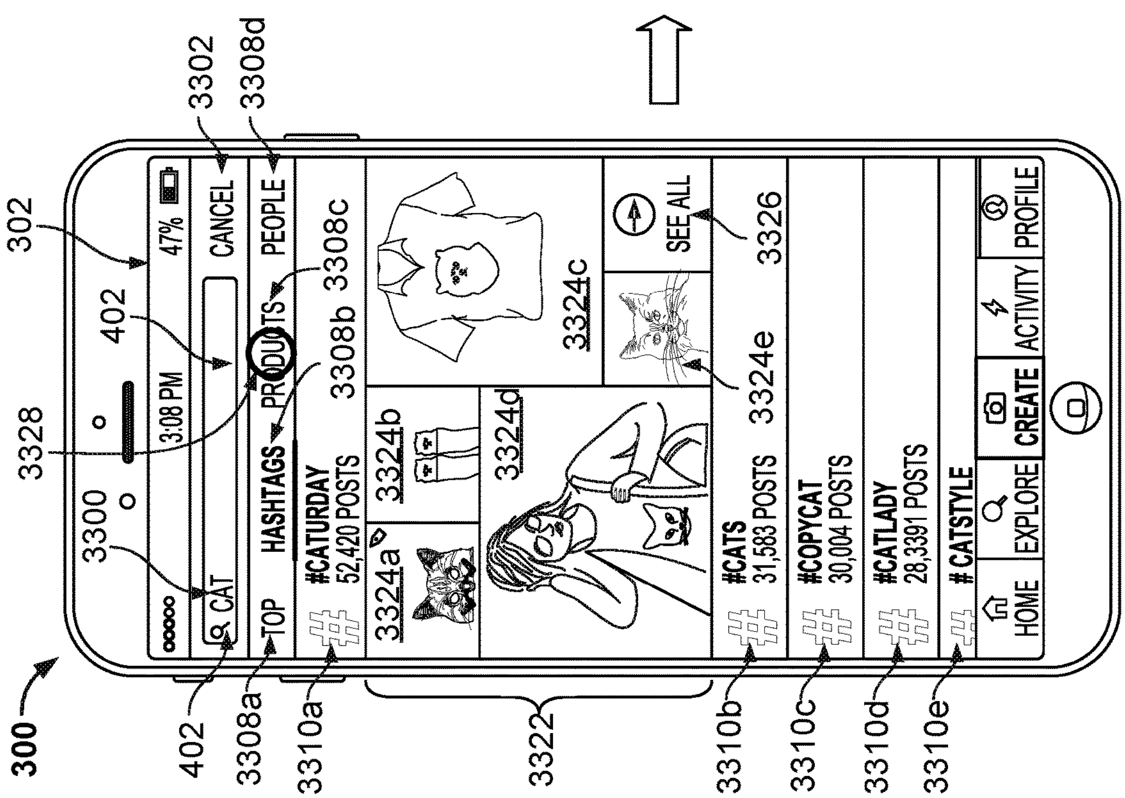

Example user input 3320 is provided through the GUI 401 selecting the hashtag result 3310*a*. Referring to FIG. 33C, in response to receiving the input 3320, the selected result 3310*a* is expanded in the GUI 401 to include the area 3322 in which content elements 3324*a-e* for the hashtag result 3310*a* are presented. The content elements 3324*a-e* include multiple different types of content (e.g., user-generated content, social media content, product elements, users, content categories), including an example product element 3324*a* and example social posts 3324*b-e*. The content elements 3324*a-e* are presented with a preview (e.g., thumbnail or smaller image) of the full content elements (other content previews/snippets are also possible, such as previews of text, tags, comments, comment summaries, emoji-based user reactions, images). The content elements 3324*a-e* are selectable in the GUI 401, selection of which can cause the full content element (e.g., social post 308 depicted in FIG. 3A) to be presented in the GUI 401 (e.g., overlay the GUI 401, displayed in an expanded area of the GUI 401, presented in a new page/interface). Although not depicted, the content elements 3324*a-e* can additionally include buttons that the user of the computing device 300 can select to interact with the content elements 3324*a-e* from within the search results presented in the GUI 401, such as buttons to save the content elements 3324*a-e* and/or to add a product element to the virtual shopping cart 305.

The content elements 3324*a-e* that are presented in the area 3322 are a portion of all of the content elements that are associated with the hashtag 3310*a*, which can be presented in the GUI 401 by selecting the "see all" button 3326. The content elements 3324*a-e* can be selected for presentation in the area 3322 from among all of the content elements that use/are associated with the hashtag 3310*a* based on any of a number of factors, such as how recently the content elements were created/added to the computer system 240 (e.g., newer content elements can be selected for presentation in the area 3322), popularity of the content elements (e.g., content elements with a greater number of saves, shares, views, and/or comments can be selected for presentation in the area 3322), a number of instances and/or significance of the hashtag 3310*a* occurring/being used in the content elements (e.g., content elements using the hashtag 3310*a* more prominently (e.g., title, description) and/or a greater number of occurrences of the hashtag 3310*a* (e.g., hashtag 3310*a* used in the description and comments) can be selected for presentation in the area 3322).

The content elements 3324*a-e* can be selected and served by the computer system 240 before or after the user input 3320 is received selecting the hashtag 3310*a*. For example, the content elements 3324*a-e* can be served by the computer system 240 to the computing device 300 with the search results and cached on the computing device 300 until the user input 3320 is received. Such a configuration can reduce the latency with which the content elements 3324*a-e* are presented in the area 3322 of the GUI 401 (since the content elements 3324*a-e* are already cached locally on the computing device 300), which can improve the performance of the GUI 401. In another example, the content elements 3324*a-e* can cached on the computer system 240 and served to the computing device 300 in response to a request from the computing device 300. For instance, the computing device 300 can be programmed to request the content elements 3324*a-e* in response to user activity related to the hashtag result 3310*a* (e.g., the user input 3318, a user hovering over the hashtag result 3310*a* for at least threshold amount of time, a user viewing the hashtag result 3310*a* for at least a threshold amount of time), which can occur before the user input 3320 is received. Such a configuration can reduce the latency with which the content elements 3324*a-e* are presented in the GUI 401 while at the same time attempting to avoid unnecessary data transmissions (reduce network data usage) in the event that the user does not demonstrate a potential interest in the hashtag result 3310*a*. In other instances, the computing device 300 can simply request the content elements 3324*a-e* in response to the user input 3320, which can increase the latency with which the content elements 3324*a-e* are presented in the GUI 401 but can minimize network transmissions to only those that are specifically requested by the user.

Example user input 3328 selecting the products tab 3308*c* is received through the GUI 401. Referring to FIG. 33D, in response to receiving the user input 3328, the product results 3312*a-h* are presented in the GUI 401. The product results 3312*a-h* can be ordered based on one or more factors, such as relevance scores determined by the computer system 240, information included with the product results 3312*a-h* (e.g., alphabetical ordering, price), and/or information indicating the popularity of the products identified in results 3312*a-h* (e.g., number of product elements have been saved/shared/viewed/commented on by users, number of posts that have tagged product elements, user reviews and/or ratings for the product elements). As described above with regard to FIG. 33A, the product elements 3312*a-h* can be presented with graphical elements (e.g., selectable buttons) through which a user of the computing device 300 can save the product elements 3312*a-h*, add the product elements 3312*a-h* to the virtual shopping cart 305, and/or perform other actions with regard to the product elements 3312*a-h* from within the search results presented in the GUI 401.

Figure 33F:
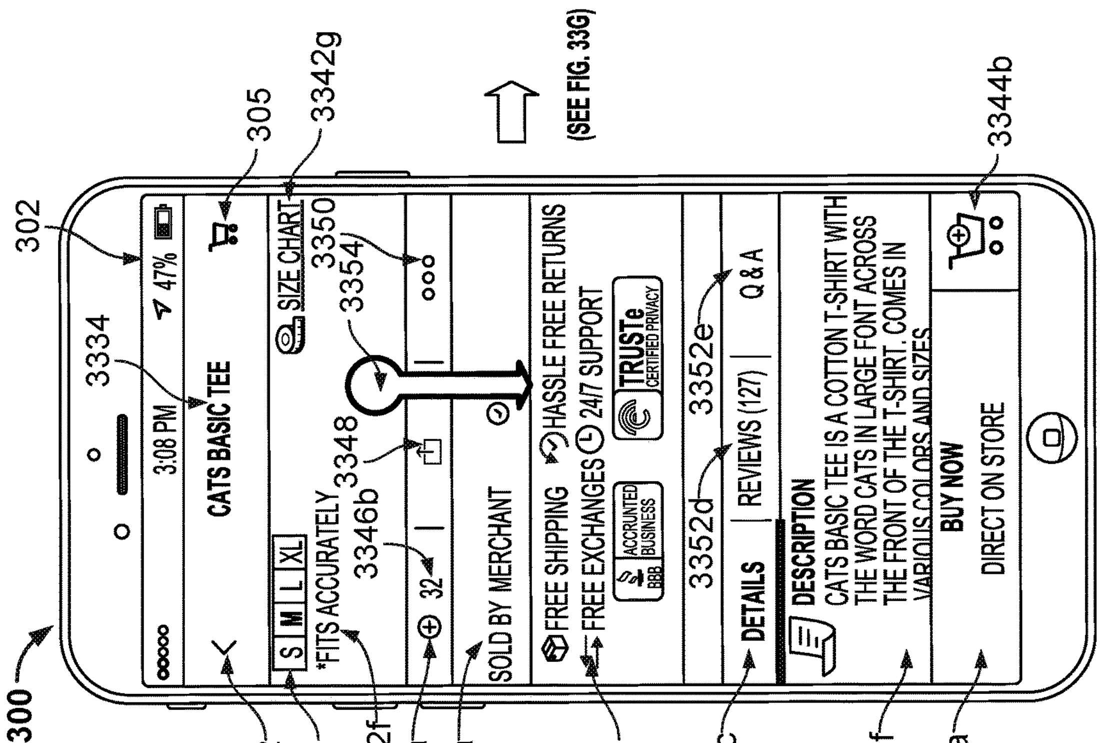
Figure 33E:
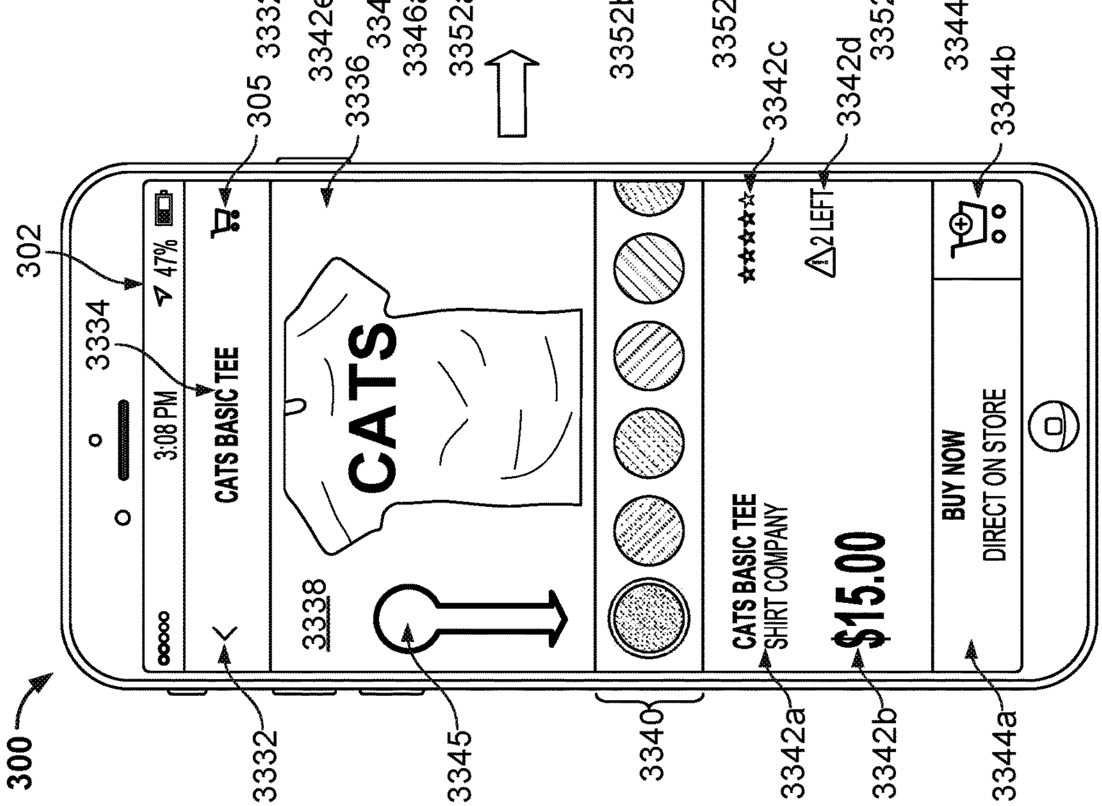

Example user input 3330 selecting the product element 3312*c* is received via the GUI 401. Referring to FIG. 33E, in response to receiving the user input 3330 a product interface 3336 for the selected product element 3312*c* is presented using product information provided by the computer system 240 (in response to a request for information for the product element 3312*c* from the computing device 300). This same product interface 3336 can be presented, for example, after selection of product elements in other interfaces that are part of the social-retail platform, such as product elements presented in the social feed GUI 304, the discovery/exploration GUI 401, the activity feed GUI 601, and/or the profile GUI 701. The product interface 3336 can present the product element 3312*c* in greater detail than in these other interfaces (e.g., explore/discovery GUI 401) and can include controls through which a user can interact with (e.g., save, add to cart, purchase, comment on, share, review) the product element 3312*c*. The product interface 3336 can also present related social posts (e.g., social posts that tag/depict the product) and related product elements (e.g., other products that may also be of interest to users who are interested in the product). The related social posts and product elements can provide ways for users to navigate and discover new elements (e.g., posts, products, users) on the social-retail platform that may be of interest to the user.

The product interface 3336 includes a title 3334 of the product 3312*c*, the virtual shopping cart icon 305, and a back button 3332 to navigate back to the location from which the product interface 3336 was launched. The product interface 3336 includes an image 3338 and selectable images 3340 of different colors/styles for the product 3312*c* that can be ordered/purchased. Selecting one of the selectable images 3340 can, in some implementations, cause the interface 3336 to replace the image 3338 with another image of the product 3312*c* with the selected colors/styles. The product interface 3336 also includes product information 3342*a-d*, such as a name and merchant 3342*a* for the product 3312*c*, an aggregate user rating 3342*c*, a number of remaining products 3342*b* available for order with the merchant, and pricing information 3342*b*.

The product interface 3336 further includes controls 3344*a-b* to purchase/order the product 3312*c*. For example, the control 3344*a* is a selectable button through which the user of the computing device 300 can order the product 3312*c* through a single action (e.g., selecting the control 3344*a*). The control 3344*b* is a selectable button through which the user of the computing device 300 can place the product 3312*c* in the virtual shopping cart 305 associated with the logged-in user. The virtual shopping cart 305 can be persistent across the interfaces 304, 401, 601, 701, and 3336, and can allow a user to add products to the cart 305 from any or all of these interfaces. The controls 3344*a-b* can be part of a footer that is persistently displayed at the bottom of the interface 3336.

In the depicted example, vertical scrolling input 3345 is provided in the interface 3336 to scroll down to view additional information and features related to the product 3312*c*. Referring to FIG. 33F, the scrolling input 3345 can cause additional features from the interface to be presented. For example, the interface 3336 includes additional product information 3342*e-g*, which includes selectable buttons 3342*e* to select a product size and a selectable sizing chart 3342*g* to view a sizing information for the product 3312*c*. The interface 3336 also includes an indication 3342*f* as to whether the product 3312*c* fits accurately (whether the selectable sizes 3342*e* are true to size). The product interface 3336 also includes social engagement features 3346-3350 that are similar to the controls 332-338 described above with regard to FIG. 3A. For example, selecting the save button 3346*a* in the product interface 3336 can cause the product 3312*c* to be saved to the user's profile/user account. Saving the product 3312*c* in the product interface 3336 can additionally cause the product 3312*c* to appear in the activity feed (i.e., activity feed item 606*d*) and/or in the home feed (i.e., social post 308) of other users who are social connected (e.g., followers, friends) to the logged-in user.

The product interface 3336 further includes merchant information 3352*a*, product purchase terms 3352*b*, and tabs 3352*c-e* to view information related to the product, including details for the product 3312*c* (tab 3352*c*), reviews of the product 3312*c* (tab 3352*d*), and questions/answers for the product 3312*c* (tab 3352*e*). The details can include a product description 3352*f*.

Figure 33H:
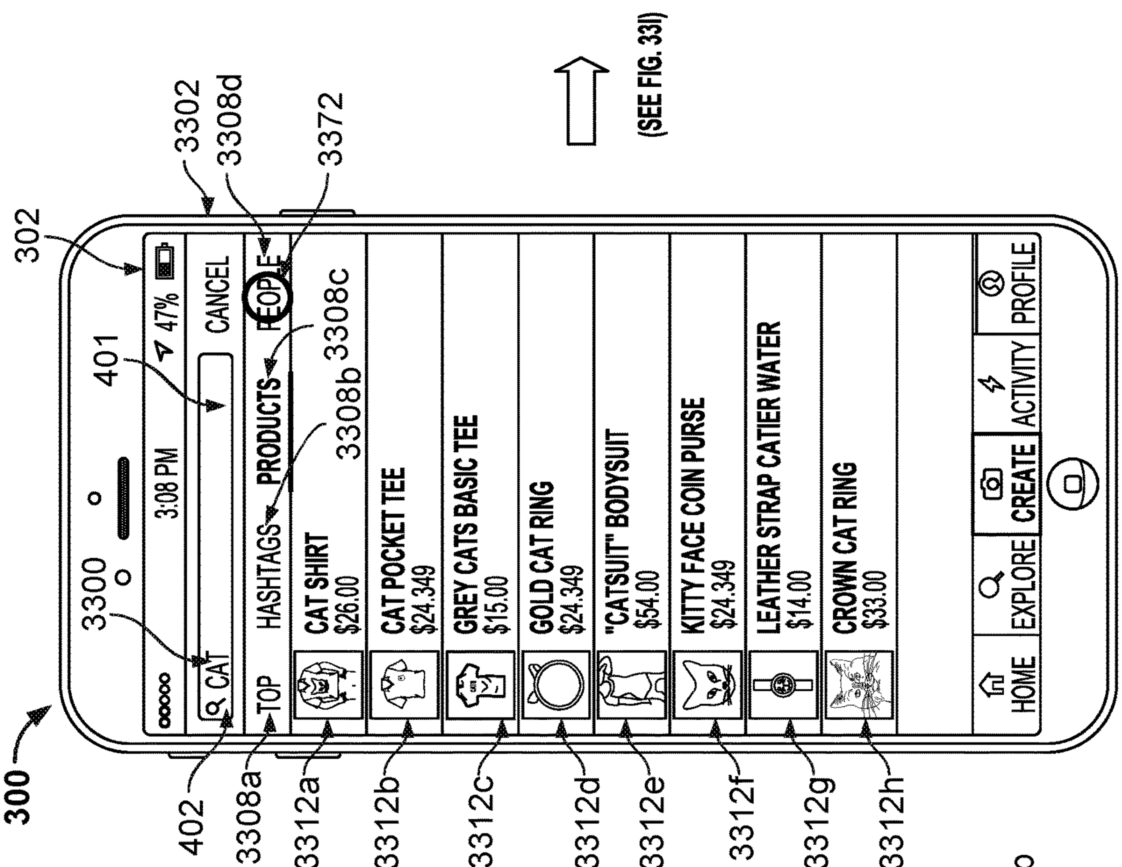
Figure 33G:
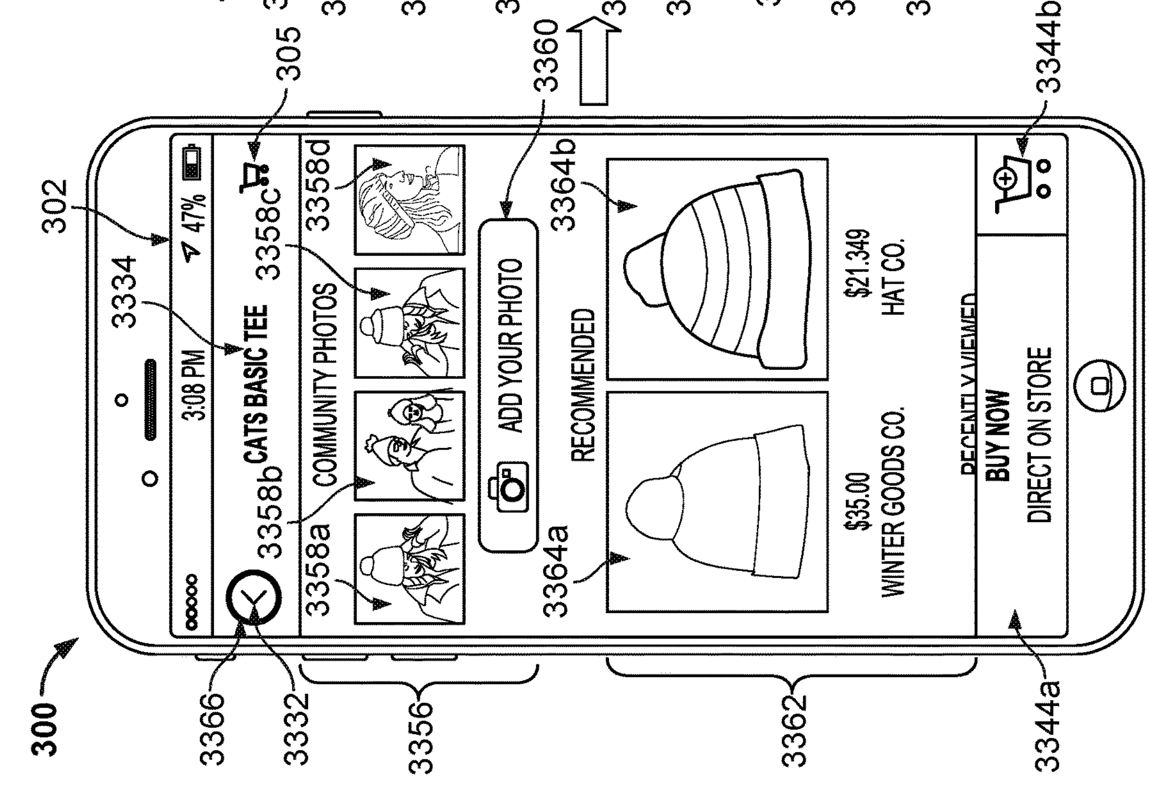

Additional scrolling input 3354 is received through the interface 3336 to view additional information for the product 3312*c*. Referring to FIG. 33G, additional features related to the product 3312*c* are presented, including a section 3356 with user-generated photos 3358*a-d* that depict the product 3312*c* and with a selectable feature 3360 to upload photos of the product 3312*c*. The photos 3358*a-d* can be selected from social posts that, for instance, tag the product 3312*c*. The photos 3358*a-d* can be selectable, which can cause the selected photo to be presented in greater detail and/or for social posts from which the photos were identified. Presentation of social posts in response to selection of the photos 3358*a-d* can allow the user of the computing device 300 to explore and discover, for example, other products that other users have paired with the product 3312*c*. For example, the photo 3358*a* depicts a user wearing the product 3312*c* (shirt) and a hat. Selecting the photo 3358*a* can cause a social post with photo 3358*a* to be presented, which can include information (e.g., tags, product elements) for other products (jacket) depicted in the photo 3358*a* as well. Furthermore, through the shopping cart features (i.e., control 3344*b*) that are persistently included across the interfaces 304, 401, 601, 701, and 3348, the logged-in user can assemble a collection of related products in the virtual shopping cart 305 via the photos 3358*a-d*. For example, the user can navigate to social posts through the photos 3358*a-d* and can add products tagged in the social posts that she is interested in to the shopping cart 305 (e.g., selection of control 3344*b*). The photos 3358*a-d* can additionally and/or alternatively be selected based on user uploads of photos through the feature 3358*e*.

The interface 3336 also presents a section 3362 of recommended other products 3364*a-b*, which can be selected and served by the computer system 240 based on any of a variety of factors, such as comparisons of product information (e.g., product verticals, product descriptions, product details) for the product 3312*c* and other products (e.g., identify similar products as the product 3312*c*), comparisons of the logged-in user's actions (e.g., product purchases, saves, shares, comments, reviews) with other products (e.g., identify products that the logged-in user has a history of being interested in), and/or the actions of other users (e.g., shares, saves, purchases, comments, ratings, reviews). For example, the computer system 240 can identify the recommended products 3364*a-b* based a group of users having performed similar actions (e.g., shares, saves, purchases, comments, ratings, reviews) for the recommended products 3364*a-b* and the product 3312*c*. For instance, if a group of users who have expressed interest in the product 3312*c*, such as by saving the product 3312*c*, have also expressed interest in the recommended products 3364*a-b*, such as by also saving the products 3364*a-b*, then the computer system 240 can determine that the logged-in user has a high probability of also being interested in the products 3364*a-b*. The recommended products 3364*a-b* can provide an additional avenue for the logged-in user to discover new products and other content across the example social-retail platform.

Example user input 3366 selecting the back button 3332 is received through the interface 3336. Referring to FIG. 33H, the GUI 401 is presented with the product results 3312*a-h* in response to receiving the input 3366. The product results 3312*a-h* are the same as those presented before the interface 3336 was presented, as described above with regard to FIG. 33D.

Figures 33I, 33J:
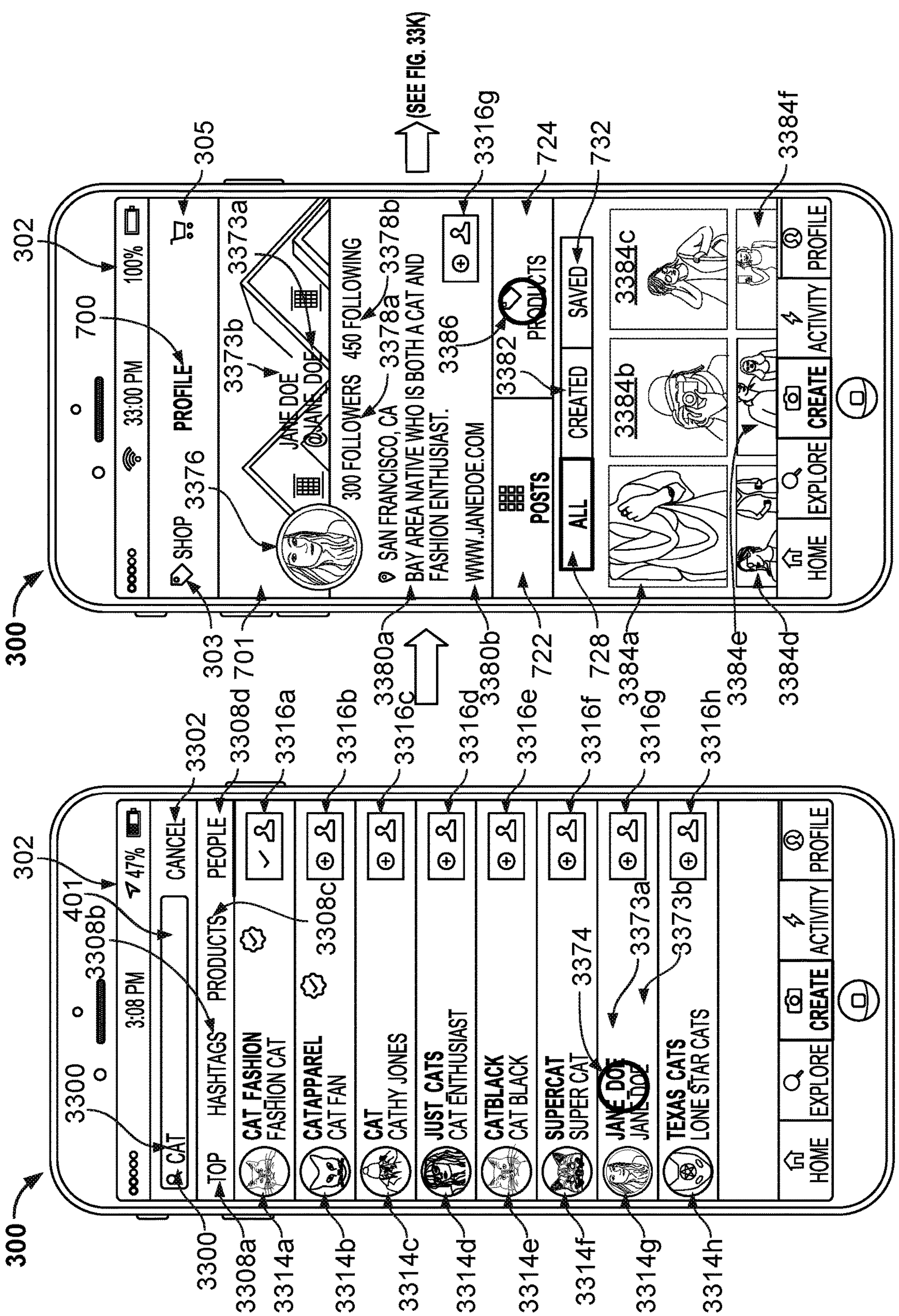

Additional user input 3372 selecting the people tab 3308*d* is received through the GUI 401. Referring to FIG. 33I, the GUI 401 presents people/user results 3314*a-h* in response to receiving the input 3372. As described above with regard to FIG. 33A, the people/user results 3314*a-h* each include selectable buttons 3316*a-h* through which the user of the computing device 300 can elect to follow/unfollow each of the users 3314*a-h*. The user of the device 300 is currently following the user 3314*a* (as indicated by the checkmark in the button 3316*a*) but is not yet following the users 3314*b-h* (as indicated by the plus sign in the buttons 3316*b-h*). Each user in the results is represented by the user's name (e.g., name 3373*b*) as well as a username (e.g., username 3373*a*). As described above with regard to FIGS. 33B and 33D, any of a number of factors can be used to determine the ordering of the users 3314*a-h* in the GUI 401, such as relevance scores determined by the computer system 240, information included with the people/user results 3314*a-h* (e.g., alphabetical ordering), and/or information indicating the popularity of the users in the results 3314*a-h* (e.g., number of followers, number of social posts for the users 3314*a-h* that have been saved/shared/viewed/commented on by users).

Example user input 3374 selecting the user result 3314*g* is received through the GUI 401. Referring to FIG. 33J, in response to receiving the input 3374 the GUI 701 is presented with profile information for the selected user 3314*g*. The fields and features in the GUI 701 are, for the most part, the same as those described above with regard to FIGS. 7A-B, but with information 3373*a-b*, 3376-3380, and 3384*a-f* being presented for the user 3314*g* (instead of the information for the user who is logged in to the computing device 300). For example, the GUI 701 presents the user's name 3373*b* and username 3373*a*, profile picture 3376, follower and following information 3378*a-b*, background information 3380*a*, blog/website information 3380*b*, and posts 3384*a-f* that are associated with the user 3314*g*. The posts 3384*a-f* include posts that were created by the user 3314*g* (as indicated by the created tab 3382) and posts that have been saved by the user 3314*g* (as indicated by the saved tab 732). The created tab 3382 is different from the mine tab 730 based on the profile that is being viewed in the GUI 701 being for a user who is different from the logged-in user on the device 300.

Figure 33K:
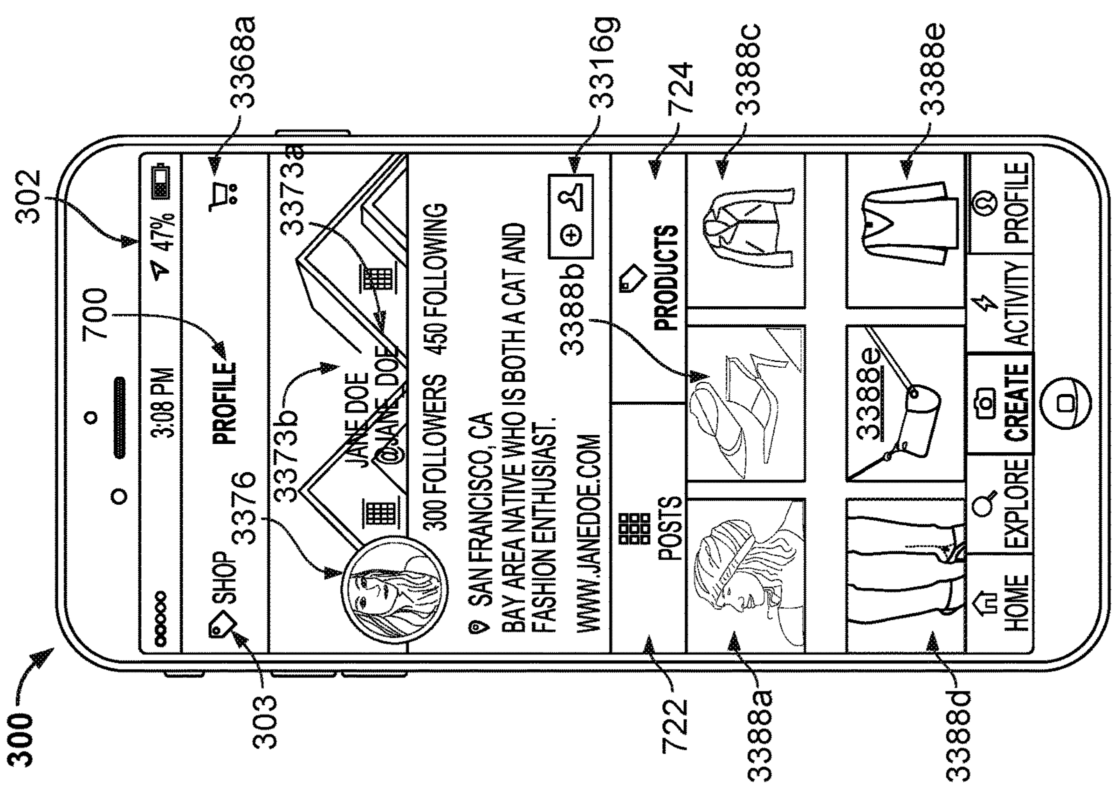

Additional user input 3386 selecting the products tab 724 is received through the GUI 701. Referring to FIG. 33K, products 3388*a-f* that have been saved publicly by the user 3314*g* are presented in the GUI 701. Since the GUI 701 is presenting the profile of a user who is different from the logged-in user on the device 300, the products that are presented in the GUI 701 are limited to the publicly saved products elements 3388*a-f*. By viewing the profile GUI 701 for the user 3314*g*, the logged-in user on the device 300 can discover and explore additional elements—social posts, product elements, users—beyond just those identified in the search results.

Figure 34A:
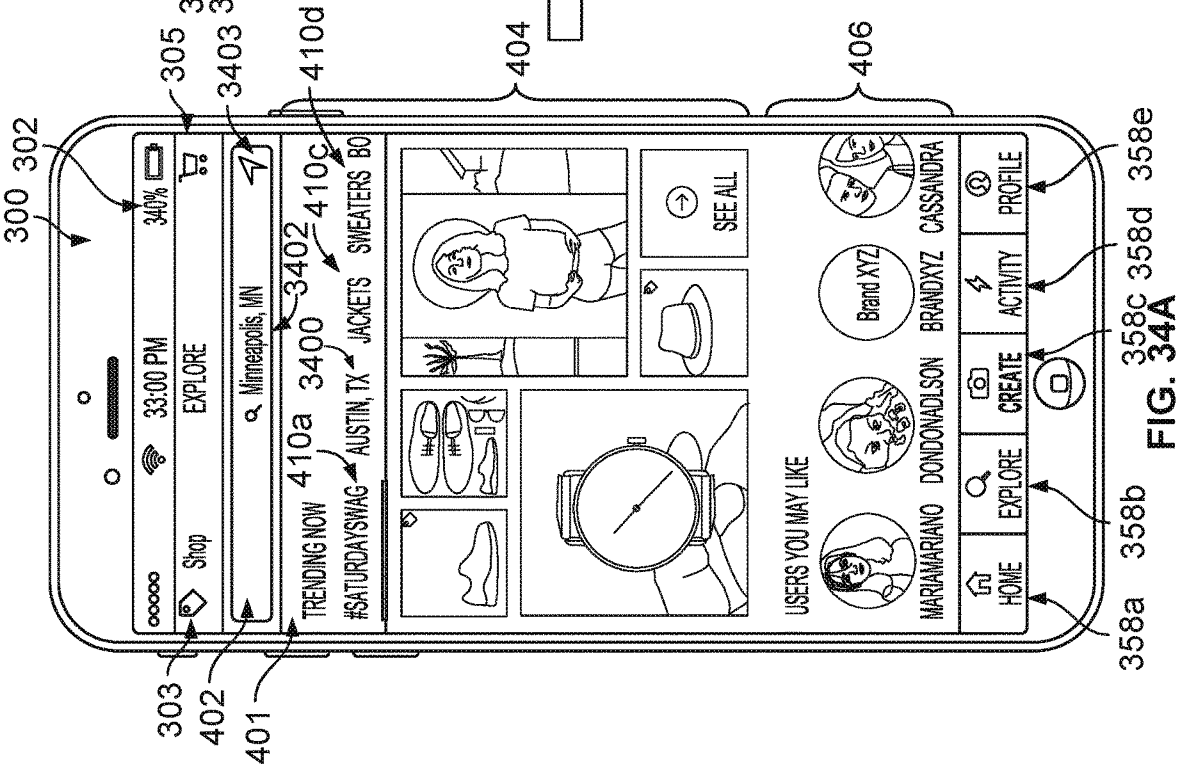
FIGS. 34A-B depict a sequence of screenshots and user interactions with a GUI for an explore/search interface on an example platform.
Figure 34B:
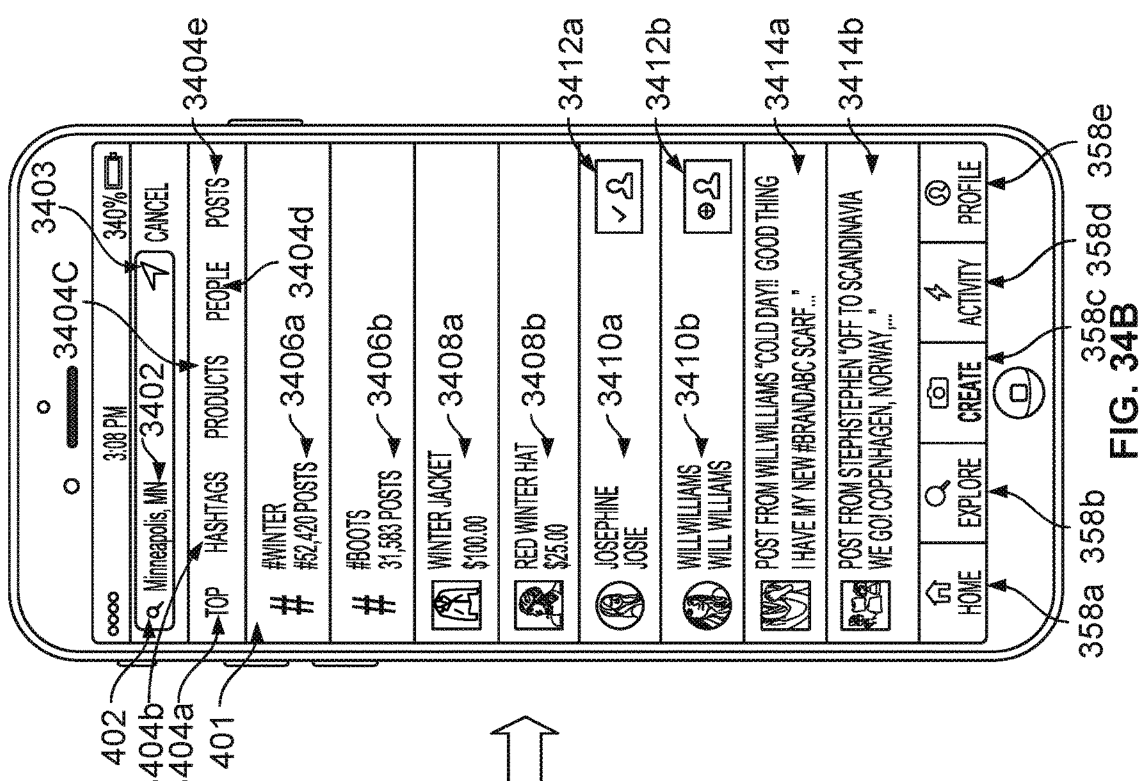

Referring to FIGS. 34A-B, a sequence of screenshots depicting searching by location in the explore/search interface on an example social-retail platform provided by the computer system 240 is depicted.

Referring to FIG. 34A, the GUI 401 includes a search field 402 through which a user can provide a search query, which in this example is an example location 3402. The search field 402 can have one or more user input features to permit location-based searching, such as a virtual keyboard, trending location suggestions 3400 that can be selected, and location services 3403 through which a user can automatically obtain a current, recent, and/or saved location of the device 300. The selectable option 3400 can be similar to the other selectable options 410*a* and 410*c-d*, and can be identified by the computer system 240 based on it being used/tagged frequently across a variety of different social media posts, comments, product elements, product reviews, and/or other content elements.

In response to submitting the location-based search query 3402, the client computing device 300 can transmit the search query 3402 to the computer system 240, which can receive and process the search query 3402. For example, the computer system 240 can access social posts, product elements, and other content to identify search results for the query. The search results can include a variety of different content types, such as social media posts, product elements, hashtags, users on one or more social networks, and/or other content types. For example, the computer system 240 can identify social media posts that have tagged the location 3402 (or another location within a threshold distance of the location 3402) and/or social posts that have been authored by users at the location 3402 or another nearby location. In another example, the computer system 240 can identify product elements that have been associated with the location, such as products commonly tagged with the location 3402 in one or more social posts, product elements that have been tagged with the location 3402 (e.g., tagged in user reviews), and/or product elements that have been viewed/shared/saved/commented on/reviewed by users who are located at or near the location 3402. In a further example, the computer system 240 can identify users in the results based on the user being located at the location 3402 and/or having created social media posts that tag the location 3402.

Referring to FIG. 34B, the computer system 240 can serve the results to the search query 3402 back to the computing device 300, which can present them in the GUI 401. The example search results 3406-3414 include example tabs/categories 3404*a-e* for results that can be presented, with the top results 3404*a* being a combination of results across all categories, the hashtag results 3404*b* being hashtag results, the products results 3404*c* being product element results, the people results 3404*d* being identified users, and the post results 3404*e* being social media posts. In the depicted example, the top results tab 3404*a* is selected, which causes mixed-type results 3406-3414 to be presented in the GUI 401. The example results include example hashtag results 3406*a-b*, example product results 3408*a-b*, example user results 3410*a-b*, and example social media post results 3414*a-b*. The results 3406-3414 are served and presented in a similar manner as the results 3310-3314 described above with regard to FIG. 33A. For example, the graphical elements for the results 3406-3414 are selectable and can include selectable buttons, like the selectable buttons 3412*a-b*, through which the user can interact with the results 3406-3414 from within the GUI 701. A user can interact with the search results 3406-3414 in a similar manner as the interactions described above with regard to FIGS. 33A-K.

Figure 35B:
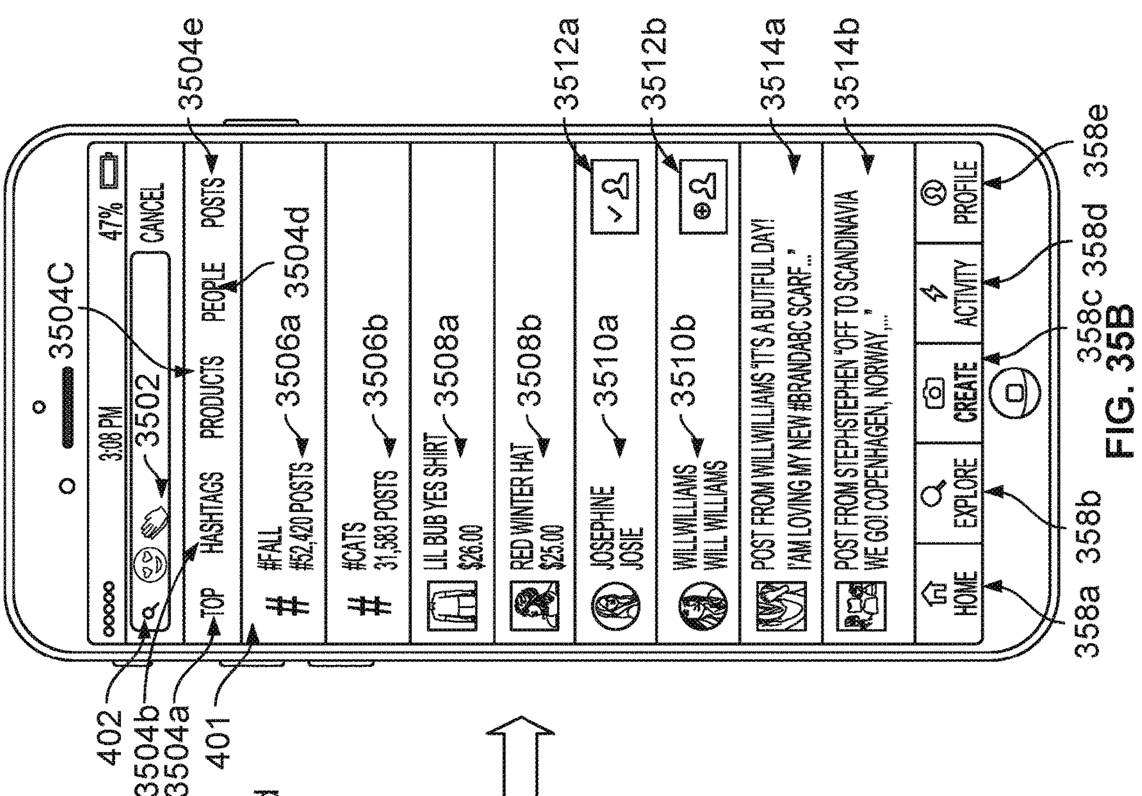
FIGS. 35A-B depicts a screenshot and user interactions with a GUI for an explore/search interface on an example platform.
Figure 35A:
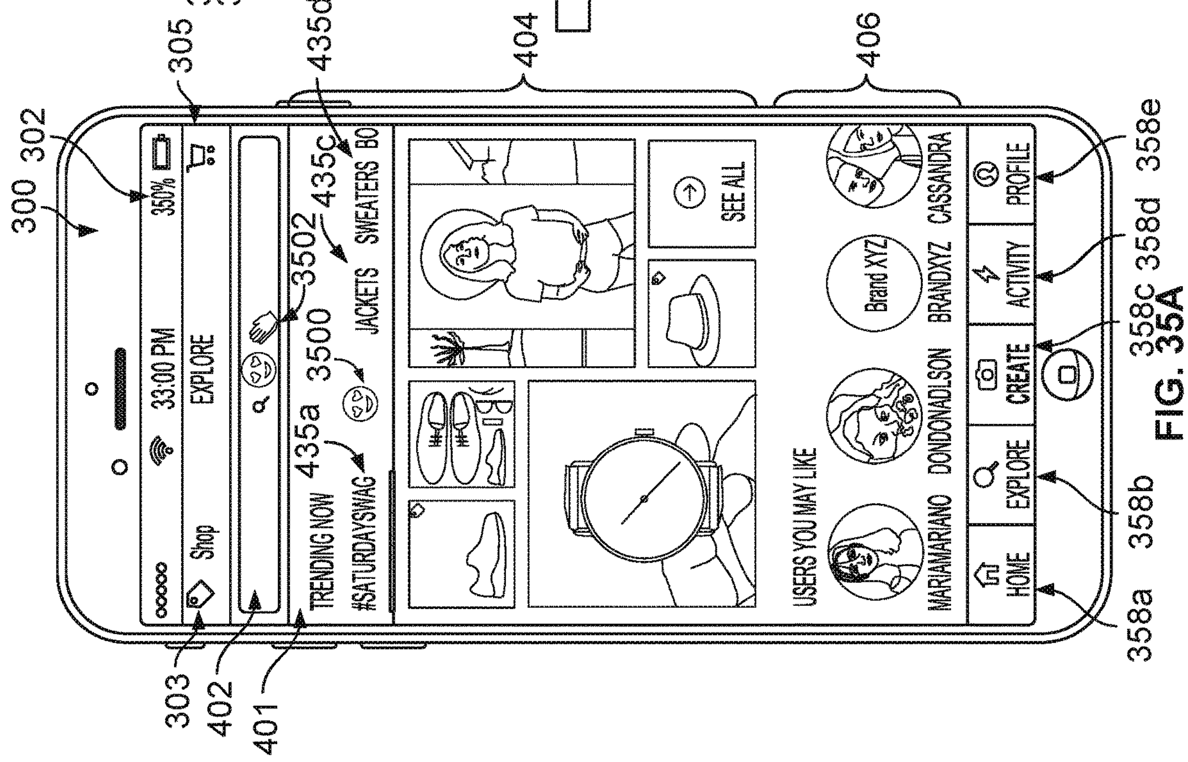

Referring to FIGS. 35A-B, a sequence of screenshots depicting searching by emojis with the explore/search interface on an example social-retail platform provided by the computer system 240 is depicted.

Referring to FIG. 35A, the GUI 401 includes a search field 402 through which a user can provide a search query, which in this example is a collection of emojis 3502. The search field 402 can have one or more user input features to permit emoji submission in search queries, such as a virtual keyboard (e.g., virtual keyboard 3304) that is displayed on the screen with features to identify and select the emojis 3502. The GUI 401 for the explore/search interface further includes a selectable option 3500 to view content elements (e.g., social media posts, product elements) that are associated with currently trending emojis. The selectable option 3500 can be similar to the other selectable options 410*a* and 410*c-d*. For example, the trending emoji 3500 can be identify by the computer system 240 based on it being used frequently across a variety of different social media posts, comments, product elements, product reviews, and/or other content elements.

In response to submitting the emoji-based search query 3502, the client computing device 300 can transmit the search query 3502 to the computer system 240, which can receive and process the search query 3502. For example, the computer system 240 can access content summaries for social media posts, product elements, and other content, and can use the content summaries to identify search results for the query. Content summaries can be, for example, emoji-based summaries of multiple content elements, like comments, for a social post and/or product element. The computer system 240 can determine a content summary, such as the top emoji response in the comments to a social post, based on any of a variety of techniques, such as frequency, weighted frequency, and/or other factors.

The search results determined for the emoji-based search query 3502 can include a variety of different content types, such as social media posts, product elements, hashtags, users on one or more social networks, and/or other content types. For example, the computer system 240 can identify social media posts that have the combination of emojis in the search query 3502 in the content summary (content summaries can include more than one content element). In another example, the computer system 240 can identify product elements that have content summary review with the combination of emojis in the search query 3502. In a further example, the computer system 240 can identify users in the results based on the user having created social media posts and/or tagged product elements with content summaries that include the emojis in the search query 3502. In another example, the computer system 240 can identify hashtags in the results based on hashtags being used in the descriptions of social media posts and/or products that have content summaries including the emojis in the search query 3502. Additionally and/or alternatively, the computer system 240 can identify results using all content and not just the content summaries.

Referring to FIG. 35B, the computer system 240 can serve the results to the search query 3502 back to the computing device 300, which can present them in the GUI 401. The example search results include example tabs/categories 3504*a-e* for results that can be presented, with the top results 3504*a* being a combination of results across all categories, the hashtag results 3504*b* being hashtag results, the products results 3504*c* being product element results, the people results 3504*d* being identified users, and the post results 3504*e* being social media posts. In the depicted example, the top results tab 3504*a* is selected, which causes mixed-type results 3506-3514 to be presented in the GUI 401. The example results include example hashtag results 3506*a-b*, example product results 3508*a-b*, example user results 3510*a-b*, and example social media post results 3514*a-b*. Each of the graphical elements for the results 3506-3514 are selectable, selection of which can cause the computing device 300 to present a corresponding element (e.g., social media post) on the computing device. The user results 3510*a-b* further include selectable buttons 3512*a-b* to select whether to follow or unfollow the users identified in the results. In this example, the logged-in user is already following the user 3510*a* (as indicated by the check mark in the button 3512*a*), but is not yet following the other user 3510*b* (as indicated by the plus symbol in the button 3512*b*). A user can interact with the search results 3506-3514 in a similar manner as the interactions described above with regard to FIGS. 33A-K.

Although particular combinations and sequences of graphical elements and inputs are described above, other combinations and sequences are also possible. For example, search queries can include combinations of keywords (as described above with regard to FIGS. 33A-K), locations (as described above with regard to FIGS. 34A-B), emojis (as described above with regard to FIGS. 35A-B), and/or other non-traditional inputs. Users, merchants, and/or other parties can promote content elements (e.g., social posts, product elements, users) they are associated with (e.g., created, offer on their website) so that they are weighted more heavily (e.g., increased relevance score) so that they appear more prominently in search results. Users can also follow other content categories and/or streams (in addition to following content generated and/or interacted with by other users), such as following particular hashtags (which can be designated in search results). For example, the hashtag results described above with regard to FIGS. 33A-K can include selectable buttons to follow the hashtag results. Following a hashtag can cause, for example, the computer system 240 to serve content elements including the hashtag in the user's social feed (e.g., GUI 304) and activity feed (e.g., GUI 601), for the hashtag that is being followed to be identified in the user's profile (e.g., GUI 701), and for trending information and search results including the followed hashtag to be weighted more heavily in the explore/discover interface (e.g., GUI 401). Other features and combinations are also possible.

Figure 36:
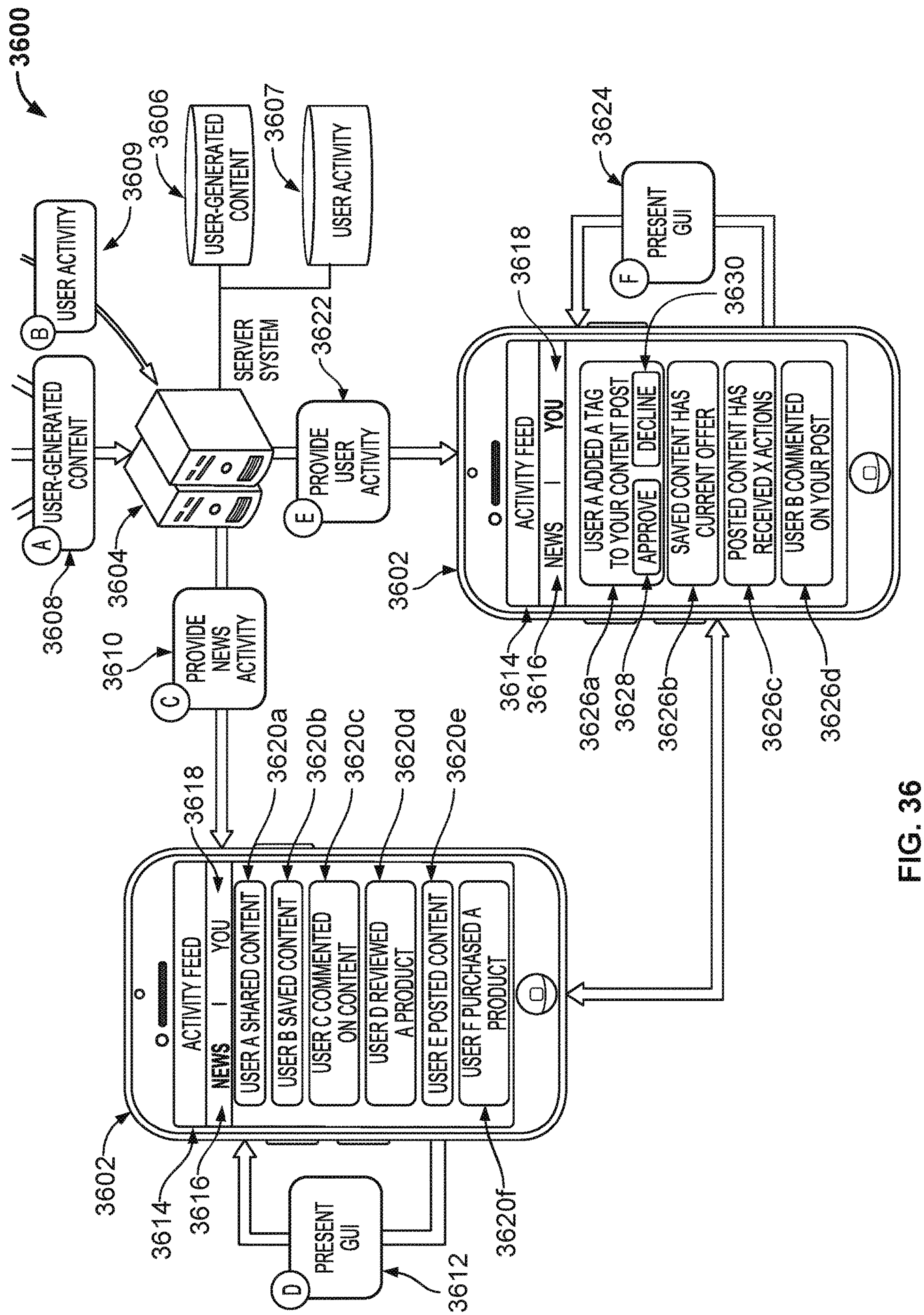
FIG. 36 is a conceptual diagram of an example system to provide an example GUI on an example client computing device.

Referring to FIG. 36, some embodiments of a system 3600 can be configured to provide an example GUI 3614 on a client computing device 3602 for monitoring and managing multiple different types of content within a common interface. For example, the GUI 3614 can present an interface through which a user of the device 3602 can monitor activity (e.g., shares, saves, comments, reviews, posts, reactions) related to content generated by (or otherwise associated with) the user of the device 3602 and/or other users, and/or manage content that has been generated by (or is otherwise associated with) the user of the device 3602.

A variety of features and information can be provided in the GUI 3614 for monitoring activity and/or managing content, such as selectable links and/or other graphical elements that identify, for instance, activities performed, users who performed the activities, content to which the activities relate, times when the activities were performed, actions that can be taken by the user of the device 3602, and/or other features. Such features and information can be organized in the GUI 3614 so that a user of the device 3602 can readily locate and perform actions with regard to relevant content elements. For example, the GUI 3614 can include a tab 3616 that, when selected, presents a chronological list of graphical elements detailing activity related to content generated by (or otherwise associated with) other users. The GUI 3614 can also include another tab 3618 that, when selected, presents graphical elements detailing activity related to content generated by (or otherwise associated with) the user of the device 3602 and graphical elements to prompt user action with regard to content generated by (or otherwise associated with) the user of the device 3602.

Content that is managed and/or monitored through the features provided by the GUI 3614 can include any of a variety of content types, such as social medial content (e.g., user posts, comments, shared content), product content, messaging content, productivity application content, news content, and/or other types of content. For example, the GUI 3614 can present and seamlessly integrate activity information related to social media content (e.g., user posts, comments, shared content) with other types of content (e.g., product content, messaging content, productivity application content, news content) that are tagged in the social media content. The GUI 3614 can allow users to interact with content in a variety of ways, such as through social interactions (e.g., share, save, comment) and other types of interactions (e.g., purchasing, messaging, productivity, news distribution) without exiting the GUI 3614 and its activity streams to use other, specifically designed applications or interfaces. For example, instead of providing a GUI that presents a single type content (e.g., social media content, product content) and that links to other applications/GUIs that are launched to present other types of content, the GUI 3614 is programmed present multiple types of content without launching or otherwise relying on another application/GUI.

The computing device 3602 can be any of a variety of client computing devices, such as a mobile computing device (e.g., smartphone, tablet, wearable device, smartwatch), laptop computer, desktop computer, and/or other types of user computing devices. The computing device 3602 can communicate with the server system 3604 over one or more networks (e.g., internet, local area network (LAN), wide area network (WAN), virtual private network (VPN), wireless network, mobile data network, or any combination thereof) to obtain, associate, and present multiple different types of content in the GUI 3614. The server system 3604 can be a computer system (e.g., cloud computer system) that either by itself or through affiliate networks is able to serve and provide features for multiple different types of content, such as social media, messaging, e-commerce, and/or other types of content. For example, the server system 3604 may directly provide social networking features and can communicate with other affiliate computer systems to provide product-related features (e.g., reviews, purchasing, order tracking). In other examples, the server system 3604 may directly provide both social networking features and product-related features. Other configurations of the server system 3604 among one or more other computer systems are also possible.

As indicated by step A (3608), the server system 3604 can receive content, such as user-generated content and other types of content (e.g., merchant-provided product content, news content, messaging content). For example, the server system 3604 can receive social media content (e.g., posts, comments, shared content) from other client computing devices and can receive product-related content (e.g., product information, product images, product reviews) from merchant computer systems. The server system 3604 can store the received user-generated content in a data repository 3606 (e.g., cloud storage system), from which it can be served by the server system 3604 to the client computing device 3602. The server system 3604 can store other types of content as well.

The server system 3604 can also receive information identifying user activity, as indicated by step B (3609). For example, user computing devices can provide information identifying actions performed (e.g., encoded identifiers for actions performed by users, such as shares, saves, comment, reaction, view, post, purchase), content with regard to which the action was performed (e.g., unique identifier for content elements stored in the repository 3606), users who performed the actions (e.g., unique user identifiers), timestamps for the actions, and/or other relevant information. User computing devices that are presenting content to users can be programmed to transmit information (in real time, in batched transmissions) to the server system 3604 identifying user activity with regard to multiple different types of content presented on the user computing devices. The server system 3604 can store the activity information in a user activity repository 3607, which, alone or in combination with the content repository 3606, can be accessed by the server system 3604 to provide activity feeds on the computing device 3602.

As indicated by steps C and E (3610, 3622), activity information for a user who is logged-in to the computing device 3602 is served by the server system 3604 to the computing device 3602. In this example, the activity information is separated into two different types—news activity and user activity. News activity represents activity related content generated by (or otherwise associated with) other users and user activity represents activity related to content generated by (or otherwise associated with) the user who is logged-in to the computing device 3602. The news activity can include, for example, activity performed by other users who are socially connected to logged-in user (e.g., friends with the logged-in user, followers of the logged-in user, being followed by the logged-in user) and/or activity performed with regard to content generated by other users who are socially connected to the logged-in user. For instance, if the logged-in user is socially connected with example user A but not with user X, the news activity can include activity related to the user A performing an action (e.g., share, save, comment, like, reaction, review) with regard to content generated user X and activity related to the user X performing an action with regard to content generated by user A. The same would hold true if the user X were also socially connected to the logged-in user on the device 3602, but the user X need not be socially connected with the logged-in user for this example activity to be identified and served to the device 3602 based on the activity being related to the user A, who is socially connected to the logged-in user.

The news activity can also include activity that is associated with other users who are socially connected to the logged-in user. For example, the news activity can include information regarding new social connections that are established for the users with whom the logged-in user is socially connected, such as the example user A becoming friends with, following, or being followed by user X. In another example, the news activity can include information regarding socially-connected users being tagged in or otherwise associated with content elements, such as being tagged in a social media post or at a particular location/event.

The news activity information is received and presented in the GUI 3614 on the client computing device 3602, as indicated by step D (3612). For instance, example activity information is presented under tab 3616 in the GUI 3614 as graphical elements 3620*a-f*, which represent activity related to a user sharing content (3620*a*), a user saving content (3620*b*), a user commenting on content (3620*c*), a user reviewing a product (3620*d*), a user posting/generating content (3620*e*), and a user purchasing a product (3620*f*). Each of the example users A-F who have performed the actions identified in the activity feed elements 3620*a-f* can be socially connected to the user who is logged-in to the computing device 3602 and/or can be performing actions with regard to content generated (or otherwise associated) with users who are socially connected with the logged-in user. The graphical elements 3620*a-f* can each include one or more selectable features (e.g., links, button, graphics, icons, thumbnail image) through which the user of the device 3602 can navigate in the GUI 3614 to additional information related to the activity item. For example, the graphical element 3620*a* can include selectable elements for the user A (selection of which can navigate the GUI 3614 to a profile page for the user A), the content that was shared (selection of which can navigate the GUI 3614 to the full content that has been shared), and the user who generated the content (selection of which can navigate the GUI 3614 to a profile page for the content generating user). In another example, the graphical element 3620*b* can include selectable elements for the user B (selection of which can navigate the GUI 3614 to a profile page for the user B), the content that was saved (selection of which can navigate the GUI 3614 to the full content that was persistently saved in association with the user B's account), and the user who generated the content (selection of which can navigate the GUI 3614 to a profile page for the content generating user). The other graphical elements 3620*c-f* can include similar selectable features. Additional information for the content elements can be presented within the GUI 3614 in any of a variety of ways, such as overlaying the activity feed in the GUI 3614, expanding an area of the GUI 3614 to present the additional information (e.g., expanding an area of the GUI 3614 below the selected element to present the additional information), presenting a new page for the additional information, and/or other ways of presenting the additional information.

The graphical elements 3620*a-f* can additionally include selectable features through which the user of the device 3602 can interact with the content and/or users identified in the graphical elements 3620*a-f* from within the activity feed. For example, the graphical element 3620*a* can additionally include selectable features through which the user logged-in to the computing device 3602 can perform one or more of the following actions from within the activity feed (without transitioning to a different interface or application): add/friend/follow the user A, add/friend/follow the user who generated (or is otherwise associated with) the content element that the user A shared, and/or share, save, react to, like, comment on, and/or perform other actions with regard to the content that the user A shared. In another example, the graphical element 3620*d* can additionally include selectable features through which the logged-in user can perform one or more of the following actions from within the activity feed: add/friend/follow the user D, can add the reviewed product to a virtual shopping cart, can purchase the reviewed product, and/or share, save, react to, like, review, and/or perform other actions with regard to the product reviewed by user D. By presenting the graphical elements 3620*a-f* with such features, the GUI 3614 can be improved by allowing the user of the device 3602 to perform multiple different types of actions across multiple different types of content from within a single interface instead of having to switch between different applications and/or interfaces (which can decrease efficiency and increase computational resource usage on the computing device 3602).

The user activity that is received by the computing device 3602 (step E) represents activity related to content generated by (or otherwise associated with) the user who is logged-in to the computing device 3602. The user activity can include, for example, activity performed with regard to social media posts generated by the logged-in user, such as other users viewing, commenting on, reacting to, purchasing products tagged in, and/or otherwise engaging with content generated by the logged-in user. Such activity can be performed by users who are and are not socially-connected to the logged-in user. For example, the user activity can include information identifying that the user A (from the example above who is socially-connected to the logged-in user) and that the user X (not socially-connected to the logged-in user) have performed actions with regard to a social media post generated by the logged-in user.

The user activity can also include activity performed by other users that requires approval, consent, and/or other input from the logged-in user. For example, the user activity can include another user tagging the logged-in user in a social media post. The logged-in user can be prompted for approval before the tag can be applied to the social media post. In another example, the user activity can include another user applying a tag to content generated by (or otherwise associated with) the logged-in user, such as tagging a product, location, user, productivity project, news item, and/or other element in a social media post generated by the logged-in user. The logged-in user can be prompted to approve the tag before it can be applied to the social media post.

The user activity information can be received and presented in the GUI 3614, as indicated by step F (3624). The user activity information can be output in the GUI 3614 using selectable graphical elements, similar to the graphical elements 3620*a-f*. Example graphical elements 3626*a-d* are depicted in tab 3618 of the GUI 3614 for a variety of different types of user activity, including another user having added a tag to a post created by the logged-in user (3626*a*), content that the logged-in user saved having a current offer (3626*b*), status information for content generated by the logged-in user (3626*c*), and another user performing an action (e.g., commenting) with regard to content generated by the logged-in user (3626*d*). Status information can include, for example, information on a number of actions (e.g., shares, saves, comments, reactions, likes, product purchases) and/or views (e.g., number of times that the content has been served by the server system 3604 to and presented on other computing devices, number of times that the content has been displayed on other computing devices) that have been generated for a content element, such as a social media post and/or other content elements tagged in social media posts.

Status information may be generated and served by the server system 3604 to the computing device 3602 on a periodic basis (as opposed to on a rolling/continual basis), such as when various engagement or other activity milestones are achieved. Milestones can be determined by the server system 3604 using any of a variety of different techniques, equations, and/or sequences. For example, milestones can be determined by the server system 3604 based on linear equations (e.g., milestone=360*X), exponential equations (e.g., milestone=$360*X^2$), logarithmic equations (e.g., milestone=$360^X$), and/or other equations. In another example, milestones can be determined by the server system 3604 based on various milestone sequences, such as a Fibonacci sequence (sum of previous two milestones is the next milestone value), a doubling sequence (multiply previous milestone by two to generate next milestone value), predetermined sequences, and/or other sequences. The server system 3604 can determine status milestones and milestone progressions differently for different types of actions. For instance, milestones for views and reactions may initially be set higher and may progress at greater intervals than milestones for comments, shares, saves, and/or product purchases. By using milestones and milestone progressions to report status information (as opposed to serving status information on a continual or rolling basis), the server system 3604 can increase the efficiency with which activity information is served to the computing device 3602 (e.g., reduce the frequency of status information reporting, which can conserve computational resources (processor cycles, network transmissions, memory usage) on the server system 3604). Additionally, milestones can improve the GUI 3614 for the activity feed, for example, by striking a balance between informing the logged-in user of relevant milestones while at the same time minimizing the number of graphical elements that are presented in the GUI 3614 for status information, which can conserve available space screen space on the computing device 3602.

The graphical elements 3626*a-d* can include selectable elements, like those described above with regard to graphical elements 3620*a-f*. For example, the graphical element 3626*a* prompts the user for input to approve or decline the tag added to a post by user A through selectable buttons 3628 and 3630. The graphical element 3626*a* can further include selectable features for the logged-in user to view additional information in the GUI 3614 regarding user A, the tag that has been applied to the post, and the post to which the tag has been applied. The another example, the graphical element 3626*b* can include selectable features to view additional information regarding the saved content element (e.g., social media post, product element, news content, productivity content) and the current offer that pertains to the content element (e.g., sale on saved product element or product tagged in social media post, limited time window for participation/enrollment in productivity project). In a further example, the graphical element 3626*c* can include selectable features to view the content to which the status information pertains, information identifying the other users who have taken the actions summarized in the status information, and/or analytics related to the status information (e.g., graph depicting frequency of actions over time, analytics describing performance relative to other content for the logged-in user and/or content generated by other users).

The news activity information (step C) and the user activity information (step E) can be identified and served together or separately by the server system 3604. For example, the server system 3604 can identify both news activity and user activity information for a logged-in user and can serve the collective activity information to the computing device 3602. For instance, the server system 3604 can periodically determine and serve activity information updates to the computing device 3602, which the computing device 3602 can receive and cache until the activity feed GUI 3614 is presented on the device 3602 (e.g., presented in response to user selection of an activity feed feature). Such an arrangement can improve the performance of the GUI 3614 by reducing delays in presenting activity information through the use of pre-cached activity feed information (no need to wait for a response from the server system 3604 to present activity information). The server system 3604 can additionally and/or alternatively determine and serve activity information to the computing device 3602 in response to requests from the computing device 3602. For instance, the computing device 3602 can present the GUI 3614 as an infinite feed of activity information and, when the user has scrolled to the end of the cached activity information, the computing device 3602 can request additional and/or updated activity information from the server system 3604. Such requests may pertain to one or more of the news activity information and the user activity information. For example, when the news tab 3616 is presented in the GUI 3614 and the user scrolls to the end of the cached news activity information on the device 3602, the device 3602 can transmit a request for additional news activity information, which can prompt the server system 3604 to determine and serve additional new activity for the logged-in user. In another example, when the news tab 3616 is initially presented on the GUI 3614 (e.g., in response to the user selecting the news tab 3616), the computing device 3602 can poll the server system 3604 for updated news activity information while presenting any caches news activity information in the GUI 3614.

The computing device 3602 can organize the activity information in the GUI 3614 using one or more features, such as the tabs 3616 and 3618. Such organizational features, like the tabs 3616 and 3618 which can allow for activity information presented in the GUI 3614 to be automatically filtered, can improve upon the GUI 3614 by allowing a user to readily toggle between different organized/filtered activity information with minimal input required. For example, a user can toggle between the news activity information and the user activity information through a single input selecting either of the tabs 3616 and 3618 (as opposed to having to type a search string for filtering the activity information). This can be particularly beneficial on devices with interfaces for typing that are more cumbersome to use, like devices with touchscreens. Other features and techniques for organizing the activity information in the GUI 3614 are also possible, such as through the addition of more preselected tabs.

FIGS. 37A-F, 38A-B, 39A-B, 40A-H, and 41A-B are screenshots depicting example features and user interactions with the social-retail platform (example implementation of the computer system 240) described above with regard to FIGS. 3A-B, 4A-B, 5A-B, 6A-B, and 7A-B. In particular, these screenshots depict an example implementation of the GUI 3614 described above with regard to FIG. 36 and the system 3600 on a social-retail platform. For example, the content that is identified as being shared in the graphical element 3620*a* can be a social post and the saved content that is identified in the graphical element 3620*b* can be a product element that was tagged in a social post, as described with regard to FIGS. 3A-B, 4A-B, 5A-B, 6A-B, 7A-B, 37A-F, 40A-C, and 41A-B.

Figure 38B:
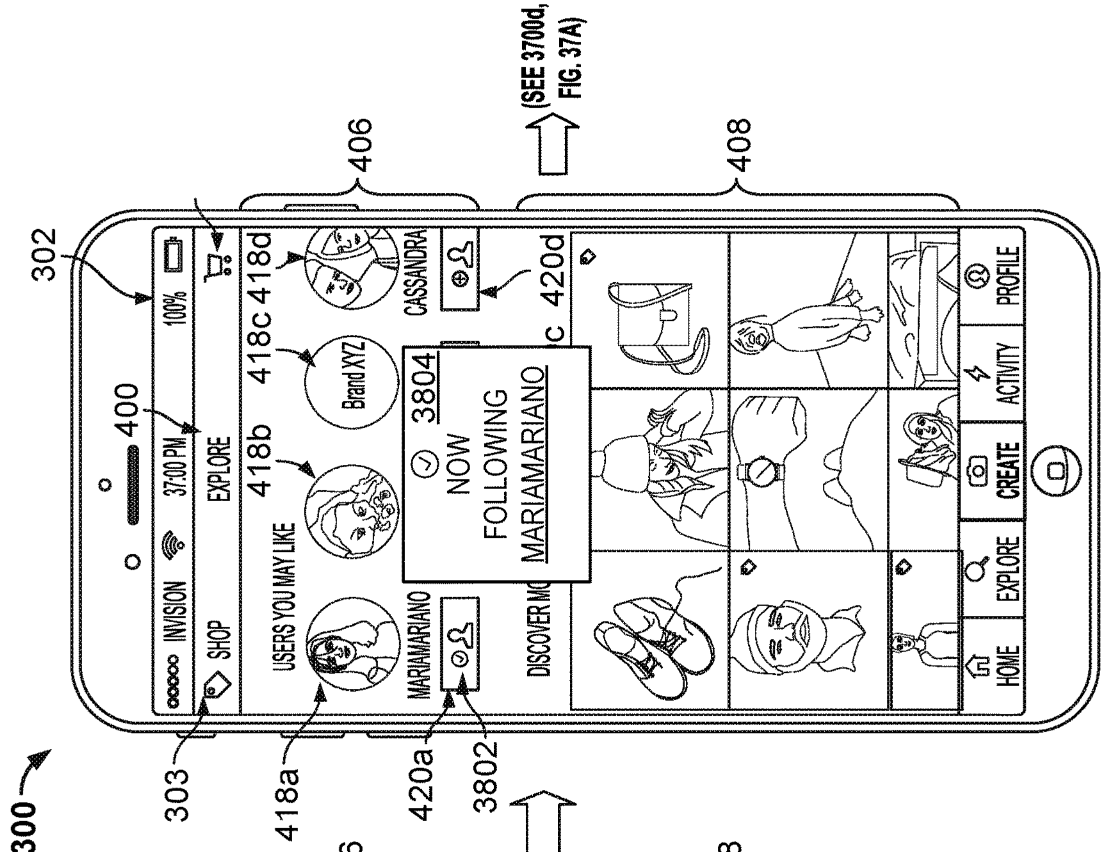
FIGS. 38A-B depict a sequence of screenshots and user interactions with a GUI to follow another user on an example platform.
Figure 38A:
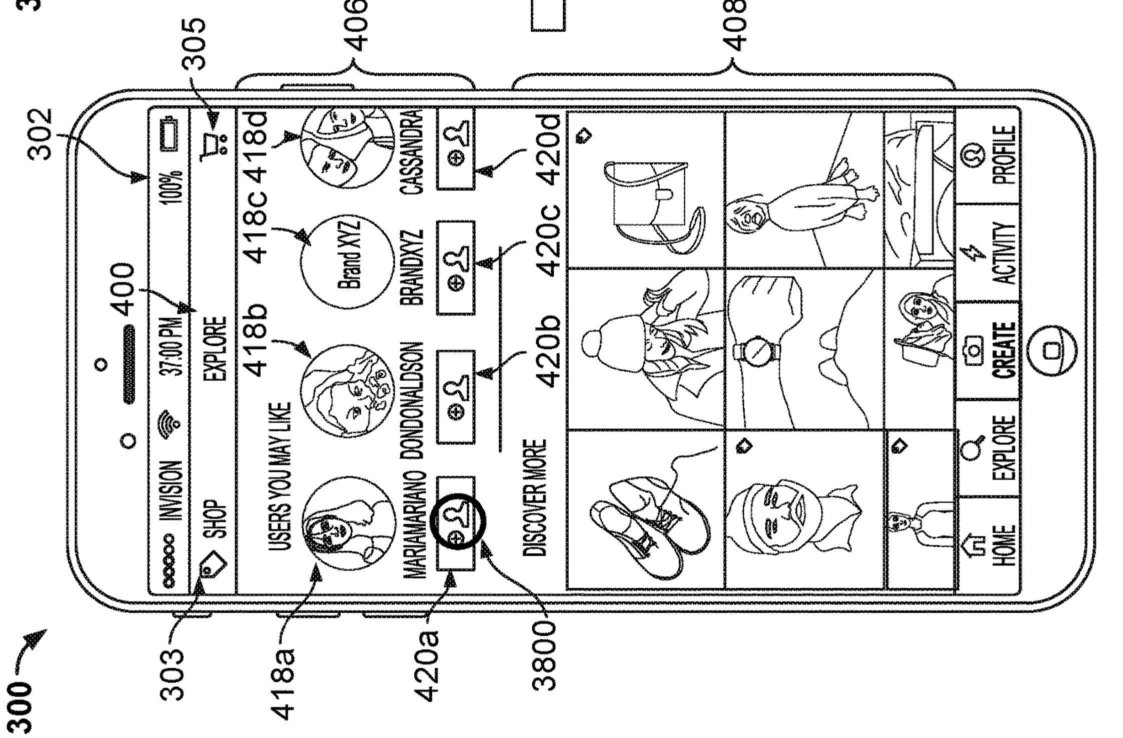
Figures 39A, 39B:
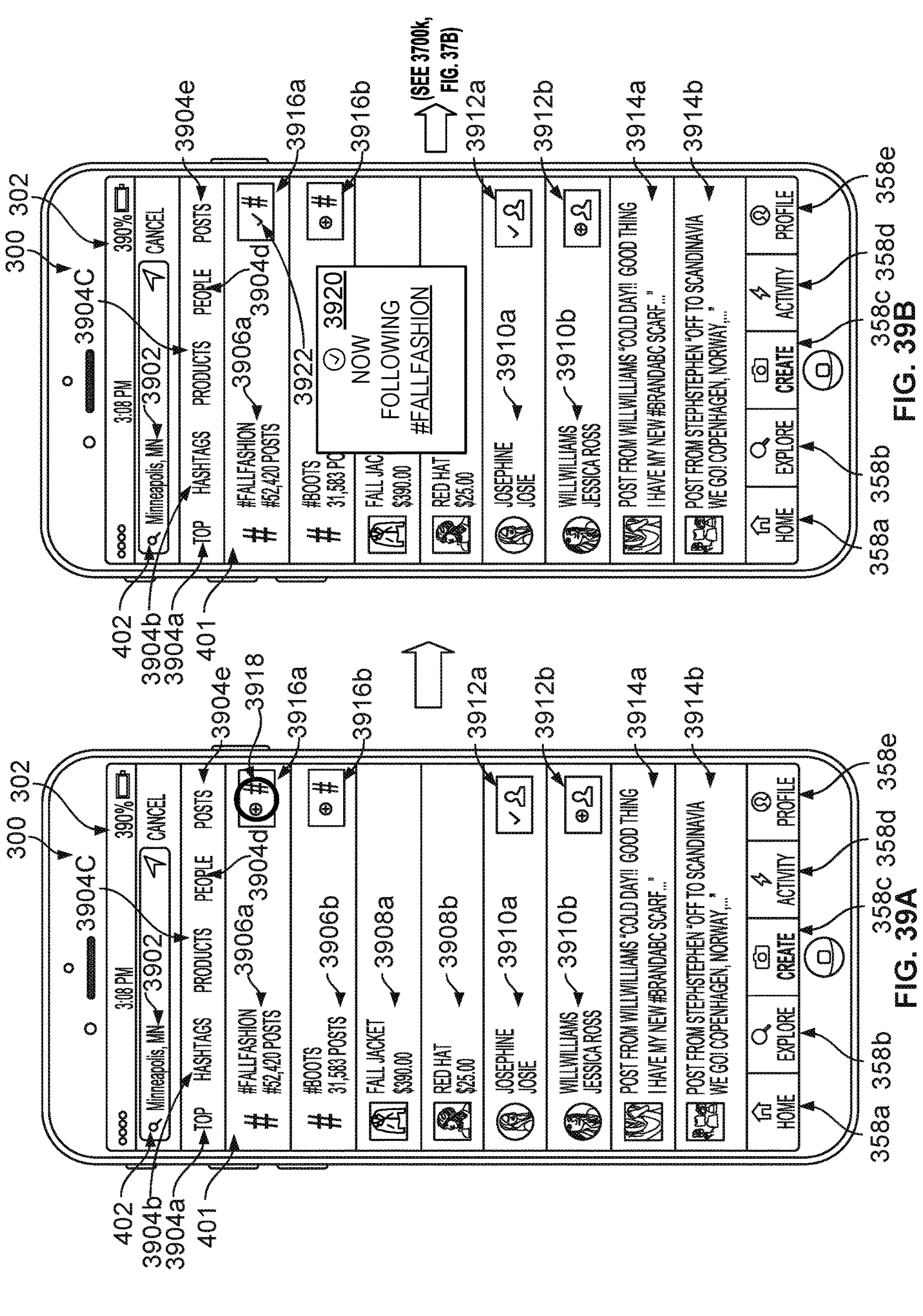
FIGS. 39A-B depict a sequence of screenshots and user interactions with a GUI to follow a content tag on an example platform.

FIGS. 37A-F are screenshots depicting an example activity feed on a social-retail platform, including activity for other users who are being followed and other features (e.g., hashtags, locations, products) that are being followed. FIGS. 38A-B are screenshots depicting user input provided through a GUI to follow another user, which causes activity for the followed user to be presented in the activity feed (FIGS. 37A-F). FIGS. 39A-B are screenshots depicting user input provided through a GUI to follow a hashtag, which causes content elements that include the hashtag to be presented in the activity feed (FIGS. 37A-F). FIGS. 40A-H are screenshots depicting user input provided through a GUI to elect to let other users tag a product in her social post, the user investigating and approving a tag suggested by another user through the activity feed (FIGS. 37A-F), and the tag being applied to the social post. FIGS. 41A-D are screenshots depicting user input provided through a GUI to navigate from a social post identified in the activity feed (FIGS. 37A-F) to the social post and then to a product tagged in the social post.

Figures 37A, 37B:
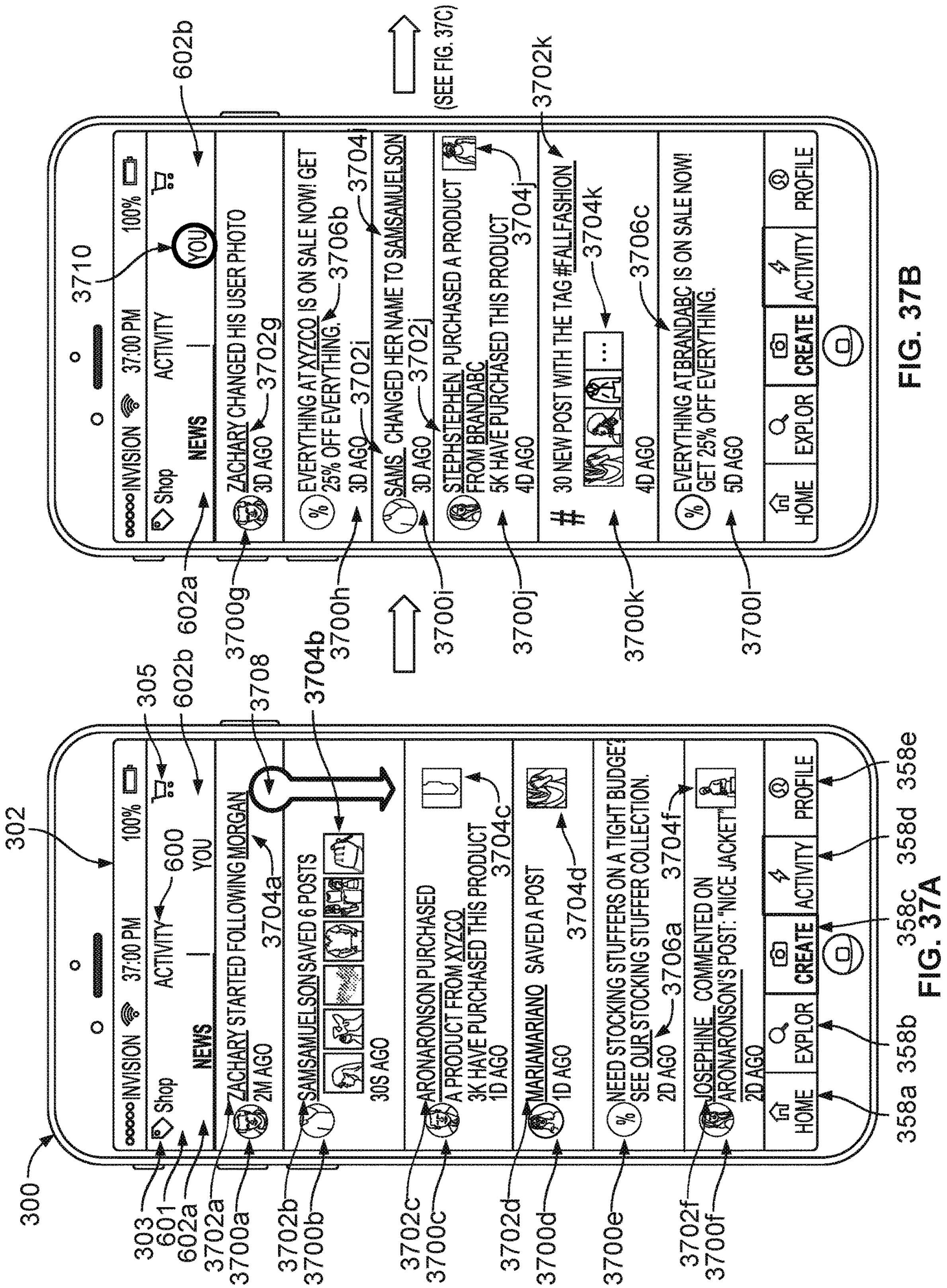
FIGS. 37A-E depict a sequence of screenshots and user interactions with a GUI for an activity feed on an example platform.

Referring to FIGS. 37A-F, a sequence of screenshots depicting user interactions with the GUI 601 presenting an activity feed on the example social-retail platform provided by the computer system 240 is depicted. Referring to FIG. 37A, the GUI 601 presents news activity information in the news activity tab 602*a* (similar to the news activity tab 3616 described above with regard to FIG. 36) for a user who is logged-in to the device 300, as described above with regard to FIGS. 6A-B. The depicted example includes a feed of graphical elements 3700*a-l* for news activity information for the logged-in user. The graphical elements 3700*a-l* are similar to the graphical elements for activities 606*a-f* described above with regard to FIG. 6A. The graphical elements 3700*a-l* each identify an action, event, activity, and/or group of actions/events/activities performed on the social-retail platform by other users and/or entities (e.g., retailers, groups, organizations) on the social-retail platform. As described above with regard to FIG. 36, the graphical elements 3700*a-l* can be identified by the server system 240 and served to the computing device 300 based on social connections (e.g., following, friends) between the logged-in user and other users, entities (e.g., organizations, groups), tag (e.g., hashtags, product tags, location tags), and/or other features. For example, the graphical element 3700*a* identifies that a user 3702*a* who is socially connected to the logged-in user (e.g., being followed by the logged-in user, following the logged-in user, friends with the logged-in user) has started following another user 3704*a*; the graphical elements 3700*b* and 3700*d* identifies users 3702*b* and 3702*d*, respectively, who are socially connected to the logged-in user having saved posts 3704*b* and 3704*d*, respectively, of other users; the graphical element 3700*c* identifies that a user 3702*c* who is socially connected to the logged-in user has purchased a product 3704*c* through the social-retail platform; the graphical element 3700*e* is a promotion for products that are associated with the logged-in user (e.g., the logged-in user has saved product elements or posts tagging product elements that are being promoted, the logged-in user is following product/brand tags for products that are being promoted); and the graphical element 3700*f* identifies a user 3702*f* who is socially connected to the logged-in user having commented on the post 3704*f* of another user.

The activity feed that is presented in the GUI 601 can be an infinite feed, allowing the user of the device 300 to scroll down to display additional activities. For instance, example scrolling input 3708 is received through the GUI 601, causing the activity feed to scroll down and display additional graphical elements 3700*g*-1, as depicted in FIG. 37B. The additional graphical elements 3700*g*-1 identify additional element activities relevant to the logged-in user. For example, the graphical element 3700*g* identifies that user 3702*g* who is socially connected to the logged-in user changed his user photo; graphical elements 3700*h* and 37001 identifies current sales that are ongoing with a retailers 3706*b* and 3706*c*, respectively, that are being followed by or otherwise associated with the logged-in user (e.g., logged-in user has saved products provided by the retailers 3706*b* and/or 3706*c*, logged-in user has saved posts tagging products provided by the retailers 3706*b* and/or 3706*c*, logged-in user is following the retailers 3706*b* and/or 3706*c*, logged-in user has purchased products from the retailers 3706*b* and/or 3706*c* on the social-retail platform); the graphical element 3700*i* identifies that the user 3702*i* who is socially connected to the logged-in user changed her name 3704*i*; the graphical element 3700*j* identifies that the user 3702*j* who is socially connected to the logged-in user purchased a product 3704*j*; and the graphical element 3700*k* identifies new posts 3704*k* that have been recently added on the social-retail platform using a hashtag 3702*k* that is being followed by or otherwise associated with the logged-in user (e.g., logged-in user following the hashtag 3702*k*, logged-in user has used the hashtag 3702*k* at least a threshold number of times in posts and comments on the social-retail platform).

The user can continue to scroll down (and up) the activity feed in the GUI 601. In the event that the user reaches or nears the end of the activities (e.g., has less than a threshold number of undisplayed activities remaining in local storage, has no remaining undisplayed activities in local storage) that have been provided to the computing device 300 by the server system 240, the computing device 300 can request additional activities from the server system 240. For example, if the user repeatedly to scroll down the activity feed, the computing device 300 can repeatedly request additional activities from the server system 240 to display in the GUI 601, thus providing an "infinite" feed of activities to the user.

At least a portion of the activity content that is initially displayed in the GUI 601 (e.g., activities identified in graphical elements 3700*a-f*, activities identified in graphical elements 3700*a-l*) can be preloaded and stored locally by the computing device 300 before the user requests to display the activity feed (e.g., before the user selects the activity feed button 358*d*). For example, the computing device 300 can be programmed to request activity feed information from the server system 240 in the background when such downloading of content will not disrupt or otherwise degrade the performance of the computing device 300 (e.g., such as downloading the activity feed information when the computing device 300 is connected to a Wi-Fi network and has unused capacity over its network interface). By preloading a portion of activities onto the computing device 300 that are initially displayed in the GUI 601 (before scrolling input is received) and requesting additional activities as needed based on scrolling input that is received, the computing device 300 can optimize performance of the GUI 601 by presenting preloaded content in the activity feed with little to no latency, while at the same time balancing the performance of the GUI 601 against performance of the network interface and the local storage system for the computing device 300 (minimizing the use of both to preload content for presentation in the GUI 601).

As indicated by the time information (e.g., second, minutes, hours, days since the action was performed) included with the graphical elements 3700*a*-1, the GUI 601 can organize the graphical elements 3700*a*-1 in the news tab 602*a* based, at least in part, on chronology. For instance, the most recently occurring activities can be presented at the top of the activity feed and later occurring activities being presented further down the activity feed. Other factors can additionally and/or alternatively be used by the GUI 601 to order the graphical elements 3700*a*-1, such as whether the logged-in user already viewed information pertaining to the activity (e.g., user already viewed the activity in the home feed) and/or a projected level of interest in the activity by the logged-in user (e.g., whether the user has expressed interest in similar activity content).

The graphical element 3700*a*-1 can each include multiple different selectable elements to allow a user to readily and easily navigate to additional information from within the GUI 601, similar to the discussion above with regard to the selectable elements depicted in FIG. 36. For example, the elements 3702*a-k*, 3704*a-k*, and 3706*a-c* can all be selectable, and can cause the GUI 601 to request and display additional information for the selected element from the computer system 240. The additional information can be presented in any of a variety of ways, such as being presented in a separate page, inline with the selected element (e.g., expanding an area below the selected element), and/or other presentation techniques.

Figures 37C, 37D:
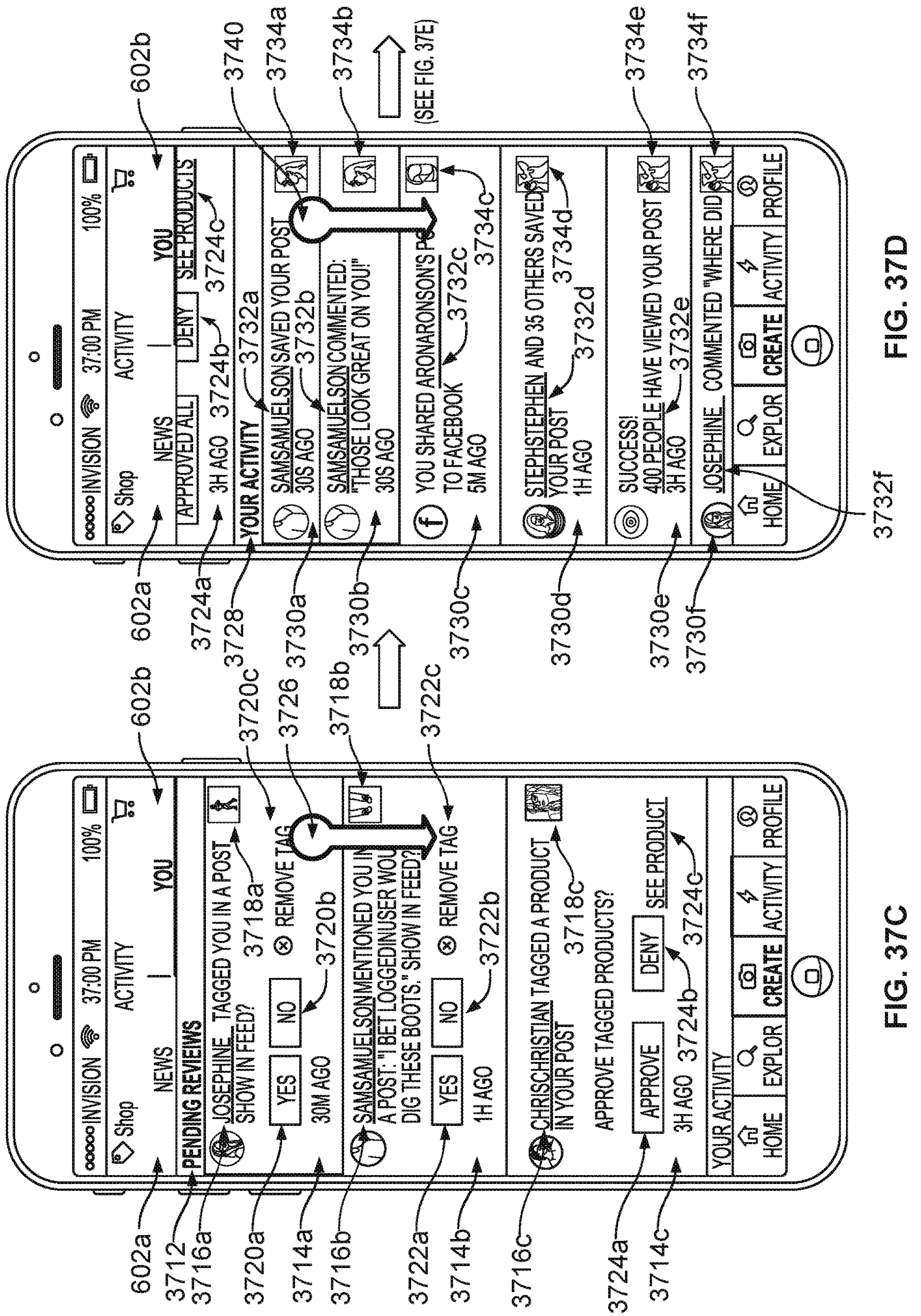
Figure 37E:
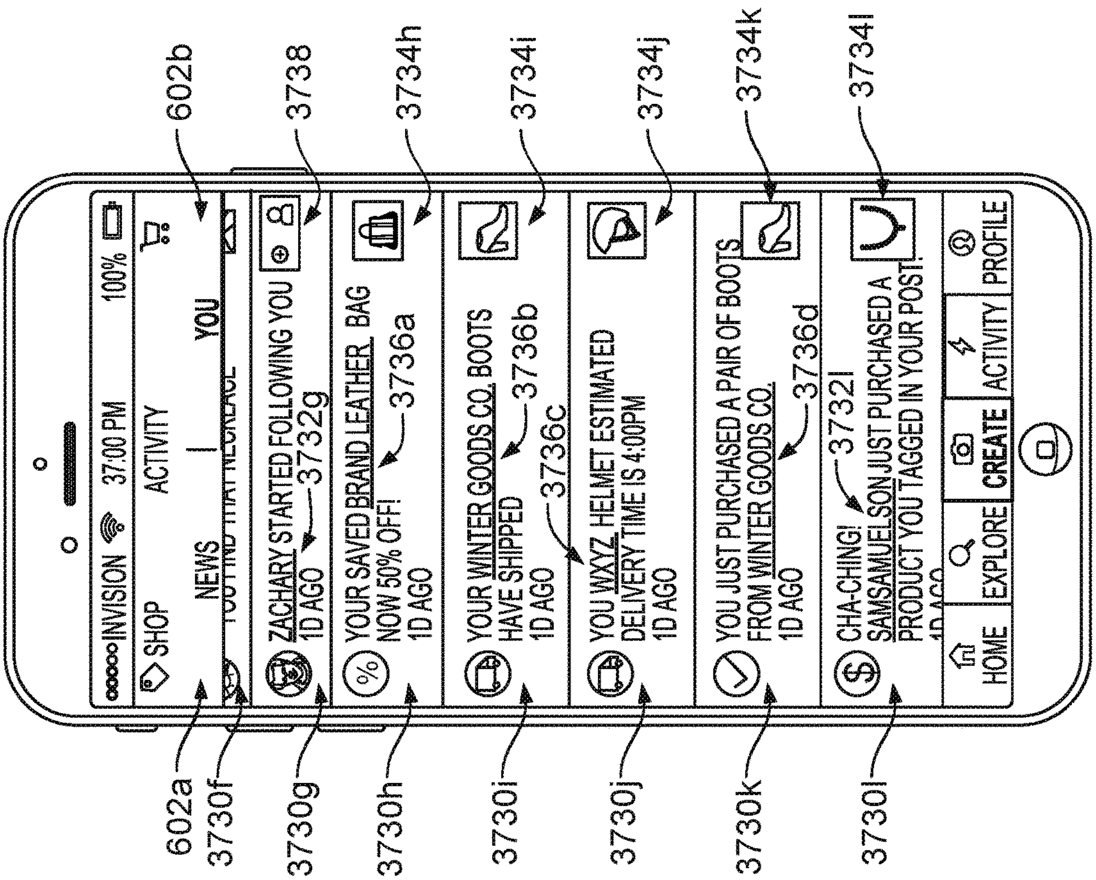

Example input 3710 selecting the user tab 602*b* is received, causing the activity feed with user activity information (similar to the user activity information described above with regard to FIG. 36) to be presented in the GUI 601, as depicted in FIGS. 37C-E. In particular, the GUI 601 presents graphical elements for the user activity information in two groups—a first group 3712 of graphical elements 3714*a-c* for activity information pending or otherwise prompting user review/input, and a second group 3728 of graphical elements 3730*a-l* for activity information identifying activity related to content generated by (or otherwise associated with) the logged-in user. The first group 3712 and the second group 3728 are similar to the sections 630 and 632, respectively, described above with regard to FIG. 6. The first group 3712 of example graphical elements 3714*a-c* are similar to the graphical element 3626*a* described above with regard to FIG. 36 and the graphical elements 634*a-b* described above with regard to FIG. 6, and the second group 3728 of example graphical elements 3730*a-l* are similar to the graphical elements 3626*b-d* described above with regard to FIG. 36 and the graphical elements 650*a-c* described above with regard to FIG. 6.

Referring to FIG. 37C, graphical elements 3714*a-c* each include information identifying a user 3716*a-c* (or other entity, group, or other actor on the social-retail platform) who performed an action with regard to a post/product 3718*a-c*, and with controls 3720*a-c*, 3722*a-c*, and 3724*a-c* providing a set of control operations that the logged-in user can perform with regard to the actions. Activities performed by other users can end up being presented in the first group 3712 pending user review/input for a variety of reasons, such as the activities implicating, associating, or otherwise connecting the logged-in user with a post and/or product (e.g., tagging the logged-in user in a post, adding tags to a post created by the logged-in user). Other activities can also be presented in the first group 3712, such as those implicating user privacy issues (e.g., publishing sensitive user information) and/or associating negative, derogatory, and/or otherwise offensive content with the logged-in user (e.g., comments that include text and/or links to negative, derogatory, and/or otherwise offensive content).

For example, the graphical element 3714*a* identifies that the user 3716*a* tagged the logged-in user in post 3718*a*, the graphical element 3714*b* identifies that the user 3716*b* mentioned (e.g., tagged) the logged-in user in post 3718*b*, and the graphical element 3714*c* identifies that the user 3716*c* tagged a product in a post 3718*c* that the logged-in user created. The graphical elements 3714*a-b* request permission to allow the tags in the posts 3718*a-b* to cause the posts 3718*a-b* to be presented in feeds of other users (e.g., home feeds, activity feeds)—meaning that the logged-in user's association with the posts 3718*a-b* (tagged in the posts 3718*a-b*) will appear in the feeds of other users who are socially connected with the logged-in user (e.g., followers of the logged-in user, friends of the logged-in user). The graphical elements 3714*a-b* include options to approve (3720*a*, 3722*a*) or decline (3720*b*, 3722*b*) the posts 3718*a-b* from appearing in the feeds of other users who are socially connected to the logged-in user (based on the logged-in user being tagged in the posts 3718*a-b*). The graphical elements 3714*a-b* also provide the logged-in user with the option to remove the tags (with the logged-in user) from the posts 3718*a-b*—meaning that selection of the control elements 3720*c* and 3722*c* will cause the tags with the logged-in user will be removed from the posts 3718*a-b*.

The graphical element 3714*c* requests permission for a product tag to be applied to the post 3718*c* that the logged-in user created. The logged-in user is given the options to either approve 3724*a* or decline 3724*b* the product tag from being applied to the post 3718*c*, and is also provided with the option 3724*c* to view additional information regarding the tagged product. Selecting the control element 3724*a* will cause the tag to either be applied to the post 3718*c*—meaning the tagged product will be viewable to other users in association with the post 3718*c* (see discussion above regarding products being tagged in posts, for example, with regard to FIGS. 3A-B). Selecting the control element 3724*b* will cause the tag to not be applied to the post 3718*c*—meaning the tagged product will not be viewable in association with the post 3718*c*. Selecting the control element 3724*c* will cause additional information regarding the product to be presented in the GUI 601 (e.g., overlaid the activity feed, presented inline with the activity feed, navigate to another page).

In some implementations, the logged-in user may need to affirmatively approve the associations (e.g., selection elements 3720*a*, 3722*a*, or 3742*a*) before the associations are made viewable to other user (e.g., before the posts 3718*a-b* appear in feeds of users who are socially connected to the logged-in user, before the product appears as a tag with the post 3718*c*). In other implementations, such associations identified through the tags may be presented prior to the logged-in user providing affirmative approval and/or after the logged-in user has declined to provide input (e.g., the graphical elements 3714*a-c* have previously been presented at least a threshold number of times in the GUI 601 (e.g., 1 time, 2 times, 5 times) without user input), but the associations may be altered after the user has provided input through the control elements 3720-3724. Other implementations are also possible.

The first group 3712 can be presented above the second group 3728 in the user activity feed in the GUI 601, so that the items needing user approval are more likely to be viewed and acted upon by the logged-in user. The groupings 3712 and 3728 can improve upon the GUI 601 by persistently maintaining activity items needing user review/approval at the top of the user activity feed without needing an additional tab, page, or menu to navigate to the items needing user review/approval. This can allow the GUI 601 to present a robust set of controls and features while minimizing (decluttering) the navigational features within the GUI 601, which can allow for the GUI 601 to be more intuitive and easier to use. Additionally, by using the groupings 3712 and 3728 (as opposed to presenting the graphical elements without these groupings), users can more readily and quickly locate information in the GUI 601 that is of interest.

Example scrolling input 3726 is received, causing the GUI 601 to scroll down the activity feed to present the second group 3728 of graphical elements 3730*a*-1, as depicted in FIGS. 37D-E. These graphical elements 3730*a-l* present a variety of activity-related information to the logged-in user, such as information on an individual user's actions with regard to content generated (or otherwise associated with) the logged-in user, information on aggregate user activity with regard to content generated (or otherwise associated with) the logged-in user, and/or information related to products that have been saved by (or otherwise associated with) the logged-in user. Referring to FIG. 37D, graphical element 3730*a* identifies that another user 3732*a* saved a post 3734*a* created by the logged-in user; the graphical element 3730*b* identifies that another user 3732*b* commented on a post 3734*b* created by the logged-in user; the graphical element 3730*c* identifies that the logged in user shared the post 3734*c* of another user 3732*c* on an example outside social media platform (platform different from the social-retail platform); the graphical element 3730*d* identifies that a group of users, including an example user 3732*d* from the group, saved a post 3734*d* created by the logged-in user; the graphical element 3730*e* identifies that an example milestone 3732*e* (e.g., post views, post saves, post comments, post reactions, post shares) has been reached for the post 3734*e* created by the logged-in user; and the graphical element 3730*f* identifies that the user 3732*f* commented on a post 3734*f* created by the logged-in user.

Additional scrolling input 3740 is received, causing the GUI 601 to scroll further down the activity feed to present more activity information for the second group 3728 of graphical elements 3730*a-l*. Referring to FIG. 37E, additional graphical elements 3730*g-l* are presented in the GUI 601 in response to the input 3740. These example graphical elements include graphical element 3730*g* identifying that the user 3732*g* started following the logged-in user and providing a selectable feature 3738 through which the logged-in user can follow the user 3732*g*; graphical element 3730*h* identifying that a retailer/merchant 3736*a* is discounting a product 3734*h* that the logged-in user saved; graphical element 3730*i* identifying that a product 3734*h* that the logged-in user ordered from a retailer/merchant 3736*b* has shipped; graphical element 3730*j* identifying a scheduled/estimated delivery time that a product 3734*j* that the logged-in user ordered from retailer/merchant 3736*c*; graphical element 3730*k* confirming that the logged-in user purchased a product 3734*k* from a retailer/merchant 3736*d*; and graphical element 37301 identifies that user 37321 purchased a product that was tagged in a post 37341 created by the logged-in user.

The computer system 240 providing the social-retail platform can track and determine the product/order related information identified in the graphical elements 3730*h*-1 either directly or indirectly through communication with one or more of the affiliated computer systems 260. For example, the logged-in user can save the product 3734*h* and order the products 3734*i-k* on the social-retail platform provided by the computer system 240 via the GUI 304 for the home feed, which can cause the computer system 240 to generate product/order activity information to be presented in the GUI 601 together with social-related activity information (e.g., user 3732*g* following the logged-in user, user 3730*f* commenting on the logged-in user's post 3734*f*). Such combined product and social activity information in the GUI 601 can improve upon the GUI 601 by providing a single interface through which a user can stay informed of and interact with social and product activity information.

Similar to the description above with regard to FIGS. 37A-B and tab 602*a*, the user activity information to be presented in the tab 602*b* can also be preloaded onto the computing device 300 in advance of the logged-in user providing input to present the user activity information (e.g., in advance of the user selecting the tab 602*a*). Furthermore, the computing device 300 can additionally be programmed to dynamically request additional user activity information from the computer system 240 as the logged-in user approaches and/or reaches an end of the user activity information that has been loaded onto the device 300 (e.g., when the user scrolls to an end of the user activity information feed).

Similar to the description above with regard to FIGS. 37A-B and tab 602*a*, the graphical elements presented in the tab 602*b* can be selectable and can cause additional information regarding the selected elements to be presented in the GUI 601. For example, selection of the selectable elements can cause the computing device 300 to request and display additional information from the computer system 240, such as displaying the information inline, overlaying, and/or in a new page with the selected element in the GUI 601. Examples of additional information being presented in response to user selection of graphical elements in the GUI 601 are described below with regard to FIGS. 40C-D and 41A-B.

Referring to FIGS. 38A-B and 39A-B, screenshots are depicted of example user actions through the explore/discovery GUI 401 on the computing device 300 that can precede activity information being served to and presented in logged-in user's activity feed on the computing device 300. In particular, FIGS. 38A-B depict a user following another user and FIGS. 39A-B depict a user following a tag (e.g., hashtag), which can cause activity information for the followed user and/or tag to subsequently be presented in the activity feeds on the computing device 300. Referring to FIG. 38A, in this example, the logged-in user selects the icon 420*a* to follow the example user 418*a*, as indicated by user input 3800. Confirmation that the logged-in user is not following the other user 418*a* is indicated by the icon 420*a* changing to include a checkmark 3802 (instead of a plus button) and the message 3804 being presented, as depicted in FIG. 38B. Now that the logged-in user is following the example user 418*a*, activity information for that user (also identified as user 3702*d*) can subsequently be identified and presented as news activity information in the news activity tab 602*a*, such as the activity information identified in graphical element 3700*d* for that same user 418*a*/802*d*. The logged-in user can elect to follow and unfollow users through other interfaces presented by the computing device 300, such as through one or more of the other interfaces described with regard to FIGS. 3-5 and 7, which can cause activity information for followed users to be presented in the news activity information in tab 602*a*.

Referring to FIG. 39A, the logged-in user submits the example location search query 3902 ("Minneapolis, Minn.") through the search field 402, which causes the computing device 300 to transmit the query 3902 to the computer system 240, to receive search results from the computer system 240, and to present the results in the GUI 401. In the depicted example, the GUI 401 includes tabs 3904*a-e* that separate the results out into a top group of results (3904*a*), hashtags (3904*b*), products (3904*c*), people/users (3904*d*), and posts (3904*e*). The top results tab 3904*a* is selected by default, which includes the presentation of heterogeneous results across each of the different results categories, with graphical elements 3906*a-b* for top hashtag results, graphical elements 3908*a-b* for top product results, graphical elements 3910*a-b* for top user/people results, and graphical elements 3914*a-b* for top post results. Each of the graphical elements 3906-3910 and 3914 are selectable to present additional information regarding the results (similar to the description above regarding the selectable graphical elements in the activity feed). Some of the graphical elements additionally include selectable icons/buttons to follow corresponding results from within the GUI 401, such as the icons/buttons 3916*a-b* and 3912*a-b* to follow the hashtags identified in graphical elements 3906*a-b* and to follow the users identified in the graphical elements 3910*a-b*, respectively. In the depicted example, user input 3918 selecting the icon 3916*a* is received through the GUI 401. Confirmation that the logged-in user is not following the hashtag 3906*a* is indicated by the icon 3916*a* changing to include a checkmark 3922 (instead of a plus button) and the message 3920 being presented, as depicted in FIG. 39B. Now that the logged-in user is following the example hashtag 3906*a*, activity information for that hashtag (also identified as hashtag 3702*k*) can subsequently be identified and presented as news activity information in the news activity tab 602*a*, such as the activity information identified in graphical element 3700*k* for that same hashtag 3702*k*/1016*a*. The logged-in user can elect to follow and unfollow hashtags (and other tags) through other interfaces presented by the computing device 300, such as through one or more of the other interfaces described with regard to FIGS. 3-5 and 7, which can cause activity information for followed hashtags (and other tags) to be presented in the news activity information in tab 602*a*.

Figures 40A, 40B:
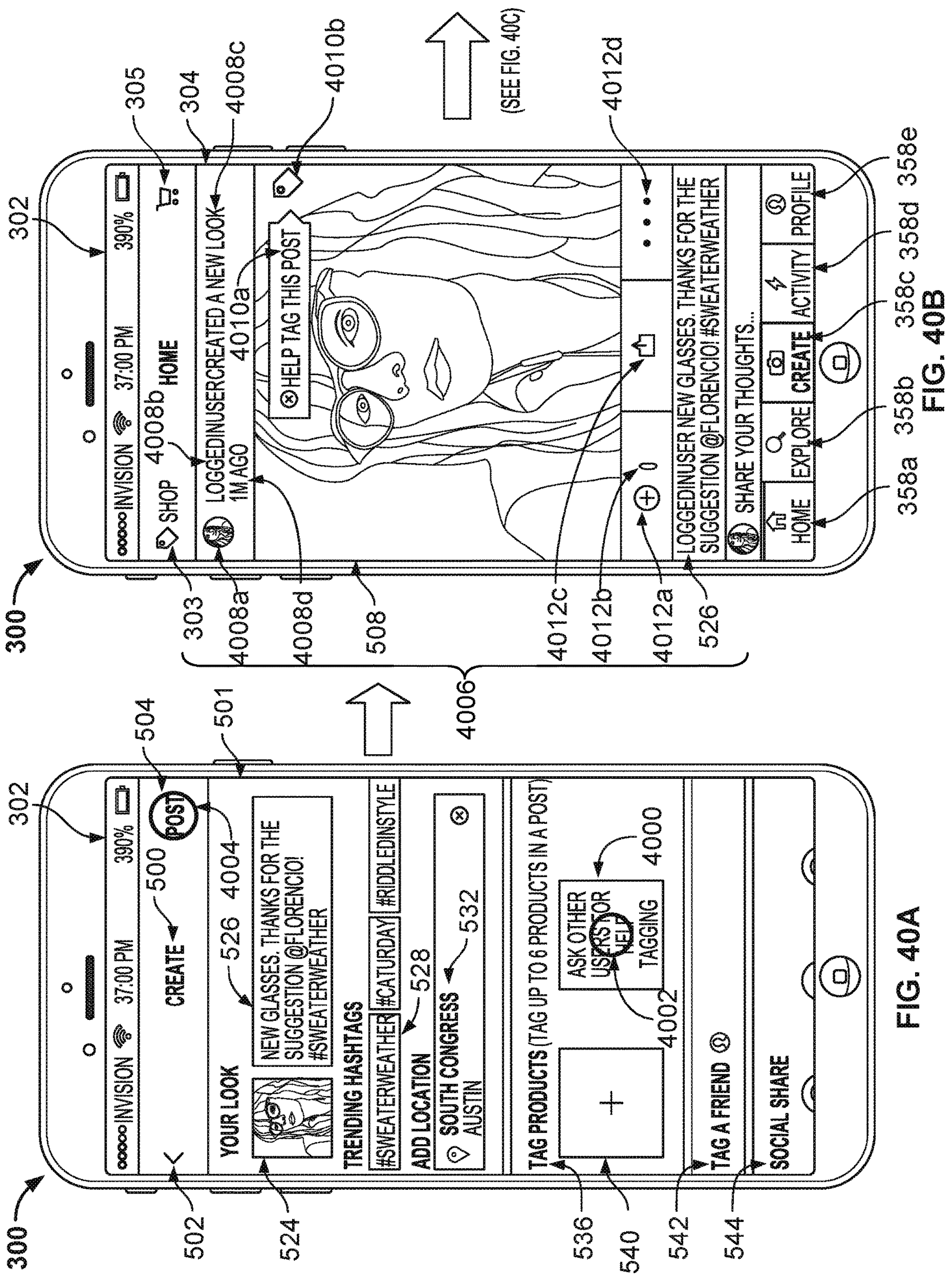
FIGS. 40A-H depict a sequence of screenshots and user interactions with a GUI to create and tag content on an example platform.

FIGS. 40A-H depict a sequence of screenshots across the interfaces for creating a new post (FIGS. 5A-B), the user activity feed (FIGS. 37C-E), and the home feed (FIGS. 3A-B) through which the logged-in user elects to let other users to tag products in her post, is notified of a proposed product tag for the post, reviews the tagged product, approves the product tag, and views the post with the product tag in the home feed. Referring to FIG. 40A, the same state of the post creation from FIG. 5B is depicted, but in this instance, the user provides selecting input 4002 for the option 4000 to ask other users to assist the user creating the post in tagging products in the image 508 (thumbnail 524). After selecting the option 4000, the user then provides additional selecting input 4004 to the post button 504, which causes the computing device 300 to transmit the post to the server system 240 with an explicit request to leverage the user's social network to tag products in the post. Alternatively, the user could have not selected either of the options 540 or 4000, and the post would have been uploaded to the server system 240 without any product tags and without a request for other users to assist in tagging products.

In this example, the server system 240 can store the transmitted post from the computing device 300 in a similar manner to the storage described above, but in this instance the post can be stored with a flag to request other user assistance in tagging the product instead of storing a product tag and corresponding product element in association with the post. Referring to FIG. 40B, storing the flag with the post can cause the post to be presented on computing device 300 (and other computing devices) with selectable features 4010*a* and 4010*b* to request user assistance in tagging products in the post 3718*c*. Unlike how the post 360 was presented in FIG. 3B, in FIG. 40B the post 3718*c* does not include the indicators 370 that a product was tagged in the post. Additionally, horizontal scrolling with regard to the post 3718*c* will not cause a product element to be presented within the GUI 304 based on no products having been tagged in association with the post 3718*c*, which includes post information 4008*a-d*, interactive controls 4012*a-d*, and a description 526 (similar to the corresponding elements described with regard to posts 308 and 360). Selection of the features 4010*a* and/or 4010*b* (and/or other particular inputs, such as horizontal scrolling when the features 4010*a* and/or 4010*b* are presented) in the GUI 304 can cause an interface to identify product tags for the post 3718*c* to be presented, such as through a product tagging interface as described above with regard to FIGS. 5A-B. Once a user (who can be different from the user who created the post 3718*c*) has selected a product to tag, the tag can be provided to the user who created the post for approval before the tag is formally applied to the post 3718*c*.

Figures 40C, 40D:
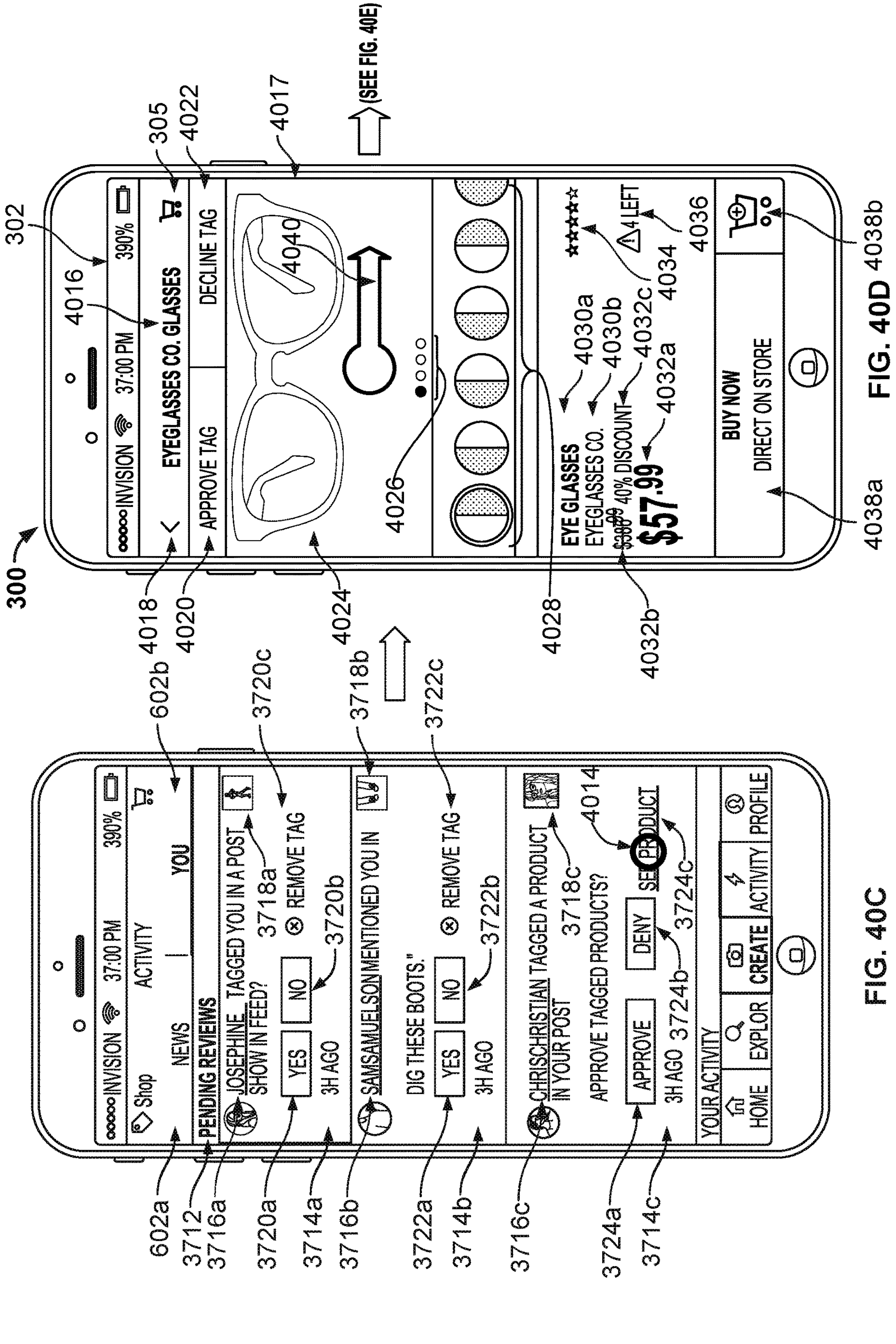

Referring to FIG. 40C, in response to the user 3716*c* proposing the product tag for the post 3718*c*, the graphical element 3714*c* for the proposed tag is presented in the user activity feed tab 602*b* with graphical elements 3724*a-c* to approve, decline, and review the tag for the post 3718*c* can be presented to obtain a decision from the creator on whether to apply the tag to the post 3778, as described above with regard to FIG. 37C. In the depicted example, user input 4014 selecting link to review the tagged product is received through the interface, which causes the client computing device 300 to request and present information regarding the tagged product for review the by user. The product information that is requested and presented to the user can be the same as the product information that will be presented with the post 3718*c*, such as the product information that would be presented in response to horizontal swiping input received with regard to the post 3718*c* being presented in the home feeds of other users.

Referring to FIG. 40D, in response to selecting the link 3724*c* product information for the tagged product is presented on the computing device 300 in an example interface 4017, which includes a variety of details regarding the tagged products and controls for the user to interact with the tagged product. In particular, the example interface 4017 includes a product title/name 4016, a product image 4024, color/pattern/style options 4028, manufacturer and product details 4030*a-b*, price information 4032*a-c*, user review information 4034, and a current remaining inventory 4036 with one or more online merchants. The interface 4017 further includes several controls, such as a selectable control 4018 through which the user can navigate back to the activity feed (FIG. 40C), selectable/scrollable controls 4026 to view alternate images of the product, selectable controls 4038*a-b* to purchase product directly through the interface 4017 or add the product to the virtual shopping cart 305, and selectable controls 4020-4022 for approve or decline the product tag from within the interface 4017. The controls 4018-4022 and 4038*a-b* can be persistent in the interface 4017 regardless of scrolling in the interface. The interface 4017 may present the product information as it would be presented to other users (different from the logged-in user) in association with the post 3718*c*, except for the controls 4020-4022 to approve or decline the product tag by the user 3716*c*.

Figures 40E, 40F:
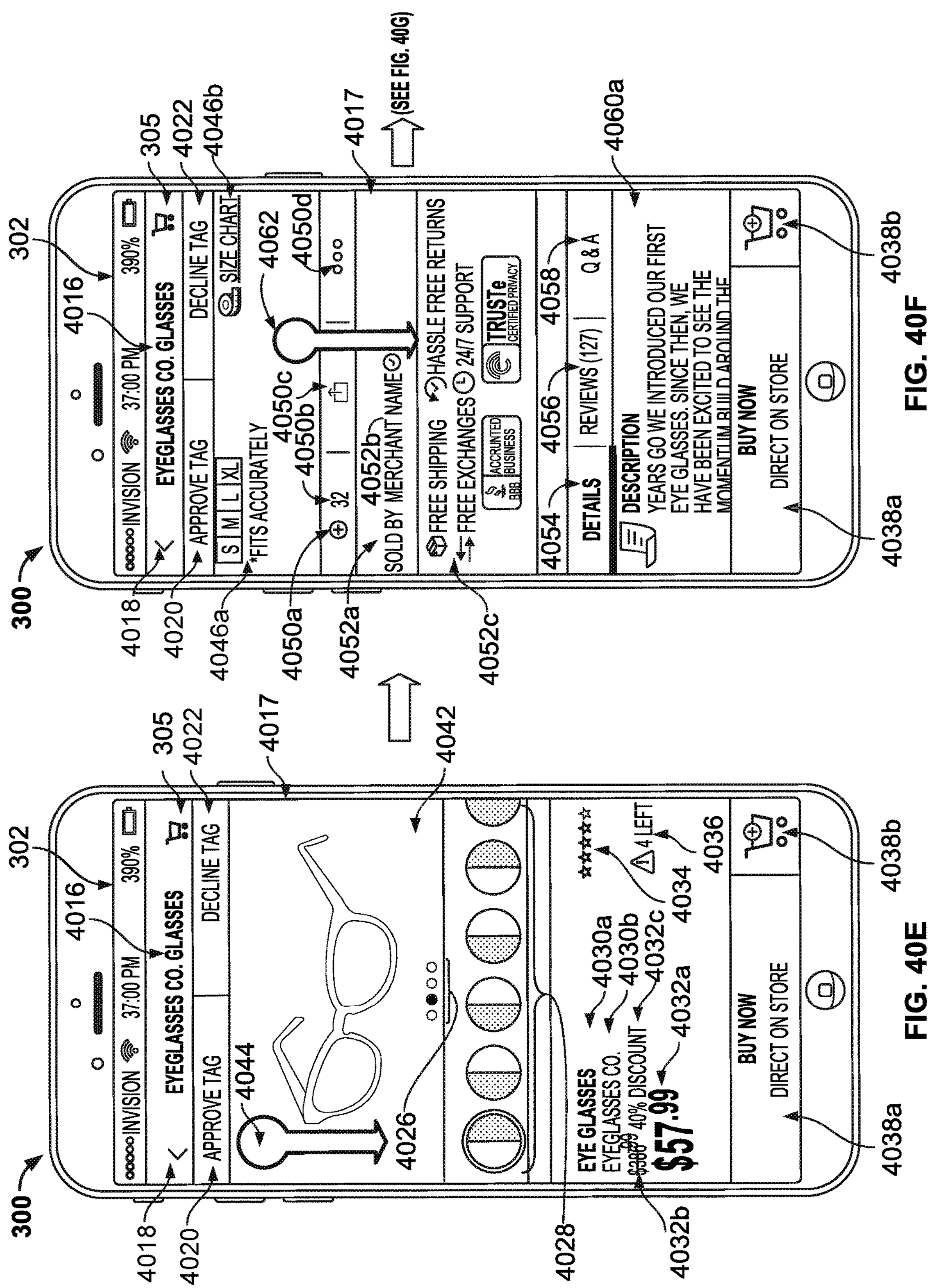

Example horizontal scrolling input 4040 is received over the image 4024, which causes the interface 4017 to present an alternate image 4042 for the tagged product, as depicted in FIG. 40E.

Example vertical scrolling input 4044 is received in the interface 4017, which causes the interface to scroll down and to present additional information for the tagged product, as depicted in FIG. 40F. The additional information includes, for example, sizing information 4046*a-b*, controls 4050*a-d* for interacting with the product (including a counter 4050*b* indicating how many users have saved the product on the example social-retail platform), merchant information 4052*a-c*, product details 4054 (e.g., example product description 4060*a*), user reviews 4056, and questions/answers 4058.

Figure 40H:
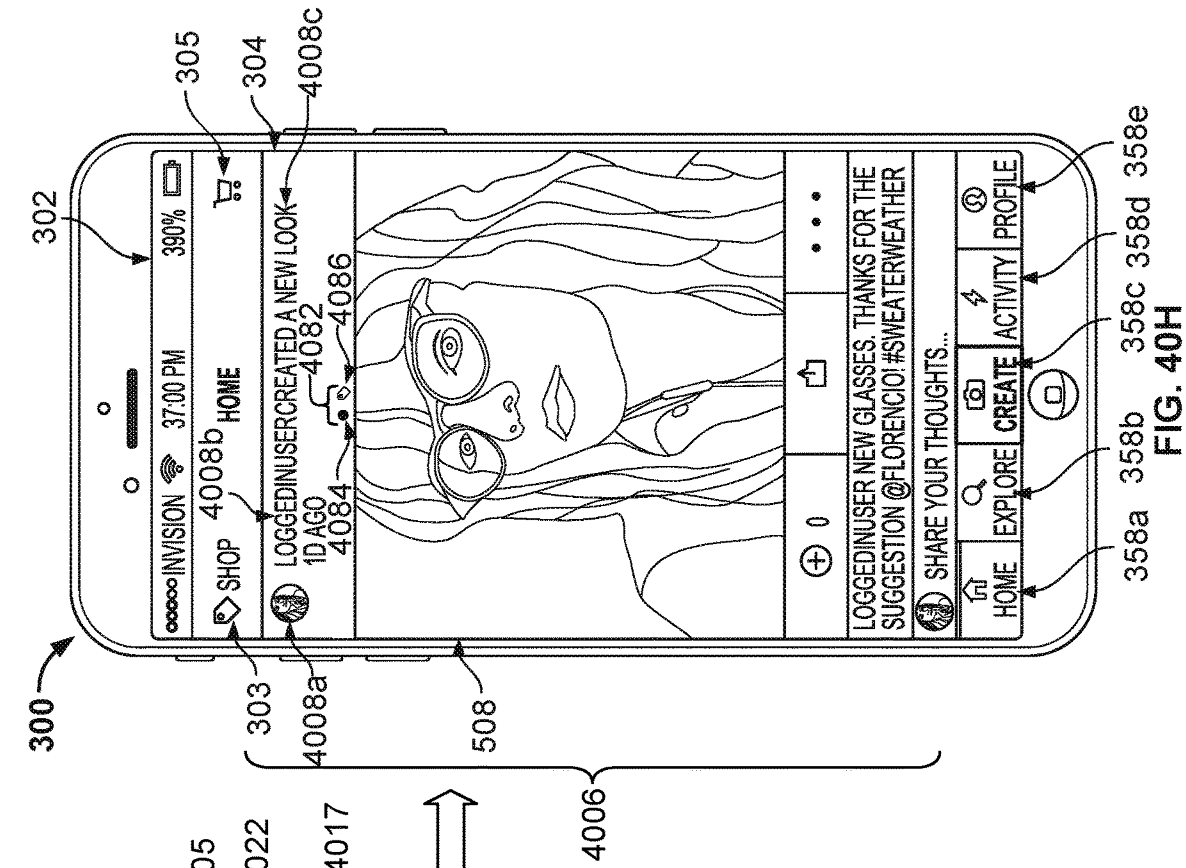
Figure 40G:
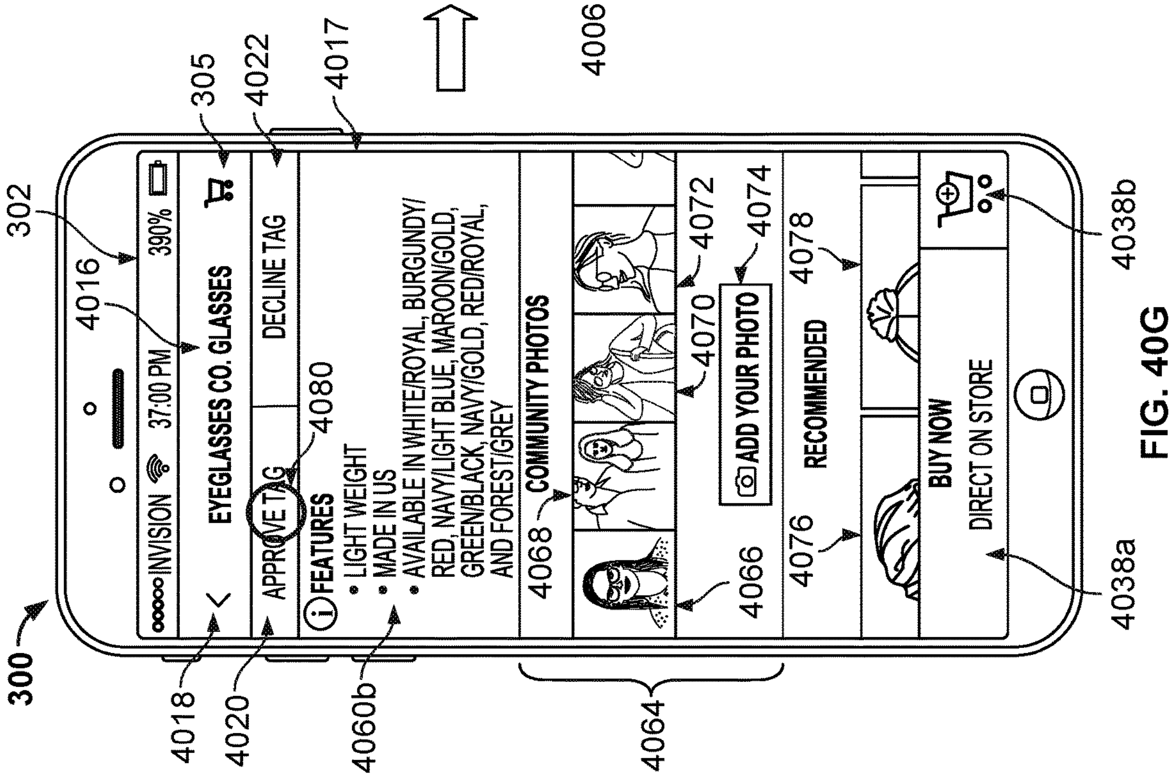

Additional vertical scrolling input 4062 is received through the interface 4017, which causes the interface to scroll further down and to present further information regarding the tagged product, as depicted in FIG. 40G. This further information includes, for example, product feature information 4060*b*, an area 4064 with other user-generated photos 4066-4072 included in posts that have also tagged the product depicted in the interface 4017, and other recommended products 4076-4078. The area 4064 further includes a control 4074 through which other user-generated photos depicting the product can be uploaded and associated with the product. The related social posts with the user-generated photos 4066-4072 and product elements 4076-4078 can provide ways for users to navigate and discover new elements (e.g., posts, products, users) on the social-retail platform that may be of interest to the user, such as exploring ways that users have combined the product in the interface 4017 with other products.

As depicted by the example user input 4080 selecting the approve control 4020, the user in this example approves the tag for the product being tagged in the post 3718*c*. Approval of the tag for the post 3718*c* can cause the post 3718*c* to be subsequently presented in the GUI 304 on the computing device 300 (and other computing devices) with icons 4082 indicating the presence of a tagged product, as depicted in FIG. 40H. For example, the icons 4082 include a first icon 4084 representing the post 3718*c* that is depicted in the GUI 304, and a second icon 4086 representing the product depicted in the interface 4017. Horizontal scrolling with regard to the image 508 in the GUI 304 can cause one or more portions of the tagged product information to be presented within the GUI 304. Examples of such horizontal scrolling input are described below with regard to FIGS. 41B-D.

Although the product tag was approved within the interface 4017, it could have alternatively and/or additionally been approved from within the user activity feed, such as through selection of the control element 3724*a* depicted in FIGS. 37C and 40C. Once approved (or declined), the graphical element 3714*c* corresponding to the proposed product tag can be removed from the user activity feed in tab 602*b*.

Figures 41A, 41B:
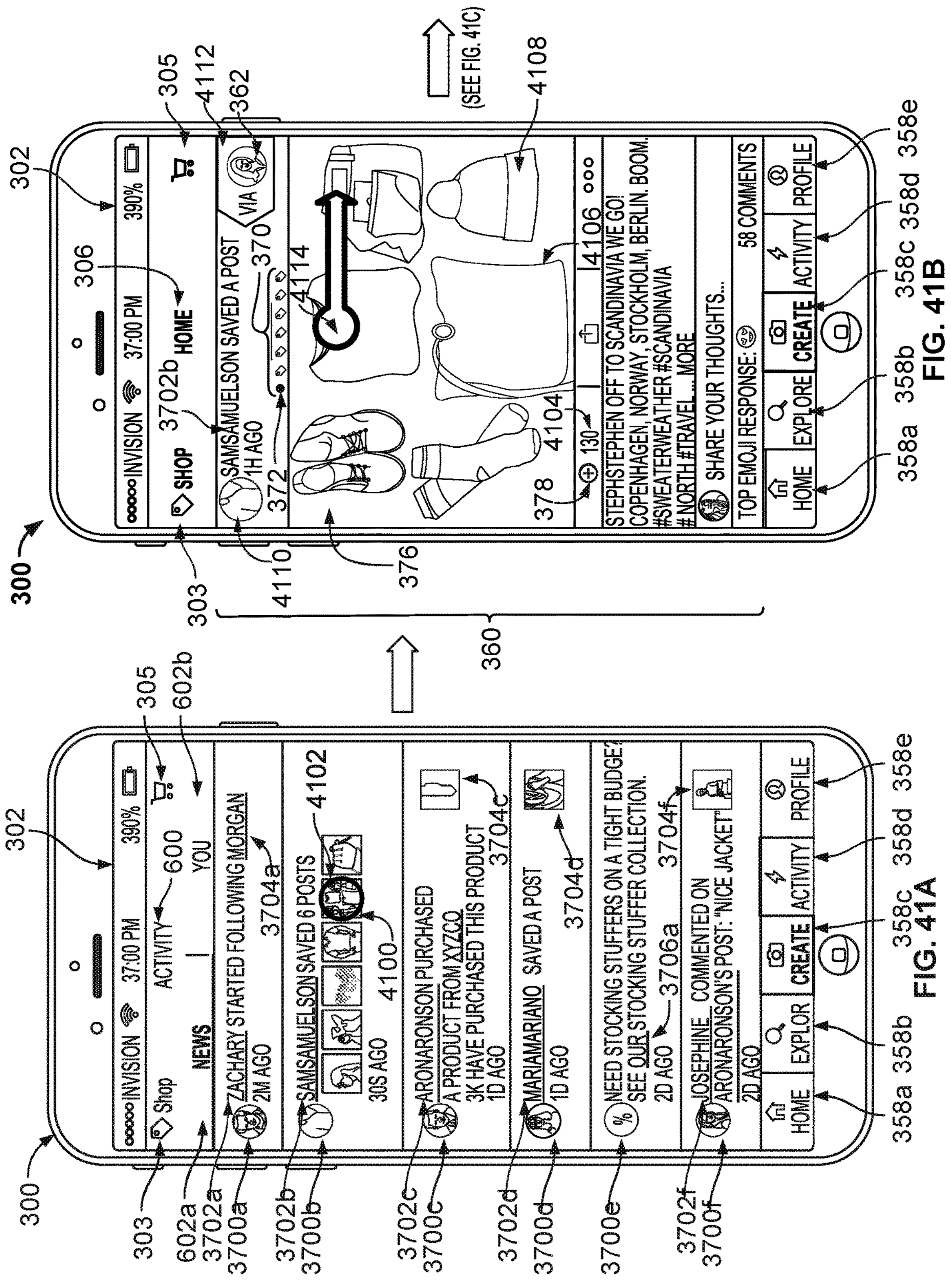
FIGS. 41A-D depict a sequence of screenshots and user interactions with a GUI for an activity feed on an example platform.

Referring to FIG. 41A, which depicts the same interface as in FIG. 37A, example user input 4102 selecting the thumbnail 1200 for a post identified as having been saved by the user 3702*b* (who is socially-connected to the logged-in user) in the news activity feed is received through the GUI 601. In response to receiving the input selecting the thumbnail 4100, the computing device 300 can retrieve and present the post 360, which corresponds to the selected thumbnail 4100, as depicted in FIG. 41B. The post 360 is the same as the example post depicted in and described with regard to FIG. 3B, but with some notable differences. In particular, the post 360 presented in FIG. 41B identifies that the user 3702*b* (identified in the activity feed in FIG. 41A) as having saved the post and includes a profile picture 4110 for the user 3702*b*. The post 360 also includes a via graphical element 4112 that attributes the post 360 to the user who originally created it, which in this instance is the user identified by the profile picture 362. Additionally, since the user 3720*b* has saved the post 360, the counter 4104 has been incremented to reflect that the post 360 has been saved an additional time.

As described above with regard to FIG. 3B, the social post 360 includes six product tags for the collection of products, including a knit hat 4108 and a bag 4106, that are depicted in the user-generated image 376 (digital photo), which are indicated by visual indications 370 of six associated product elements. These associated product elements can be accessible within the GUI 304 and its content stream by horizontally scrolling in the GUI 304 along a perpendicular content stream. As depicted in this example, user input 4114 is provided to the GUI 304 in the form input to scroll to the right (e.g., swipe left in the GUI 304 to cause the content to scroll to the right) along the perpendicular content stream. For instance, as indicated by the icon 372 (which corresponds to the social post 360 in the perpendicular content stream) being highlighted/bold, the GUI 304 is currently showing the graphical element at the leftmost end of the perpendicular content stream. A user can provide right scrolling input until the graphical element at the rightmost end (corresponding to the rightmost product icons 370) of the perpendicular content stream is reached (or in implementations where the perpendicular content stream is "infinite," can continue to provide right scrolling input to cause the device 300 to retrieve additional content).

Figures 41C, 41D:
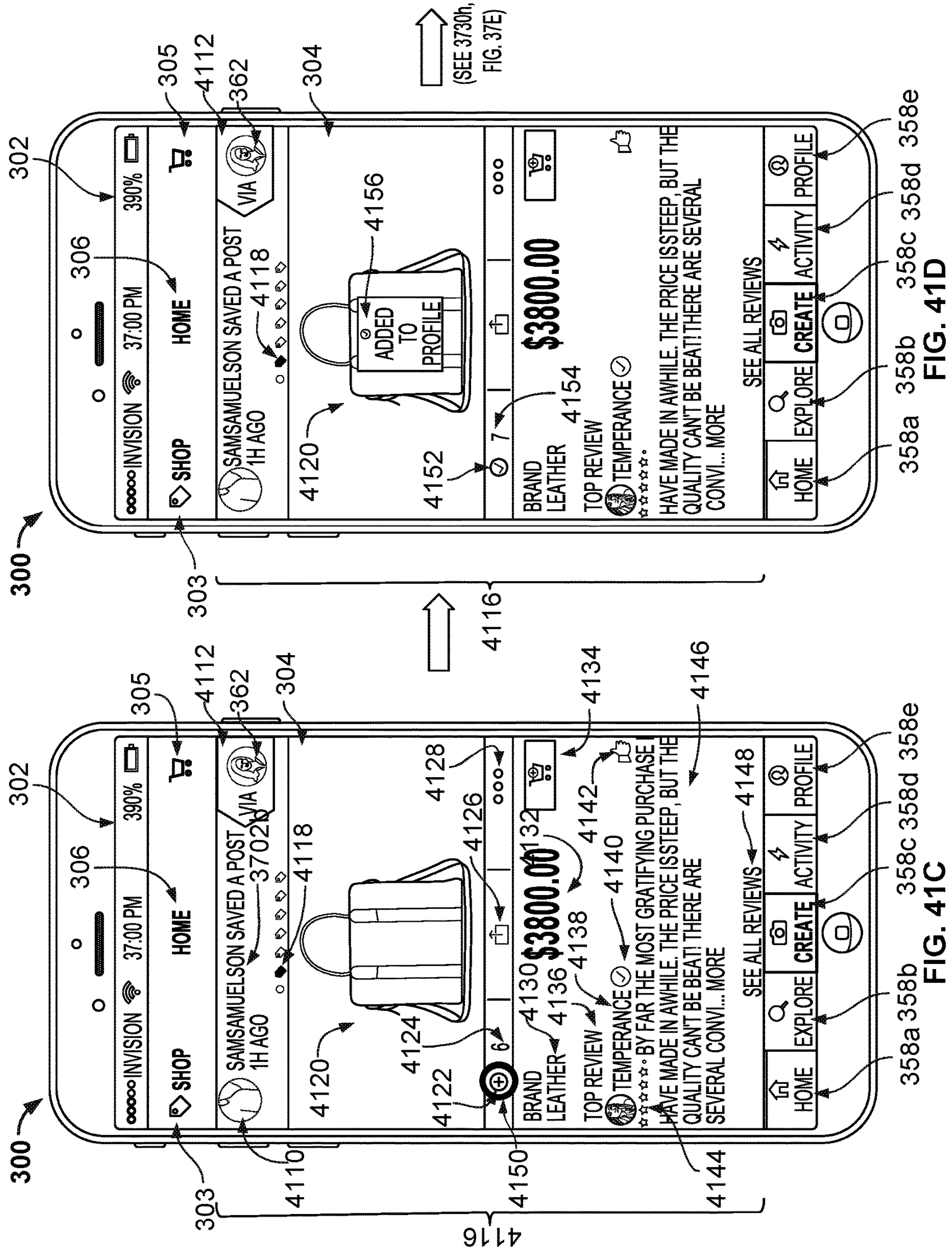

Referring to FIG. 41C, in response to receiving the user input 4114, the GUI 304 can cause the perpendicular content stream to scroll to the right and to display the product content element 4116, which corresponds to the product icon 4118 (now highlighted/bold to indicate a current position along the perpendicular content stream). The example product content element 4116 includes an image 4120 for the product 4106 depicted and tagged in the social post 360. The image 4120 can be a merchant or manufacturer-provided image (as opposed to a user-generated, such as a photograph taken by a user). The image 4120 can be, for example, an image that is presented for the product 4116 on online stores/retailers and in online advertisements.

Like the social post 360, the product element 4116 includes controls 4122-4128 through which users can interact with the product 4106. For example, the controls include a selectable element 4122 ("+" button, example of a selectable feature to save posts and product elements) through which a user can "save" the product element 4116 to her profile (see FIG. 7B). The selectable button 4122 is paired with a counter 4124 that identifies a number of other users who have already saved the product element 4116. The controls further include another selectable element 4126 (share icon) that can be selected to share the product element 4116 either inside or outside of the social-retail platform provided by the computer system 240. For example, the user can select the element 4126 to share the product element 4116 with other users within the social-retail platform provided by the computer system 240, and/or to share the product element 4116 on other social media platforms (e.g., FACEBOOK, TWITTER, PINTEREST). The controls also include another selectable element 4128 (ellipses icon) that includes additional features that can be performed with regard to the product element 4116 (e.g., transmit message with product information, flag as inappropriate).

The product element 4116 further includes product information, such as a merchant 4130 providing the product and a current price 4132 for the product. The merchant information 4130 can be selectable and can cause information about the merchant, such as user ratings for the merchant and other products offered by the merchant, to be presented (e.g., presented in an online store for the merchant either inside or outside of the social-retailer platform). The product element 4116 additionally includes a selectable shopping cart icon 4134 that a user can select to add the product 4106 that is depicted in the social post 360 to the virtual shopping cart indicated by the icon 305. For example, by selecting the shopping cart icon 4134, the product 4106 can be added to the shopping cart from within the social feed presented in the GUI 304 (without using another application or otherwise exiting the GUI 304). A user can, for instance, add the product element 4116 to the shopping cart and then continue scrolling vertically along the social feed or horizontally along the product feed (without having to reopen or refocus the computing device 300 on the GUI 304).

The product element 4116 further includes a review section with user reviews for the product 4106. The review section includes a "top review" portion 4136, which in this example is a review by user 4138 who is a member of the social-retail platform (as indicated by the icon 4140). The review section further includes a selectable icon 4142 to indicate whether this review is helpful/useful, a rating 4144 that the user 4138 gave the product, and a textual review 4146 of the product. The review section also includes a selectable element 4148 to expand/view all reviews (not just the top review 4136). The product reviews can be from one or more user groups, such as users who are part of the social-retail platform and/or users of one or more online retail stores where the product 4106 is offered.

In the depicted example, the user provides selecting input 4150 to the save icon 4122 that is presented with the product element 4116 and within the social feed of the GUI 304. Referring to FIG. 41D, the selecting input 4150 causes the product element 4116 to be saved in association with the logged-in user's account on the social-retail platform, as indicated by the save icon 4122 changing to a checkmark icon 4152, the save counter incrementing from "6" (4124) to "7" (4154), and the save confirmation message 4156 being presented in the GUI 304.

Saving the product element 4116 can cause the product element 3718 to appear in product tab 724 in the profile GUI 701 and/or for the post 360 that tagged the product element 3718 to appear in the posts tab 722 in the profile GUI 701. Additionally, information regarding the logged-in user saving the product element 4116 can be presented as news activity information in the activity feeds of other users who are socially connected to the logged-in user (similar to the activity information presented in the graphical element 3700*b* regarding the user 3702*b* having saved the post 360). Furthermore, information regarding the product element 4116 can also be presented in as user activity in the activity feed of the logged-in user (in the tab 602*b*), such as the product 4106 identified in the product element 4116 going on sale (similar to the information presented in the graphical element 3730*h*).

Figure 42:
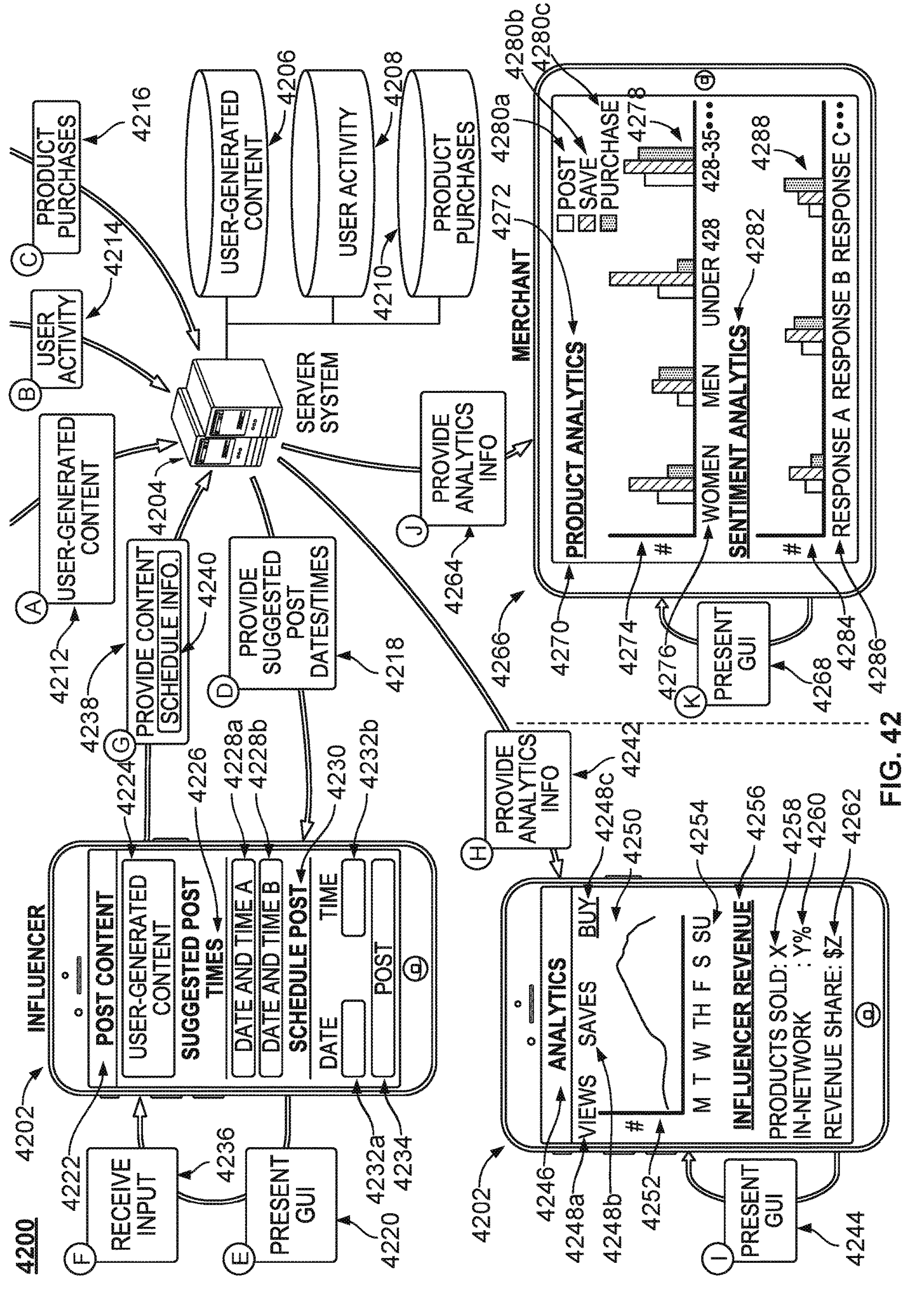
FIG. 42 is a conceptual diagram of an example system to provide an example GUIs on example client computing devices for monitoring user engagement with content elements and for configuring content elements to optimize user engagement.

Referring to FIG. 42, some embodiments of a system 4200 can be configured to provide example GUIs 4246 and 4270 on example client computing devices 4202 and 4266 for monitoring user engagement with content elements, and an example GUI 4222 for configuring content elements to optimize user engagement. The user engagement information can be determined by a server system 4204 that tracks user activity with regard to content elements, that determines user engagement information from the user activity, and that provides user engagement information to the client computing devices 4202 and 4266 for use in the GUIs 4246 and 4270.

For example, the GUI 4246 can present an interface through which a user of the device 4202 can view analytics related to user engagement with content that the user has created or is otherwise associated with, such as social media content (e.g., social media posts) with other types of content (e.g., product content, messaging content, productivity application content, news content). The GUI 4246 can allow a user to view and analyze user engagement with content elements along a variety of different dimensions, such as based content views, content saves (user actions persistently associating a content element to a user's profile), actions related to content tagged or otherwise identified in content elements (e.g., purchases of products tagged in content elements, selections of links included in content elements), and/or other user engagement-related metrics. For instance, the user of the computing device 4202 can be a user on a social network who has been designated as an "influencer"—meaning that the user has been identified as having at least a minimum level of social influence over other users on the social network (e.g., the user at least a threshold number of followers/fans/socially-connected users on the social network, content generated by the user on average has at least a threshold level of engagement by other users on the social network). Influencers can enhance overall user engagement with content on a content platform (e.g., social platform) and can receive incentives to produce content and to enhance user engagement with the content they generate. For instance, influencers can receive special benefits based on user engagement with content they generate, such as credits, discounts, payments, revenue percentages, promotion on various platforms, and/or other benefits. The GUI 4246 can be an interface that is provided to influencers to track user engagement with the content they generate along one or more dimensions of user engagement.

The GUI 4222 is another interface that can be provided to influencers to assist them in enhancing user engagement with the content they generate. For example, the GUI 4222 is part of a post creation interface through which the user of the computing device 4202 can generate and upload content to the server system 4204 to distribution to other users as part of a social platform. Conventionally, user generated content goes "live"—meaning it is accessible by and distributed to other users on a social platform—when it is uploaded to a server system hosting a social platform. However, engagement with user-generated content can vary dramatically depending on when the content first goes live. For example, content posted on Thursday and Friday afternoons may be viewed, commented on, and shared (example types of user engagement) with greater frequency than content that goes live on Sunday mornings. Likewise, the engagement with user-generated content can vary depending on the particular audience that is viewing the content, such as the group of users who follow or are otherwise socially connected with another user. The server system 4204 and/or the computing device 4202 can determine suggested days and times when new content that the user of the computing device 4202 is generating should go live to optimize user engagement, which are presented in the GUI 4222. The suggested days and times can be automatically determined based on data analysis (e.g., machine learning techniques) of a variety of data sources that can indicate future engagement with the new content, such as historical engagement data for content generated by the user of the computing device 4202, the types and composition of content generated by the user in comparison with the new content, engagement trends over time with the user's audience, and/or other factors. The GUI 4222 can additionally allow the user to manually designate a day and time when the new content should go live. By providing suggested days/times in the GUI 4222 to designate a future time when the new user-generated content goes live on the server system 4204, the computing device 4202 and the server system 4204 can improve the GUI 4222 by both simplifying the analysis around and designation of future times for a post to go live.

Similar to the GUI 4246, the GUI 4270 can allow a merchant to view and analyze user engagement with products tagged or otherwise identified in content elements along a variety of different dimensions, such as engagement information across different demographic categories for users who have engaged with the content elements, sentiment analysis related to the user engagement, and/or other factors. The system 4200 can provide a content platform through which different types of content elements can be associated with each other through content tags. For example, GUIs provided on client computing devices can include controls that allow users to designate first types of content and to tag second types of content in first types of content, such as tagging product elements (example second type of content) in user-generated images that are included in social media posts (example first type of content). Client computing device can upload these content associations (e.g., content tags) to the server system 4204, which can serve the multiple different associated content elements to the client computing devices for presentation in a single user interface on the client computing devices. For example, a GUI on a client computing device can present and seamlessly integrate social media content (e.g., user posts, comments, shared content) with other types of content (e.g., product content, messaging content, productivity application content, news content) using interfaces and controls that allow users to interact with each of the content items within a common content stream. Such a GUI can allow users to interact with content in a variety of ways, such as through social interactions (e.g., share, save, comment) and other types of interactions (e.g., purchasing, messaging, productivity, news distribution) without exiting the GUI and its content stream to use other, specifically designed applications or interfaces. Instead of providing a GUI that presents a single type content (e.g., social media content, product content) and that links to other applications/GUIs that are launched to present other types of content, such a GUI can be programmed present multiple types of content without launching or otherwise relying on another application/GUI.

User actions and engagement with multiple different types of content that are presented through such a GUI can be uploaded to and analyzed by the server system 4204, and used to provide the user engagement information for a merchant in the GUI 4270. The user engagement information can draw on user engagement across multiple different types of content that are associated with a merchant's products, such as user engagement with social media posts that tag the merchant's products and user engagement with product elements that are presented to users with the social media posts. For example, the GUI 4270 can present user engagement information identifying a number of social media posts that have tagged a particular product, a number of times that either the social media posts or product elements for the particular product have been saved by users (persistently associated with their profiles), and a number of times that the product has been purchased on the social platform. Additional and/or alternative dimensions of user engagement on a content platform providing associations between multiple different content types are also possible in the GUI 4270, which can also be adapted to other entities (e.g., news sources, organizations).

The computing devices 4202 and 4266 can be any of a variety of client computing devices, such as a mobile computing device (e.g., smartphone, tablet, wearable device, smartwatch), laptop computer, desktop computer, and/or other types of user computing devices. The computing devices 4202 and 4266 can communicate with the server system 4204 over one or more networks (e.g., internet, local area network (LAN), wide area network (WAN), virtual private network (VPN), wireless network, mobile data network, or any combination thereof) to obtain and present user engagement information in the GUIs 4222, 4246, and 4270. The server system 4204 can be a computer system (e.g., cloud computer system) that either by itself or through affiliate networks is programmed to serve and provide features for multiple different types of content (e.g., social media, messaging, e-commerce, and/or other types of content), tracking user actions and engagement with content, and to perform data analysis to determine user engagement information. For example, the server system 4204 may directly provide social networking features and can communicate with other affiliate computer systems to provide product-related features (e.g., reviews, purchasing, order tracking). In other examples, the server system 4204 may directly provide both social networking features and product-related features. Other configurations of the server system 4204 among one or more other computer systems are also possible.

As indicated by step A (4212), the server system 4204 receives user-generated content, such as social media posts that tag other types of content (e.g., merchant-provided product content, news content, messaging content). For example, the server system 4204 can receive social media content (e.g., posts, comments, shared content) from the client computing device 4202 and/or other computing devices, and can retrieve other types of content that are tagged in the social media content, such as retrieving product-related content (e.g., product information, product images, product reviews) from merchant computer systems. The server system 4204 can store the received user-generated content in a data repository 4206 (e.g., cloud storage system) and the other tagged content, from which it can be served by the server system 4204 to client computing devices.

As indicated by step B (4214), the server system 4204 also receives user activity information from client computing devices that identifies both explicit and implicit user actions performed with regard to content elements served by the server system 4204. Client computing devices can be programmed to report activity information in response to user actions performed, such as users selecting or using various controls features (e.g., save button, like button, share feature, entering a comment, adding a product to a virtual shopping cart, selecting a content element, swiping/scrolling between content elements in a content stream, viewing a content element, creating a post, tagging other content elements). For example, the server system 4204 can distribute content to client computing devices based on social connections between users and/or other designated interests/associations, which can be presented in GUIs on the client computing devices with various features through which users can interact with the content elements. User interactions can be reported back to the server system 4204 as user activity information, which the server system 4204 can store in a user activity data repository 4208 (e.g., cloud storage system). The server system 4204 can retrieve and use the activity information stored in the data repository 4208 to determine user engagement with various content elements, and to serve engagement information to the computing devices 4202 and 4266 for presentation in the GUIs 4222, 4246, and 4270.

As indicated by step C (4216), the server system 4204 can also receive product purchase information that identifies products that have been or are being purchased by users in relations to content elements served by the server system 4204. The product purchase information can be generated by the server system 4204 (e.g., in instances where the server system 4204 is designated to process product purchases for products tagged in a content element served by the server system 4204) and/or by one or more affiliate computer systems through which product purchases via content elements served by the server system 4204 (e.g., in instances where the affiliate computer systems are designated to process product purchases for products tagged in a content element served by the server system 4204). Product purchase information 4216 can identify a variety of information related to product purchases, such as identifying a user who purchased the product, a product element that corresponds to the product, a content element (e.g., social post) that tagged the product element and from which the user purchased the product, and revenue for the purchase. The server system 4204 can receive the product purchase information and store it in a product purchase data repository 4210 (e.g., cloud storage system), which can be used to determine and serve engagement information for both the product elements representing the products that were purchased as well as the content elements that tagged the product elements.

As indicated by step D (4218), the server system 4204 can provide suggested dates and times to post (go live) with content elements that are being generated through the GUI 4222 on the computing device 4202. For example, the GUI 4222 can include various features that a user of the device 4202 can use to designate user-generated content 4224, such as selectable buttons through which media elements can be selected (e.g., photos, videos, audio) and text boxes through which text and tags can be designated. The GUI 4222 can poll the server system 4204 for suggested dates/times when the user begins or resumes working on a post, which can cause the server system 4204 to determine engagement information relevant to the user, the user-generated content 4224 to be included in the post, and the user's expected audience for the post. For example, the server system 4204 can identify previous content information (e.g., type of content, time when content element was published) that the user of the computing device 4202 has generated from the user-generated content repository 4206, and can use identifiers for those content elements to retrieve user activity information (e.g., type of activity, time when the activity occurred) related to those content element from the user activity repository 4208 and the product purchase repository 4210. The server system 4204 can use the user activity information to identify days (e.g., days of the week, weeks of the month) and times (e.g., morning, afternoon, evening, specific times) when the user's audience (e.g., followers, other users who are socially connected to the user of the device 4202) has historically engaged with the content generated by the user of the computing device 4202 at a high rate (e.g., at least a threshold number of user actions performed with regard to content elements posted at particular day and time). The server system 4204 can use any of a variety of appropriate data analysis and/or statistical techniques to determine particular days and times, such as machine learning algorithms.

As part of the determination of particular days and times for the user to schedule a post, the server system 4204 can weigh particular historical data more heavily than other historical data based on a variety of factors, such as the similarity between the proposed user-generated content 4224 for the new post and previous user-generated content, the use of currently trending or popular tags (e.g., hashtags) in the content 4224 in comparison to the use of previously trending/popular tags in previous user-generated content, and/or the seasonality of content elements (e.g., product taxonomy for products tagged in the user-generated content 4224, keywords and phrases used in the user-generated content 4224, seasonal hashtags used in the user-generated content 4224, inclusion of images/videos with particular color palettes in the user-generated content 4224) used in the user-generated content 4224 relative to the seasonality of content elements used in previous user-generated content. For example, the more similar the user-generated content 4224 is to previous user-generated content (e.g., in terms of text, images, tags, tagged product taxonomy), the more likely the engagement information for that previous user-generated content will accurately indicate the engagement with the user-generated content 4224, and the more heavily that engagement information can be weighted relevant to other engagement information.

The server system 4204 can additionally determine the likely engagement for the expected audience for the user-generated content 4224 based on historical engagement for those users included in the expected audience (e.g., users who are following or otherwise socially connected with the user of the computing device 4202). For instance, the audience for content posted by the user of the computing device 4202 can change over time. To accurately capture an expected response to the user-generated content 4224, the server system 4204 can identify a current set of users to whom the user-generated content 4224 will be provided (e.g., identify followers from a social graph maintained by the server system 4204), can retrieve their historical activity from the user activity repository 4208, and can use that to identify particular times when the users have been most active and engaged with user-generated content hosted by the server system 4204.

The server system 4204 can use one or more of these predictive engagement sources—historical engagement with the user's previous content, weighting some engagement instances based on similarities between the user-generated content 4224 and the previous content, historical engagement with content elements for the expected audience for the user-generated content 4224, and/or other predictive engagement sources—to determine particular days and times when the user-generated content should be posted/go live on the server system 4204. The server system 4204 can provide the suggested days and times for the user-generated content 4224.

The computing device 4202 can receive the suggested days and times and can present the suggestions in the GUI 4222 to the user, for example, in a suggested time section 4226 as selectable graphical elements 4228_a-b_ that can be readily selected by the user. The GUI 4222 can also include a section 4230 with fields 4232_a-b_ through which the user can manually designate a future day and time for the post to be published/go live on the server system 4204. Once the user has either selected an automatically suggested future day/time for the post (through graphical elements 4228*a-b*) or manually designated a day and time through the fields 4232*a-b*, the user can select the post button 4234 (as indicated by step F, 4236), which can cause the computing device 4202 to upload schedule information 4240 designating the user-generated content 4224 for distribution by the server system 4204 at a future time (as opposed to being instantaneously made available for distribution upon being uploaded), as indicated by step G (4238). The server system 4204 can receive the schedule information 4240 and use it to store the user-generated content 4224 in the user-generated content repository 4206 with one or more flags (e.g., flag to not yet publish the content 4224), values (e.g., timestamp designating the future time at which the content 4224 can go live/publish), and/or scripts (e.g., cron job to remove the flag for the content 4224 at particular time in the future) designating the content 4224 for distribution at the future time identified in the schedule information 4240.

The server system 4204 can also provide engagement-based analytics on the client computing device 4202 related to the performance of content generated by the user of the device 4202. For example, once the user-generated content 4224 is published, the user of the computing device 4202 can access the analytics GUI 4246 for the content 4224 to analyze user engagement with the content 4224. The computing device 4202 can request analytics information to present in the GUI 4246 from the server system 4204 for one or more content elements, which the server system 4204 can determine from the user activity and product purchase information for the content elements from the repositories 4208-4210. For example, the server system 4204 can determine user engagement with the user-generated content 4224 (after it has gone live/published) across a number of dimensions, such as a number of views of the content 4224, a number of times either the content 4224 or other content elements it tags have been saved, and/or a number of times that products tagged in the content 4224 have been purchased. Other dimensions are also possible. Such data can additionally be plotted over time, so that the user of the computing device 4202 is able to view trends with regard to the content element 4224.

The server system 4204 can provide the analytics information to the client computing device (as indicated by step H, 4242), which the client computing device 4202 can present in the GUI 4246 (as indicated by step I, 4244). The example GUI 4246 can include a variety of different features and graphical elements for presenting the analytics information, which can pertain to a single content element (e.g., single social media post) and/or to a combination of content elements (e.g., multiple social media posts). The GUI 4246 also includes selectable tabs 4248*a-c* that the user of the device 4202 can use to toggle between analytics information for different dimensions, such as content views (4248*a*), content saves (4248*b*), and product purchases for products tagged in content (4248*c*). In the depicted example, the product purchase tab 4248*c* is selected, which causes the GUI 4246 to present a graph 4250 plotting product purchases 4252 (e.g., number of product purchases, revenue from product purchases) related to one or more content elements over time 4254 (e.g., current day, week, month, year) with influencer revenue information 4256 related to one or more products tagged in the one or more content elements. Example influencer revenue information 4256 depicted in the GUI 4246 includes a number of products sold 4258, a percentage of the product sales that have been done in-network 4260 (as opposed to being out of network), and an amount revenue 4262 from product sales earned by the user of the device 4202. In-network refers to sales processed through the server system 4204 and/or through affiliated computer systems that have pre-established arrangements with the server system 4204 (and its users) to share revenue from product sales generated through content on the server system 4204 (e.g., generated from social posts).

Users designated as influencers on the server system 4204 can receive a portion (e.g., percentage, per product amount) of the revenue from in-network sales that originate through content (e.g., social media posts tagging products) they have generated and distributed to other users through the server system 4204. Influencers may not receive revenue from sales that are out of network. For example, an influencer can receive a share of revenue from product sales (and/or other activity) for products that are tagged in social media posts generated by the influencer. Product sales attributed to an influencer can be limited to those that stem directly from the content generated by the influencer. For example, a social post (tagging a product) created by an influencer can be distributed to other users who are socially connected to the influencer (e.g., following the influencer, friends with the influencer). The post can be presented on client computing devices in user interfaces through which these other users can purchase the products tagged in the post, such as through purchasing the product from within a social feed, selecting a link/graphical element for the product from within the post and purchasing on the product another page/site, and/or saving the post (and/or tagged product) and purchasing the product at a later time from a repository of saved content. Such purchases can be directly attributed to the post and can be designated as having originated with the influencer, and a portion of the revenue from the purchase can be allocated to the influencer through data stored in the repositories 4206-4210 (described in greater detail below with regard to FIGS. 43A-B).

The server system 4204 can be programmed to not allocate product purchases that indirectly stem from the user-generated content element. For example, if an influencer generates a social post (tagging a product) that is shared by one of their followers, and then the product is purchased by another user (not a follower) who views the shared content, that purchase may not be attributed to the influencer because it is not direct. Such indirect purchasing of products can be determined by the server system 4204 and used to designate data regarding directly attributable product purchases in the repositories 4208-4210. Providing compensation for only directly attributed purchases can provide an incentive to influencers to cultivate a rich following of users instead of relying other people who are socially connected with their followers to make purchases.

The server system 4204 can additionally provide analytics to merchant computing devices, such as the computing device 4266, regarding one or more products that are sold by the merchant. For example, the computing device 4266 can request analytics related to a particular product from the server system 4204, which can prompt the server system 4204 to retrieve relevant information from the repositories 4206-4210 and to provide analytics information to the device 4266, as indicated by step J (4264). The analytics information can be presented in the GUI 4270 on the computing device 4266, as indicated by step K (4268). The analytics information can be provided over a variety of dimensions, including both product and social dimensions related to content elements that tagged the product. For instance, analytics information can be across the multiple example dimensions 4280*a-c*, which include a number of posts that tagged the product (4280*a*), a number of save instances in which users either saved a post tagging the product or saved the product directly (4280*b*), and a number of times the product was purchases (4280*c*).

In the depicted example, the GUI 4270 includes a product analytics section 4272 and a sentiment analytics section 4282. The products analytics section 4272 includes example histograms (4278) presenting information on a number of instances of social and product action (4274) across multiple different demographic categories (4276), which the server system 4204 can determine from, for example, user profile information that users provide to the server system 4204. The sentiment analytics section 4282 also includes example histograms 4288 that compare a number of instances (4284) in which particular user responses (4286) are provided with regard to the product (and/or posts tagging the product). The responses 4286 can be, for example, different enumerated reactions that users can register to a content element (e.g., social post) and/or tagged product element, such as liking or loving an element. The responses 4286 can also include reactions that users enter through comments for a content element and/or tagged product element, such as emojis, tags (e.g., hashtags), keywords, links, animated media elements (e.g., animated GIFs), and/or other reactions. The sentiment analytics 4282 can provide a merchant with insight into how users view a particular product and content elements that tag the product. For example, the post histogram for Response A can indicate a number of instances of the Response A in posts and/or in reactions/comments to posts tagging the particular product, the save histogram can indicate a number of instances of those posts being saved by users, and the purchase histogram can indicate a number of instance that the particular product has been purchased from those posts.

Additional analytics features and dimensions can be presented in the merchant GUI 4270. For example, the merchant GUI 4270 can permit a merchant to drill-down into particular categories of data and/or to aggregate particular groupings of data. The merchant GUI 4270 can also allow merchants to track revenue that is being allocated to influencers and to make adjustments thereto. For example, the merchant GUI 4270 can allow a merchant to increase the revenue allocation to influencers for a particular product to incentivize influencers to consider a social post tagging that product.

FIGS. 43A-B, 44, and 45A-B are conceptual diagrams with screenshots depicting example features and user interactions with the social-retail platform (example implementation of the computer system 240) described above with regard to FIGS. 3A-B, 4A-B, 5A-B, 6A-B, and 7A-B. In particular, these screenshots depict example implementations of the GUIs 4222, 4246, and 4270 described above with regard to FIG. 42 and the system 4200 on a social-retail platform. For example, the user-generated content element 4224 can be a social post that tags a product element as described with regard to FIGS. 3A-B, 4A-B, 5A-B, 6A-B, and 7A-B.

Figure 43A:
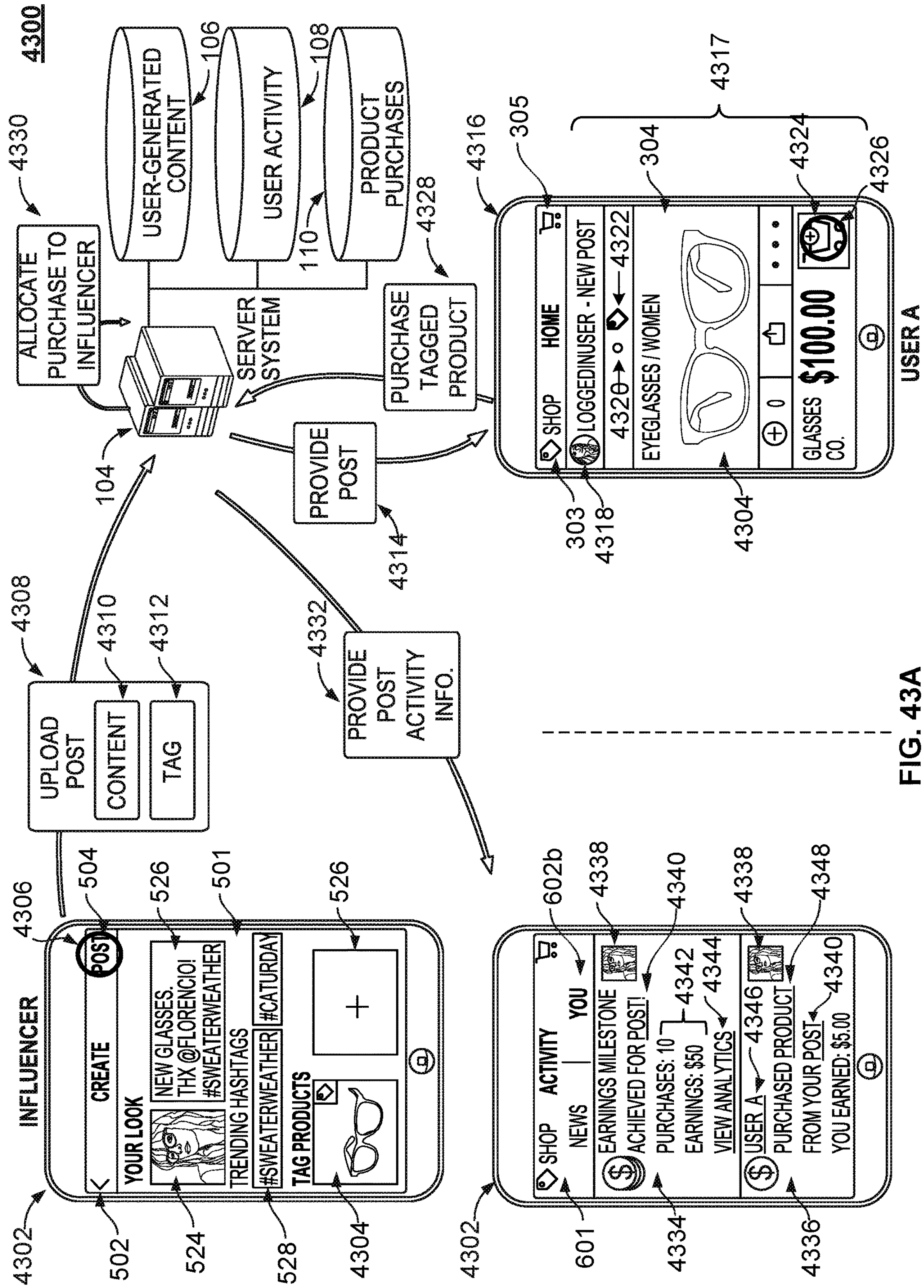
FIGS. 43A-B conceptual diagrams depicting sequences of screenshots through which engagement with a social post is tracked on an example platform.
Figure 43B:
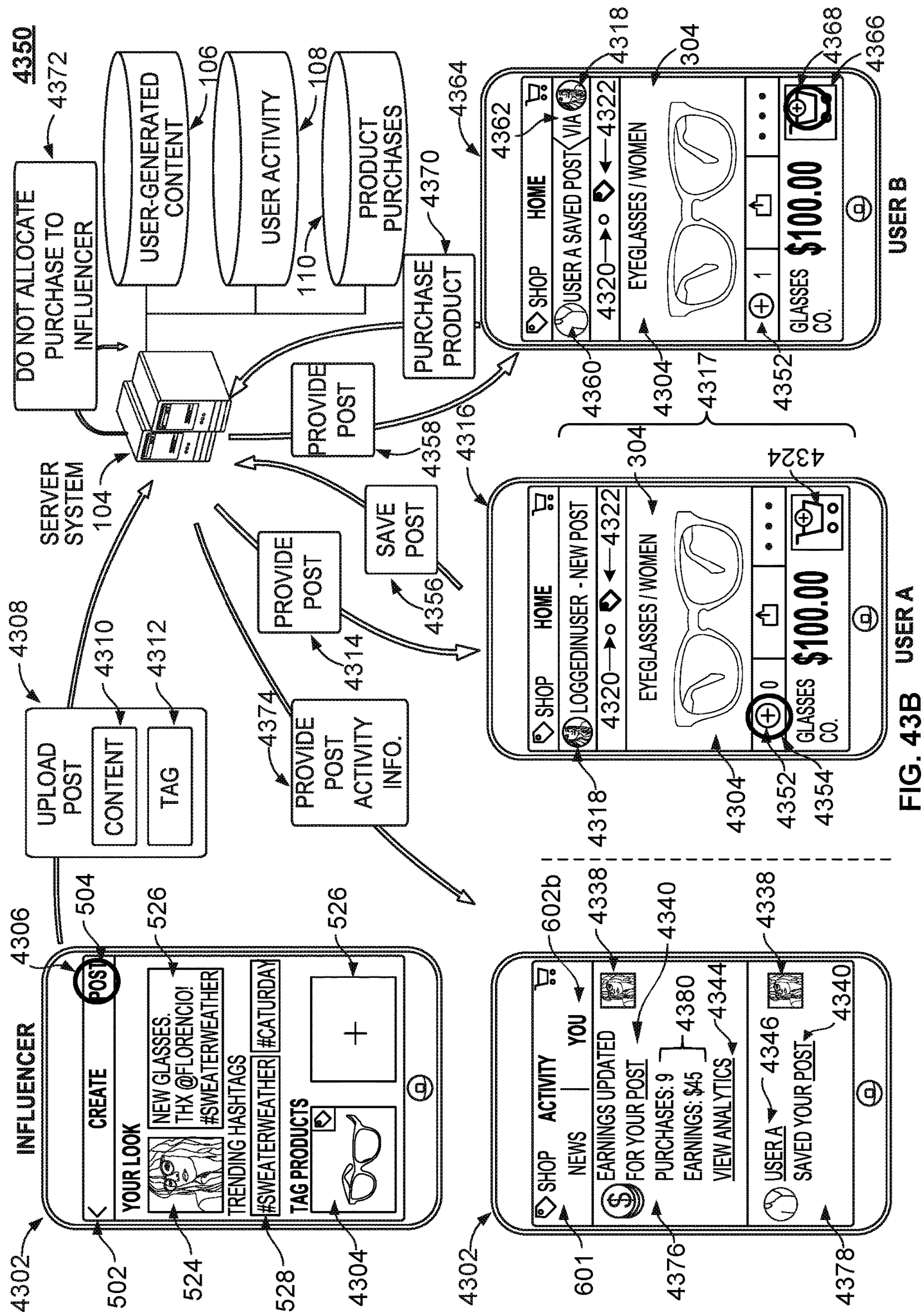

Referring to FIGS. 43A-B, conceptual diagrams depicting sequences of screenshots through which revenue for a product sale is allocated to an influencer (FIG. 43A) or not allocated to an influencer (FIG. 43B) based on whether the product purchase originated from the influencer's social post.

Referring to FIG. 43A, an example system 4300 is depicted in which an influencer is compensated for a product purchased directly from a social post that the influencer created. The example system 4300 includes an influencer computing device 4302 (similar to the computing devices 4202 and 300 described above) that is associated with an influencer on the social-retail platform provided by the server system 4204, another computing device 4316 associated with another user who is following (or otherwise socially connected with) the influencer, and the server system 4204 (and associated data repositories 4206-4210). In this example, the influencer is creating a social post through the GUI 501 that tags product element 4304, which in this example is a pair of glasses. As indicated by the example input 4306, the user selects the post element 504, causing the computing device 4302 to upload the post with content 4310 and the product tag 4312 (4308) to the server system 4204. In response to receiving the post upload, the server system 4204 can add the post and product tag to the data repositories 4206-4210 for subsequent distribution to other user who are following (or otherwise socially connected to) the influencer.

The server system 4204 can store the post in a manner that will permit the server system 4204 to serve it to client devices, but also to track and attribute product purchases to the influencer's social post. For example, server system 4204 can store posts with unique identifiers that are associated with the user who created it and with any products that are tagged in the content. For example, the following simplified database schema can be used to store data entries in the user-generated content data repository 4206:

<content id><creator id><product id><content>

The <content id> field can be a unique identifier for a social post. The <creator id> field can be a unique identifier for the user who created the content. The <product id> field can be a unique identifier for the product element tagged in the content, and the <content> field can be the content.

The server system 4204 can subsequently provide the post created by the influencer to the user computing device 4316 (4314), such as in response to a request for content from the computing device 4316. The computing device 4316 can present the post 4317 in the home feed GUI 304. For example, the post 4317 can include attribution information 4318 identifying the influencer as the source of the post, such as the influencer's image and username. The post includes icons 4320-4322 indicating that the post 4317 includes a tagged product, and the product icon 4322 being highlighted indicates that the user of the device 4316 the product element (product 4304) associated with the post 4317 is currently being shown. For example, the social post content can originally be presented in the GUI 304, but the user of the device 4316 may display the product element 4304 in response to particular types of user input via the GUI 304, such as horizontal scrolling or swiping input with regard to the post 4317. The product element 304 that is presented includes various information associated with the product element, including a button 4324 through which the user can purchase or add the product (glasses) to the virtual shopping cart 305. As indicated by the user input 4326 selecting the button 4324, the user can purchase the product element 4304 either directly from within the GUI 304.

In response to the user input 4326, the computing device 4316 can transmit information indicating that the product element 4304 tagged in the post 4317 is being purchased by the user. The server system 4204 can store information indicating that this purchase, which is directly attributed to the post 4317, should be allocated to the influencer who created the post 4317. For example, the server system 4204 can log information into the user activity data repository 4208 and/or the product purchases repository 4210 that indicates that the product purchase should be allocated to the post 4317 and the influencer. For example, products that are purchased directly within the an interface presenting a content element, such as a social feed (e.g., GUI 304), can be processed by the server system 4204 and logged directly in the product purchases repository 4210, such as in the following format:

<purchase id><user id><content id><product id><purchase amount>

The <purchase id> field can be a unique identifier for the purchase. The <user id> field can be a unique identifier for the user (e.g., User A) who purchased the product 4304 identified by the <product id> field. The <content id> field can be the unique identifier for the social post 4317 from which the product was purchased. The <purchase amount> can be the amount the user paid for the product. For example, the client computing device 4316 on which a user is purchasing the product element 4304 from within, for instance, a social feed GUI 304 can be programmed to transmit at least the <user id>, <content id>, and <product id> information to the server system 4204, which can process the purchase and add the entry for the purchase (with the <purchase id> and the <purchase amount>) to the repository 4210.

In instances in which the product 4304 purchase is processed on an affiliated computer system (as opposed to being processed directly on the server system 4204), the purchase can be attributed to the social post 4317, for example, logging instances of user action that direct a user from the user-generated content element to another page/site, and then correlating that user action to purchase information. For example, when the user of the device 4316 selects the button 4324 (or a link, or other graphical element) for the tagged product 4304 from the social media post 4317, the instance of that user selection can be reported by the client computing device 4316 to the server system 4204 and logged in the repository 4208, such as in the following format:

<action id><user id><content id><product id>

The <action id> field can be a unique identifier for the action (e.g., selection of the button 4324). The <user id> field can be a unique identifier for the user (User A) who performed the action with regard to the product 4304, uniquely identified by the <product id> field for the product element 4304. The social post 4317 tagging the product element 4304 can be uniquely identified by the <content id> field. To preserve user privacy, the client computing device 4316 can be programmed to transmit the unique <action id> field value (or other unique identifier that is not directly linked to the user) to affiliated computer systems (along with an identifier for the server system 4204), which can log the <action id> field value in association with product purchases. Purchase data with the <action id> field value can then be transmitted back to the server system 4204 by the affiliated computer system, and the server system 4204 can use the <action id> field value to identify other associated values (<user id>, <content id>, and <product id> field values) from the repository 4208 and to attribute the purchase to the user who created the content element from which the purchase originated. Such values can then be logged by the server system into the product purchases repository 4210, as discussed above.

In another example, if the user of the device 4316 were to save the product element 4304, by selecting the "+" button, and subsequently purchasing the product element 4304, the user purchase of the saved product (persistently saved in association with a user's profile) can also be directly attributed to the social post 4317 and the influencer (user of device 4302) from which the product element that were originally been saved (or otherwise persistently associated with) the user's profile. For example, when a user saves the social post 4317 that tags the product element 4304 and/or saves the product element 4304 directly, the product element 4304 and the social post 4317 can be associated with the user (User A) who performed the action, such as in the repository 4208 in the following data format:

<save id><user id><content id><product id>

The <save id> field can be a unique identifier for the save instance. The <user id> field can be a unique identifier for the user (User A) who performed the save action. The <content id> field can be a unique identifier for the social post 4317 that was either saved or that tagged the product element 4304, uniquely identified by the <product id> field, that was saved. When the user (user A) subsequently goes to purchase a saved product, either directly through the server system 4204 or through an affiliated computer system, the save identifier <save id> (provided to the client computing device 4316 on which the user is purchasing the saved content) can be transmitted in association with the purchase and used by the server system 4204 to lookup corresponding information for the purchase (e.g., the <content id> field value and the <product id> field value), which can be used to log the purchase in the product purchase repository 4210, as discussed above.

The server system 4204 can allocated the product purchase to the influencer (4330) in this instance based on the purchase having directly originated from the social post 4317 created by the influencer. For example, the server system 4204 can reference the product purchase repository 4210 to determine and allocate product purchases to influencers (and other users) on the server system 4204. The server system 4204 can determine percentages (or other amounts) of revenue from particular product purchases attributed to an influencer. The server system 4204 can maintain various allocations of revenue for particular products depending on, for example, the merchant, the product manufacturer, the product SKU, current deals/offers extended to the influencer, the site processing the purchase (e.g., the server system 4204, in-network affiliate, out of network) and/or other factors. The server system 4204 can use this to determine an amount that has been earned by influencers who are compensated for driving product purchases through their social activity, but can also be used to identify other users who should potentially be offered the opportunity to be influencers (e.g., users who are driving significant amounts of social engagement with their content, such as through product purchases).

The server system 4204 can provide information on the post 4317 and associated product purchases to the computing device 4302 for presentation in the activity feed (4332). For example, the activity feed GUI 601 can present example activity feed entries 4334 and 4336 relating the influencer's revenue allocation for the product element 4304 having been tagged in the post 4317. In particular, the entry 4334 indicates that the influencer has obtained a revenue milestone for products purchased via the post (identified by the icon 4338 and the link 4340), and included information 4342 identifying the milestone (e.g., number of purchases, amount of revenue allocated to the influencer) and providing a link 4344 to view analytics for the post (e.g., view the analytics presented in the interface 4246). The entry 4336 indicates that the user of the computing device 4316 (identified by the link 4346) purchased the product element 4304 (identified by the link 4348) tagged in the post 4317 (identified by the icon 4338 and link 4340).

Referring to FIG. 43B, an example system 4350 (similar to system 4300) is depicted in which the influencer is not compensated for a product purchased indirectly from the social post 4317 that the influencer created. The example system 4350 includes the influencer computing device 4302, the computing device 4316 associated with a first user (User A) who saves the influencer's post, another computing device 4364 associated with a second user (User B) who purchases a product tagged in the influencer's post based on the save by the first user, and the server system 4204 (and associated data repositories 4206-4210). In this example, the influencer creates the social post 4317 that tags the product element 4304 in the GUI 501 and uploads it to the server system 4204 (4308), which causes the server system 4204 to distribute it to the computing device 4316 (4314) for the first user who is following (or otherwise socially connected to) the influencer. The is the same sequence of steps that are described above with regard to FIG. 43A.

However, in this example the first user on the computing device 4316 does not purchase the product element 4304, but instead saves the product element by selecting the save button 4352, as indicated by the selection input 4354. In response to the button 4352 being selected, the computing device 4316 can transmit a request for the post 4317 and/or the product element 4304 to be saved in association with an account for the first user, as indicated by 4356. The server system 4204 can store data regarding the save in the user activity repository 4208, as described above, which the first user can access from his/her profile at a later date.

The first user saving the post 4317 and/or the product element 4304 tagged in the post 4317 can additionally cause the server system 4204 to transmit the post 4317 and/or the product element 4304 to other users who are following (or otherwise socially connected to) the first user, such as the second user. These other users may not be following the influencer, however the influencer's content may be distributed to them based on the actions of users who are following (or otherwise socially connected to) the influencer. For example, the post can be provided by the server system 4204 to the computing device 4364 associated with the second user, as indicated by 4358. The post 4317 and the product element 4304 can be presented in the GUI 304 on the computing device 4364 in the similar manner as it is presented on the computing device 4316, but the attribution for the post 4317/product element 4304 can be different. For example, attribution information 4360 can identify the socially connected user (first user) and the action that user performed (save) to cause the post 4317/product element 4304 to be presented in the GUI 304. However, the original creator of the post 4317 can additionally be identified in the "via" section 4362, which identifies the influencer 4318 who created the post 4317.

In this example, the second user selects a purchase button 4366 (similar to the button 4324) to purchase the product element 4304, as indicated by the selecting input 4368. In response the button 4366 being selected, the computing device 4364 can transmit information regarding the product purchase to the server system 4204, as indicated by 4370. For example, the computing device 4364 can transmit a save identifier (<save id>—identifying the instance of the first user saving the post 4317/product element 4304), a user identifier for the second user (<user id>—identifying the second user), and information indicating that the second user is purchasing the product element 4304.

The server system 4204 can receive this information and determine whether to allocate the purchase to the original creator of the post 4317. However, unlike the purchase described above with regard to FIG. 43A, the purchase in this instance is indirect with regard to the influencer—meaning that since the post 4317 was surfaced to the second user via one or more intermediaries (e.g., the first user), the purchase is not attributed to the influencer and the influencer does not receive a portion of the revenue from the purchase. For example, the server system 4204 can use the save identifier from the client computing device 4364 to obtain a unique identifier for the post (<content id> field) that was saved and a unique identifier for the user who saved it (first user). The server system 4204 can also use the unique identifier for the post to obtain an identifier for the original creator (<creator id> field), and can compare the identifier for the original creator (influencer), the user who saved the post (first user), and the user who purchased the product via the post save (second user) to determine whether the purchase was direct or indirect. The server system 4204 can determine that a product purchase is indirect when there are more than two unique user identifiers in the set of users in a chain from creation to product purchase, such as in this instance, which has three unique user identifiers (influencer, first user, and second user). However, in instances where there are two unique user identifiers in the chain, the server system 4204 can determine that the product purchase was directly attributable to the original user. In this instance, the sever system 4204 can determine that the product purchase was indirect and can log the product purchase as such (enter flag or data value to distinguish between direct and indirect attribution in the product purchase repository 4210).

The server system 4204 can provide information related to the post 4317 and its performance to the influencer's computing device 4302, as indicated by 4374. Similar to the description in FIG. 43A, this information can be presented in the activity feed 601 for the influencer, and can include activity entries 4376 and 4378. The entry 4376 is similar to the entry 4334 described above with regard to FIG. 43A, but in this instance the information 4380 indicates one fewer purchase and less earnings for the product that are attributed to the influencer. Since the purchase by the second user on the computing device 4364 is not attributed to the influencer, information regarding this purchase does not appear in the activity feed 601. Instead, the save action by the first user of the post 4317 appears in the activity feed 601 as entry 4378.

Figure 44:
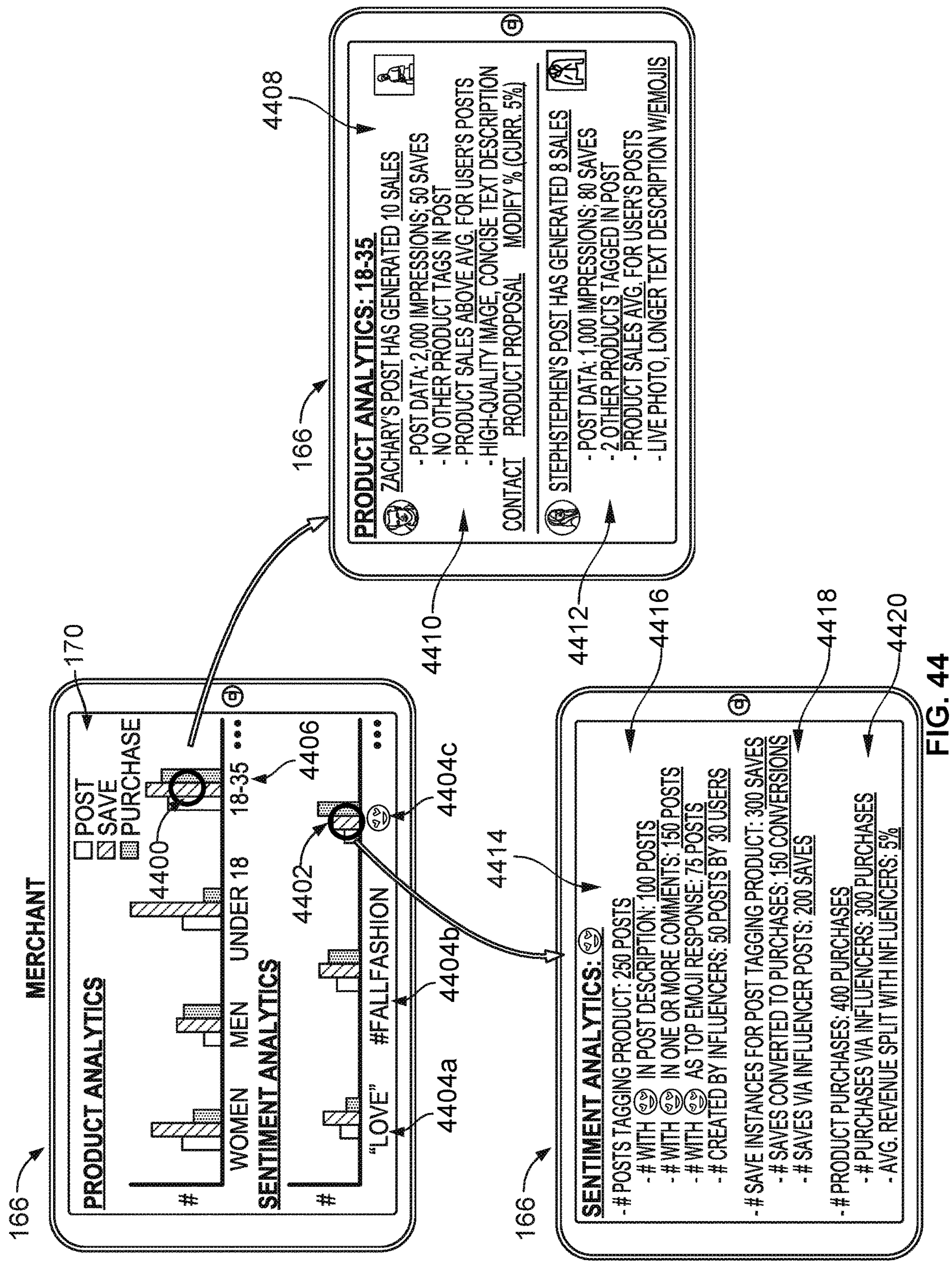
FIG. 44 are screenshots of example GUIs for viewing analytics information on an example platform.

FIG. 44 depicts screenshots of example GUIs for viewing analytics information. In particular, the example GUI 4270 on computing device 4266 described above with regard to FIG. 42 is depicted with selectable features through which a user (merchant) can drill down into particular analytics categories to view additional information regarding data the underlies the analytic values.

For example, user input 4400 selecting the 18-35 demographic category 4406 in the product analytics section of the GUI 4270 can cause detailed product analytics information 4408 for this demographic category to be presented on the computing device 4266. For example, the computing device 4266 can request and present detailed information for the selected demographics category, such as presenting an ordered ranking of posts 4410-4412 that have tagged the relevant product(s) to the analytics. In this example, the posts 4410-4412 (only a portion of which are depicted, others can be presented via scrolling in the interface) can include a variety of information related to each post that has tagged the relevant product(s), such as the number of sales, the number of impressions, the number of saves, whether other products were also tagged in the post, how the product sales compare to other sales stemming from the user's posts, qualitative analysis of the user's post (e.g., image quality, textual description quality), and/or other information. A variety of information can be further drilled down into and/or analyzed by the user via the selectable links, such links to view the post, to view a timeline of purchases related to the post, to contact the user directly, to provide additional product proposals to the user, and/or to modify a current percentage of revenue allocated by the merchant to the user. Other features are also possible.

In another example, user input 4402 selecting the example sentiment 4404*c* (an emoji) from multiple different sentiments 4404*a-c* (e.g., keywords, hashtags, emojis) related to the product(s) is received. In response to the user input 4402, sentiment analytics information 4414 related to the selected sentiment 4404*c* is presented on the computing device 4266. The sentiment analytics information 4414 includes analytics information on posts 4416, on save instances 4418, and on product purchases 4420. Several of these analytics provide selectable links through which the user of the device 4266 can further drill down into or analyze the underlying data, such as viewing the individual posts that have tagged a product, posts that have included the sentiment 4404*c* in the description, posts for which the sentiment 4404*c* has been provided in the comments, posts for which the sentiment 4404*c* has been identified as the top emoji response, posts that have been created by influencers, a number of save instances, a number of saves converted to purchases, an number of saves via influencers posts, a number of product purchases, a number of product purchases via influencers, an average revenue split with influencers, and/or other relevant features.

Figures 45A, 45B:
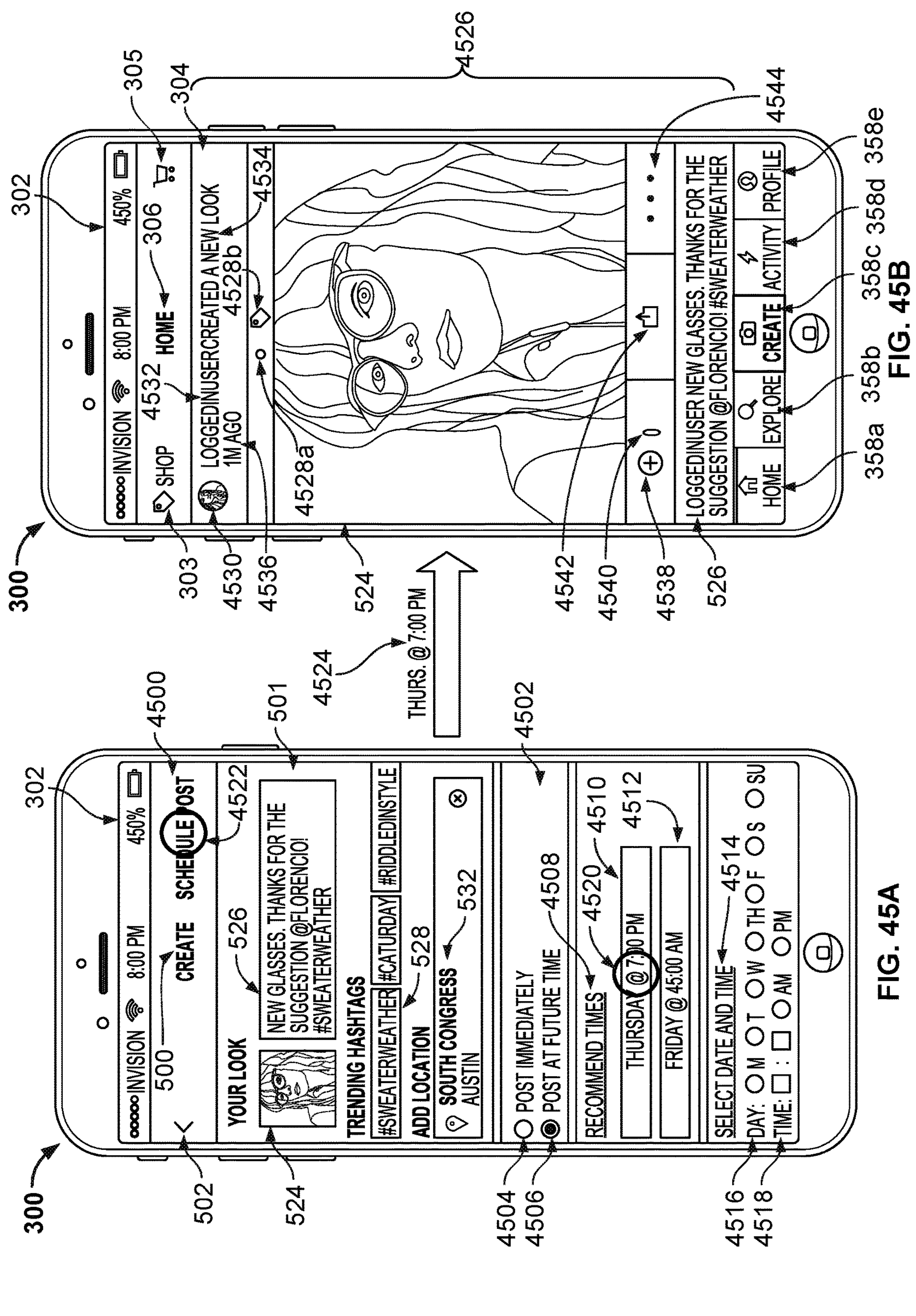
FIG. 45A-B are screenshots of an example GUI for scheduling a post on an example platform.

Referring to FIGS. 45A-B, a sequence of screenshots depicting user interactions with the GUI 501 to create a time-scheduled post on the example social-retail platform provided by the computer system 240 is depicted. Referring to FIG. 45A, it depicts the same state of the post creation as in FIG. 5B, but in this example additional features 4500-4518 are added to schedule the post for a future time (as opposed to posting when the user selects the post button 504). For example, the GUI 501 includes a section 4502 with selectable radio buttons 4504 and 4506 to allow a user to select between posting immediately and delaying the post until a future time. In the depicted example, the delay option 4506 is selected. The GUI 501 further includes recommended future days and times to post (4508), which in this example include Thursday at 7:00 pm (4510) and Friday at 45:00 am (4512). The times can be determined and recommended by the server system 204 based on a variety of factors, such as the past performance of posts (e.g., number of view, number of saves, number of product purchases, number of shares) by the user at various times and/or the past performance of posts by other users. The GUI 501 further includes options 4514 to allow a user to designate a specific day (4516) and time (4518) for the post to go live on the server system 240.

In the depicted example, the user selects (4520) the proposed option 4510 and then selects (4522) the schedule post feature 4500. This user input 4520-4522 causes the client computing device 300 to transmit the post with the delayed/future post information to the server system 240, which can schedule the post to go live (change from being private to public) at the user-designated time. For instance, as indicated by the arrow 4524, in the depicted example the server system 240 will delay the post from going live until Thursday at 7:00 pm (option 4510), at which point the post will be presented in the GUI 304 (as depicted in FIG. 45B) of the creator and/or other users (e.g., friends, followers) who are socially connected to the user who created the post.

Referring to FIG. 45B, once the time designated for the post to go live has been reached, the scheduled post 4526 can be served by the server system 240, such as in a social network feed of other users who are following (or otherwise socially connected to) the post creator. For instance, the post 4526 is depicted in the GUI 304, similar to the posts described above with regard to FIGS. 3A-B. In this example, the post 4526 includes the user-selected photo 524, the user-generated description 526, and an indicators 4528*a-b* that the post 4526 includes a tagged product. For example, as discussed above, the circle symbol 4528*a* can represent the social post 4526 and the product symbol 4528*b* can indicate that there is a tagged product with a corresponding product element that can be viewed by horizontally scrolling with regard to the post 4526. The computing device 300 can further be programmed to present additional information for the post 4526 in the GUI 304, such as attributing creation of the post 4526 to a user associated with the image 4530 and user name 4532, information on what action that user took (4534), a time since that action was taken (4536), and selectable features 4538-4544 for a user viewing the post 4526 to interact with the post (e.g., save, share). Although the post 4526 is presented in the same computing device 300 as the computing device used to create the post 4526, it can additionally or alternatively be served by the server system 240 to other users who are different from the user who created the post.

Although particular combinations and sequences of graphical elements and inputs are described above, other combinations and sequences are also possible. For example, social feeds can be horizontally scrollable and product feeds can be vertically scrollable. In another example, users may scroll to the left from a social post along a product feed to navigate to product elements. Product elements can additionally and/or alternatively include a selectable feature to purchase the product directly from within a social feed (instead of adding a product to a virtual shopping cart). Other features and combinations are also possible.

Figure 46:
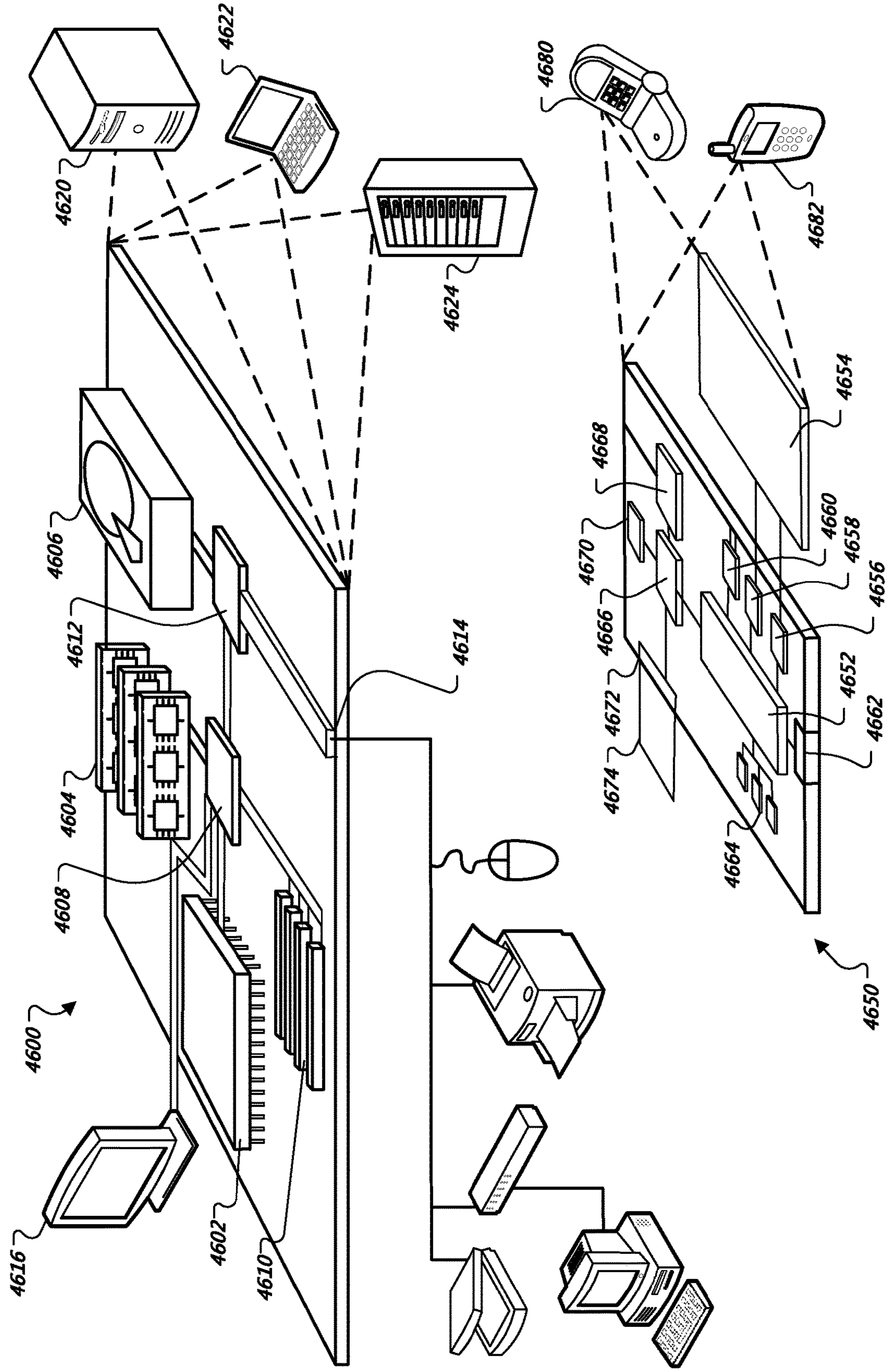
FIG. 46 is a block diagram of example computing devices that are optionally available for use with particular embodiments of the GUI and the platform described herein.

FIG. 46 is a block diagram of computing devices 4600, 4650 that may be used to implement the systems and methods described in this document, either as a client or as a server or plurality of servers. Computing device 4600 is intended to represent various forms of digital computers, such as laptops, desktops, workstations, personal digital assistants, servers, blade servers, mainframes, and other appropriate computers. Computing device 4650 is intended to represent various forms of mobile devices, such as personal digital assistants, cellular telephones, smartphones, and other similar computing devices. Additionally computing device 4600 or 4650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 4600 includes a processor 4602, memory 4604, a storage device 4606, a high-speed interface 4608 connecting to memory 4604 and high-speed expansion ports 4610, and a low speed interface 4612 connecting to low speed bus 4614 and storage device 4606. Each of the components 4602, 4604, 4606, 4608, 4610, and 4612, are interconnected using various busses, and may be mounted on a common motherboard or in other manners as appropriate. The processor 4602 can process instructions for execution within the computing device 4600, including instructions stored in the memory 4604 or on the storage device 4606 to display graphical information for a GUI on an external input/output device, such as display 4616 coupled to high speed interface 4608. In other implementations, multiple processors and/or multiple buses may be used, as appropriate, along with multiple memories and types of memory. Also, multiple computing devices 4600 may be connected, with each device providing portions of the necessary operations (e.g., as a server bank, a group of blade servers, or a multi-processor system).

The memory 4604 stores information within the computing device 4600. In one implementation, the memory 4604 is a volatile memory unit or units. In another implementation, the memory 4604 is a non-volatile memory unit or units. The memory 4604 may also be another form of computer-readable medium, such as a magnetic or optical disk.

The storage device 4606 is capable of providing mass storage for the computing device 4600. In one implementation, the storage device 4606 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 4604, the storage device 4606, or memory on processor 4602.

The high-speed controller 4608 manages bandwidth-intensive operations for the computing device 4600, while the low speed controller 4612 manages lower bandwidth-intensive operations. Such allocation of functions is exemplary only. In one implementation, the high-speed controller 4608 is coupled to memory 4604, display 4616 (e.g., through a graphics processor or accelerator), and to high-speed expansion ports 4610, which may accept various expansion cards (not shown). In the implementation, low-speed controller 4612 is coupled to storage device 4606 and low-speed expansion port 4614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 4600 may be implemented in a number of different forms, as shown in the figure. For example, it may be implemented as a standard server 4620, or multiple times in a group of such servers. It may also be implemented as part of a rack server system 4624. In addition, it may be implemented in a personal computer such as a laptop computer 4622. Alternatively, components from computing device 4600 may be combined with other components in a mobile device (not shown), such as device 4650. Each of such devices may contain one or more of computing device 4600, 4650, and an entire system may be made up of multiple computing devices 4600, 4650 communicating with each other.

Computing device 4650 includes a processor 4652, memory 4664, an input/output device such as a display 4654, a communication interface 4666, and a transceiver 4668, among other components. The device 4650 may also be provided with a storage device, such as a microdrive or other device, to provide additional storage. Each of the components 4650, 4652, 4664, 4654, 4666, and 4668, are interconnected using various buses, and several of the components may be mounted on a common motherboard or in other manners as appropriate.

The processor 4652 can execute instructions within the computing device 4650, including instructions stored in the memory 4664. The processor may be implemented as a chipset of chips that include separate and multiple analog and digital processors. Additionally, the processor may be implemented using any of a number of architectures. For example, the processor 4610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 4650, such as control of user interfaces, applications run by device 4650, and wireless communication by device 4650.

Processor 4652 may communicate with a user through control interface 4658 and display interface 4656 coupled to a display 4654. The display 4654 may be, for example, a TFT (Thin-Film-Transistor Liquid Crystal Display) display or an OLED (Organic Light Emitting Diode) display, or other appropriate display technology. The display interface 4656 may comprise appropriate circuitry for driving the display 4654 to present graphical and other information to a user. The control interface 4658 may receive commands from a user and convert them for submission to the processor 4652. In addition, an external interface 4662 may be provide in communication with processor 4652, so as to enable near area communication of device 4650 with other devices. External interface 4662 may provide, for example, for wired communication in some implementations, or for wireless communication in other implementations, and multiple interfaces may also be used.

The memory 4664 stores information within the computing device 4650. The memory 4664 can be implemented as one or more of a computer-readable medium or media, a volatile memory unit or units, or a non-volatile memory unit or units. Expansion memory 4674 may also be provided and connected to device 4650 through expansion interface 4672, which may include, for example, a SIMM (Single In Line Memory Module) card interface. Such expansion memory 4674 may provide extra storage space for device 4650, or may also store applications or other information for device 4650. Specifically, expansion memory 4674 may include instructions to carry out or supplement the processes described above, and may include secure information also. Thus, for example, expansion memory 4674 may be provide as a security module for device 4650, and may be programmed with instructions that permit secure use of device 4650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 4664, expansion memory 4674, or memory on processor 4652 that may be received, for example, over transceiver 4668 or external interface 4662.

Device 4650 may communicate wirelessly through communication interface 4666, which may include digital signal processing circuitry where necessary. Communication interface 4666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 4668. In addition, short-range communication may occur, such as using a Bluetooth, WiFi, or other such transceiver (not shown). In addition, GPS (Global Positioning System) receiver module 4670 may provide additional navigation- and location-related wireless data to device 4650, which may be used as appropriate by applications running on device 4650.

Device 4650 may also communicate audibly using audio codec 4660, which may receive spoken information from a user and convert it to usable digital information. Audio codec 4660 may likewise generate audible sound for a user, such as through a speaker, e.g., in a handset of device 4650. Such sound may include sound from voice telephone calls, may include recorded sound (e.g., voice messages, music files, etc.) and may also include sound generated by applications operating on device 4650.

The computing device 4650 may be implemented in a number of different forms, as shown in the figure. For example, it may be implemented as a cellular telephone 4680. It may also be implemented as part of a smartphone 4682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method for providing a graphical user interface (GUI) with a content stream, the method comprising:

receiving, at a computing device, a plurality of social media posts to present in a vertical content stream that is vertically scrollable in the GUI, wherein the plurality of social media posts are user-generated content and include image data and text, and wherein one or more product elements in the plurality of social media posts were previously tagged by users at other computing devices;

identifying, by the computing device, that a particular social media post includes one or more product tags that correspond to the one or more product elements and that have been added to the particular social media post by a user, wherein the one or more product tags identify the one or more product elements as being present in the particular social media post, and wherein the one or more product tags include an identifier for a product that is offered for sale on one or more merchant sites;

designating, by the computing device, the particular social media post as being part of a horizontal content stream that is horizontally scrollable in the GUI within the vertical content stream based on identifying the one or more product tags in the particular social media post, wherein the horizontal content stream includes the particular social media post as a primary element in the horizontal content stream and the one or more product elements that are sequentially arranged based on the corresponding one or more product tags;

preloading, by the computing device, the particular social media post and the one or more product elements;

displaying, by the computing device, the plurality of social media posts in the vertical content stream within a display screen of the computing device, wherein the particular social media post is displayed in the vertical content stream within the display screen while the one or more product elements are hidden from the display screen of the computing device;

receiving, through an input subsystem of the computing device, a horizontal scrolling input related to the particular social media post that causes the particular social media post to disappear from the display screen while at least one of the one or more product elements appears in the display screen in place of the particular social media post, wherein the horizontal scrolling input is received when the particular social media post is displayed in the vertical content with a particular context; and in response to receiving the horizontal scrolling input, removing the particular social media post from the display screen and displaying a first of the one or more product elements in place of the particular social media post in the vertical content stream so as to maintain the particular context within the vertical content stream, wherein the first of the one or more product elements is embedded within the vertical content stream in response to horizontal scrolling input related to the particular social media post, and wherein the first of the one or more product elements is displayed with non-user-generated content that includes at least one of product information, product ratings, and a product purchase option that are identified by a product tag that corresponds to the first of the one or more product elements.

2. The method of claim 1, wherein the first of the one or more product elements does not alter visibility of other social media posts adjacent the particular social media post being replaced.

3. The method of claim 1, further comprising:

receiving, through the input subsystem of the computing device, user input selecting a graphical element to purchase a product associated with the first product element; and adding, by the computing device, the product to a virtual shopping cart in response to receiving the user input.

4. The method of claim 3, wherein:

the vertical content stream is an infinite social feed, and the product is added to the virtual shopping cart without leaving the infinite social feed or launching another application.

5. The method of claim 3, further comprising:

receiving, through the input subsystem of the computing device, vertical scrolling input while displaying the first product element;

outputting, in response to receiving the vertical scrolling input, a next social media post in the vertical content stream.

6. The method of claim 1, wherein the GUI is outputted on the computing device by a social-retail application that is being executed or interpreted on the computing device.

7. The method of claim 1, wherein, when the particular social media post is removed from the display screen and the first of the one or more product elements is displayed in place of the particular social media post in the vertical stream, other social media posts that are displayed within the display screen remain unchanged in the vertical content stream.

8. The method of claim 1, wherein the first of the one or more product elements is displayed in the vertical content steam without launching a new application on the computing device.

9. A computing device to provide a graphical user interface (GUI) for presenting multiple types of content within a content stream, the computing device comprising:

one or more processors;

a network interface that is programmed to establish a network connection with a remote server system and to receive information from the remote server system over the network connection;

a display that is programmed to output a plurality of graphical elements as part of the GUI;

one or more input devices that are configured to receive user input related to the plurality of graphical elements; and memory storing instructions that, when executed, cause the one or more processors to perform operations to provide the GUI, the operations comprising:

receiving a plurality of social media posts to present in a vertical content stream that is vertically scrollable in the GUI, wherein the plurality of social media posts are user-generated content and include image data and text, and wherein one or more product elements in the plurality of social media posts were previously tagged by users at other computing devices;

identifying that a particular social media post includes one or more product tags that correspond to the one or more product elements and that have been added to the particular social media post by a user, wherein the one or more product tags identify the one or more product elements as being present in the particular social media post, and wherein the one or more product tags include an identifier for a product that is offered for sale on one or more merchant sites;

designating the particular social media post as being part of a horizontal content stream that is horizontally scrollable in the GUI within the vertical content stream based on identifying the one or more product tags in the particular social media post, wherein the horizontal content stream includes the particular social media post as a primary element in the horizontal content stream and the one or more product elements that are sequentially arranged based on the corresponding one or more product tags;

preloading the particular social media post and the one or more product elements;

displaying the plurality of social media posts in the vertical content stream within a display screen of the computing device, wherein the particular social media post is displayed in the vertical content stream within the display screen while the one or more product elements are hidden from the display screen of the computing device;

receiving, through an input subsystem of the computing device, a horizontal scrolling input related to the particular social media post that causes the particular social media post to disappear from the display screen while at least one of the one or more product elements appears in the display screen in place of the particular social media post, wherein the horizontal scrolling input is received when the particular social media post is displayed in the vertical content with a particular context; and in response to receiving the horizontal scrolling input, removing the particular social media post from the display screen and displaying a first of the one or more product elements in place of the particular social media post in the vertical content stream so as to maintain the particular context within the vertical content stream, wherein the first of the one or more product elements is embedded within the vertical content stream in response to horizontal scrolling input related to the particular social media post, and wherein the first of the one or more product elements is displayed with non-user-generated content that includes at least one of product information, product ratings, and a product purchase option that are identified by a product tag that corresponds to the first of the one or more product elements.

10. The computing device of claim 9, wherein the first of the one or more product elements does not alter visibility of other social media posts adjacent the particular social media post being replaced.

11. The computing device of claim 9, wherein the removing and displaying comprise an animated transition from the particular social media post to the first of the one or more product elements of the at least one of the other social media posts.

12. The computing device of claim 11, wherein the animated transition comprises a scrolling animation that corresponds to the horizontal scrolling input.

13. The computing device of claim 9, wherein the operations further comprise:

receiving, through the input subsystem of the computing device, vertical scrolling input while displaying the first product element; and outputting, in response to receiving the vertical scrolling input, a next social media post in the vertical content stream.

14. The computing device of claim 9, wherein:

the one or more product elements comprise product posts for products identified by the one or more product tags, the product posts including retailer-provided images for the products and retailer-provided textual descriptions of the products.

15. The computing device of claim 14, wherein:

the particular social media post further comprises user-generated comments for the plurality of social media posts, and the one or more product elements further comprise (i) user-generated reviews of the products in the product posts and (ii) selectable graphical elements to add corresponding ones of the products to a virtual shopping cart.

16. The computing device of claim 15, wherein:

the user-generated comments for the plurality of social media posts are from first groups of users, and the user-generated reviews for the product posts are from second groups of users that are different from the first groups of users.

17. The computing device of claim 16, wherein:

the first groups of users comprise users who have direct or indirect social media connections with an original poster of the plurality of social media posts, and the second groups of users comprise users who own or have otherwise used the products identified in the product posts.

* * * * *